United States Patent

[11] 3,551,665

[72] Inventors Don M. Powers;
Robert J. Litwiller, Poughkeepsie, N.Y.;
Robert E. Goldschmidt, Hyde Park, Mass.

[21] Appl. No. 579,082
[22] Filed Sept. 13, 1966
[45] Patented Dec. 29, 1970

[73] Assignee International Business Machines Corporation
Armonk, N.Y.
a corporation of New York

[54] FLOATING POINT BINARY ADDER UTILIZING COMPLETELY SEQUENTIAL HARDWARE
15 Claims, 113 Drawing Figs.

[52] U.S. Cl. .......... 235/175, 235/173
[51] Int. Cl. .......... G06f 7/50
[50] Field of Search .......... 235/175, 173, 168, 164, 156

[56] References Cited

UNITED STATES PATENTS

| | | | |
|---|---|---|---|
| 3,193,669 | 7/1965 | Voltin .......... | 235/164 |
| 3,043,509 | 7/1962 | Brown et al. .......... | 235/156 |
| 3,037,701 | 6/1962 | Sierra .......... | 235/159 |
| 3,022,006 | 2/1962 | Alrich et al. .......... | 235/160 |

OTHER REFERENCES

J. Earle Exponent Differences and Preshifter IBM Technical Disclosure Bulletin Dec. 1966 pp. 848—849 F. B. Jones Floating Point Feature on the IBM Type 1620 IBM Technical Disclosure Bulletin May 1962 pp. 43—46

*Primary Examiner*—Malcolm A. Morrison
*Assistant Examiner*—David H. Malzahn
*Attorneys*—Hanifin and Jancin and R. R. Schlemmer, Jr.

ABSTRACT: A high-speed adder utilizing a unique pipelining or serial flow-through design. By providing a plurality of latch points within the system as many as three separate addition operations may be processed or in execution concurrently within the adder circuitry. The latch points or interlocks prevent the mixing or inadvertent dumping of one operation into another. The exponent operations for preaddition decimal point alignment and for postaddition normalization and shifting are performed by completely separate units so that no unit of functional hardware within the adder is used more than one time in a given operation.

INVENTORS
ROBERT E. GOLDSCHMIDT
ROBERT J. LITWILLER
DON M. POWERS

BY [signature]
ATTORNEY

PATENTED DEC 29 1970 3,551,665

SHEET 09 OF 109

DIGIT PRE-SHIFTER

PATENTED DEC 29 1970 3,551,665

FRACTION ADDER SECTION 1 (HIGH ORDER)

FRACTION ADDER CARRY LOOK-AHEAD

UCC 2

START CONTROL 1

START CONTROL 2

SIGN CONTROL 1

FRACTION INPUT STORAGE REGISTERS

EXPONENT & SIGN INPUT STORAGE REGISTERS

ASSIGN GATE,
DIGIT PRE-SHIFT
AND TRUE
COMPLEMENT

| | | |
|---|---|---|
| FIG. 29A | FIG. 29B | FIG. 29C |
| FIG. 29D | FIG. 29E | FIG. 29F |
| FIG. 29G | FIG. 29H | FIG. 29I |
| FIG. 29J | FIG. 29K | |

EXPONENT SUBTRACTOR

ZERO DETECTOR
DECODE

| | |
|---|---|
| FIG. 33A | FIG. 33B |
| FIG. 33C | FIG. 33D |
| FIG. 33E | FIG. 33F |
| FIG. 33G | FIG. 33H |

ZERO DETECT

LOOK AHEAD

EXPONENT UPDATE
RESULT STORAGE

SIGN CONTROL

FLOATING POINT BINARY ADDER UTILIZING COMPLETELY SEQUENTIAL HARDWARE

TABLE OF CONTENTS

| Section | Title |
|---|---|
| I | General Introduction |
| II | General Description (of overall system). |
| III | General Description of High Speed Adder. |
| IV | Floating Point Unit (general description). |
| V | Description of Detailed Logical Schematics. |
| VI | Conclusions |
| VII | Claims |

The present invention relates to a novel adder configuration. More particularly, it relates to such an adder having speed capabilities fully compatible with modern, extremely fast computing systems.

Current computing system technology continues in the direction of ever faster and more complex machines. In particular, in such larger systems, the trend is to utilize a plurality of highly specialized units within the system wherein each of these units is particularly adapted to perform a specific function. For example, in many currently available systems, separate adders, multipliers, dividers, square root units, and the like are provided to perform the particular operation to which they are suited. Such systems normally have highly specialized control units which process the system instructions and route various operations to the different functional units for performance. Often the control units are able to cause the operations to be performed in parallel in said different functional units.

The result of this trend for more specialized functional units is to cause such units to be highly developed to perform a specific operation in an optimum manner without consideration for other operations the unit would otherwise have to perform.

As is well known the primary design objective of the extremely large scientific computers is to be able to operate with increasingly greater speed or shorter cycle time. This objective is necessitated by the fact that the type of problems to be performed on such computers typically require millions of separate operations to solve a single problem. The most critical timing problem is in the real time area such as weather forecasting wherein the answer must be forthcoming in time to constitute a forecast. However, in general, the faster a computer is, the better and more powerful it is.

In the past, memory cycle time has been a primary bottleneck in the ultimate speed capabilities of any particular machine. However, a recent memory developments have markedly reduced memory cycle times per se and further, new multiaccess techniques wherein plural operands are obtained from one or more memories in parallel have greatly reduced average cycle times. Accordingly, the burden of increasing system speed capabilities has in effect been returned to the arithmetic unit area.

Recent developments in electronic circuits and especially in the area of the integrated and even more sophisticated monolithic circuits has lowered the effective cost of an individual active circuit element and even entire circuit families such that sophisticated circuit designs, long considered prohibitively expensive in the past, are now realized. Further, with the new technologies faster and faster active circuit elements i.e., transistors are being produced. The net result of recent technological gains in the electronics industry and the computer industry in particular is that the speed of individual circuits is starting to be limited by the actual speed of flow of the electrons through the various conducting wires and components within a system. Further, with the reduced cost and greater quantity of circuitry which may be provided as an economically feasible design the ultimate design of most arithmetic units as multipliers, adders, and the like is rapidly approaching an optimum. For example, as is well known in a simple adder wherein any given two bits are added together, a sum and carry are generated. As is further well known, the primary time consumption in such an adder is for propagation of the carries, and attendant updating of the original summands as the carries are propagated. As is further well known, it is possible to provide a serial adder which starts in the low order position summands and merely proceeds upwards a bit at a time and keeps track of sums and carries as it goes in a relatively straightforward manner. Obviously this is far too time consuming for a large scale computer. Hence, for years such computers have used the well-known parallel adder wherein all bit positions of the summands are added in parallel and original sums and groups of carries are developed. In order to keep the propagate time for such adders down, carry look-ahead has been provided in order that the total number of logic levels be kept to a minimum. It is possible with modern adder design concepts utilizing a large degree of carry generation and look-ahead circuitry to design an adder in which the total number of logic levels necessary for adding many bits e.g. 48, 56, 64) is not significantly greater than that normally required for adding a single pair of bits in the old serial by bit-type adders. However, as is well known, such adders do require vast quantities of logical circuitry and interconnection. Such adders are well known in the IBM STRETCH machine, the IBM 7094 machine and also in a number of other large scale scientific computers produced by other leading manufacturers. The aforementioned computing systems contain such high-speed sophisticated arithmetic units an general and adders in particular, and the individual arithmetic units are capable of operating at speeds wherein the transmission of pulses from one logical level to the next becomes a major time problem. It is thus obvious that in order to increase the speed of such sophisticated computing systems, other system design approaches must be taken.

It has now been found that significantly improved operating speeds may be achieved in a very large high-speed computing system having high speed memory capabilities and advance data bussing control wherein operands can be provided to the arithmetic units as fast or faster than the arithmetic units can usually perform an operation. This is accomplished by providing separate operation units having parallel operating capabilities.

More particularly greater floating point addition/subtraction speeds are accomplished by providing a highly specialized add/substract unit having a unique data flow-through design. The flow-through design concept provides separate sequential hardware for performing each separate step in an addition/subtraction operation whereby no unit is used more than once in the operation. The individual units comprising the proposed system are more or less conventional. However, their organization and use are quite unique. Latch points or segmentation is provided in the add/substract unit so that, for example, new data may be input to the specialized input storage area while another operation is being performed. Also data, which is the result of a previous operation may be in the process of being transmitted to other storage areas while a new operation is being performed by the adder.

It is accordingly a primary object of the present invention to provide a novel high-speed adder unit for use in a computing system.

It is a further object of the present invention to provide such an adder particularly adapted for the high-speed performance of floating point addition/subtraction operations.

It is yet another object of the present invention to provide such an adder having unique data flow-through characteristics.

It is a still further object of the present invention to provide such an adder wherein each functional unit of said adder is used only once in any addition operation.

It is a still further object of the invention to provide such an adder having a plurality of latch points whereby separate segments of a given addition/subtraction operation may be performed and each is separated by said latch points.

It is another object of the invention to provide such an adder using highly parallel functional units which incorporate extremely high-speed integrated circuit technology. It is still another object to provide such an adder which is sufficiently fast to meet the severest demands of a high-speed scientific computer system having highly developed memory accessing and data bussing techniques.

These and other objects features and advantages of the invention will be apparent from the following description and drawings in which.

Figure 3:
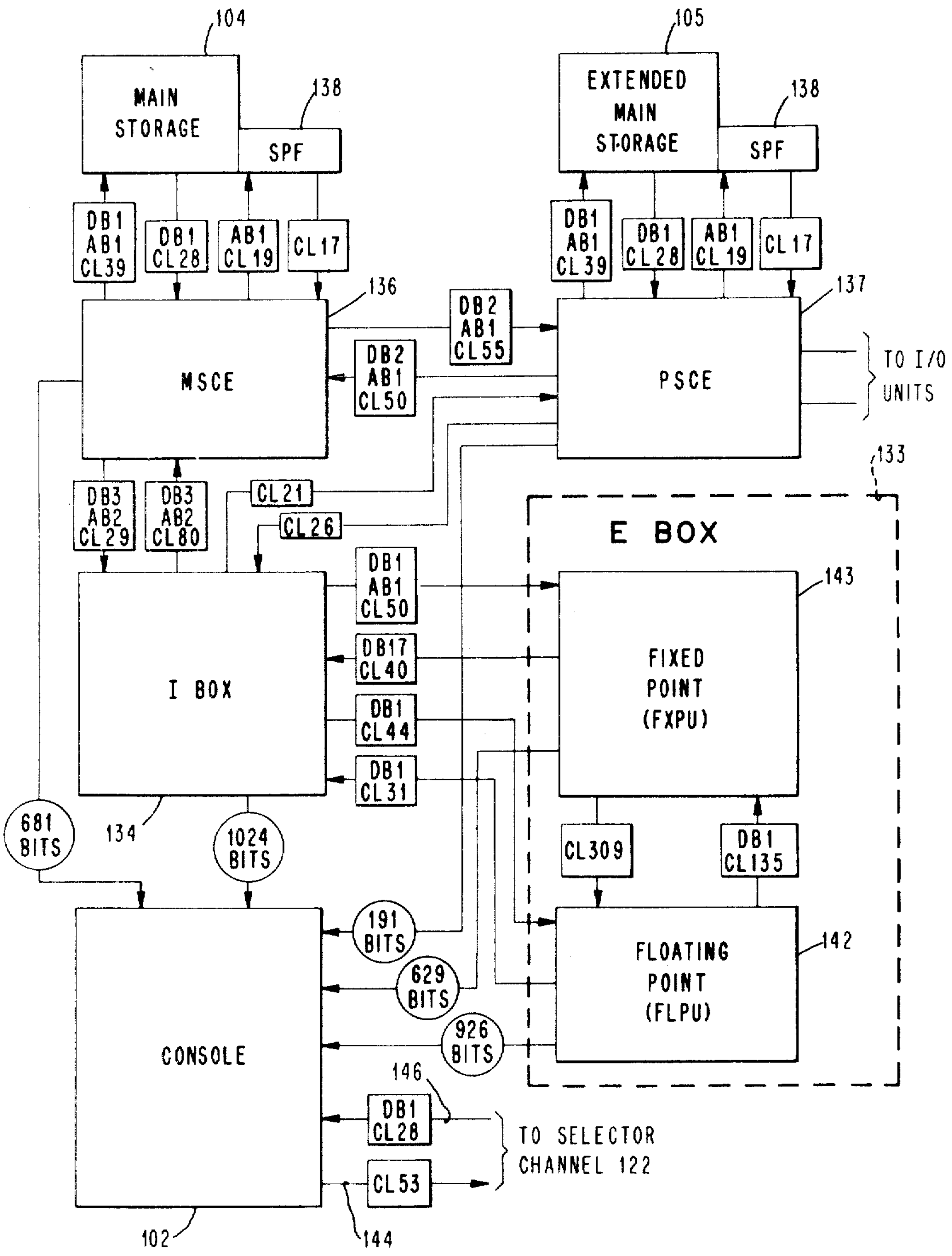
FIG. 3 is an organizational block diagram of the Central Process Unit showing more of the component interconnection detail than FIG. 2.
Figure 4:
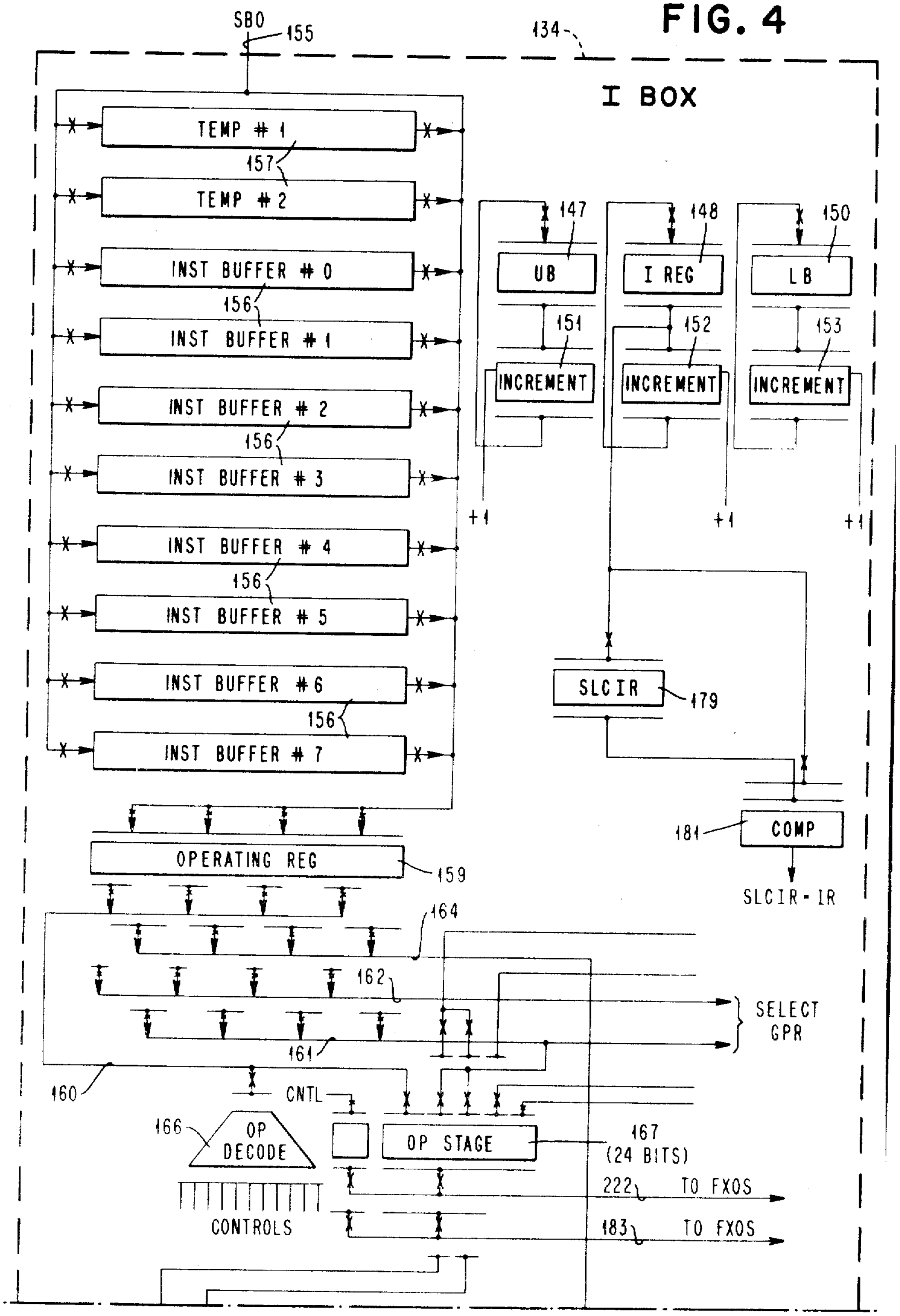
Figure 4A:
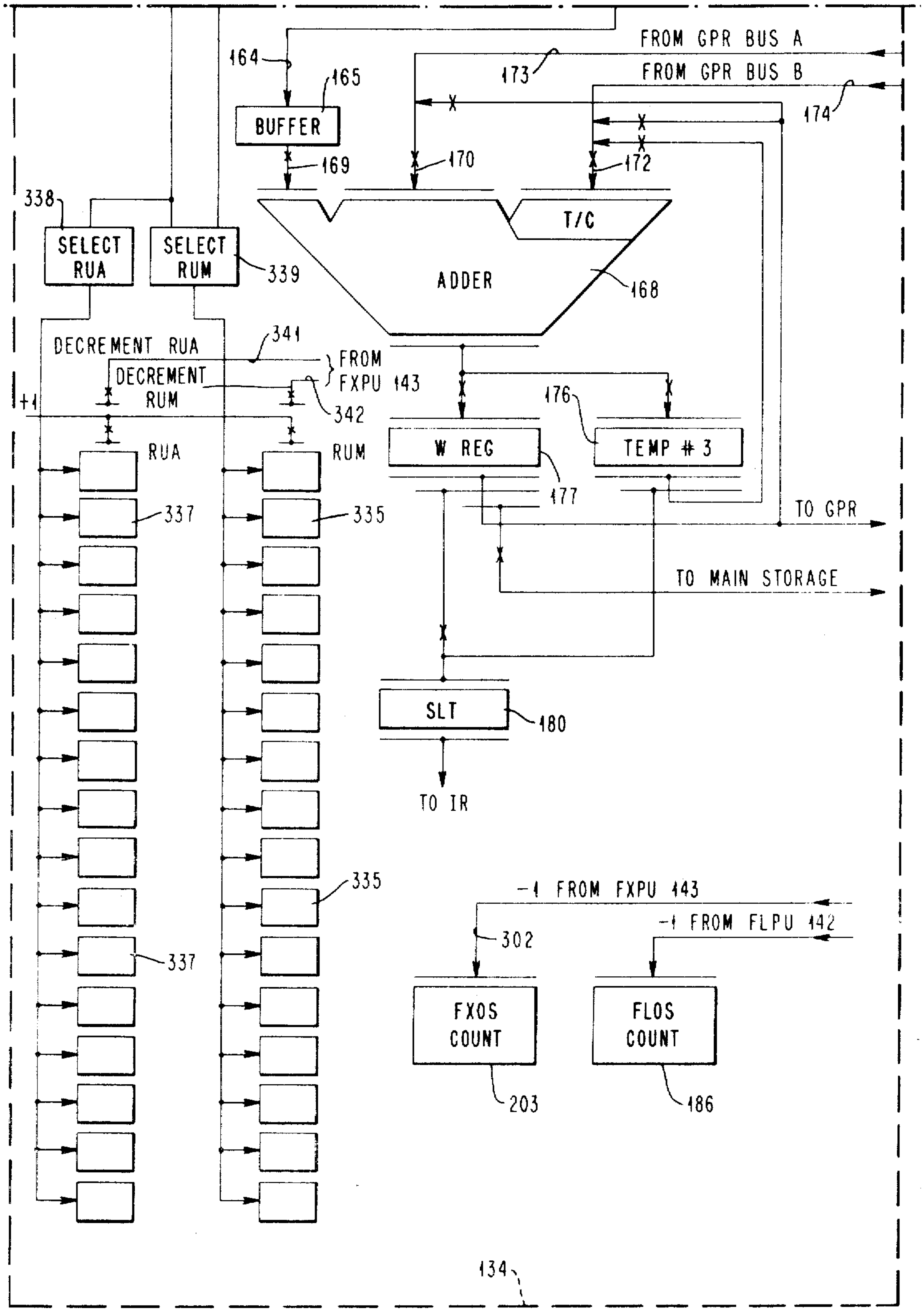

FIGS. 4–4A form a composite which is a functional block diagram of the I box of FIG. 3.

Figure 5:
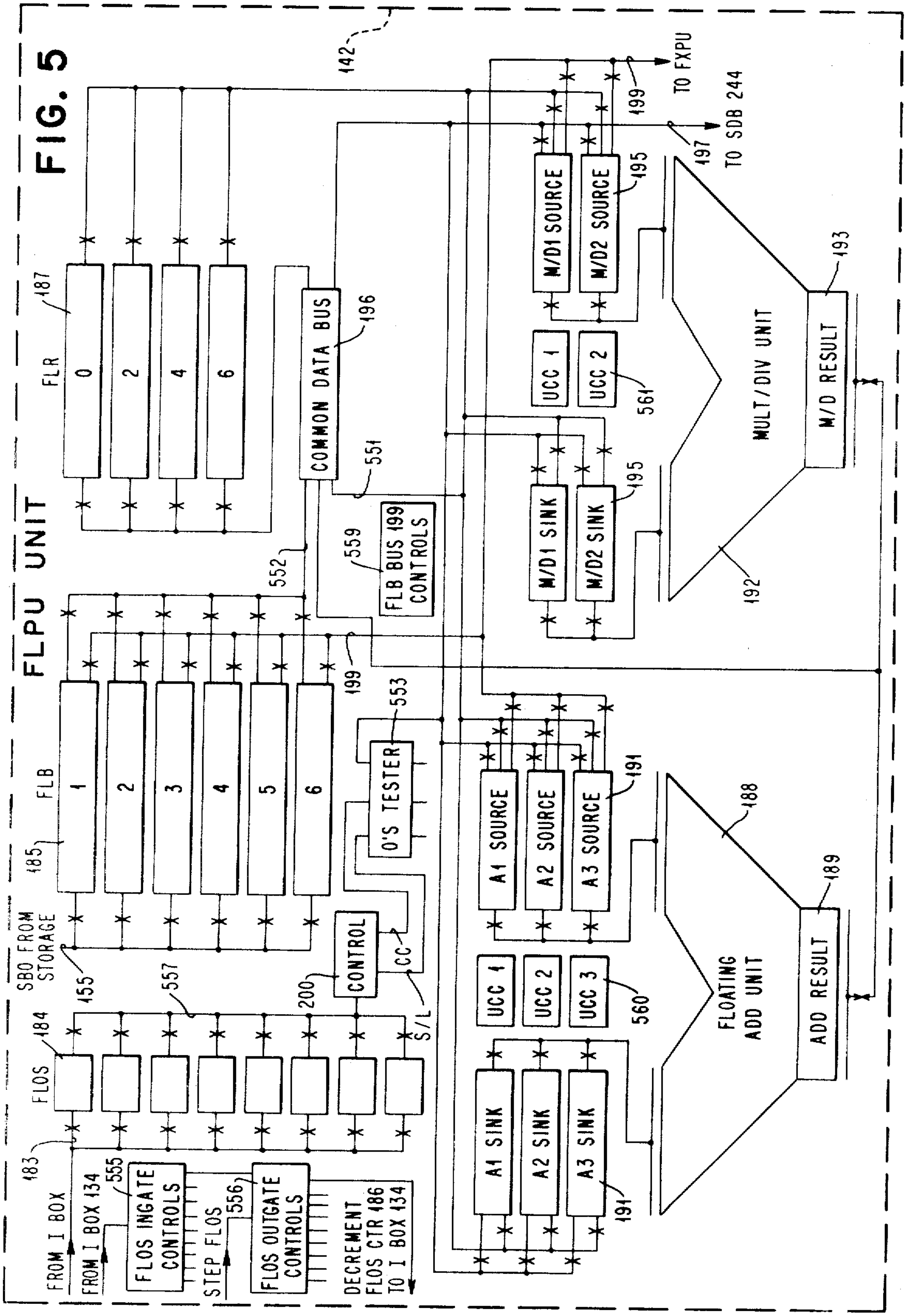

FIG. 5 is a simplified functional block diagram of the Floating Point Unit (FLPU) of FIG. 3.

Figure 6A:
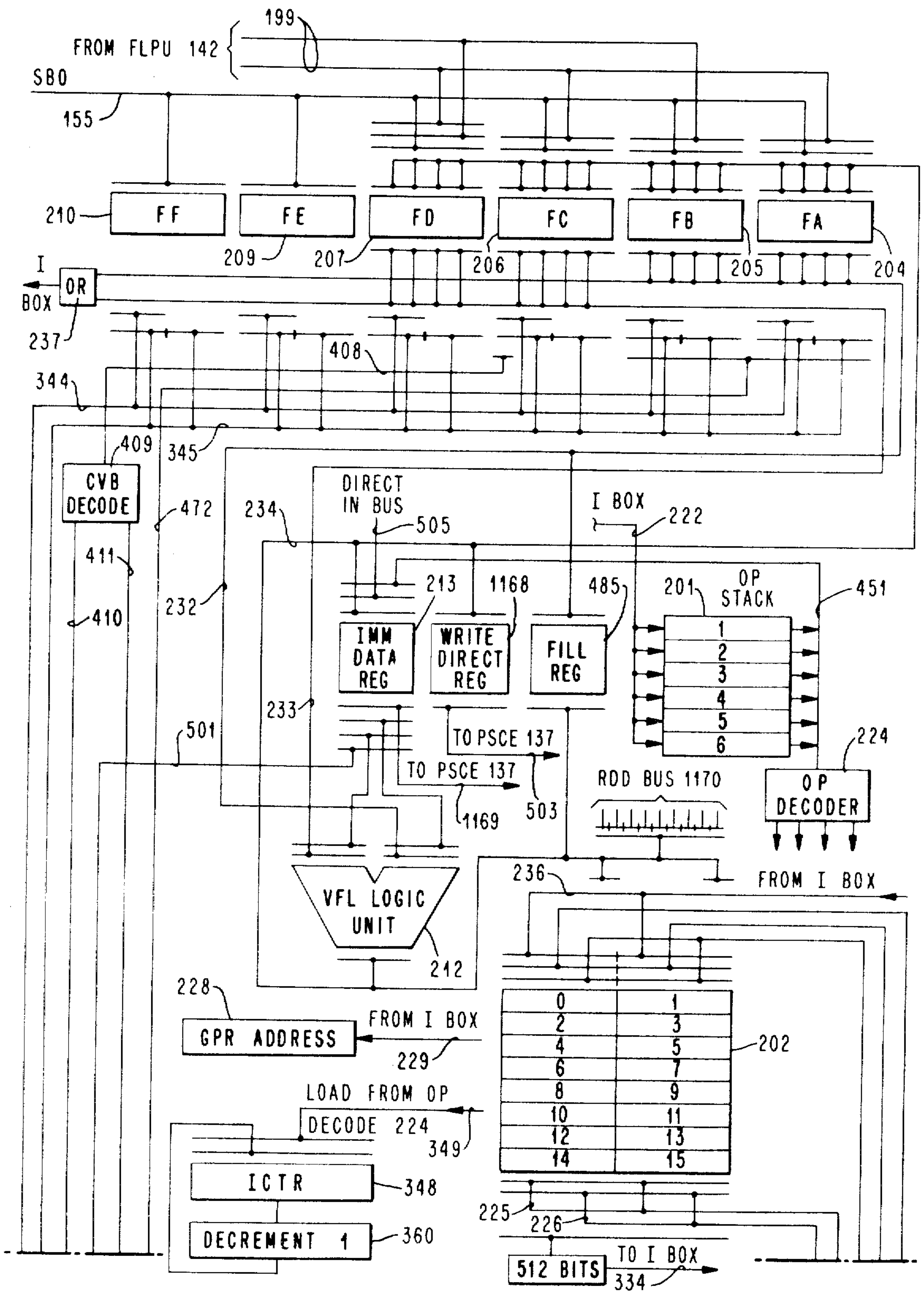
Figure 6B:
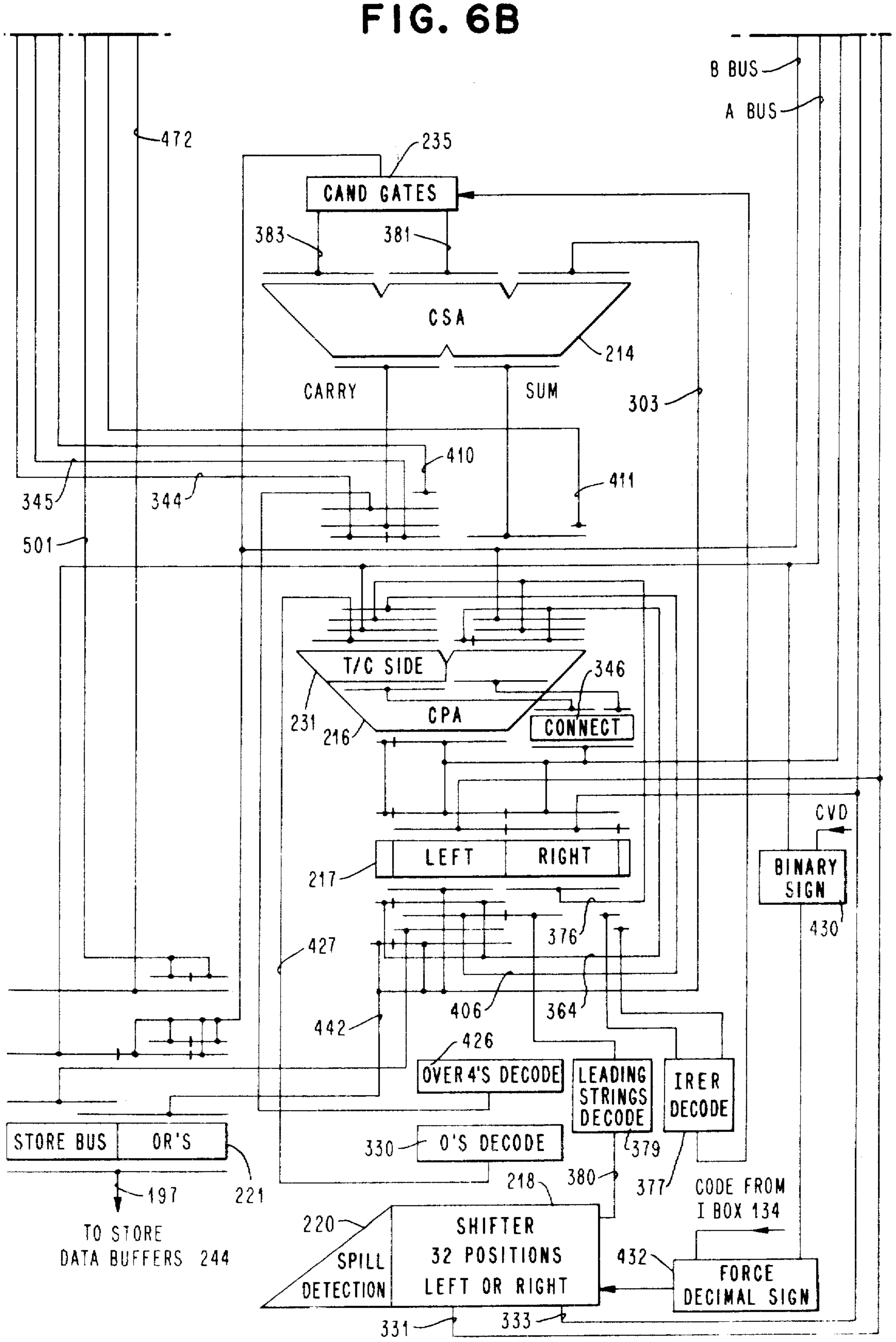

FIGS. 6A—B comprise a detailed functional block diagram of the Fixed Point Unit of FIG. 3.

Figure 7:
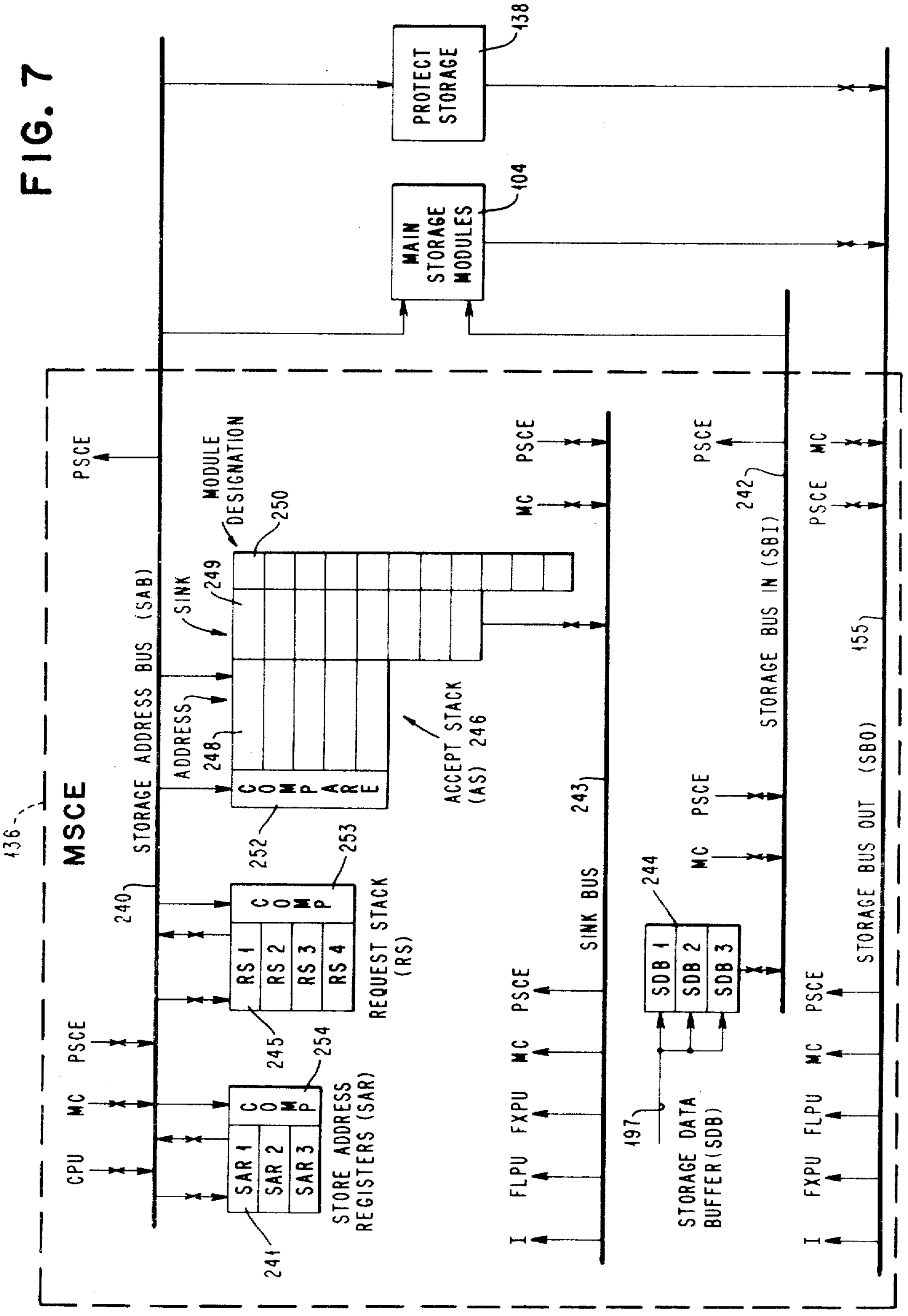

FIG. 7 is a functional block diagram of the Main Storage Control Element (MSCE) of FIG. 3.

Figure 8:
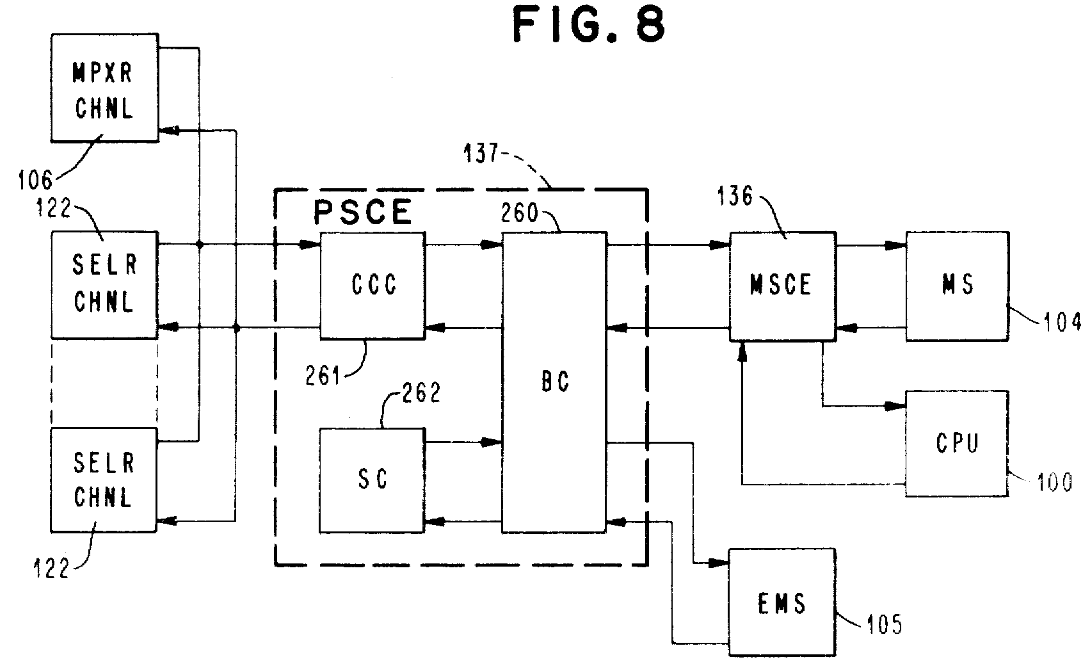

FIG. 8 is a functional block diagram of the principal elements of the Peripheral Storage Control Element (PSCE) of FIG. 3.

Figure 9:
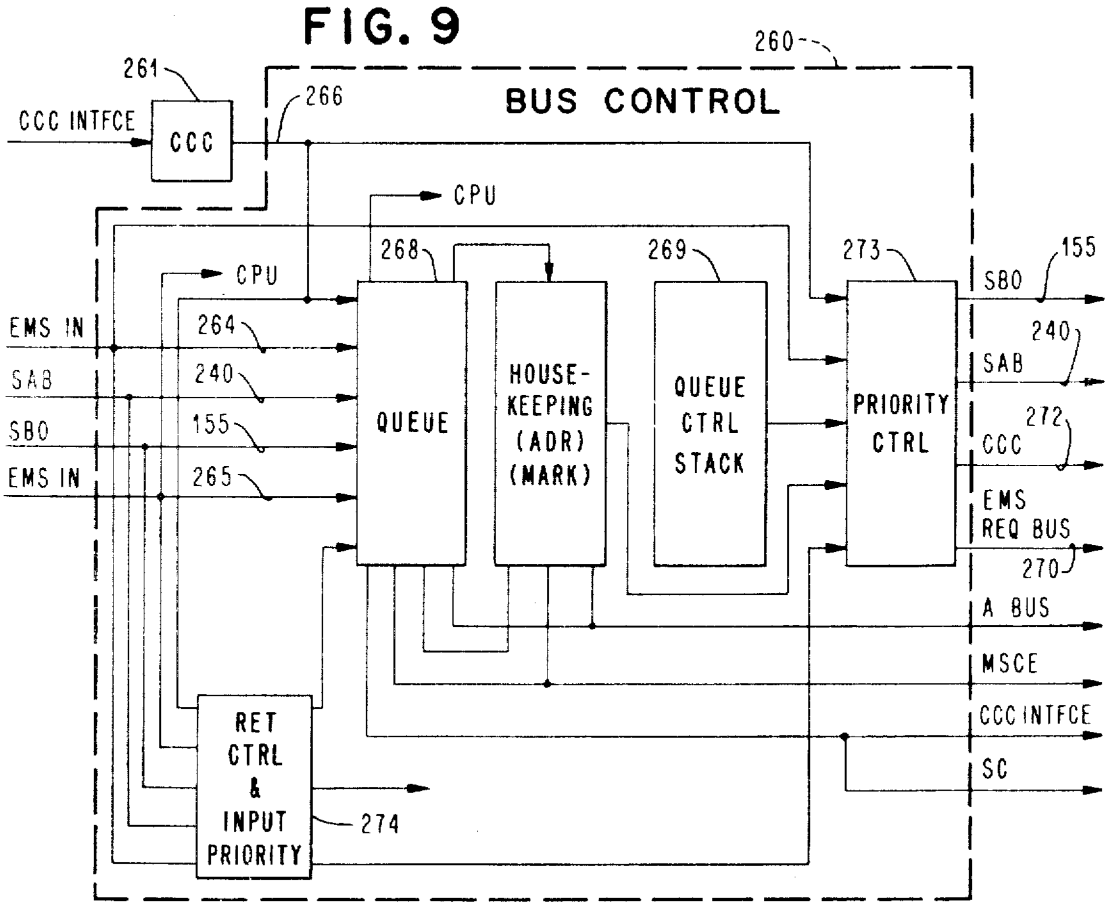

FIG. 9 is a logical block diagram of the Bus Control 260 of FIG. 8.

Figure 10:
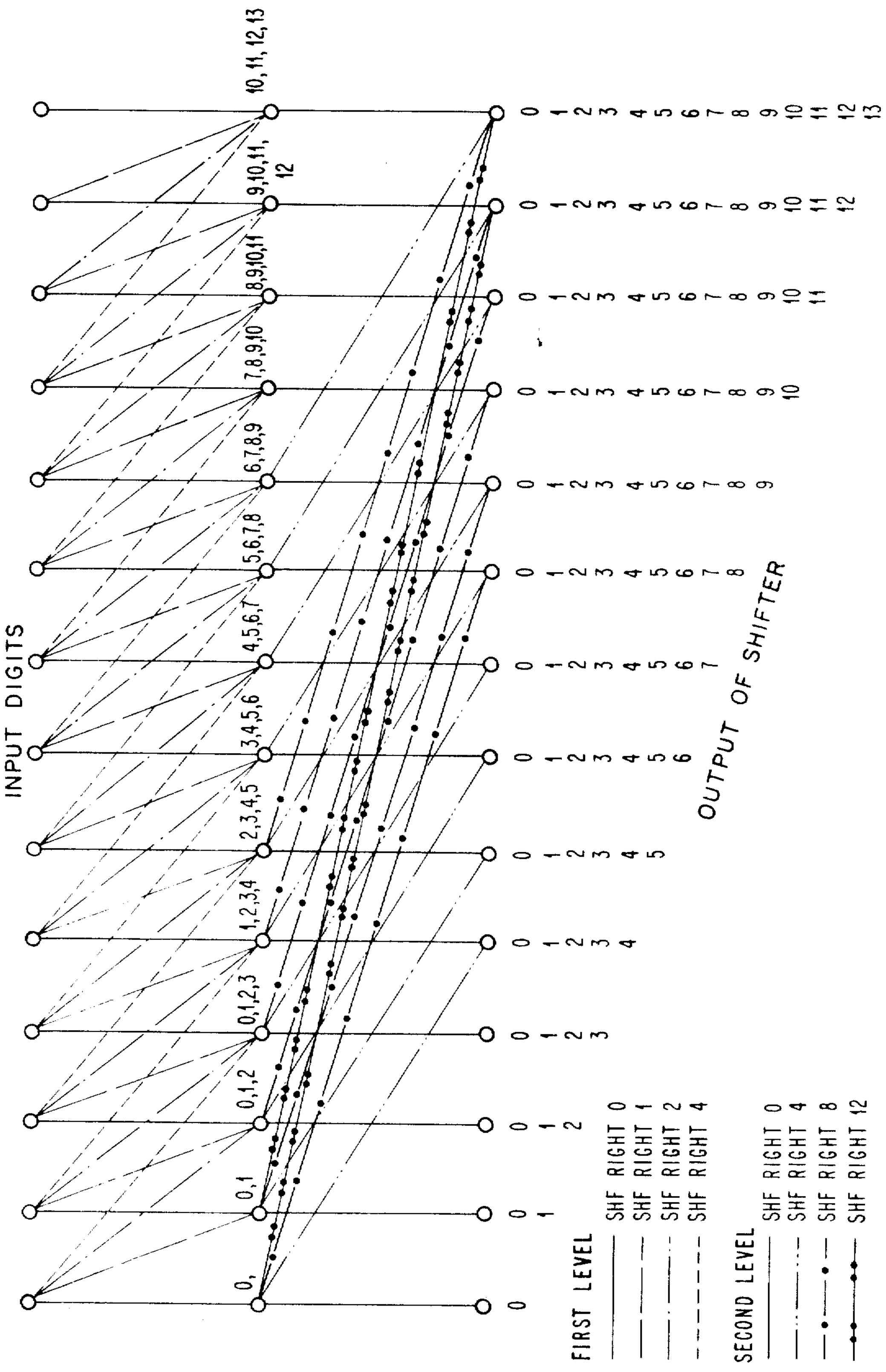

FIG. 10 is a diagrammatic illustration of the two levels of shifting performed by the Digit Preshift Unit.

Figures 11, 11B:
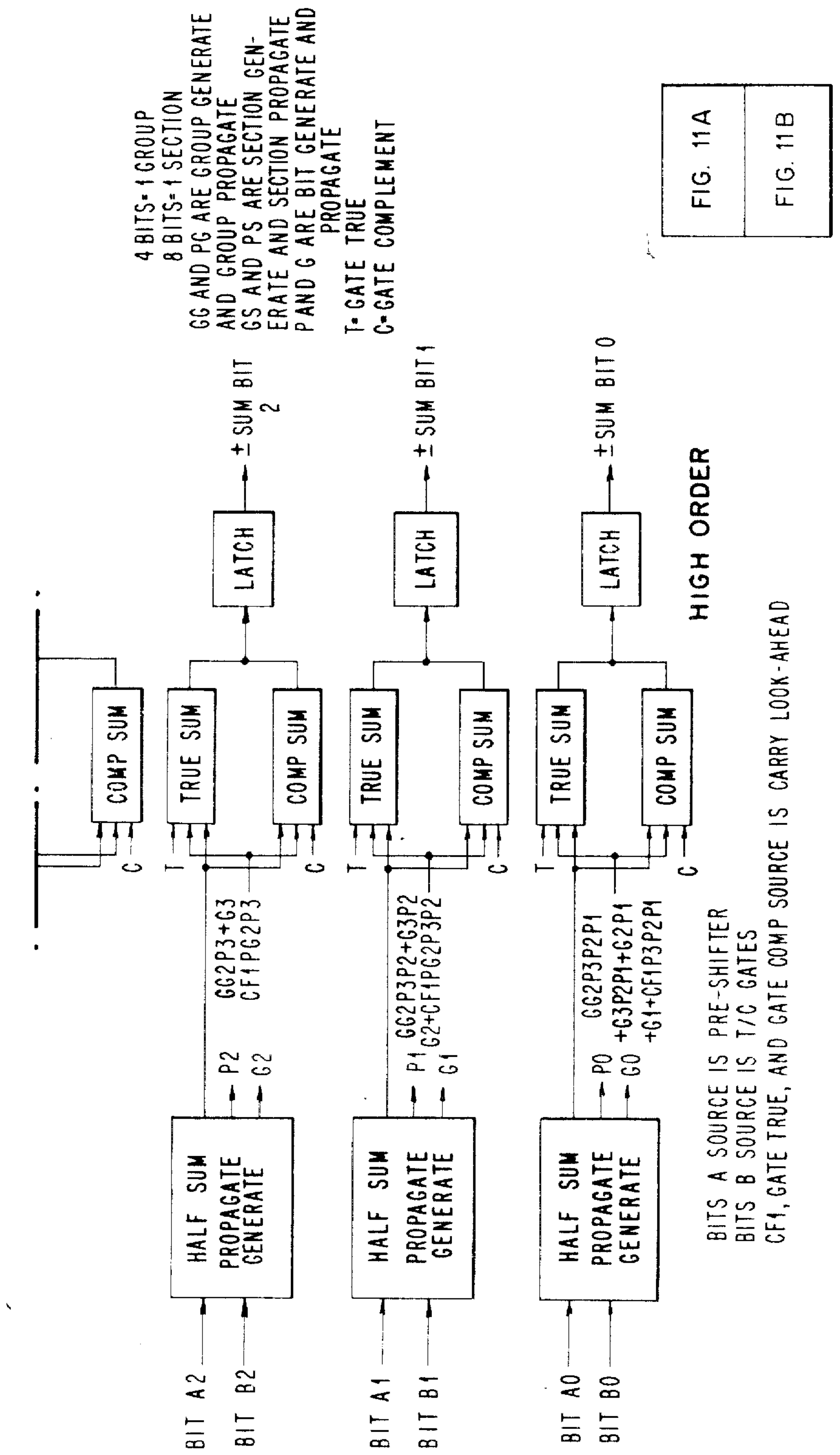
Figure 11A:
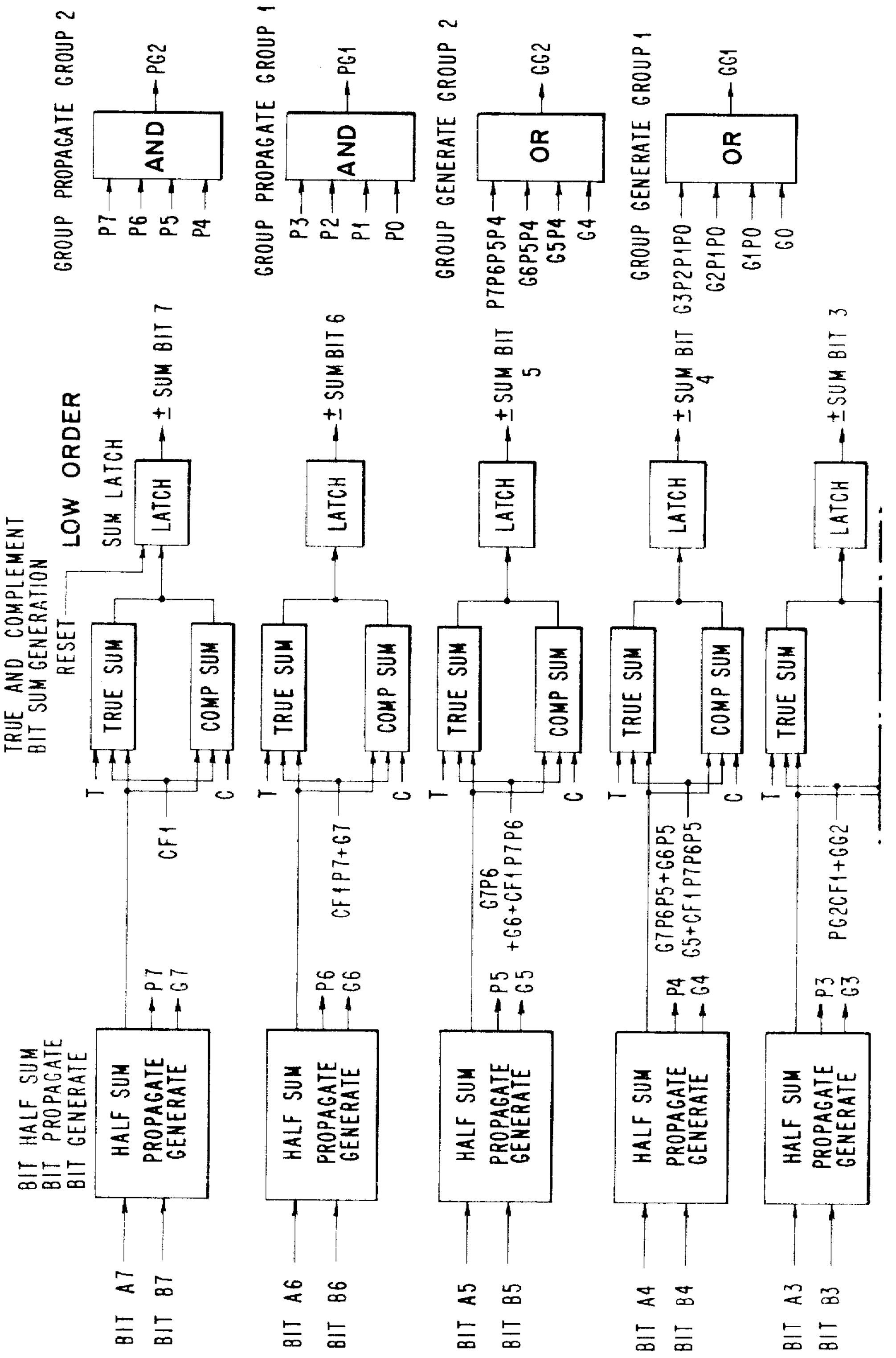

FIGS. 11A and B comprise a logical block diagram illustrating the manner in which bit sums, carry propagate and carry generate signals are produced.

Figures 12, 12A:
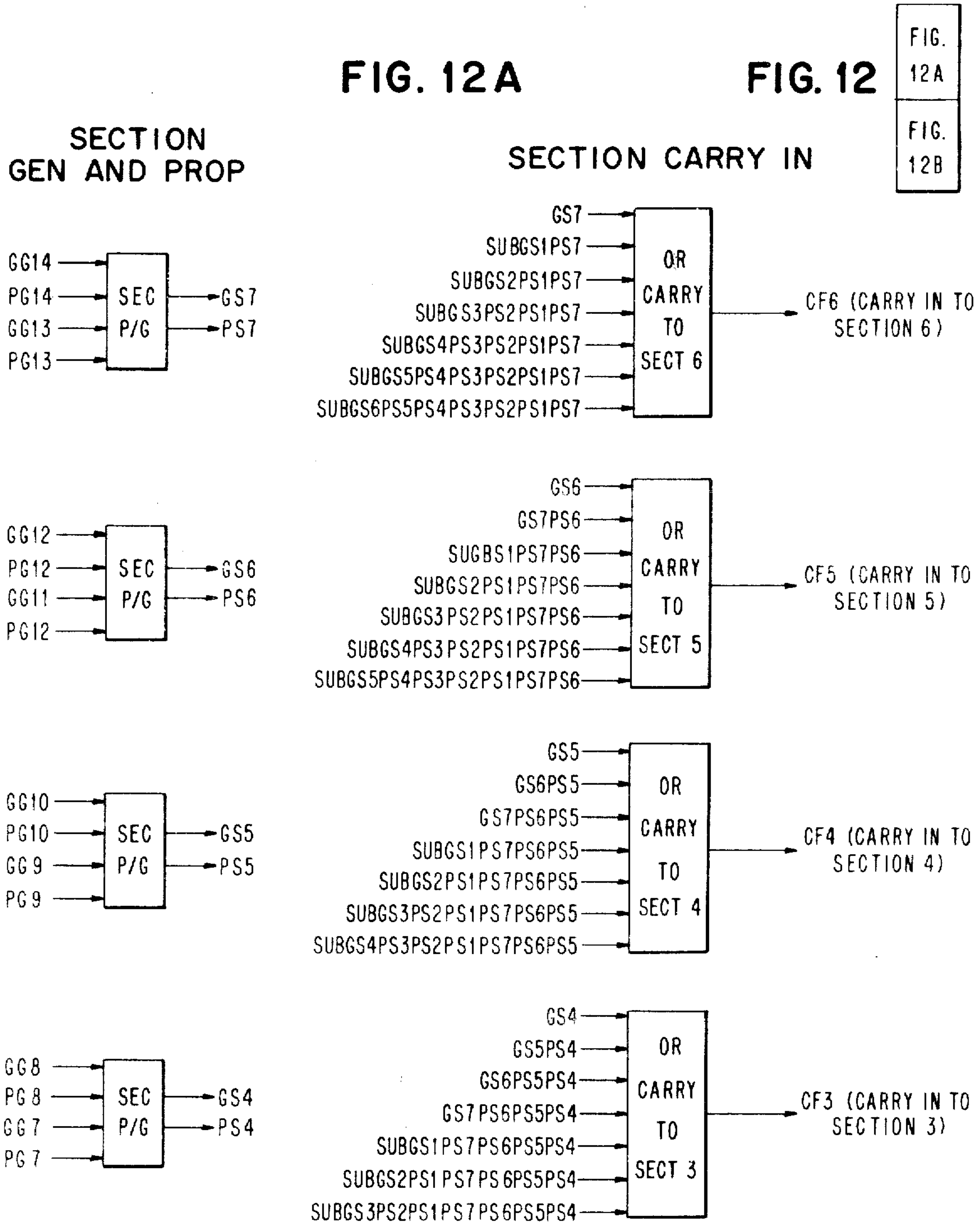
Figure 12B:
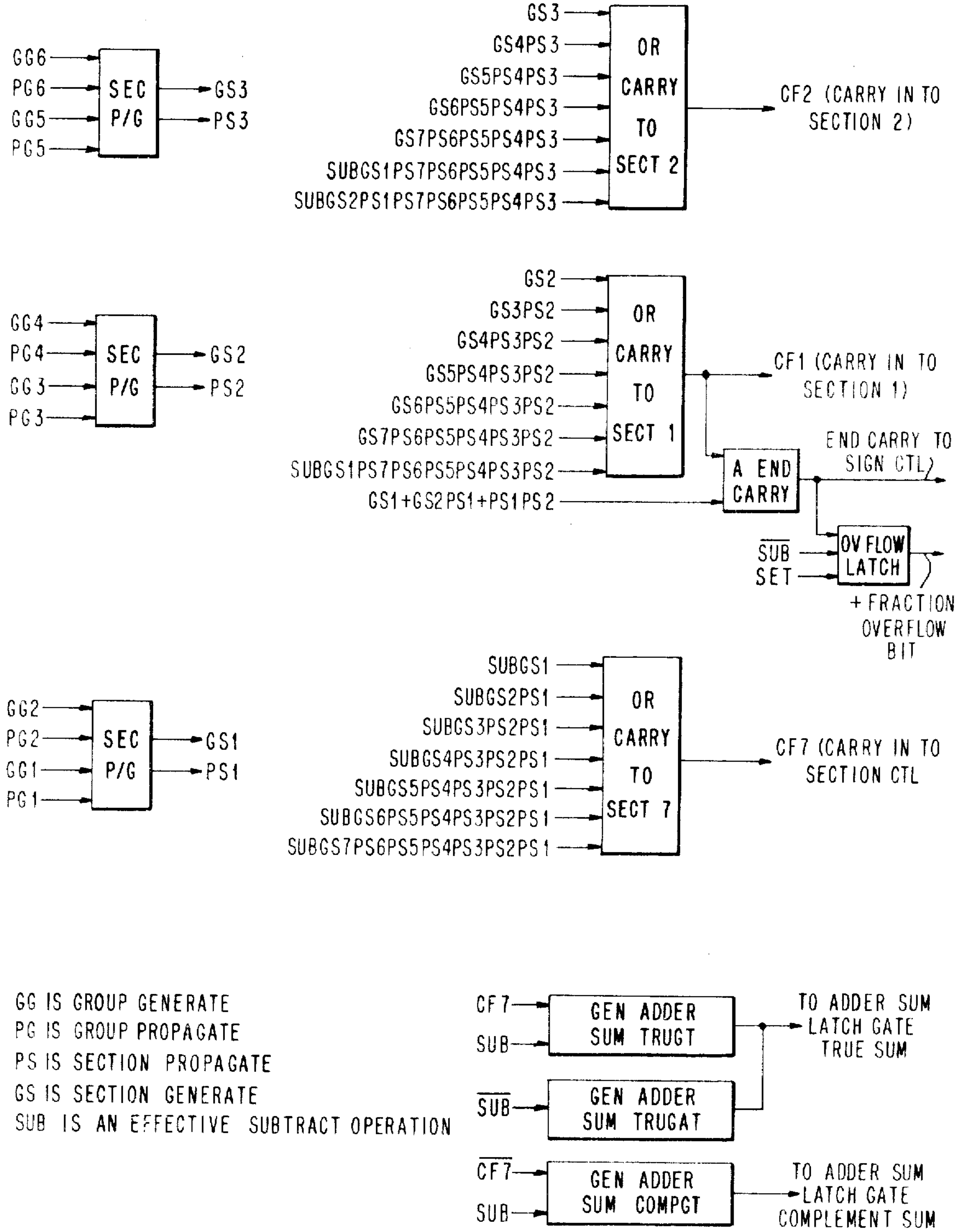
Figure 13:
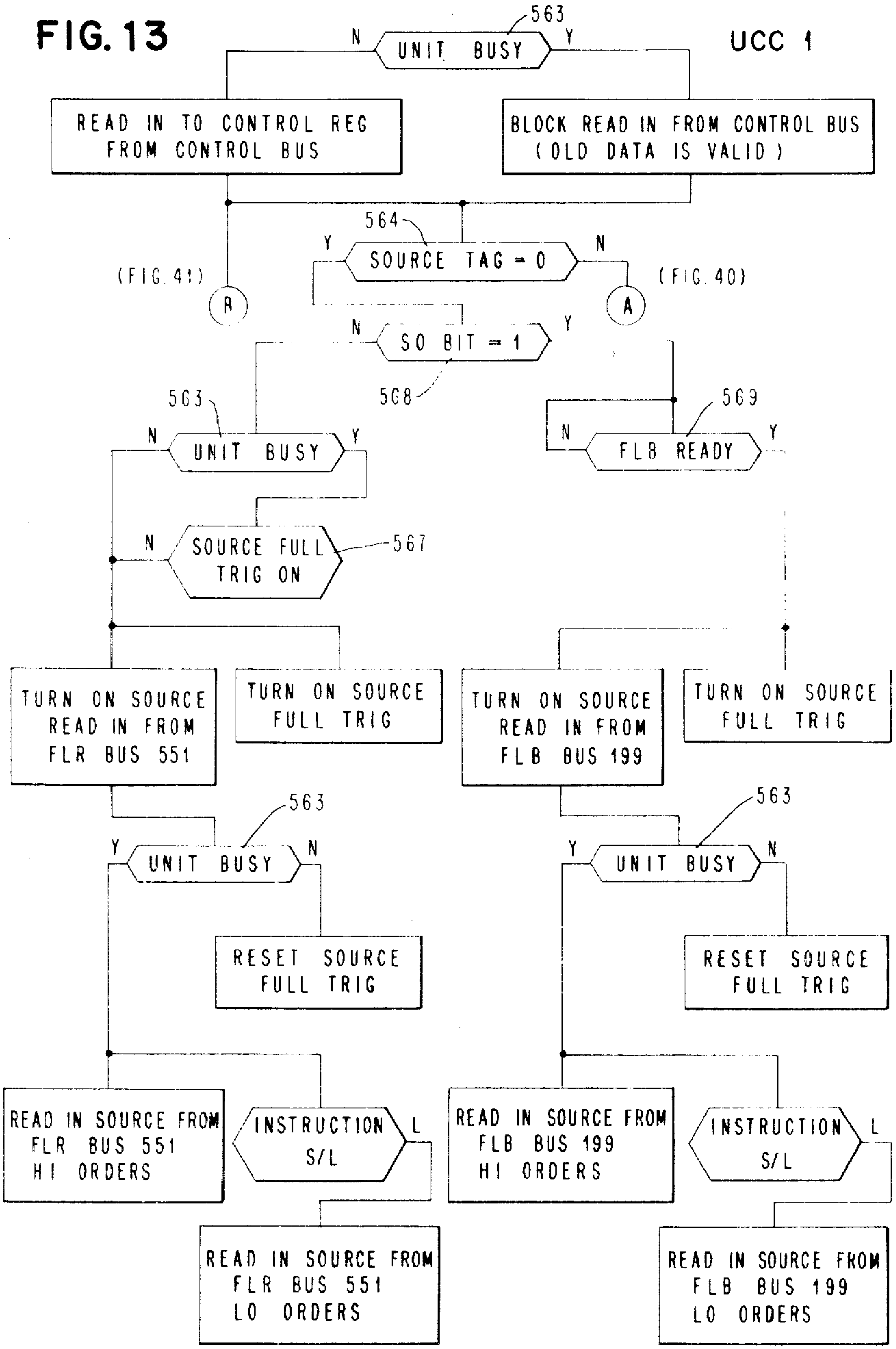

FIGS. 12A and B comprise a logical block diagram illustrating the manner in which intersection (8 bits) propagate, generate and carry signals are produced in the look ahead circuitry of the fraction Main Adder.

FIGS. 13, 14, 15 and 16 comprise flow charts for the Unit Communication Control (UCC) shown in FIG. 5.

Figure 17A:
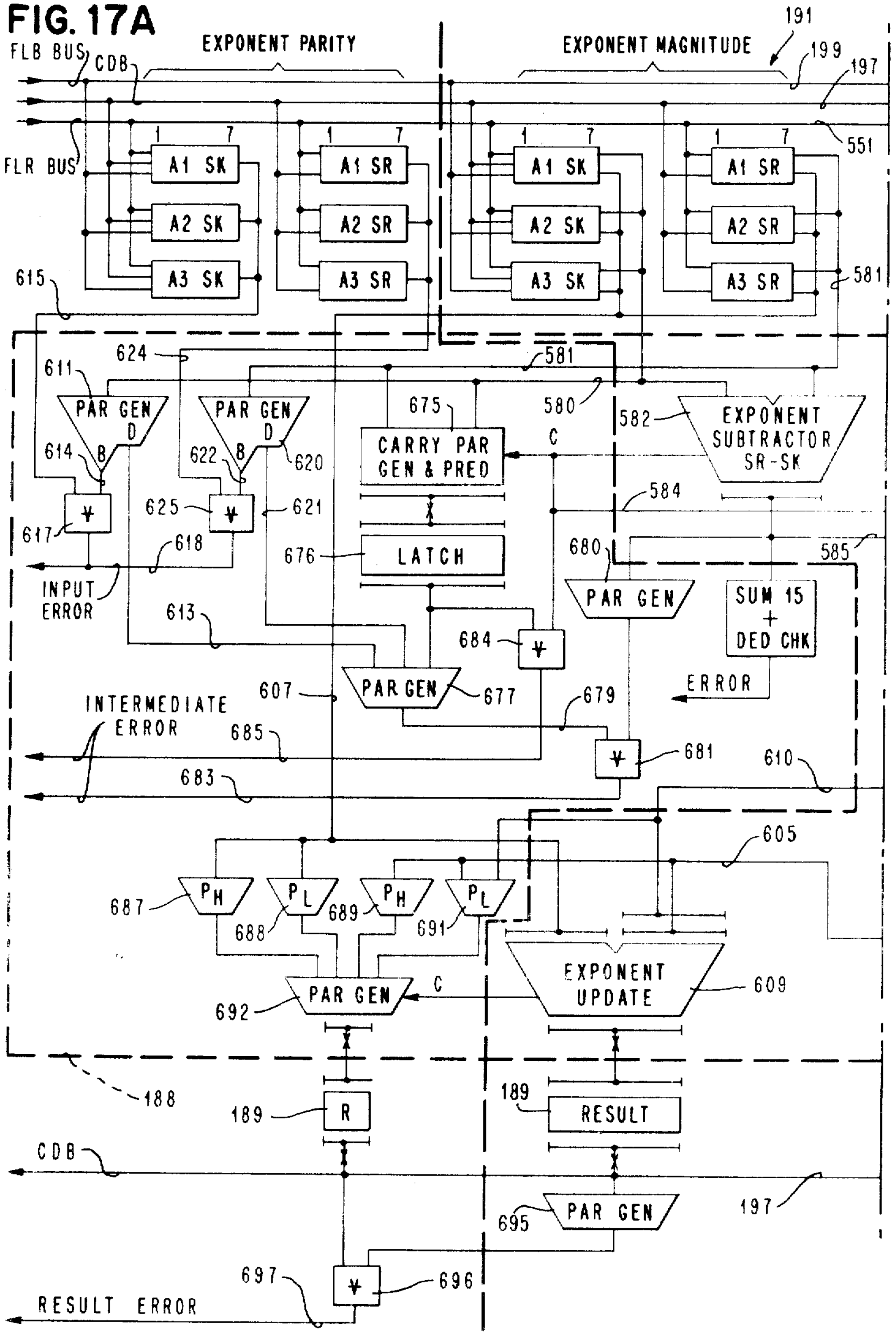

FIGS. 17A and B comprise the functional block diagram of the floating point adder of the present invention and illustrates the data flow path between the major functional units.

Figure 18A:
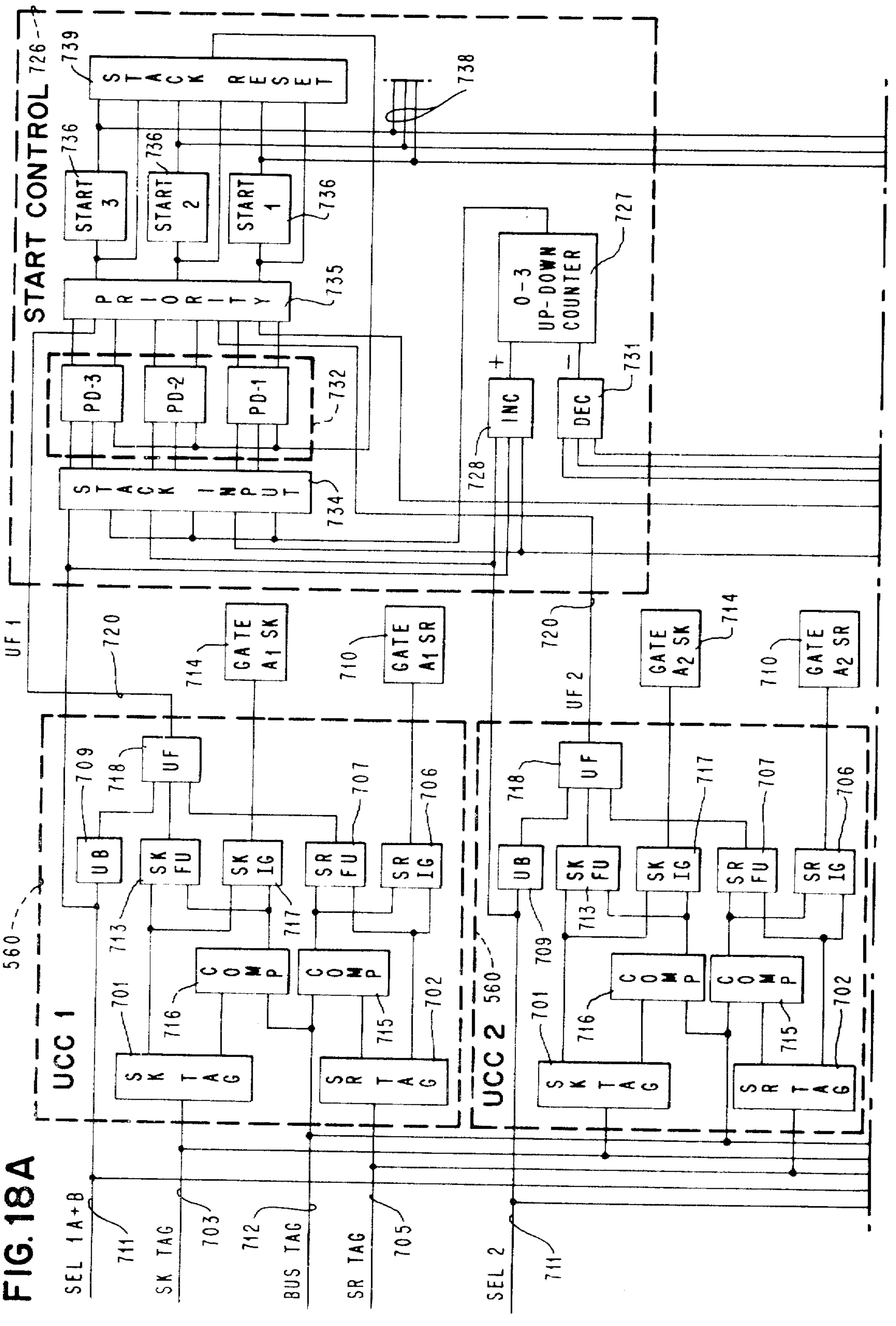

FIGS. 18A and B comprise a functional block diagram for the Unit Communication Controls 560 as shown in FIG. 5.

Figure 18B:
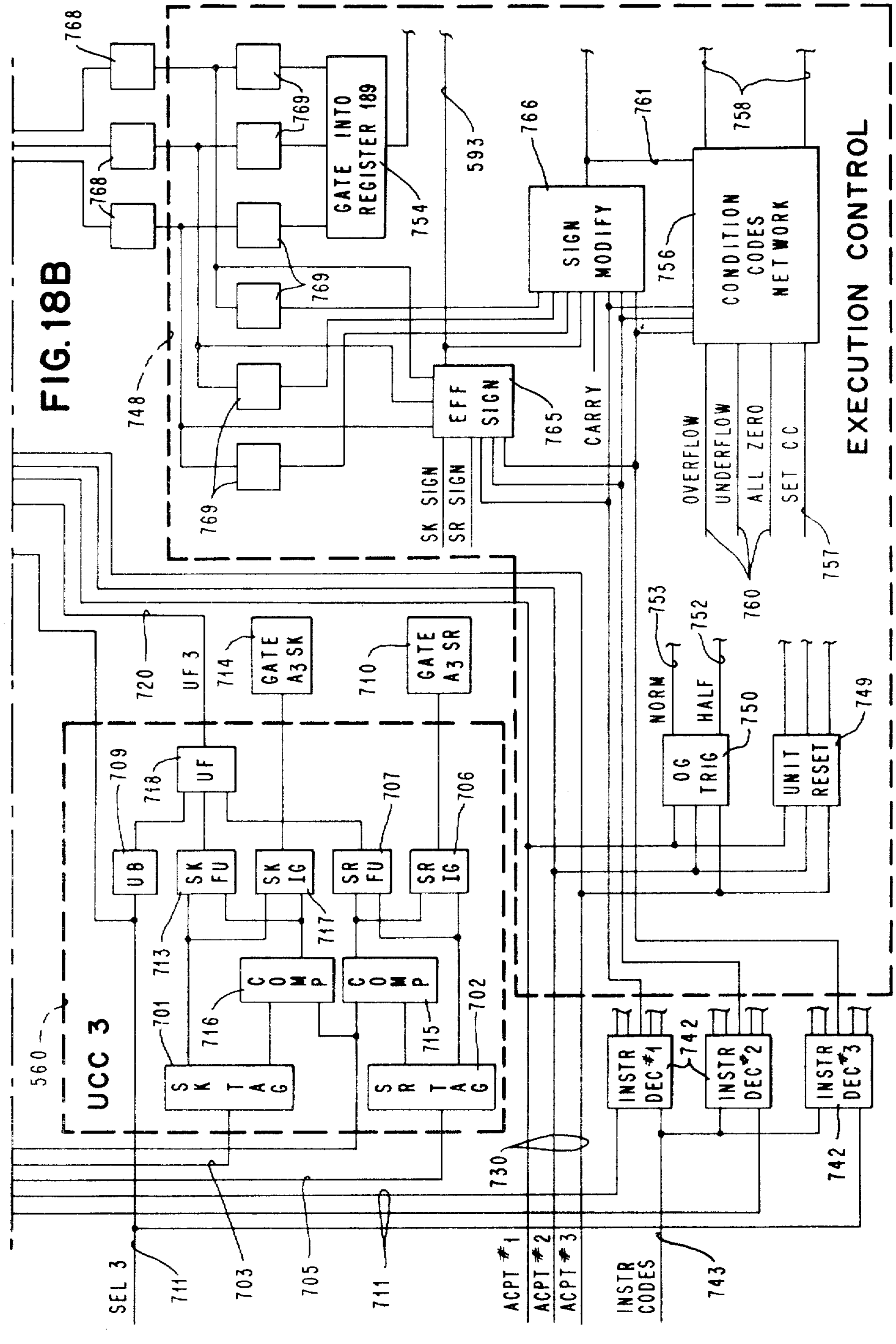
Figure 19:
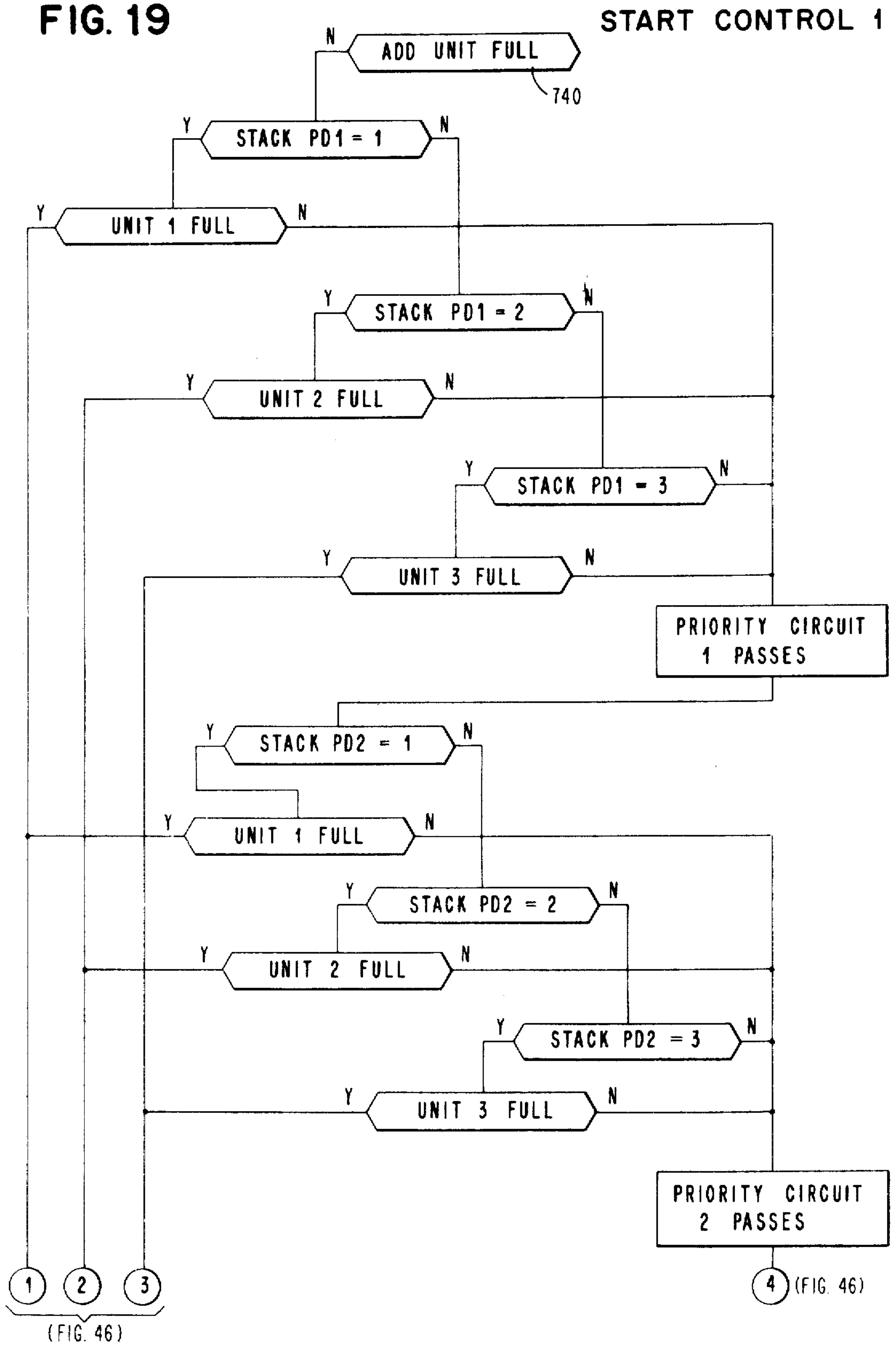
Figure 20:
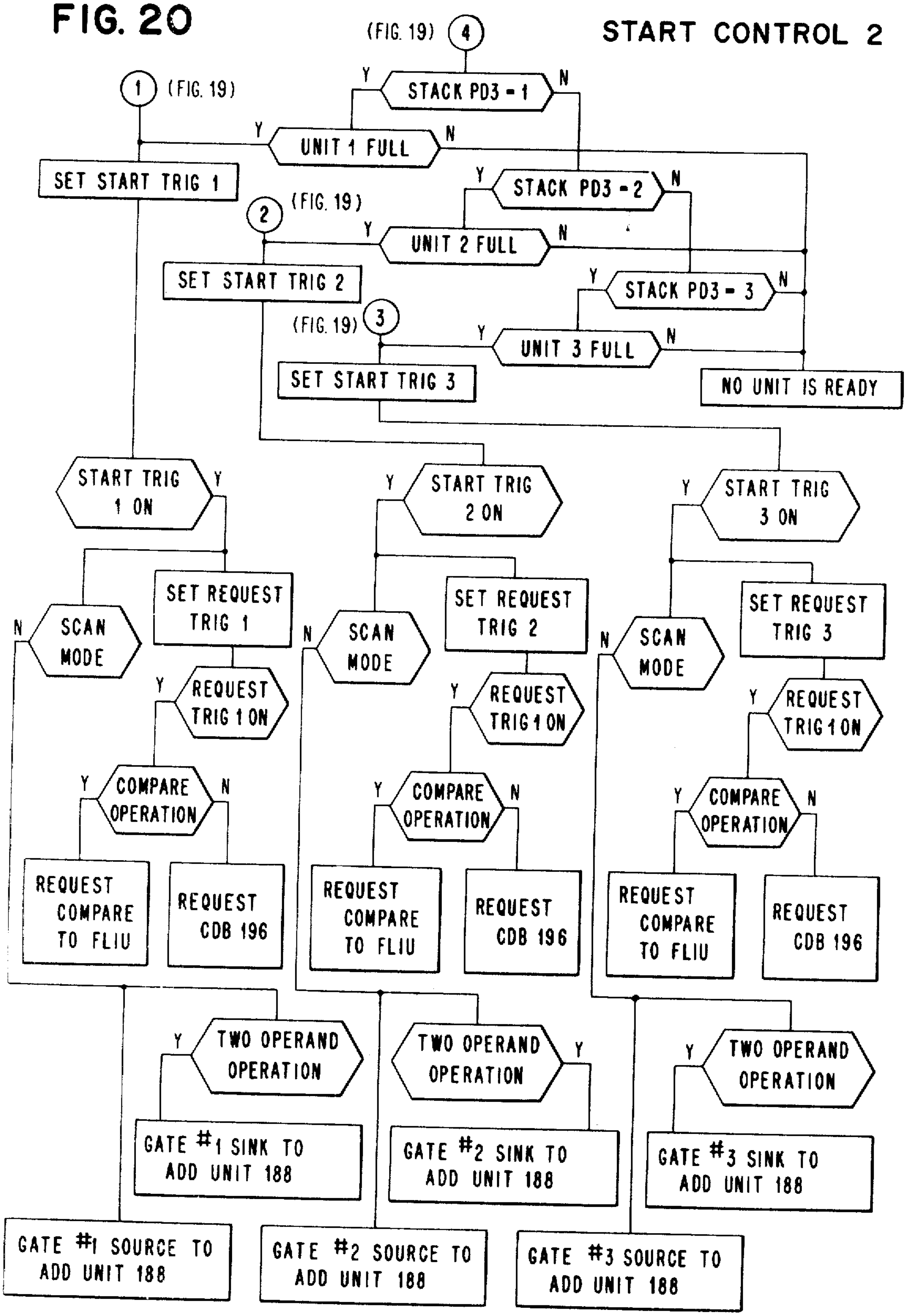

FIGS. 19 and 20 comprise flow charts for the Start Control unit 726 shown in FIG. 18.

Figure 21:
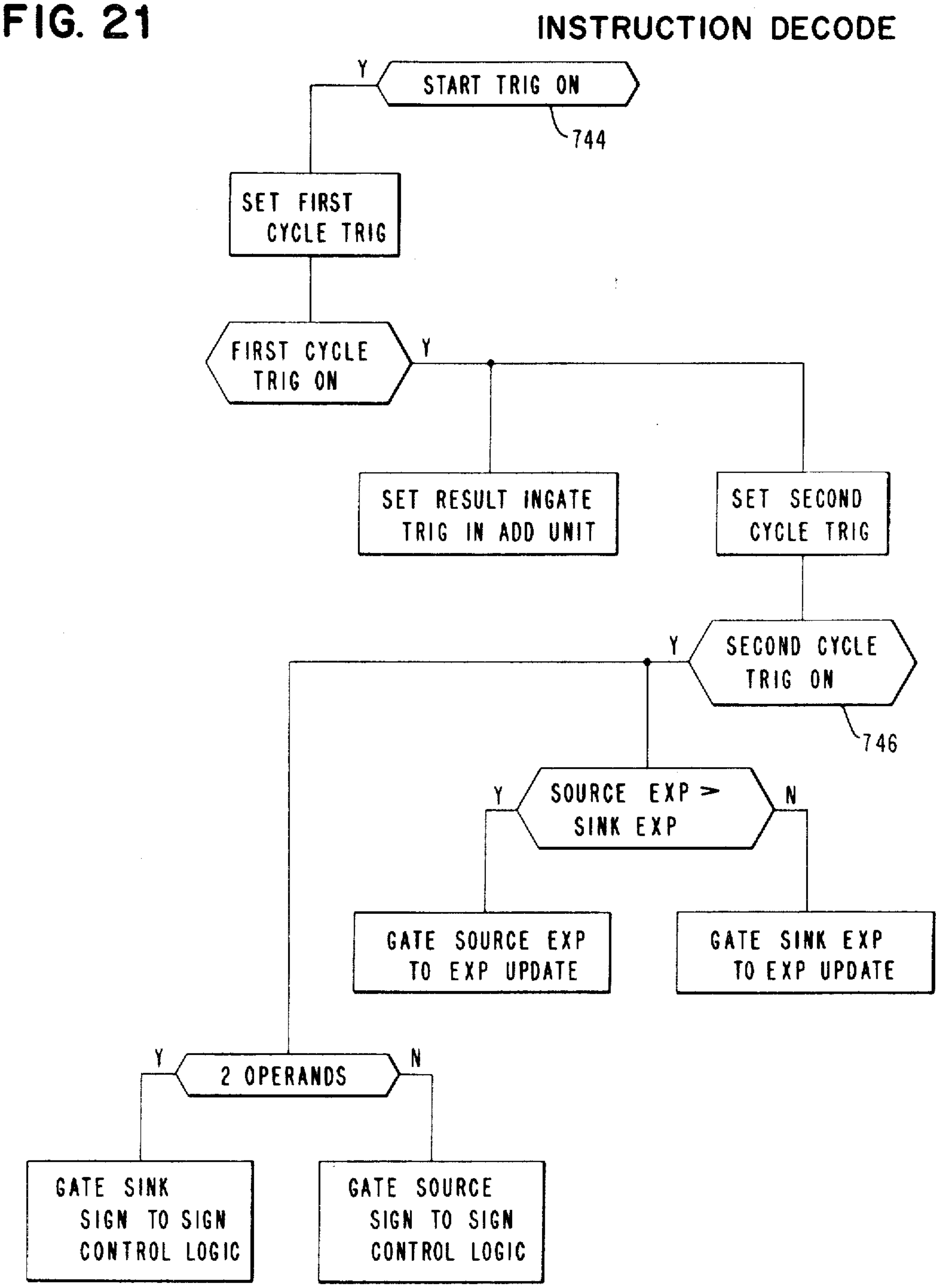

FIG. 21 comprises a flow chart for the Instruction Decoders 742 shown on FIG. 18 and in essence indicates the basic flow-through timing of the present floating point adder.

Figure 22:
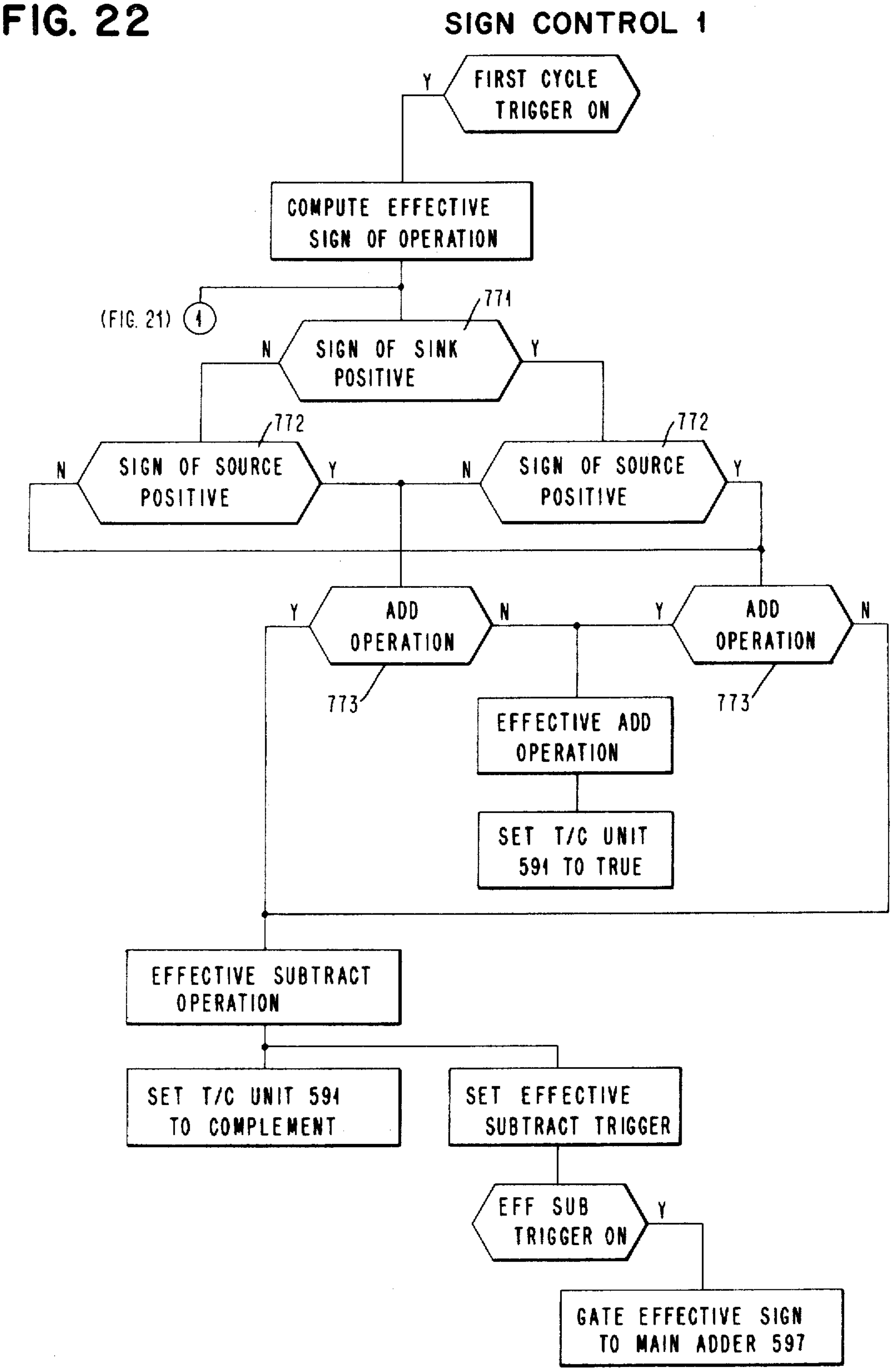

FIG. 22 is a flow chart illustrating the operation of the effective sign circuitry 765 of FIG. 18 wherein the effective sign for transmission to the Main Adder is determined.

Figure 23:
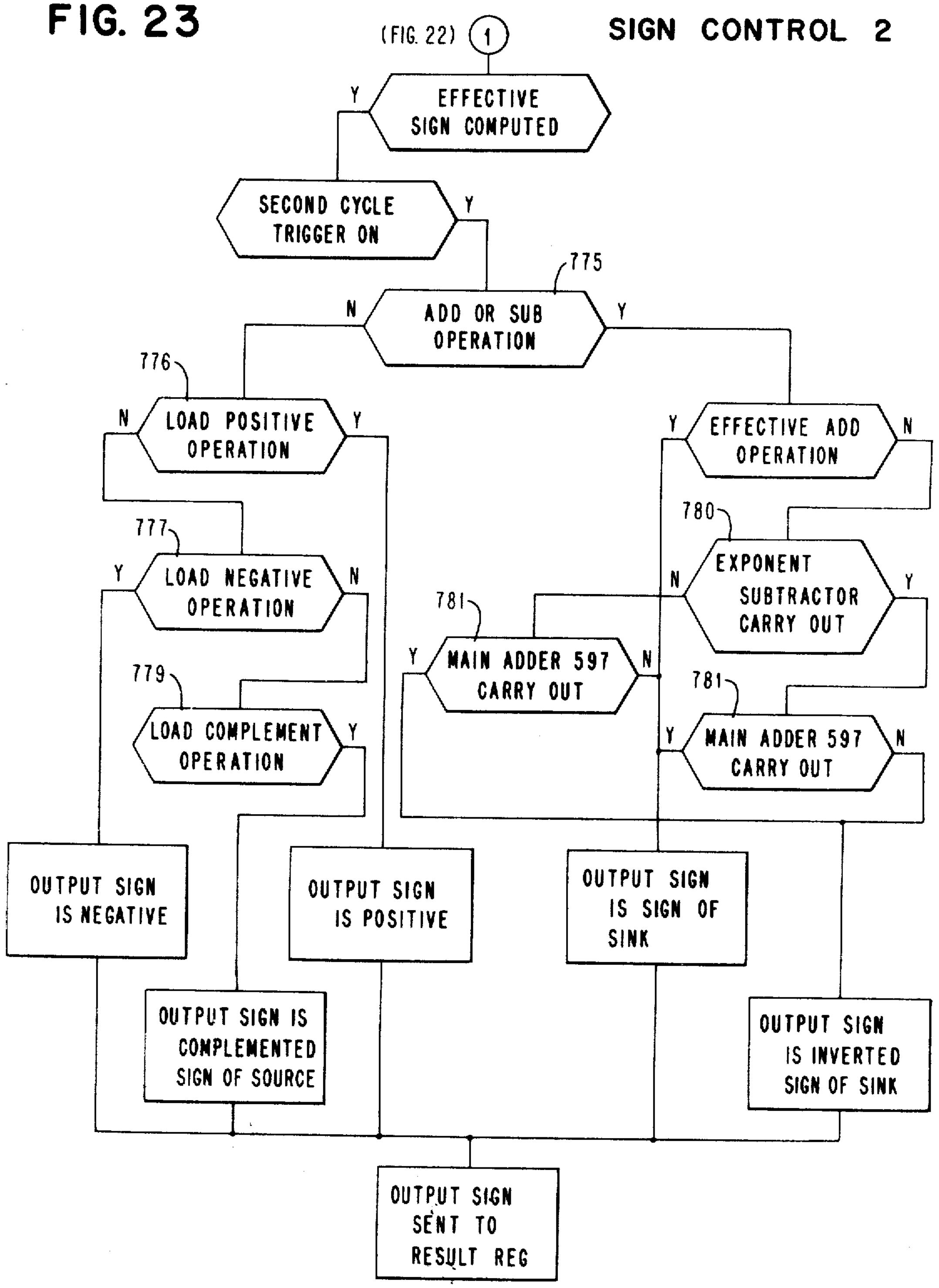

FIG. 23 is a flow chart illustrating the operation of the Sign Modify block 766 of FIG. 18 describing the computation of the final result sign which is sent to the adder Result Registers.

Figure 24:
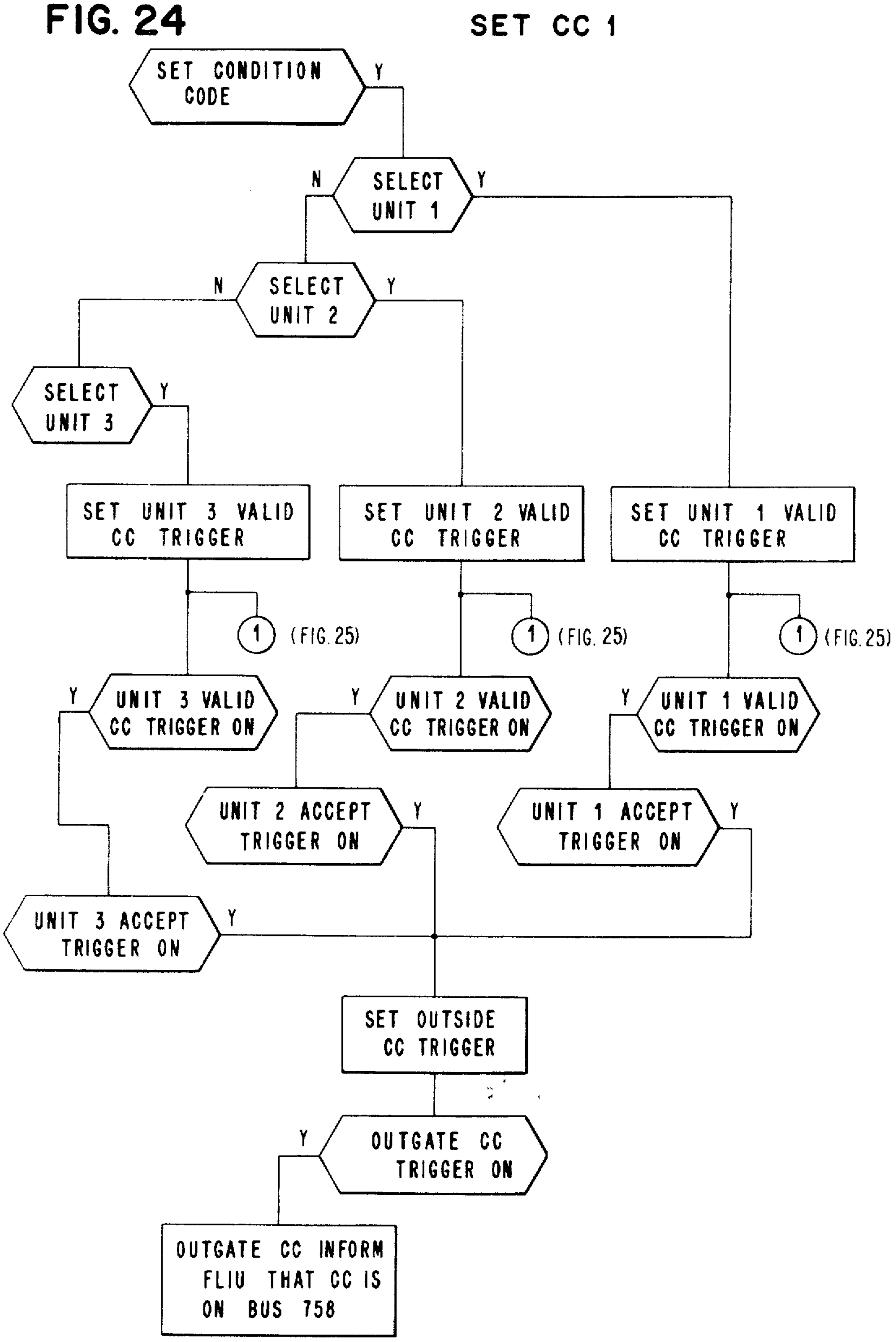

FIG. 24 is a flow chart for the Condition Code part 1 which occurs generally during the first machine cycle.

Figure 25:
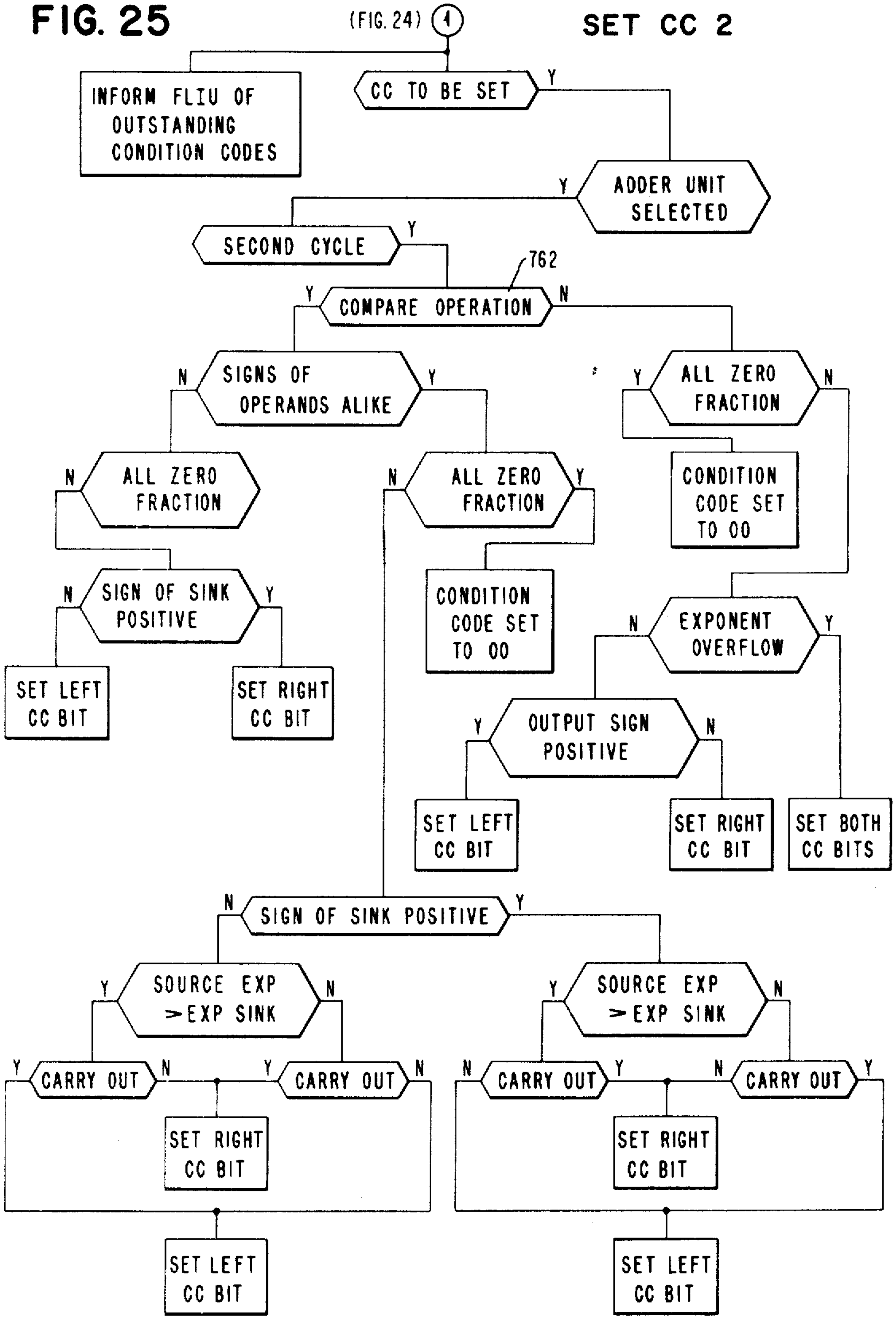

FIG. 25 is a flow flow chart for the Condition Code network of FIG. 18 illustrating the function performed by this unit generally during the second cycle of operation. (Modify the description of FIG. 24 above the relate same to the condition codes network 756.)

Figure 26:
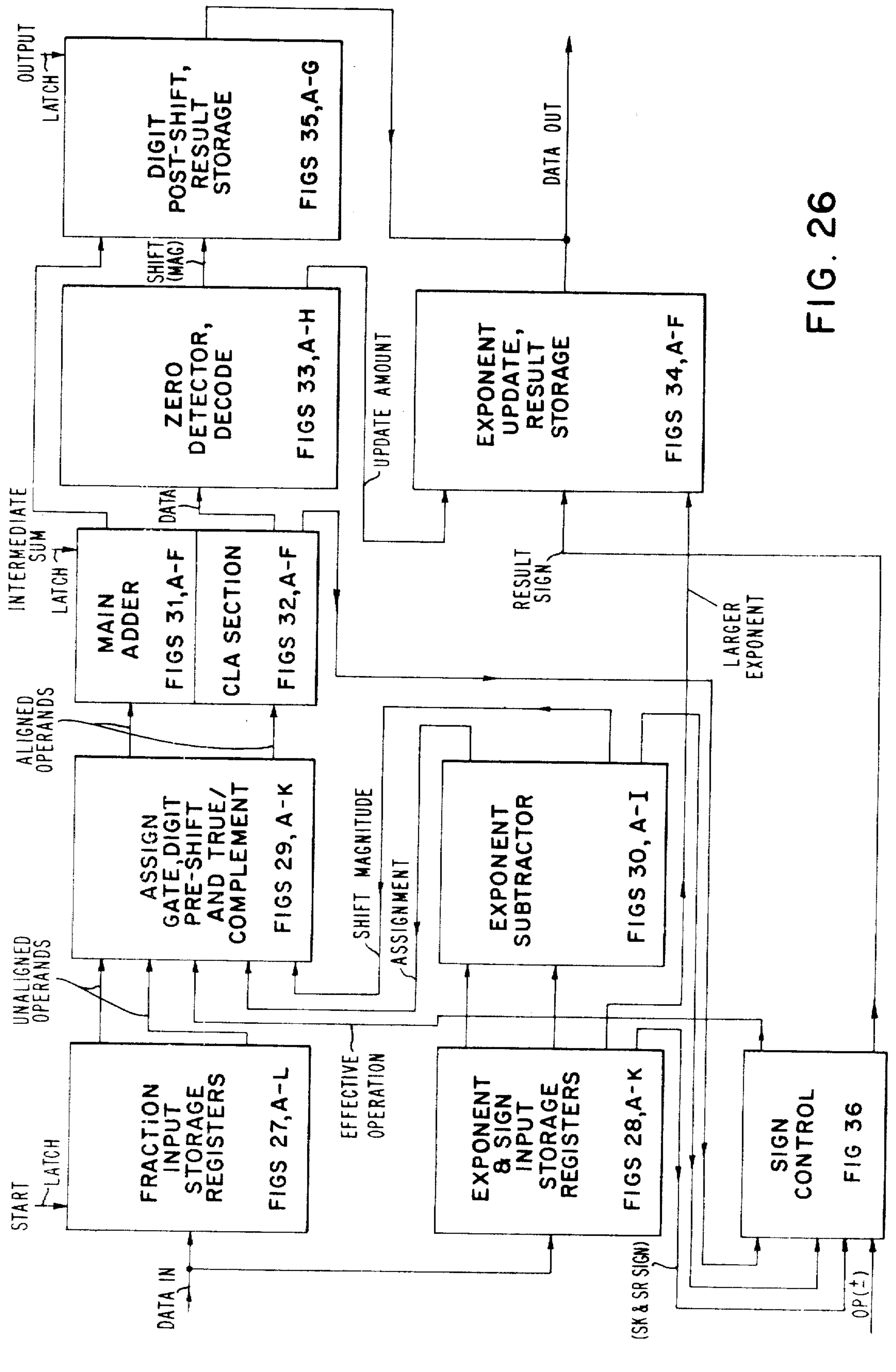

FIG. 26 is a general organizational drawing illustrating the overall data flow in and organization of the detailed logical schematic diagrams of FIGS. 27 through 36.

Figure 17B:
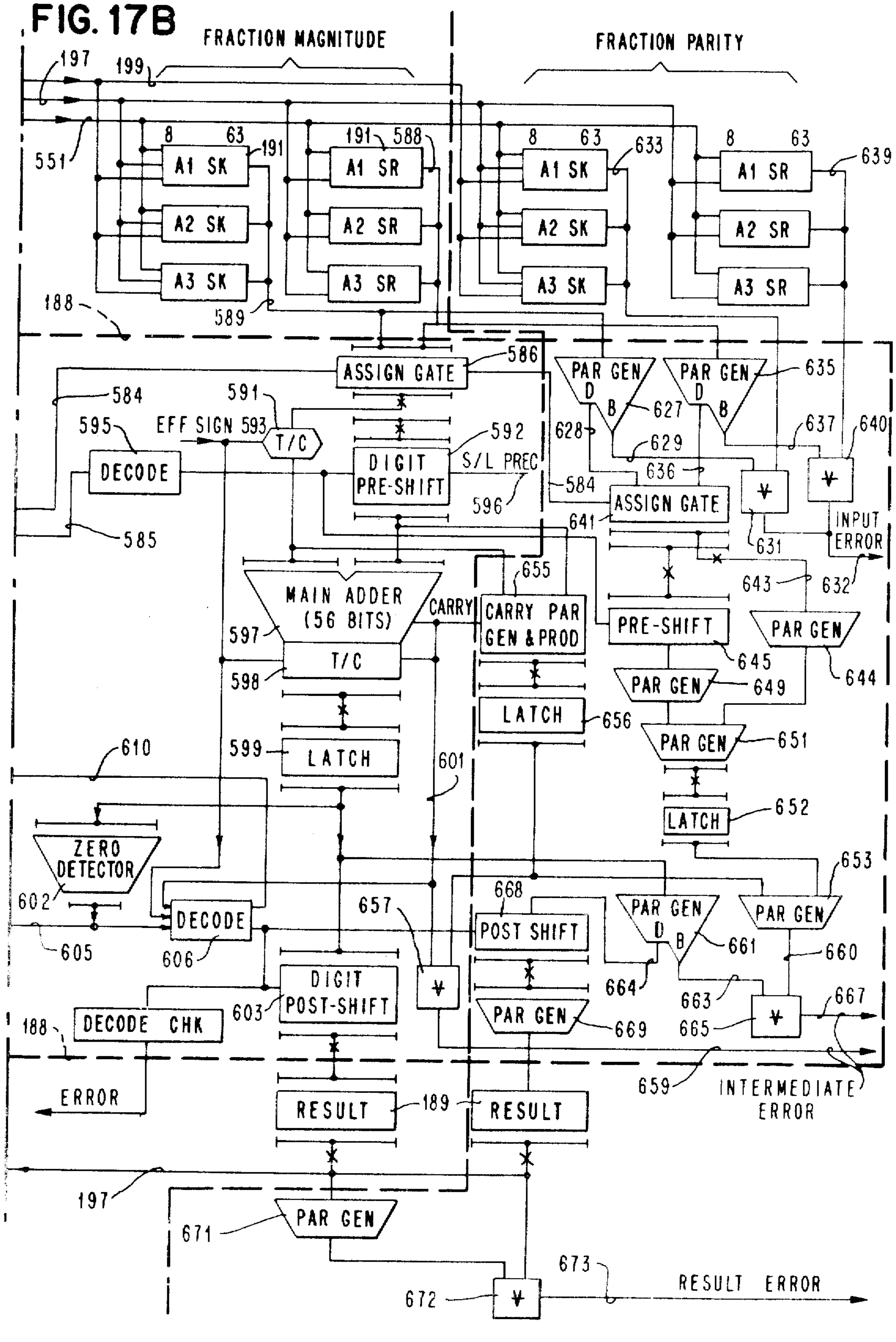

FIGS. 27A through L comprise a logical schematic diagram for a plurality of bit storage positions of the Input Registers 191 illustrated on FIG. 17 and labeled A1—A3, SK and A1—A3, SR.

FIGS. 28A through K comprise a logical schematic diagram for a plurality of bit storage positions for the input registers 191 indicated as exponent magnitude on FIG. 17 designated A1—A3, SK and A1—A3, SR.

FIGS. 29A through K comprise a logical schematic diagram for a plurality of bit positions for that portion of the functional block diagram of FIG. 17 designated as the Assign Gate 586, the Digit Preshift 592, and the true compliment gates (T/C) 591.

FIGS. 30A through I comprise a logical schematic diagram for the exponent subtractor 582 of FIG. 17.

FIGS. 31A through F comprise a logical schematic diagram of a plurality of bit positions for the basic adder stages of the Main Adder 597 FIG. 17.

FIGS. 32A through F comprise a logical schematic diagram of the carry look-ahead section of the Main Adder 597 of FIG. 17.

FIGS. 33A through H comprise a logical schematic diagram for those portions of the system shown on FIG. 17 designated as the Zero Detector 602 and the Decode 606.

FIGS. 34A through F comprise a logical schematic diagram for a plurality of bit positions of that portion of FIG. 17 designated as the Exponent Date adder 609 and the Result Register 189.

FIGS. 35A through G comprise a logical schematic diagram for a plurality of bit positions of that portion of FIG. 17 designated as the Digit post-shift 603 and the Result Register 189 connected to the output thereof.

Figure 36:
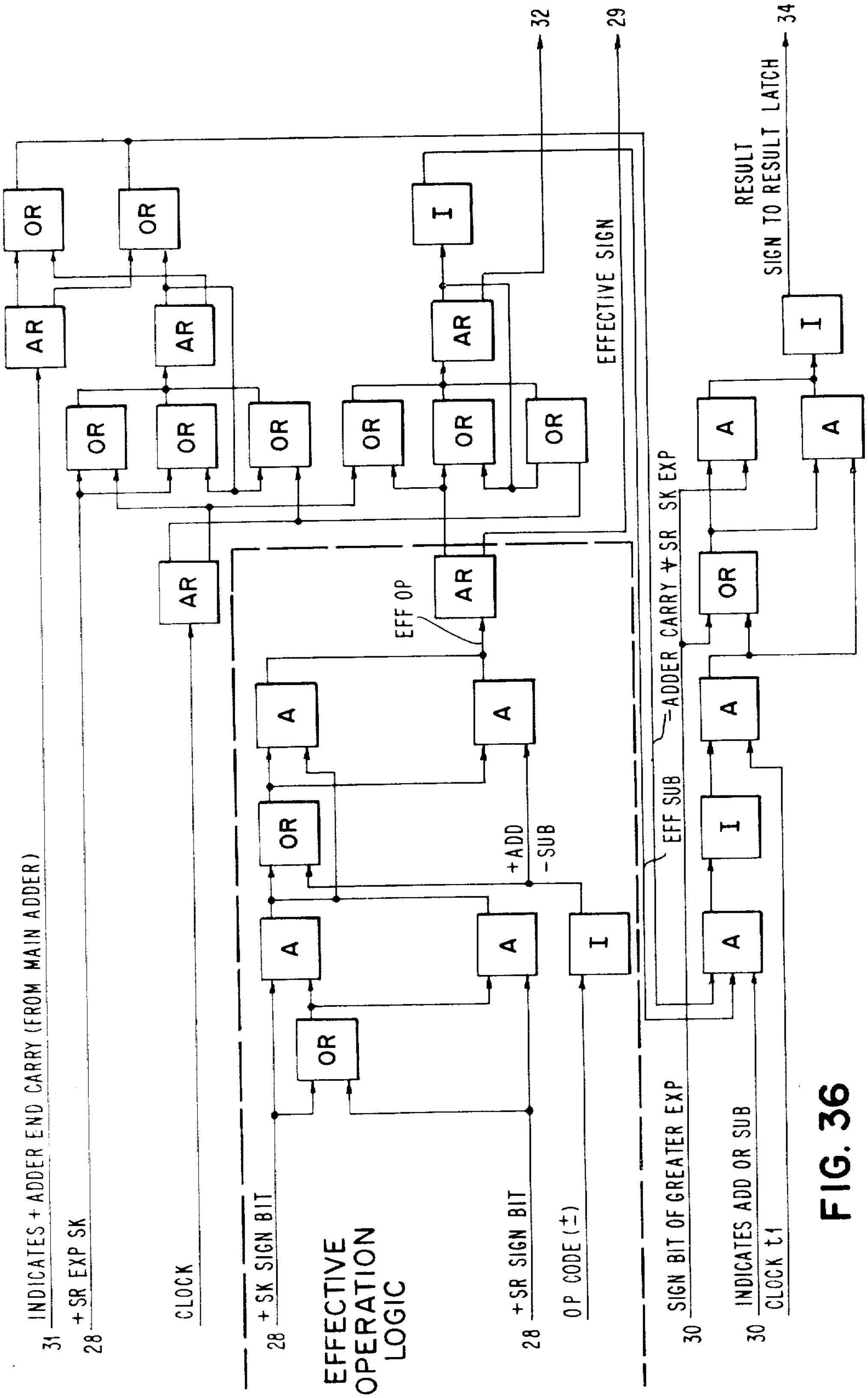

FIG. 36 comprises a logical schematic diagram of the Sign Control Circuitry shown on FIG. 18 and embodying the blocks designated as Effective Sign 765 and Sign Modify 766.

Figure 37A:
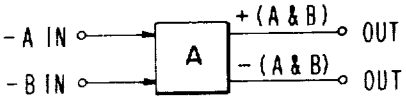

FIG. 37A illustrates a basic NAND logic module used as an AND block.

Figure 37B:
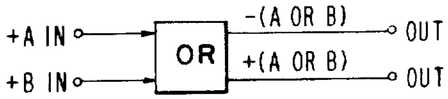

FIG. 37B illustrates a basic NAND logic module used as an OR block.

Figure 37C:
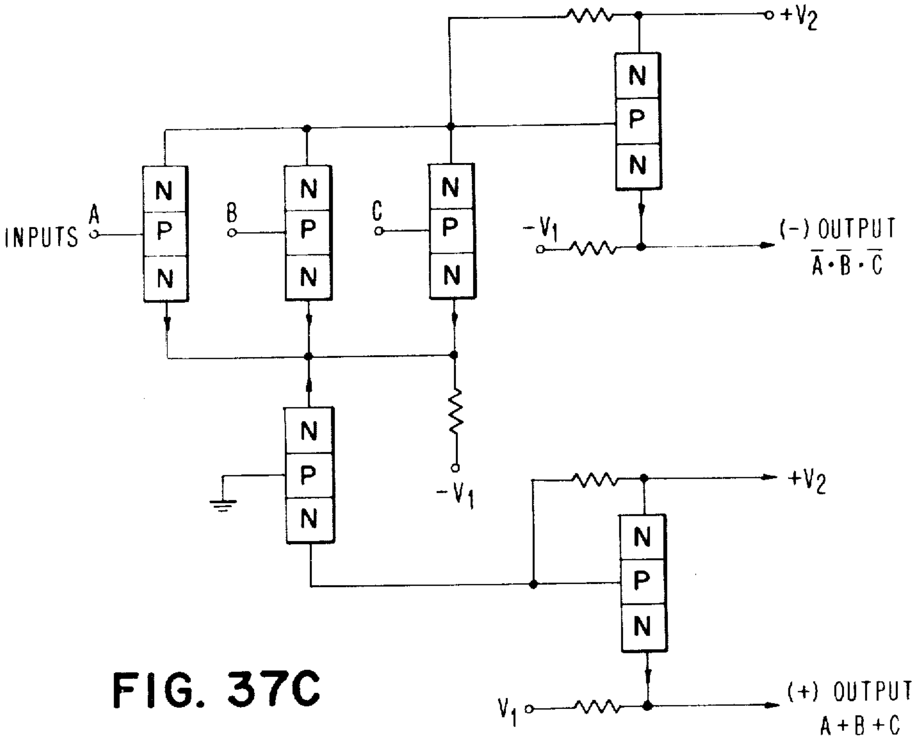

FIG. 37C comprises a detailed schematic diagram of a basic NAND logic module of which the present system is constructed in its preferred embodiment and comprises current steering emitter follower logic.

Figure 38:
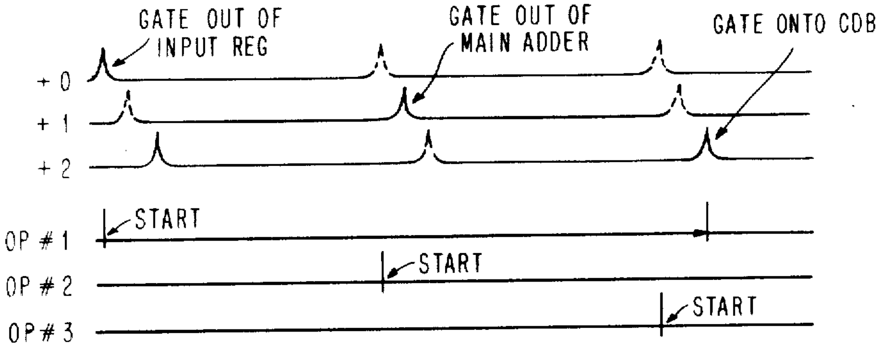

FIG. 38 comprises a basic timing diagram illustrating the timing within the present floating point adder system.

The objects of the present invention are accomplished in general by a high-speed adder for use with a large-scale scientific computer which comprises a multiple input storage means wherein the necessary operands for a plurality of operations may be stored concurrently, and means for indicating when a complete set of operands in the appropriate operation indicator are in said input storage location and susceptible of performance. Means are provided for first comparing the two exponents, determining the magnitude of the difference therein if there be a difference, and for appropriately shifting the fraction portion of the smaller of the two numbers in accordance with said determination. Means are then provided for passing the fraction portions of both operands into the main adder where the complete addition or effective subtraction is performed. The output from the main adder is gated at a predetermined time into a normalization section wherein a determination is made for possible post-shifting of the result from the main adder to provide a normalized result. The result is shifted an amount equal to said determination and the exponent of the aligned operation is updated in accordance with said shifting of the fraction portion. The fraction result and the updated exponent are then gated back into system storage at the second predetermined time. Means are further provided for gating a second pair of operands into the main adder section a predetermined amount of time before the preceeding result is gated out of said adder into the normalization circuitry.

The system is characterized by the fact that no functional component is used more than once in a given addition operation thus the adder configuration may be a straight flow-through type of unit wherein once a pair of operands enters the front of the adder array it passes directly therethrough and when one operation has reached a first latch point and entered same a new operation may be gated into the system whereby the adder will be concurrently performing more than one operation in various portions thereof at any given time.

Further, modifications of individual functional units may be made due to the fact that they may be highly specialized not only because of the particular number system used, i.e. 4 -bit (hexadecimal) digits wherein certain positions may be ignored due to the size of the machine as will be explained subsequently but also due to the very specialized nature of the operations performed by certain of the functional units. Thus the exponent subtractor is purely a subtractor and the sink operand is always gated into same in its complement form whereby an addition is performed and depending on the summands the result may be complemented or modified with a hot one. Thus, regardless of the particular operation being performed by the adder, i.e. add or subtract the exponent subtractor is concerned solely with determining which exponent is larger and if there is a difference, the magnitude of same in order to effectuate the proper gating of the unshifted operand into the main adder and also for providing a shift magnitude signal for the Preshifter. The particular number system used in the present system also allows certain modification and circuit savings in the preshifter since, if the exponent difference exceeds a certain FIG. (15), the magnitude of the shifted operand would for all practical purposes be zero and the operation in essence becomes a single operand operation as will be more apparent from the subsequent description. It will also be apparent that the preshifter need have the facility to shift in only the one direction as the smaller of the two operands will always be shifted to the right to add zeros between the radix point and the first significant fraction bit.

Similarly, in the postshifter a novel design is utilized wherein the shifter is a unidirectional shifter. In this case it need to shift only to the left. As is well known in any add operation it is possible to have a one bit overflow from the high order bit position of the adder and therefore the capability of shifting one bit to the right would normally have to be incorporated. However, with the present design an overflow bit condition is assumed to be a zero right shift and a no overflow with no leading zeros is considered to be a one bit left shift and a single leading zero is considered to be a two bit shift, etc. By this technique considerable hardware saving is possible in the shifter with very little extra logic required.

The system is built up almost exclusively of a basic NAND logic module. This common circuit element is utilized for virtually all logic functions and varies only depending on the number of inputs required. It may be utilized for performing AND logic, OR logic, inversion (I) and for true/complement amplification (AB) In the latter case for a single input both the true and complement output are desired for subsequent logical operations.

Similarly, the timing for the present system is extremely straightforward and simple as the system is basically synchronous-asynchronous wherein three basic timing pulses are required which gate operands into the main adder, gate the result out of the main adder into the normalization circuitry and finally gate the complete result from the output registers back into the system storage area. The flow of data within the various blocks is strictly asynchronous and requires insignificant additional timing control.

The following general and specific descriptions of various aspects of the overall computing system and the floating point unit and the adder will more clearly set forth the novel aspects of the present invention.

The overall system organization for a large-scale high-speed scientific computer is set forth in Section II.

Section III comprises a detailed description of the manner in which the present high-speed adder operates and contains a number of numerical examples which clearly explain the arithmetic operations in both the exponent circuitry and also the fraction circuitry. This section also contains reference to FIGS. 10, 11 and 12 which illustrate diagrammatically the shifting philosophy for both shifters although only the preshifter is illustrated (FIG. 10). FIGS. 11 (A and B) and 12 (A and B) are functional block diagrams of the primary and carry look-ahead sections which make up the main adder. The description of these two FIGS. clearly illustrates the manner in which the main adder operates.

Section IV generally describes the overall floating point unit in which the present high-speed adder is incorporated and generally describes the operation of said unit and the manner in which instructions are passed to the present main adder and whereby operation of said adder is effected. This section also describes in considerable detail with specific reference to a number of flow diagrams the operation of the input controls to the adder which signal the adder that one or more of the three input reservations stations contain all of the information, i.e. both operands as well as the op-code necessary to perform a given add/subtract operation. This section also describes the overall operation of the high-speed adder of the present invention with relation to the major functional components thereof, and further for purposes of general illustration describes the manner in which the parity is checked and maintained throughout an operation cycle. However, this latter description of parity is not considered a part of the present invention and is accordingly neither disclosed nor described in the logical schematic diagrams of FIGS. 27 through 36.

Section V of the specification describes each of the functional units specifically shown in the organizational drawing of FIG. 26 it being understood that a number of these drawings obviously show only a relatively small portion of certain of the functional components such as the input registers, the main adder, output register, etc. It is believed, however, that this presentation illustrates in minute detail the design of a high-speed adder constructed in accordance with the principles of the present invention and utilizing a preferred form of modular circuit construction.

GENERAL DESCRIPTION

The preferred embodiment of the invention described herein forms a part of a large size data processing system capable of extremely rapid operation, and operation of many sections in parallel whereby large amounts of data may be processed in a reasonable length of time.

Figure 1:
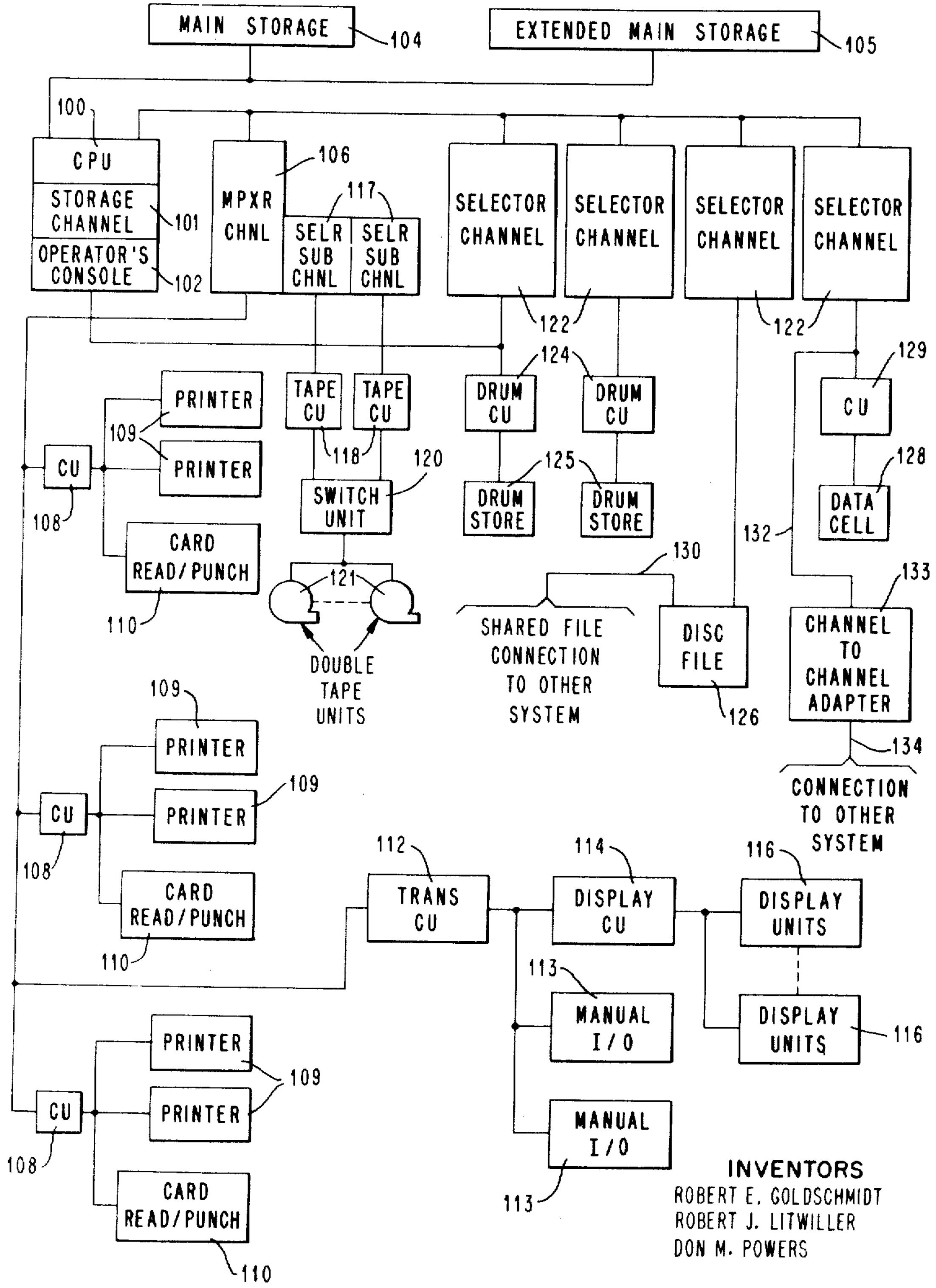
FIG. 1 is a greatly simplified organizational drawing of a large scale, high-speed scientific computer indicating the main computer components as well as the input and output units and certain other peripheral equipment.

Although it is to be understood that the exact configuration of a data processing system will depend upon the form in which data is to be initially supplied to the system and the data outputs desired, a representative configuration of a large system is shown in FIG. 1. Here the Central Processing Unit (CPU) 100, a Storage Channel (SC) 101, and a Maintenance and Operators Console 102, are combined in a main frame which will be uniform for all system configurations. A Main Storage (MS) 104, typically 256,000 double (64 bits and 8 parity bits) words, will be connected to the CPU 100 to hold the programs and data required by the CPU, and this Main Store 104 may be supplemented by an Extended Main Storage (EMS) 105 of the same or double capacity, i.e. 256,000+ or 513,000+ double words. Due to restrictions on physical size and location, lengths of wire connections, control sizes and the like, data cannot be transferred between the CPU 100 and EMS 105 as rapidly as it can be passed between CPU 100 and MS 104, so that it is preferable to maintain most of the immediately needed material in MS 104 and to make only occasional data transfers from CPU 100 to EMS 105. The Storage Channel 101 which may be almost a small computer is therefore provided in the main frame to control with only occasional commands from the CPU 100, the transfer of large blocks of storage data between the MS 104 and EMS 105, to keep the words in MS 104 reasonably current with needs.

The operator's part of Console 102 contains the keyboard, control switches and display units required for operation of the system. To prevent interference with the normally uninterrupted cycling of the machine, the Console 102 is connected to CPU 100 as another Input/Output (I/O) device and not directly, thus enabling the CPU 100 to carry on with the performance of other operations while the Console 102 is being set up for another entry.

The remainder of the system comprises the I/O Devices and their controls to supply the CPU 100, MS 104 and EMS 105 with needed information. A multiplexor (MPXR) channel 106 is provided to receive data from a large number of slow-speed devices operating concurrently, and it does this by accepting a byte (8 bits + parity) of data from a connected I/O device as soon as the device has the data available, and assembling the byte with earlier bytes received from the device until it has a double 64-bit word assembled and then transmitting the word to a storage location. The MPXR 106 will also receive a double word and transmit the word by bytes to a connected I/O device. Due to the speed difference between the operations of MPXR 106 and the I/O devices connected thereto, up to 256 devices can be operating concurrently through the MPXR 106. Typical devices shown attached to the MPXR 106 are three control units (CU) 108, each of which controls two Printers 109 and a Card Read/Punch Unit 110. Also connected to MPXR 106 is a Transmission Control Unit 112 for control of remotely located devices, here shown as Manual Input/Output Devices 113, such as keyboard, typewriters, or card machines, and a Display Control Unit 114, which controls a number of cathode ray tube Display Units 116.

Also shown connected to MPXR 106 as a part thereof are two Selector Sub Channels 117, each of which will be connected through a Tape Control Unit 118 to a Switch Unit 120. Any tape unit of a plurality of Double Tape Units 121 can be connected through Switch Unit 120 and CU's 118, to either of the Selector Sub Channels 117. A selector Sub Channel such as 117 can be connected to any of a plurality of I/O units, but differs from a multiplexer channel such as 106, in that only one I/O device can be operating at a time. Such a selector sub channel will be for devices which supply or receive data at a comparatively high rate and cannot share time with other devices on the same channel.

The system shown also includes four Selector Channels 122, although more or less may be connected as desired, and each Selector Channel 122 may have a plurality of I/O devices connected thereto. Two of the Selector Channels are shown as each having a Drum Control Unit 124, and a Drum Storage Unit 125, connected thereto, a third has Disc File 126 attached thereto, and the fourth is shown connected to a Data Cell 128 through its Control Unit 129. A lead 130 from Disc File 126 indicates that the file may be shared with another system. A Channel-to-Channel Adapter 133 connected by a Lead 132 to the fourth Selector Channel 122, and by another Lead 134 to another system, may permit direct communication between two systems by making each system appear to be an I/O device of the other system.

The Maintenance and Operator's Console 102 may also be connected to a Selector Channel 122 to enable entry of control data by the operator in the same manner as other I/O data, and without arresting the system operation unless such is desired.

These I/O devices, including Multiplexer and Selector Channels 106 and 122, and similar units for supplying and receiving data and instructions, are representative of commercially available devices and as the details of such devices are not part of the inventive concepts claimed herein, no further description of such devices will be given It will hereafter be assumed that information is supplied by appropriate devices to the Main Storage 104 and the Extended Main Storage 105 as it is needed.

CENTRAL PROCESSING UNIT

Figure 2:
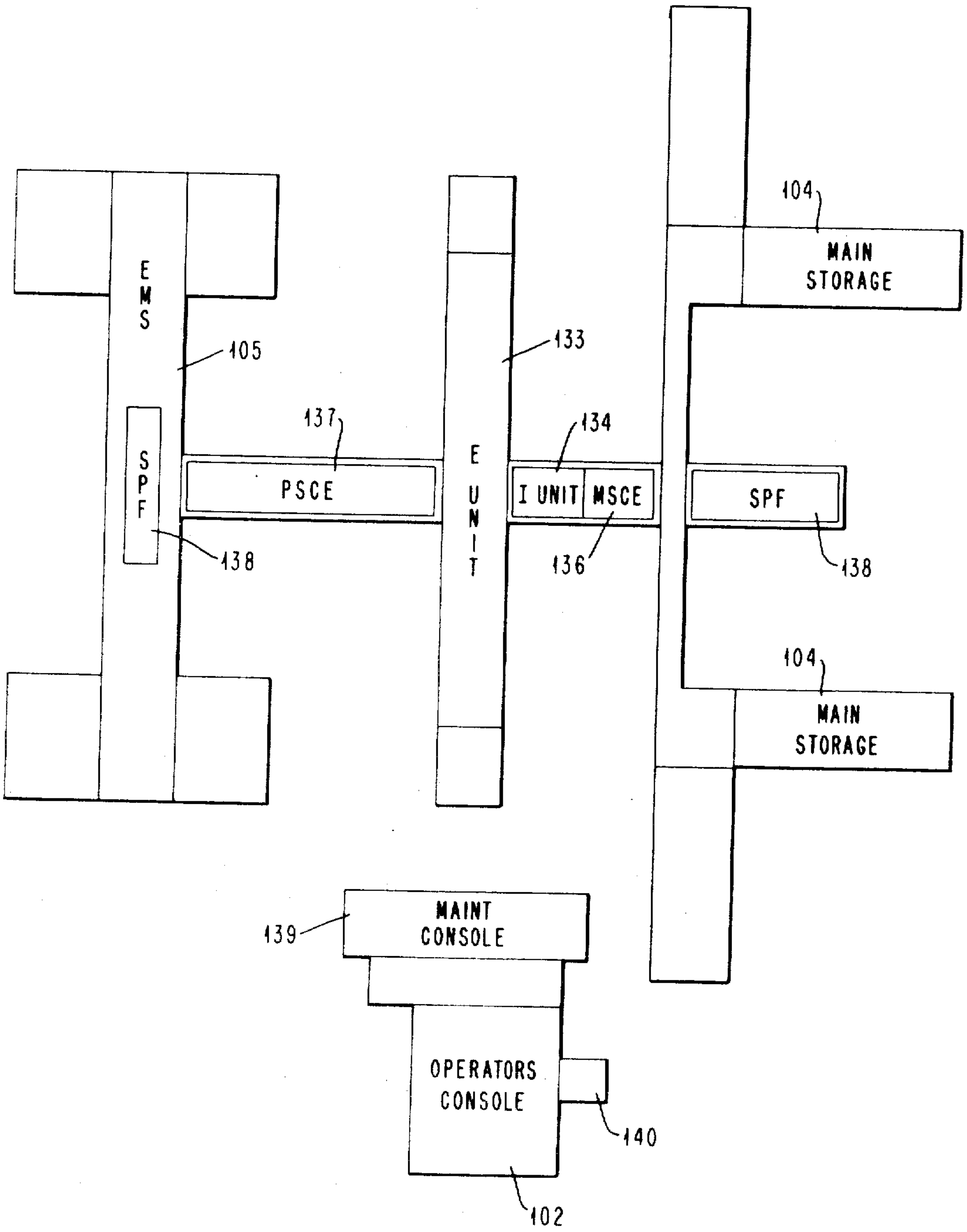
FIG. 2 is an organizational block drawing illustrating the major components of the Central Process Unit of FIG. 1.

The CPU 100 is the major operating unit of the present system and can logically be subdivided into four more or less independent units. As shown in FIG. 2, the CPU 100 is physically in the form of a cross with four sets of modules connected to a common central junction box. Vertically of the cross and comprising two of the four module sets in the Execution (E BOX) Unit 133, which performs all of the arithmetic and logical operations on the data. The inner part of the right-hand arm is the Instruction Unit (I Box) 134, which is responsible for all instruction decoding, operand fetching, and an overall control of the operations of the system. The other part of the right arm is the Main Storage Control Element (MSCE) 136 which is the main interfere between the I and E units 134 and 133 and the Main Storage 104. Also all communications between the I and E Units 134 and 133 on one hand, and the Peripheral Storage Control Element (PSCE) 137, pass through MSCE 136. The PSCE 137 forms the other, left, arm of the cross and has connected to it the Extended Main Storage 105. Each Storage Unit 104 and 105 has as a part thereof a Storage Protection Feature (SPF) 138 which stores a protection code for each block of storage addresses, and for each reference to its storage, compares the protection code with the program to ensure that the program is permitted access to the called for storage address. As this storage protection feature is fully disclosed and claimed in the assignee's copending Pat. Application, Ser. No. 334,714, now U.S. Pat. No. 3,328,765 filed by G. M. Amdahl, E. D. Councill, R. J. Flaherty and J. J. Zagursky, on Dec. 31, 1963, and titled, "-Memory Protection System," no further description of the details of the SPF 138 will be given herein.

The systems engineer's part of the Maintenance and Operator's Console 102 is numbered 139 and the both consoles with an attached CRT Display Unit 140 are combined into a separate stand-alone unit and will be connected with each of the four CPU sections by cabled wiring. The Console 139 can display the states of all settable circuits in the CPU and with the operator's part of Console 102 will provide a serviceman with complete manual control of the system for error diagnosis and repair.

As is indicated in FIG. 3, the CPU 100 can be logically considered as five functional sections connected by information carrying circuits and by control signal circuits. Since the E Box 133 has one portion which is primarily used for computations involving floating point numbers, and a second section used mainly for arithmetic operations on fixed point (integer) numbers, and logical or arithmetic operations on variable length alphanumeric operands, it is shown as the Floating Point Unit 142 and as the Fixed Point (including Variable Field Length) Unit 143. The major communications between units are set out in FIG. 3 where the number of control lines cl. the number of address busses (24 lines each) (AB) and the number of 72-bit (8 bytes each with 8 data bits and 1 parity bit) data busses (DB) are indicated for each direction of communication between the logical units.

The Maintenance and Operator's Console 102 is also included in FIG. 3 as it receives communications from all of the CPU 100 areas. The inputs to Console 102 are mostly individual data bit lines from the CPU, there being 926 from the FLPU 142, 629 from the FXPU 143, 1024 from the I Box 134, 681 from the MSCE 136, and 191 from PSCE 137, for indication purposes. In addition a further group of 53 lines 144 from the Console 102, and 100 lines 146 to a Console 102, connect to a Selector Channel 122 to enable the system operator or a system engineer to communicate with the CPU 100.

INSTRUCTION UNIT

The Instruction Unit (I Box) 134 performs under the control of the instruction words of a program and has the following assignments:

1. Fetching and buffering of the stream of instructions.
2. Partial decoding of instructions and their assignment to the proper execution unit.
3. Fetching of operands to the execution units.
4. Complete execution of branching, I/O and status switching instructions and partial execution of instructions requiring multiple operations.

5. Handling of interrupts.

The first assignment, instruction fetching, is under the control of three registers, the Upper Bound Register (UB) 147, FIG. 4, the Instruction Register (I Reg.) 148, and the Lower Bound Register (LB) 150. Each of these three registers has associated therewith an Incrementer Unit 151, 152, and 153, respectively, which always has an output signal representing one more than the value in its associated register. When the incremented output is fed back into a register, the register assumes the incremented value which then passes to the Increment Unit 151, 152, or 153, to raise it to the next value. Thus, each time the output of the Increment Unit is gated into its register, the register value increases by a unit.

The instruction words from storage, double words of 72 bits each, are received by I Box 134 on a group of 72 lines forming the Storage Bus Out (SBO) 155, and are gated into a set of eight Instruction Buffers 156, numbered 0 to 7, or, under some conditions, into 01 or 02 Temporary Buffers 157. For the present it may be assumed that the first instruction word fetched will be stored in the Instruction Buffer 156 having as its designation the lowest three bits of the double word address of the fetched word. The second word will normally have a sequential address and will be placed in the next higher numbered Buffer until 07 Instruction buffer is filled. The next word fetched will have an address which will end in 000 and the fetched word will be placed in the 00 Instruction Buffer 156.

Initially all Instruction Buffers 156 are considered to be empty as are UB 147, I Register 148 and LB 150. The starting address of the program is placed in UB 147, I register 148 and LB 150, and a fetch is immediately initiated using the address in UB 147. On the next machine cycle, a second fetch is initiated using the address from Incrementer 151 which address is also placed in UB 147. A third and a fourth fetch are called for on the next two machine cycles with an incrementing of UB 147 on each fetch, after which incrementing the UB 147 will be set to an address three higher than the starting address in I Register 148, and this will be the address of the last word fetched. As will be more fully described later with reference to the MSCE 136, the destination of a fetched word is sent out on the machine cycle before the word is transmitted, and in this instance the input gates to the Instruction Buffer 156 having the address corresponding to the lowest three digits of the storage address will be selected to put the returned word into the appropriate Instruction Buffer 156. Since this is the first fetch, the Operating Register 159 is empty at this time and the fetched word will also be gated into this register. Operating Register 159 is controlled to receive instruction words from any of the Instruction Buffers 156, Temporary Buffers 157 or SBO 155, and holds the current instruction word for decoding and control, and also holds enough of the next instruction word or words to fill up its double word capacity. Successive instruction words are placed in the successive Instruction Buffers 156 as they are received.

In the described embodiment, instructions may be of three lengths, either 16, 32, or 48 bits long and it will be noted that the Operating Register 159 has an elaborate array of gates connected thereto. On the input side, there are four sets of -bit gates so that any one or more of the 16-bit positions of Register 159 can be loaded independently. Initially as was noted, the entire 64 bits of the first instruction word on SBO 155 are loaded into OP Register 159. Since instructions may start at any of the four positions within this instruction, it will be clear that the current instruction address in I Reg. 148 will need two low order bits in addition to the fetch address to select the proper part of the instruction word in Register 159 for decoding, and one or more of the 16-bit groups to the left may belong to a previous program and are not to be used. Hence, under control of the I Reg. 148, any of the bits needed to fill out these left orders with significant instructions will be gated into OP Register 159 when the second instruction word is fetched over SBO 155. Thereafter, as instructions are used from Register 159, it is refilled from the Instruction Buffers 156 to maintain the Register 159 filled with unused instructions.

Among the out gates from Register 159 is the operating code set of four groups of eight gates supplying a Bus 160 of eight lines. Since the operating code will always be the leftmost 8 bits of an instruction, and the instruction can start at any of the four positions within the Register 159, the lines 160, are gated to the left 8 bits of each group of 16 bits.

Storage addresses within instruction words may be either of two formats. First will be instructions for those operations requiring only the use of some of the general purpose registers (GPR) to be described later and designating one or two GPR's in the second eight bits of the first 16 bits of the instruction. These addresses will be gated out of the appropriate positions to a Bus 161 of eight lines. In the other format, a storage address will be set out in the second or third 16 bits of a longer instruction as four bits specifying a GPR which contains a base address and 12 bits specifying the displacement of the wanted address from the base address. The 4 bits for the GPR selection will, for this format, be gated out of the selected positions to a Bus 162 which is only 4 bits wide. The accompanying 12 displacement bits of the address will be gated on a 12-bit wide Bus 164 into a storage buffer 165.

The Op code part of an instruction in Register 159 will be gated out on Bus 160, and into an Operation Decoder 166, under control of the two low order bits of I Reg. 148, which as mentioned above, identify the location of the current instruction within Register 159. The two highest bits of the operation code specify the instruction format and control the readout of the address part of the instruction to Busses 161, 162, and 164. For a 16-bit instruction, the address or addresses on Bus 161 normally specify GPR's which contain operands for an operation within E Box 133, and will be transmitted thereto along with the operation control signals from Decoder 166.

For a medium length, 32-bit instruction, the second half of the first 16 bits may still specify a GPR for use, as for example, as address in Main Store 104, or Extended Main Store 105, and such address will require use of an I Box Adder 168. The Adder 168 has three inputs which are to be added together to produce the effective address of the operand to be fetched. One input 169 is 12 bits wide and is supplied by Buffer 165 which is loaded with the displacement part of the address directly from the Operating Register 159. The base part of the address can be up to 24 bits and will be stored in a GPR which will be gated into a second input 170 of Adder 168 under control of the address on Bus 162. Another factor of the effective address is to be found in an index register which will also be a GPR, and the value in the index GPR, which will be selected by the signals on Bus 161, will be transmitted to the third input 172 of Adder 168.

It should be noted at this time that the GPR's are physically located in the Fixed Point Unit 143, FIG. 3, and not in the I Box 134. As the time required to send a gating signal to the GPR's and receive their stored value is substantial and would cause at least a loss of one machine cycle in the time required to generate an effective address, the numbers stored in the GPR's are made immediately available to the I Box 137 by extending "hot" lines, indicated in FIG. 4 as GPR Bus A, 173 and GPR Bus B, 174 into the I Box from the GPR's and putting gates at the I Box end of these busses. Thus, when a value in a GPR is needed, it may be immediately gated into Adder 168 despite the physical distance separating the GPR's from the adder. The only exception to the immediate availability of the GPR settings can arise when a value to be stored in a GPR is generated in Adder 168, and is needed in the next machine cycle, and there is insufficient time available for the value to be stored in the GPR and returned on the Busses 173 and 174. This exception is sensed in the I Box 134 and is compensated for by the provision of a third Temporary Register 176 which is loaded from the output of Adder 168. Whenever I Box 134 determines that the address of a required GPR is the same as that one which has just been loaded from Adder 168, the value stored in Temporary Register 176 is gated to Adder 168 instead of the settings of the associated GPR Bus 173 or 174. Another Register 177, the W Register, also receives the output of Adder 168, and can be gated out to the GPR's or to Main Storage 104, as required.

OPERATION OF THE INSTRUCTION UNIT

In the operation of the I Box structure thus far described, it will be seen that initially UB 147, I Reg. 148, LB 150 and all Instruction Buffers 156 and Temporary Registers 157 are clear of significant values. The address of the starting instruction is loaded into UB 147, I Reg. 148, and LB 150, and instruction fetching is started by requests for double words from the addresses in UB 147. The UB 147 is incremented at each fetch so that it always records the address of the last instruction fetch requested. The UB 147 will request fetches of instruction words until it is three word addresses ahead of the address in I Reg. 148 for a total of four initial words. When the first word returns it is gated into one Instruction Buffer 156 and into Operating Register 159 where the two lowest order bits of I Reg. 148 which have no address function in fetching, control the readout of the initial half word, 16 bit, instruction to the OP Decoder 166, the GPR's etc. As soon as the first instruction is processed by either execution in the I Box, or by being transferred to another unit for execution, the address in I Reg. 148 is increased by the length of the last instruction, this length is indicated in the first two bits of the instruction, and now points to the first part of the next instruction. At this time, the half words of instruction in Operating Register 159, which have been utilized, are replaced by the corresponding half words of the next instruction word from an instruction Buffer 156. Thus, there will always be available in Register 159 at least the operating code part of the next instruction, and the remainder of the instruction can be loaded into 159 as that Op code is being decoded.

Each time the RI Reg. 148 is incremented to cause a carry from the two low order bits into a higher order bit, it is an indication that another double-word instruction has been completely utilized so far as that I Box is concerned and that decoding has moved into a new word. Since the UB 147 is not now three double-word addresses ahead of I Reg. 148, a fetch of the next instruction is called for an D UB 147 is incremented to again be three ahead of I Reg. 148. LB 150 has in the meantime remained at the address of the first instruction word placed in Buffers 156. When UB 147 is eventually incremented so that it calls for a fetch into the same Buffer 156 as the first instruction word was placed in, the address in LB 150 is incremented to point the next higher address. Thus, in summary, UB 147 contains the address of the last instruction word which has been called for a fetch, I Reg. 148 contains the address of the instruction word being decoded, and LB 150 contains the address of the oldest instruction word remaining in Buffers 156. These operations will continue in this order until a branch point of some kind is reached. For a branch which forms a short enough loop so as to be contained within the past history instruction words already in Buffers 156, as shown by a comparison of the address in LB 150, with the branch address specified in the current instruction, the I Box 134 is set into "Loop Mode."

In loop mode, the address in LB 150 is set to the target of the branch and LB 150 is frozen in that state so long as the I Box continues in loop mode. It is also possible to generate a loop mode state of the I Box if the target of the branch instruction is not contained within the Instruction Buffers 156, but is nevertheless less than eight full double words prior to the address of the present instruction. In such a situation, the entire loop can be contained within the Buffers 156. Upon detection of such a loop, i.e. the branch address is within eight double words of the address in I Reg. 148 but is not at this time contained in Buffers 156, an initialization of the I Box is started. Here, the branch address of the instruction is placed into UB 147, I Reg. 148 and LB 150 as above described, to start instruction fetching. In the loop mode state LB 150 is frozen at the starting address and UB 147 is permitted to increase to completely fill the Buffers 156 with future instructions as soon as the necessary machine cycles can be spared after the four cycles required for the initial instruction fetches and after such operand fetches and other storage operations, as have priority, have been taken care of.

In either type of loop mode state, the complete instruction loop is contained within the instructions stacked in Buffers 156 and will be decoded and transmitted to the E Box 133 for execution without any need for continuous fetching of the instructions of the loop from storage. It will be evident that any branch instruction which leads to an instruction loop will be a branch on condition type of instruction for otherwise the machine will be locked into an unending loop. The I Box 134 operation for all branch on condition instructions will be substantially the same unless the instruction leads to the first type of loop mode where the target instruction is already in Buffers 156. As a preliminary description, the I Box 134 will have no difficulty with an unconditional branch instruction or a conditional branch instruction in which the condition for the branch has occurred prior to the decoding of the instruction after its transfer into Operating Register 159. In these unconditional or predetermined condition branches, the target address of the instruction is placed into UB 147, I Reg. 148, and LB 150, as soon as it is determined through Adder 168 and the condition, if any, is tested and thereafter the I Box 134 proceeds in the same manner as initially described.

If, however, the branch is dependent on a condition which has not been determined, when the branch instruction is decoded, the I Box must proceed in a manner which offers the best chance of avoiding loss of time. Hence, the I Box assumes that the condition will not be met and continues to decode and transmit for execution the subsequent instructions. It does, however, set up a condition test circuit to be activated when the condition has been determined and will also pause long enough to call for two storage fetches starting at the target address of the branch. These two instruction words when they return will be stored into 01 and 02 Temporary Buffers 156, respectively, to be available if the program branch is to be taken. Furthermore, the instructions issued to the I Box 134 or E Box 133 after the conditional branch instruction is decoded will be accompanied by a conditional tag which prevents execution of the instruction so long as it is present since the I Box does not now know if the branch is to be taken or not. When the condition on which the branch depends is determined, such conditionally tagged instructions will have their tags turned off if the condition is not met, or if the condition is met the conditionally tagged instructions will be canceled and thus not executed. Obviously, if the condition of the branch is not met, the instructions stored in Temporary Buffers 157 will be canceled or if they have not returned from storage, will be blocked at the gates into Buffers 157, but if the branch condition is met, then the word in 01 Temporary Buffer 157 is transferred into an Instruction Buffer 156 and into Operating Register 159 for decoding as the new instructions. The storage address of this instruction word is placed in UB 147, I Reg. 148, and LB 150, and this address determines which of the Buffers 156 is selected to store the instruction word. The instruction word in 02 Temporary Buffer 157 is now transferred into the next adjacent Buffer Register 156 and UB 147 is incremented. Control will then be transferred back to UB incrementer 151, now pointing to the branch address plus two and further instruction fetching will proceed as first described but from the branch path.

If, however, the conditional branch will set up an instruction loop which can be contained within Instruction Buffers 156, the I Box 134 will for the first iteration proceed exactly as above set out but will additionally be set into loop mode to prevent the LB 150 from exceeding the target address until the condition of the branch has been determined. If, however, the LB 150 has already exceeded the target address, and thus the first loop instruction has been dropped from Buffers 156, the I Box will be set into loop mode and will then proceed as in any other branch, i.e. the target instruction will be fetched into 01 Temporary Buffer 157, etc. as above described So long as the I Box 134 remains in Loop Mode, there will be no additional instruction fetching from the Main Store 104 after the Instruction Buffers 156 have been filled with eight words starting at the branch target address until after the branch condition ceases to be met at the branch point or the target address changes. It was noted above that it is normally assumed that a branch will not be taken and that the I Box will issue instructions along the main path after the branch instruction and will tag such instructions conditional and not to be executed until the branch condition is determined. In loop mode, however, the alternative assumption is made, i.e. that the branch will be taken and the conditionally issued instructions will be in the branch back to the loop. They will, however, still be tagged conditional and will not be performed until the condition precedent has been decided. When the branch condition is no longer met, any such conditional instructions will be canceled the loop mode will be set off and new instructions will be issued along the main path. The LB 150 will be unfrozen and the UB 147 will immediately start fetching new instruction words until the normal relationship between the values stored in UB 147, I Reg. 148, and LB 150, is reestablished.

It is also possible to leave loop mode or change to a different loop by some operation performed as a result of an instruction within the loop. It will be remembered that when the loop mode is entered, the address of the branch target is generated in Adder 168 by summing the values in at least one GPR and the address displacement specified in the instruction and stored in Buffer 165. If, during the processing of a loop, an instruction changes the value stored in one of the GPR's which was used to generate the branch address, the old address is no longer valid, and the branch instruction must be reprocessed to determine the new branch address. Such reprocessing of branch address could be done at each iteration of the loop, but does require a full machine cycle, and it is preferred to add some additional hardware to save this machine cycle. Such hardware comprises a Save Loop Count Instruction Register (SLCIR) 179 into which is gated the address in I Reg. 148 when a loop mode branch is detected and a Save Loop Target (SLT) Register 180 which receives the target address of the branch when it is available from Adder 168. Thus, SLCIR 179 contains the address of the instruction which sets the branch, and SLT 180 has the target address for the branch. Whenever in Loop Mode a branch instruction is found, the setting of I Reg. 148 is compared in Comparator 181 with the setting of SLCIR 179, and if they are found to be equal, the value of SLT 180 is gated into I Reg. 148, thus saving one machine cycle. It is to be remembered that Loop instructions after the branch are not to be executed until the branch condition is determined.

The target address in SLT 180 can be in error at the completion of iteration of a loop if one of the GPR's has had its stored value changed since it was used in generating the address in SLT 180. To detect such condition, the I Box 134 also stored during loop mode, the numbers of the GPR's which were utilized to generate the SLT 180 address, and also monitors the activity of such GPR's. If there is an alteration of one of these monitored GPR's the SLT 180 value is considered invalid. Loop mode is therefore canceled and a new branch address is generated in the same manner as the address was generated in the first loop iteration.

INSTRUCTION ISSUING

A second principal responsibility of the I Box 134 is the issuing of instructions to the appropriate units for execution and the fetching of required operands from storage 104 or 105. This task is pipelined in three independent stages so that at any time as many as three instructions may be in process by the I Box, each instruction being at a different stage of processing. This pipeline type of operation naturally provides an improvement in the effective speed of I Box operation, even though a particular instruction may be in process longer than the time needed to similarly process an instruction with straight through hardware.

Assuming that there are no interlocks to hold up operation of I Box 134, the first pipeline stage gates out over Bus 160 the operation code (8 bits) of the instruction in Operating Register 159 as selected by the setting of I Reg. The OP code is decoded in Decoder 166 to the type of operation to be performed, i.e. floating point, fixed point, or other, and whether the execution unit will require operands from storage or not. For a floating point type of operation, the I Box will check to see if the floating point unit (FLPU) 142 can accept the instruction. As will be described later, the FLPU 142 is analogous to simple computer with an instruction stack to hold some instructions, floating point buffers to store operands and some arithmetic and logic units to operate on the operands. If the instruction stack is full, the FLPU 142 cannot accept the instruction from the Decoder 166. Also, if the instruction calls for operands to be fetched from storage, the I Box 134 checks for availability of a floating point buffer register to receive the fetched operand and checks the availability of Adder 168. The Adder 168 is not available if pipeline stage 3 is full, or if pipeline stage 2 is full and MSCE 136 is not accepting addresses for storage fetches for reasons to be set out at a later point. If any of these conditions is not met, the I Box 134 will stop until the condition is met. As soon as it can proceed, the Decoder 166 determines whether the I Box 134 is operating in conditional mode, i.e. whether a conditional branch has been previously decoded and the condition precedent to the branch has not been determined, and whether the operation will set a condition code signal.

As soon as the requirements are met, the I Box 134 will send to the FLPU 142 a signal including the following 14-bit signals:

| | |
|---|---|
| 1 Full/Empty | Sets tag to indicate valid instruction. |
| 1 Conditional Operation | Instruction not to be executed when bit is on. |
| 1 Condition Code | This instruction will set a condition code. |
| 8 Operation Code | Control the FLPU operations. |
| 2 Register Address | Designate the one of four registers having one of the operands. |
| 3 2nd Register Address | Designate a second register or a buffer having a second operand. |

If the instruction is for a fixed point operation the I Box makes similar checks of its own pipeline status and of the FXPU 143 status to detect any blocking conditions. As soon as there are no such conditions, the FXPU 143 receives a set of 24 bit signals as follows:

| | |
|---|---|
| 1 Full/Empty bit | Set to indicate a valid instruction. |
| 1 Conditional Operation | Instruction not to be executed when bit is on. |
| 1 Condition Code | This instruction will set condition code. |
| 8 Operation Code | Controls the FXPU operations. |
| 4 GPR #1 Address | The location of operand #1. |
| 4 GPR #2 Address | The location of operand #2. |
| 3 Fixed Pt. Buffer | The address of the buffer register which is to have the source operand. |
| 2 Storage Address Register | Identifies a Storage Data Buffer to receive a generated operand. |

Since both the I Box 134 and FXPU 143 can change the operands in the GPR's, an interlock is provided to prevent the I Box from using these registers before the FXPU can set them in an issued but unexecuted instruction, and also to prevent the I Box 134 from changing the GPR operand if the operand is to be used in an unexecuted operation. The structure for this interlock is associated with the GPR's and will be more fully described in the description of the FXPU 143, but briefly consists of a Register Unavailable for Addressing (RUA) Counter 337 and a Register Unavailable for Modification (RUM) Counter 335 for each GPR. Every instruction which uses a GPR as a sink for data storage increments the RUA counter for that GPR and execution of the instruction decrements the counter. The I Box 134 cannot use a GPR to generate an address until the RUA Counter for that GPR equals zero, at which time the GPR will store the correct value for an address generation. Similarly, the RUM counter is incremented whenever an instruction is decoded which uses the associated GPR as a data source and is decremented as the instruction is executed. The I Box is prevented from using such a GPR until its stored data has been fully utilized, Only when both RUA and RUM are 0 can the I Box use a GPR in a manner which would alter its stored value.

As noted above, when the I Box 134 decodes a branch on condition, it checks the condition code setting to determine which way to branch. Since there may be some instruction in the E Box 133 which has not been executed but which will affect the condition code, the branch cannot be determined until the last instruction capable of changing the code has been performed. Each instruction issued by the I Box 134 which can change the condition code includes a condition code bit and this will turn off all other set condition code tags in both FXPU 143 and FLPU 142. Thus, only one condition code tag can be set at any time, and this will be the last one issued. The I Box must hold off on determination of a branch until that condition code tag is reset.

As above noted, until a branch is decided, the I Box 134 will continue to issue instructions tagged for conditional operation. Any such instruction may have a condition code tag set but this will not reset the tag for the previously issued unconditional instruction. It will, however, reset the condition code tag on any previously issued conditional instruction so that one conditional instruction may also have a set condition code tag. When the conditional tag is canceled on such an instruction, the presence of a set condition code tag will immediately reset any condition code tag bits among the unexecuted instructions.

There are also instructions which can be fully executed within the I Box 134, such as the branching set out above. In general, when the I Box 134 encounters an I Box instruction, it halts succeeding instruction processing until the instruction is completed, and for some instructions the I Box must wait until all instructions in process, i.e. in the pipeline, are issued before it can proceed.

In pipeline stage 2, address generation for the first of any required storage operands takes place. The three operands on Adder Inputs 169, 170, and 172, are gated into the Adder 168, and the sum is gated to the Wording Register 177. If the instruction is a store instruction, a quick check is made to see if the store can be to the storage address from which the next instruction now being decoded by OP Decoder 166 was fetched.

In pipeline stage 3,the storage address of an operand is passed to an address buffer in MSCE 136, and in a store operation, the address is also checked in the I Box to detect if it is a store to an address from which an instruction fetch has already been made. If so, the I Box stops for one cycle and orders a new instruction fetch from the storage address. The MSCE 136 has, as will be described later, interlocks to insure that the store and fetch will be executed in proper logical order.

EXECUTION UNIT

The Execution Unit (E Box) 133 can be considered as divided into two almost independently operating sections, the Floating Point Unit (FLPU) 142, and the Fixed Point Unit (FXPU) 143, both receiving instructions from the I Box 134 and being connected by data busses to the MSCE 136 for operand transfer.

FLOATING POINT UNIT

The overall data flow and instruction storage of the FLPU 142 is shown in FIG. 5. The 14-bit instruction signal from the I Box 134 is received on a Bus 183 and will be stored in the next available one of a set of eight, 14-bit stack registers forming the floating Point Operating Stack (FLOS) 184. The I Box can issue instructions for storage in FLOS 184 so long as the stack is not filled. The instructions in FLOS 184 are executed in a strict first-in/first-out sequence.

The FLPU 142 also has a stack of six 64-bit buffer registers (FLB) forming the FLB stack 185. Each of these FLB's is connected to the Storage Data Out Bus 155, see FIG. 4, to receive operands from Main Storage or Extended Main Store through MSCE 136. These operands will have been called from storage by the I Box 134 as the instruction was decoded. The I Box will also have assigned one of the FLB's 185 to receive the operand and will have transmitted the address of that FLB to MSCE 136 as the sink to which the data fetched is to be sent, and will also have sent it to the FLOS Register 184 along with the operating code to identify to the FLOS 184 where its operand will be found. There is no requirement that the FLB's 185 be used in sequence for either receiving or transmitting operands.

There is also a stack of four 64-bit Floating Point Registers (FLR) 187. These FLR's normally contain one of the operands for every instruction, and are also the sink into which the result of an operation is placed.

An Add Unit 188 is provided to handle all floating point additions. This Add Unit 188 contains a full carry/propagate carry/look-ahead type of adder in which the complete addition of two operands can be made in one machine cycle with the sum latched in a set of Add Result Latches 189. Since a floating point number will consist of an exponent of a base of 16 as a multiplier factor and also consists of a fraction part, and as only fraction parts having the same exponent can be added or subtracted, it is necessary to compare the exponents of two addition operands and to right-shift the fraction part having the lower value of exponent to align the fraction parts properly. This testing and shifting operation is preformed in one machine cycle and the aligned operands are set into latches for application to the adder during the next machine cycle with latching of the result into latches 189. Thus, addition of two operands can be performed in two machine cycles, but as the output during the first cycle is set into latches, it is possible to gate the setting of the latches into the adder and at the same time to gate a second set of operands into the exponent comparing and fraction shifting stage for their preliminary handling. It is thus possible to have two sets of operands in Adder 188 at the same time, and by such pipelining to produce results at the Adder 188 output latches 189 at an effective rate of one per machine cycle.

To provide the operands required for such repetitive adder cycles, the Add Unit 188 is supplied with three sets of input buffers 191, each set being effectively an adder and comprising two 64-bit registers to store respectively, a sink operand and a source operand, and also comprising a group of 10 address latches to store the 4-bit address of the unit whose output will be stored as the sink operand, all zeros indicating that the operand will be from an FLR 187 and a 5-bit group for the address of the unit whose output will be stored as the source operand. An all zero condition of the 5-bit group will specify that one of the FLR's 187 will be the source, a 10000 setting will specify the Buffer Stack 185 as the source, while a nonzero condition of the last four bits will identify one of the other add or multiply/divide units as the source. A single bit, the S/L bit, is a part of the original instruction field in the Operating Stack 184, and indicates whether the operation is to be performed with short or long precision, i.e., it controls the gating for the low order group of 32 bits.

The FLPU 142 also contains a Multiply/Divide Unit (M/D) 192 for the multiplication or division of operands supplied thereto. The result of an M/D unit operation is temporarily held in a group of latches, M/D Result 193. To keep the input of the M/D Unit 192 supplied with operands, there are two Operand Storage Registers 195 for each input to the M/D unit. This enables a new set of operands to be stored for the M/D unit 192, while a first set is being utilized in the unit. As in the Add Unit 188, there are 10 register positions associated with a pair of Registers 195, four positions to retain the address of the unit from which a sink operand will be supplied, five positions to hold the address of the unit from which a source operand will be supplied, and a short/long precision bit.

A Common Data Bus (CDB) 196 is provided to transfer data between the inputs and outputs of the Add Unit 188, the M/D Unit 192, and the FLR's 187, and to gate out the values in FLB's 185. Insofar as data is concerned, the CDB 196 is an extensive set of gates feeding an output OR circuit, so that any selected input to the Bus 196 may be connected to the Output Bus 197, which is common to all data receiving units including the Storage Data Buffers 244 of MSCE 136. The CDB 196 also contains control circuitry to gate the units which are to utilize CDB 196 in accordance with a preselected priority. The FLB's 185 have first priority and when they contain operands will be gated out in sequence from the lowest numbered on to the highest numbered one. When no operands are in FLB's 185, the Add Unit 188 has next priority for the CDB 196 and is strictly on a first-in/first-out priority among the Buffer Registers 191 which have all of their needed operands. The M/D unit 192 has the lowest priority and can gate out its results with a first-in/first-out priority between its input registers 195 if both sets are ready at the same time. The first-in/first-out (FIFO) priority among the inputs of the Add Unit and the M/D unit is to allow staging of operations through these units to maintain a proper sequence of results, and to prevent any undue delay in supplying operand results.

When any unit requires the use of CDB 196 to transfer an operand, it transmits its request to the CDB priority circuit which will, when no unit with higher priority is requesting the bus, return an accept signal and transmit to every operand input circuit, the address of the unit which is to put its operand on the CDB 196. It was noted earlier that each of the Buffer Registers 191 and 195 stored the address of the unit which has to supply its operand and such a register will also be provided in the other units receiving data from CDB 196 as the FLR's 187 and the SDB's 244 supplied by SDB 197. When the address of the transmitting unit appears on CDB 196, it is compared at every input with the stored address, and when an equality is detected, the receiving unit prepares to accept the operand. The CDB 196 will gate out the selected operand to its Output Bus 197 on the next machine cycle at which time the receiving unit will have its gates opened to receive the operand. On the same cycle which transfers the operand, the control section of the CDB 196 can again respond to a bus request and transmit on its address bus, the address of another unit which will supply the next operand on the bus so that effectively the CDB 196 can transmit at a maximum of one operand in each machine cycle.

The FLB's 185 are provided with a direct input to the right-hand ones, the sources, of the Buffer Registers 191 and 195, and to the Fixed Point Unit 143 by way of the Buffer Bus (FLBB) 199. Whenever an instruction in FLOS 184 indicates that an operand fetched to an FLB 185 is to be a source operand, the FLB when it receives the operand requests a time slot on the FLBB 199. FLB 199 has controls similar to CDB 196 but simpler in that the only priority is between the FLB's 185 according to their number. When an FLB's request for Bus 199 is accepted, its address is sent to all receiving units and, as described above with respect to the CDB 196, on the next cycle the unit which is to receive the operand will gate it in from FLBB 199.

OPERATION OF FLOATING POINT UNIT

The FLPU 142 with its own stored program in FLOS 184, its own storage in FLB's 185 and FLR's 187, and its own execution units Add Unit 188 and M/D unit 192, is essentially a small specialized computer under the overall control of the I Box 134. As was set out in the description of the I Box, any instructions for the floating point unit are sufficiently decoded to identify that the instruction is for FLPU 142 and the operation part of the instruction is sent thereto. If the instruction also specifies the FLR's 187 as the source and sink of the required operands, these two addresses will be also transmitted to FLPU 142. If, however, an operand from storage is needed, the I Box 134 will determine which of the FLB's 185 are available for use, will insert the address of the selected FLB 185 into the instruction sent to FLPU and will include the identification of the FLB as the sink of the fetch request sent to MSCE 136. These instructions are sent to and stored in FLOS 184 in sequential order.

When an instruction in FLOS 184 is ready for execution it is decoded in a Control Unit 200 on the output of FLOS 184 to determine what units are required for execution of the instruction. The full information for the instruction, i.e. Op code and two operand addresses, is transmitted to all execution units. Every unbusy execution unit will sample the transmitted information and it will continue to sample the information on every cycle until it is selected. The sampling of the instructions comprises actually entering the data from FLOS 184 into a set of latches and retaining it until the next set of data is put on the FLOS output. When an execution unit is selected for the execution of the instruction, the operation codes already in its latches will be frozen into the units control circuits, and the addresses which accompanied the OP codes will remain in the selected Buffer Registers 191 or 195 or the SDB's. The execution unit is thereafter tagged busy and will not again sample the control signals until it has completed its operation and placed its result signals on the CDB 196. It is to be understood that for the purposes of this discussion, an execution unit may be considered to comprise an FLR 187, a Storage Data Buffer (SDB), or for arithmetic operations, one pair of Buffer Registers 191 or 195 for any pair of registers will store all of the operands required for an operation and such an operation, with only rare exceptions, can start as soon as all operands are stored. It has actually been determined that the time saved by the provision of three separate add units and two separate M/D units instead of one Add Unit 188 with three sets of Buffers 191 and one M/D Unit 192 with two sets of Buffers 195 is negligible or nonexistent for most programs.

Before any execution unit can be selected it is necessary to bring up a GO signal during a decode cycle. The conditions required for generation of GO are dependent upon the operation to be performed, but may include such tests as:

1. A precision (S/L) match between an instruction and the data in a sink register.
2. A precision (S/L) match between an instruction and the data in a source register.
3. Is execution unit available.
4. Is operation tagged conditional.
5. Is the operation canceled
6. Is the FLOS empty.

The next cycle of operation is the Select cycle and comprises some combination of the following operations:

1. Turn on execution unit's select trigger for one cycle.
2. Set unit busy trigger for the selected unit.
3. Set the FLB name section of the address of the instruction into the FLB address part of the Buffer 191 or 195 and turn on a go-when-full (GWF) tag for the addressed FLB.
4. Set the FLR part of the address of the instruction into the FLR address part of the Buffer 191 or 195 and turn on a busy trigger for the FLR.
5. Set a Sink FLR outgate trigger.
6. Set a Source FLR outgate trigger.
7. Step the operating stack to the next instruction.

It is to be noted that during the decode cycle, an execution unit will receive the address of the unit which is to send it the required operand or operands, and such addresses will be latched in when the unit is selected. During a select cycle of an arithmetic operation, the sink operand from the appropriate FLR 187 will be put on the bus for receipt by the selected execution unit. If, however, the sink FLR has not yet received the operand from a unit, i.e. an FLB 185, the Add Unit 188 or M/D unit 192, it will have its busy tag set as will be described at a later point, and will have in its control circuits the address of the unit which is to supply the operand to the CDB 196 for transmission to FLR 187. If the sink FLR 187 contains a set busy tag during the select cycle when its stored operand is to be transmitted, the FLR 187, will instead transmit the address of the unit to supply the operand and will then be set not busy. This address will replace the FLR 187 address sent to the Buffer 191 or 195, so that when the execution unit which is to supply the operand puts its identification on CDB 196, the identification will be recognized by the control circuits of the receiving unit which will thereupon gate the operand into its Buffer 191 or 195 on the next cycle. This scheme of transmitting the address of the operand supplying unit when the operand is not available is termed "forwarding" and as is evident will enable substantial time to be saved since in this embodiment, it is not necessary to store the operand in the designated FLR 187 and then wait several cycles to transmit it to the using unit. An additional advantage is that the FLR 187 is free to receive a new operand as soon as it has transmitted the address from which its operand was to come.

If the second operand is also to be sent from an FLR 187, another select cycle takes place to transmit either the operand stored in the selected FLR 187 or its stored identification of the unit which is to supply the operand. When the source operand is from main storage, however, the operation is somewhat changed as the FLB 185 to receive the operand is assigned by the I Box when the instruction is decoded in the I Box. Now when the instruction is reached in FLOS 184, the control circuits 200 will look at the addressed FLB and if it is full on the first select cycle, it will be gated out to the execution unit where its stored operand is to be used. If, however, the operand has not been received, the FLB is directed to go-when-full (GWF) as previously noted, and will then put its operand on the FLBB 199 when it has been received and priority permits.

NONARITHMETIC FLPU OPERATIONS

The Control 200 in conjunction with FLOS 184 can perform a number of operations without the use of an arithmetic execution unit. These operations will include a number of variations of a load routine such as load, in either short or long precision, one FLR 187 from an FLB 185, or from another FLR 187, or to load from one FLR to another and to test for a zero, positive or negative condition of the operand. The operations will also include a store routine to transmit an operand from a sink FLR 187 to an SDB by way of the CDB 196. None of these operations involve an arithmetic unit and simply transfer data unchanged. If the move operation is to load an FLR 187 from another FLR 187, the operand storage address is sent on the decode cycle and the operand is sent on the next cycle. If, however, the sending FLR is tagged busy, its address register contents are forwarded to the receiving register's address register, and the sending one is reset to not-busy. When the sending device is an FLB 185, the FLB will transmit over the CDB 196 if it is full, or will be set to go-when-full, and it is given priority. The address register contents cannot be forwarded for these operations for the SBO 155 of the FLB's does not connect directly to the FLR's 187.

If the operation is a store operation, a similar sequence is followed except that an SDB in the MSCE 136 is to receive the operand from an FLR 187. The SDB will be given the address of the source FLR, or the contents of the source FLR's address register will be forwarded to it if the FLR is busy and has not received the operand.

FIXED POINT UNIT

The Fixed Point Unit (FXPU) 143, FIG. 3, is a part of the E Box 133 and executes all operations using fixed point hexadecimal numbers and all variable length operands, alphabetic and/or numeric. The FXPU 143 comprises five functional units as indicated in FIG. 6. These units are an Operation Stack 201, for both Fixed Point and Variable Field Length operations, a group of 16 General Purpose Registers (GPR) 202, each 32-bits wide and, as previously mentioned in the description of the I Box 134, each connected by "hot" lines to the I Box GPR A Bus 173, and GPR B Bus 174, and six Fixed Point Buffer (FXB) registers FA to FF, individually referenced as FA 204, FB 205, FC 206, FD 208, FE 209, and FF 210. Also included in FXPU 143 are a VFL Logic Unit 212 having associated with it an Immediate Data Input Register 213, and a fixed point execution unit which may be considered as comprising a 36-bit three input Carry Save Adder (CSA) 214, a 38-bit wide Carry Propagate Adder (CPA) 216 which can feed its output into either half of a 68-bit Accumulator 217, and a Shifter 218 on the output side of Accumulator 217. Shifter 218 is capable of shifting the output signals to the right or to the left up to 32-bit positions and includes an Overflow Detector 220 to detect any significant digit loss on a left shift. A group of Store Bus OR's 221 can combine data to be transferred from different units in the FXPU 143 to the Storage Data Buffers in the MSCE 136 into the one Bus 197.

The Fixed Point Operating Stack (FXOS) 201 contains six 24-bit Buffer Registers. The function of FXOS 201 is to receive microcoded Op's on an input bus 222 from the I Box 134 as previously mentioned, and to issue the Op's on a first-in/first-out basis to the Op Decoder 224 for control of the fixed point/VFL operations.

The 16 GPR's 202 are used as the sink and source of the operands for most instructions. There are two full word output busses, A Bus 225, and B Bus 226, and only full words can be gated from a GPR 202 to a Bus 225 or 226. The GPR Address Register 228 is a 9-bit register set from I Box 134 on Bus 229 to control the address of the GPR which is the sink of an operation and controls the ingating of operands into the GPR's 202. A single byte (8 bits) a full word (32 bits) or a double word (64 bits) can be ingated on any cycle. An ingated byte will always be stored in bit positions 24 to 31, i.e. the right end of a GPR and a double word will be stored in an even-odd pair of GPR's, i.e. 02 and 03, 04 and 05, etc.

The six Fixed Point Buffers 204—210 are used during fixed point/VFL operations as sink and source data registers and all operands from storage will enter the FXPU 143 through these Buffers. Four of the six buffers FA—FD are used for all multioperation instructions, both fixed point and VFL, while the other two FE and FF are used only for fixed point operations. A buffer can have either the right or the left 16-bit half outgated to the left half of the left input of CPA 216, or the right half of the buffer can be gated into the right half of the same left input of CPA 216, either alone or in conjunction with the gating of the buffer's left half into the remainder of the CPA input. It should be noted that this left input of CPA 216 has a I/C side 231 which may be set to cause entry of the operand (T) or its complement (C) for effective addition or subtraction of the operand.

For VFL operations, the FA and FB buffers 204 and 205 may be used as one 64-bit sink register and any byte may be outgated to the Sink Bus 232 of the VFL Logic Unit 212. The other two buffers FC and FD 206 and 208 may be used as the 64-bit source register and any byte may be outgated to the Source Bus 233 of the Logic Unit 212. Although not further described at this time, there is a byte address register associated with each buffer FA, FB, FC, and FD, those with FA and FC being 3 bits wide to address any byte of the combined 64 bits of FA-FB and FC-FD and those for FB and FD being 2 bits wide to address any of the four bytes in a register when it is used alone as a 32-bit wide register. Each address register can be incremented or decremented by a unit and the data in the register controls the bytes to be outgated to Busses 232 and 233.

The Carry-Save-Adder 214 is used only for multiplying operations and has a Multiply Gate 235 connected to two of its inputs to supply to one input either nothing or a one multiple or a two multiple and to the other input either nothing or a four multiple or an eight multiple. All multiples are of the multiplicand operand without a 0-, 1-, 2-, or 3-bit position left shift, and any multiple can be supplied either plus or minus as required.

The Carry Propagate Adder 216 is 38-bits wide on each input. It is used as a 32-bit wide Adder for add and subtract operations, as a 36-bit wide adder for multiplication and division operations and it is used over its full width in convert-to-decimal operations. Only on the left input is a complement function available.

The Accumulator 217 is 70-bits wide with a right 322 bits, a left 32 bits and a 6-bit left extension, and is used particularly in multiplication to buffer partial results. The outgating circuits go to the Shifter 218 or back to the inputs of CPA 216 with the CPA input circuits settable for a left shift of either one or three orders, or for a right shift of four orders of only the left part and extension. The outgating for the right part of Accumulator 217 enables the value stored in the right half of the Accumulator 217 to be sent to either input of CPA 216, to be partially decoded along with the left part for a string of leading zeros in Leading Strings Decoder 379, or to a Multiplier Decoder 377 which controls the Multiply Gates 235.

The Shifter 218 spans a full 64 bits and is ingated from Accumulator 217 and for the multiply operation can also receive the right 4 bits of the 6-bit left extension. The input can be shifted to the right or to the left and can be shifted any extent up to 32 orders. Zeros will be filled in on the right or left end, ones will be filled on the left end when a complemented negative number is shifted and any significant digit shifted to the left out of the effective output bus will be detected as a spill.

The Immediate Data Register 213 is linked to the VFL Data flow and is also linked to the Operation Stack 201. Its primary function is to hold Immediate Data which will be included in the instruction word. This register 213 can outgate to either the Sink Bus 232 or the Source Bus 233 for the VFL Logic Unit 212.

The VFL Logic Unit 212 has the Sink Bus 232 and the Source Bus 233 as its two 8-bit inputs and has the ability to AND, to OR, or to XOR (exclusive OR) the two sets of inputs or to gate either input unchanged to the Result Bus 234.

The I Box can supply data directly to the GPR's 202 by sending a 32-bit word, generally an address base, on a Bus 236 and specifying the GPR 202 to receive the data by the signals on Bus 229 to the GPR Address Register. The I Box 134 can receive signals by the 512 "hot" lines connected to the GPR's and an 8-bit OR 237 drives a bus which can transmit any 8-bit byte from the FXB's 204, 205, 206, or 208, to I Box 134.

The Storage Bus Out (SBO) 155 is a 32-bit wide bus and will carry a word from storage as the response to a fetch request. Data on this Bus 155 will be preceded by the I Box assigned address of the FXB into which the operand is to be stored. A As described earlier, the detection of its address by an FXB 204—210 will open its ingates on the next cycle to allow the store value to enter the FXB.

The Floating Point Bus is Bus 199 of FIG. 5 and comprises a 64-bit data part and a 3-bit address part to select an FXB as above. Data will be put on the Bus 199 as a result of a request from FXPU 143.

The Store Bus OR's 221 can be loaded with up to 64 bits of data to be sent to a Storage Data Buffer (SDB) 244 in MSCE 136. The OR's 221 will also be supplied the address of the SDB 244 to which the data is to be sent. The Store Bus OR's 221 can collect data from the FXB's 204-210, from the GPR's 202 and from the Accumulator 217. Either 1, 2, 4, or 8 bytes of 8 bits can be gated through the Store Bus OR's 221.

FIXED POINT UNIT OPERATION

The primary purposes of the decoder 224 is to control the issuing of instructions from the Operating Stack 201. These instructions in FXOS 201 are microcoded in 21 bits with the left 8 bits containing the Op code. Three tag bits are also provided for each FXOS buffer register. These three are the conditional operation, set condition code, and full bits which have been previously described.

As Op's are processed, certain signals must be sent to the I Box 134 to maintain up to date the I Box counters indicating the status of the GPR's and FXOS. The RUA and RUM Counters 337 and 335 are incremented as Op's are sent to the FXOS and during execution of these Op's the same counters are to be decremented and will indicate that a specific GPR has just completed its function as a sink or a source field. The specific RUM OR RUA counter to be decremented will be indicated by the register address field of the Op or from the GPR Sink Address Register 228.

The I Box 134 also maintains the FXOS Counter 203 to indicate the number of unexecuted instructions in FXOS 201. Each Op issued by I Box 134 to FXPU 143 causes the Counter 203 to be incremented, and each Op execution sends a stack counter decrement signal to the I Box.

Fetches of all operands will have been called for by the I Box when an instruction is decoded, and a specific FXB 204—210 or Floating Point Buffer (FLB) 185 FIG. 4 will have been assigned. In general, all 32-bit operands will be brought into the FXB's while 64-bit operands will be sent to an FLB 185 and will be transferred to the FXB's when requested. The address of the assigned FLB or FXB will be included in the Op sent to FXOS 201. The I Box 134 keeps track of the full or empty status of the FXB's and FLB's by setting a busy trigger when an FXB or FLB is assigned and then having the trigger reset by OP Decoder 224 when the data in the FXB or FLB is used. Also, address generation of operands, branches etc., in I Box 134 will be taking place concurrently with the execution of Op's in FXPU 143. To prevent delay in the I Box processing when fixed point operations are in process, the I Box is given priority in making a store into GPR's 202, even to the point of blocking fixed point/VFL processing if necessary. This priority is controlled by an ingate priority circuit which monitors all I Box requests for GPR ingating, and as soon as the I Box request for ingating is accepted, it will block an ingate request from the FXPU execution units until the I Box has completed its storing into the GPR's.

In the FXPU 143, the normal processing of Op's in the FXOS 201 is in a serial manner. As an Op is issued to one of the execution units, Fixed Point or VFL, any data required from a FLB 185 is called for and assigned to an FXB 204—210. The FXB's are monitored to detect when all data fields are available to execute the issued Op.

While the execution of one Op instruction is in process in the execution units, the next Op in FXOS 201 is being decoded in Decoder 224 and this will apply for the successive Op's of a multiple Op instruction, as well as for an Op which can be executed in a single cycle. The succeeding Op will be issued as soon as the data facilities for its execution are available to the extent that two or more Op's can be in execution simultaneously if they do not have overlapping hardware requirements.

Most Op's for the FXPU 143 are single Op instructions having, for the control bits 8 through 20, the addresses of the registers containing the needed operands. In these 21 bits, bits 0—7 are for the Op code, bits 8—11 identify a GPR 202 for the first operand, bits 12—15 identify a second GPR 202 for a second operand, bits 16—18 specify which FXB or FLB contain the operand to be sent to storage, and bits 19—20 are the SDB 244 which is to receive the data to be stored in Main Storage 104.

For another type of operation, single operand instructions, bits 12—18 may contain data having a different significance. If the operation is a shift then bit 12 specifies a direction and bits 13—18 are the shift extent, while for a load multiple or store multiple, there will be a plurality of Op's, i.e., one micro-Op for each word and bits 12—15 are control bits for left, right, start and end, and bits 16—18 specify the FLB 185 having the storage operand to be processed.

The Fixed Point Unit (FXPU) 143 operations may be grouped into single-cycle instructions and multiple-cycle instructions. The single-cycle instructions include the load instructions in which all operands go through the Adder 216. The source register, either a FXB or a GPR is gated to the left input to Adder 126 and then back to the GPR sink register. If the load instruction includes a test of the operand condition, the test is made at the Adder 126 according to the instruction with the Condition Code being set in accordance with the result of the test. For a load positive or load negative, the T/C gates 231 of Adder 216 are conditioned to enter the operand, complemented as required for the instruction, while load complement always complements the operand. The numeric operations, add, subtract, compare, and the connectives, all require two operands and have a GPR 202 as a sink operand storage. The source operand may be from either a GPR 202 source or from an FLB 204—210. For subtracts and compares, the operand which is to be subtracted is directed to the left input of Adder 216 where it can be complemented as required. The connectives, i.e., AND, OR, and EXCLUSIVE OR, are performed within the Adder 216 in a separate data path and ORed into the Adder output. Store operations route a data operand from the selected GPR 202 to Store Bus OR's 221 for transmittal to an SDB 244.

The multicycle Op's are either a fixed number of cycles, e.g. single word shifts or are data dependent as multiplication, division convert to binary, shift double word, etc. The RUM and RUA decrement signals and the FXB not busy signals are sent to the E I Box during the execution of these operations at times dependent upon the operation and the FXOS 201 Buffer Register is released to the I Box as soon as all data has been extracted from it, generally on the second execution cycle.

VARIABLE FIELD LENGTH OPERATIONS

The VFL Execution Unit generally operates with alphanumeric operands having no fixed length. Since such operands cannot normally be encompassed in a double-word length, the operation is generally with one operand from storage and a second operand from either storage or a GPR 202. The VFL Logic Unit 212 operates for each cycle on a maximum of 8 bits from each operand and these 8-bit bytes are supplied over the Source and Sink Busses 232 and 233 from the FA—FB and FC—FD Buffers. Since the length of storage in a buffer is 8 bytes, it will be necessary for the I Box 134 to keep these buffers filled until the whole of the VFL operands is utilized. The I Box 134 will issue an Op for each word to be used as either a source or a sink, will refill each buffer as the data word therein is utilized, and will indicate when the VFL operation is to terminate.

MAIN STORAGE CONTROL ELEMENT

The Main Storage Control Element (MSCE) 136, FIG. 7, is the communication control unit between the E and I Boxes 133 and 134 on one hand, and on the other hand to the Main Data Storage Units 104, and, through the PSCE 137, to Extended Storage Units 105 and the I/O units indicated in FIG. 1.

The MSCE 136 is logically divided into the following functional areas as shown in FIG. 7:

1. Storage Address Bus (SAB) 240, Store Address Registers (SAR) 241 and Sink Bus 243.
2. Storage Bus In (SBI) 242, Storage Bus Out (SBO) 155 and three Storage Data Buffers (SDB) 244.
3. The Request Stack (RS) 245, and
4. The Accept Stack (AB) 246.

The Storage Protect Feature 138, shown in FIG. 7, is as previously noted, described in detail in applicant's pending application No. 334,714, and will not be further described herein. It functions to store a protection code for each block of storage addresses in MS 104, and for every reference to an address in MS 104 it compares the code for the block including that address with the code under which the program is operating to detect and signal any unauthorized storage operations.

The Storage Address Bus 240 receives from the I Box 134, the Maintenance Console 102 and PSCE 137, the address at which a storage operation is to be performed, as well as the instructions for performing that operation. The Storage Address Bus 240 is ingated to the Storage Address Registers 241, the Request Stack 245, the Accept Stack 246, and to the PSCE 137, for those storage addresses which are not contained within the MS 104. The Sink Bus is fed from the Accept Stack, the Maintenance Console 102 and PSCE 137, and carries, one cycle in advance of the presentment of data, the sink address of the unit to receive data requested from storage. The Sink Bus 243 is sensed by each unit which can expect to receive data from storage, i.e. the I Box 134, the FXPU 143, the FLPU 142, the Maintenance Console 102 and PSCE 137.

The SBI 242 is the bus carrying all data for insertion in MS 104 or EMS 105, and its only supply source from CPU 100 is through the SDB's 244 although it can also be ingated from the Maintenance Console 102 or the PSCE 137. Similarly the SBO 155 can receive data from the MS 104, PSCE 137, SPF 138 or Maintenance Console 102, and is outgated to the units which sense the Sink Bus 243, i.e. the I Box 134, the FXPU 143, FLPU 142, PSCE 137 and Console 102. The SDB's as previously noted, are filled over a Bus 197 with data under control of store instructions issued by I Box 134 to itself or the E Box 133.

The request Stack 245 is a group of four buffer registers to hold storage instructions which cannot be immediately put into operation as they are received, due generally to a "busy" condition of the module of Main Store 104 containing the desired operand. It will normally issue a stored request when the requested storage module becomes available and the stored requests will issue in a random order since there is little likelihood that the storage modules of MS 104 will become available in the same sequence as instructions are stored in Request Stack 245. If, however, there are two requests in Request Stack 245 which can be issued, or if there are two requests addressed to the same module, these will be issued in a first-in/first-out status to insure issuance of every request and to preserve logical correctness. The Request Stack 245 has priority over the CPU in issuing instructions to MS 104 and when one of its buffered instructions can be issued, that instruction will be transferred into the Accept Stack 246 in preference to one from CPU 100 which will be blocked from access to the Accept Stack side of SAB 240.

The Accept Stack 246 is the main data control area of the MSCE 136. It is essentially a large pushdown stack of buffer registers in which stored data is moved downwardly one step for each machine cycle, so that it becomes available at various output control stations on a strict first-in/first-out basis. The Accept Stack 246 has first a group of five Address Buffers 248, each sufficiently large to store the address of any double word in MS 104. There are also a group of eight sink address buffers 249 to retain the return address of a wood being fetched from storage, and also a column of 11 module designating buffers 250 to hold the designation of the module of MS 104 in which the fetch or store instruction was being performed.

It should be noted that buffers 248, 249, and 250 are simultaneously loaded with the data on SAB 240 and as all data progresses downwardly one step per machine cycle, the word address in buffers 248 will remain available for five cycles, the sink address in buffers 249 will be retained for eight cycles and the module address in buffers 250 will be held for 11 cycles. The reasons for retaining such addresses for the given times is related to the ratio between the machine cycle under which the CPU 100 operates and the much slower cycling speed of the MS 104 modules. After an address has been issued to MS 104 and a module thereof has started to cycle, it requires none machine cycles before the data for a fetch can be gated on to the SBO. However, only three cycles are required before the data for a store can be gated from the proper SDB 244 into the data register of a module. The sink address in buffers 249 is therefore retained in buffers 249 until the eighth cycle when it is gated from the lowest buffer 249 to the Sink Bus 243 to alert all sink units that data for the specified sink unit will be put on SBO 155 on the next cycle. For a store cycle, the stored data contained in the SDR 244 for the SAR 241 which started the store cycle, is outgated to SBI 242 three cycles after the store request is set on the SAB 240, as will be later described in more detail. The Sink Buffers 249 also store and shift the control data which accompanied the instruction. Such control data can include error signals, Maintenance Console 102 instructions, etc.

The 11 module designating buffers are used to control on the ninth cycle, the data out gating controls to put the fetched data from the proper module onto the SBO 155. The additional buffer locations are required due to the construction of the modules of MS 104. As is conventional, each module is started cycling by supplying to it one of its addresses. After a fixed interval, herein taken as about eight machine C(CPU) cycles, the data from the address location is present in a storage data register in the module and can be gated out as is described above on the ninth cycle. For a store operation, some or all of the data at the addressed location is prevented from entering the storage data register and its place is taken by data ingated from SBI 242. During the remainder of the module cycle, the information in the storage data register is copied into the addressed location and after about the 13th machine cycle, the module can be readdressed for another operation. The 11 buffers of module designation stack 250 are continuously monitored to indicate the busy modules. Every address put on SAB 240 is decoded to determine the designation of the module having that storage address and that designation is compared with all of the module designations in stack 250 is determine if the requested module is busy. The storage address is transmitted to all storage modules and the entire information is gated into Accept Stack 246 and Request Stack 245. If, however, the required module is busy servicing a previous storage request, the request is rejected and tagged invalid in Accept Stack 246 where it will be ignored and will be tagged valid and held in the Request Stack 245. It should be noted that every request is ingated to one of the Request Stack 245 buffers but is only tagged valid if the requested module cannot accept the request. Unless the valid tag is on, a buffer of the Request Stack 245 is considered empty.

One exception to the rejection of requests for data in a busy module is made when a fetch is to be made from a storage location which is already being fetched from or stored into. If the fetch address is contained within the five buffers of Address Stack 248, it is immediately accepted into Accept Stack 246 despite the busy state of the module. As above noted, the storage data register of the module retains the fetched or stored data so that a second outgating of the data can be performed without the necessity of going through another storage cycle with consequent delay in supplying the data to the requesting unit. The Address Stack 248 is limited to five positions as it is believed that the time saved when the later fetch is more than five instructions after the earlier request doe not justify the additional hardware and complexity required so eliminate the storage cycle.

Such detection of a request to a storage location presently being accessed is controlled by a Compare Unit 252 which compares on each machine cycle every address within the five buffers or Address Stack 248 and all addresses in the Request Stack 245 with the I Box 134 requested address on SAB 240 to detect any such request which can be accepted even though the addressed module is busy.

As noted above, Request Stack 245 has four buffer registers. In order to save time, each request applied to SAB 240, is stored in a selected one of these four buffer registers. However, the buffer register is tagged valid only when it is determined that the required storage module is busy. If the required module is not busy, the request in the buffer is not tagged valid and is ignored. When an indication is received that a storage module for which there is an outstanding request in Request Stack 245 is about to go not busy, Stack 245 has priority over any new requests from the I Box 134. The Request Stack 235 will therefore put its address on SAB 240 and inhibit the application of an address to this bus by the I Box 134.

Since execution of a fetch request may be started as soon as it is entered into the Accept Stack 246, whereas a store request must wait until all of the required data is available, a situation could arise where a fetch request is received for data from a particular address while an unexecuted store request for storing in that address is in one of the SAR's 241. In order to prevent the fetching of improper data, the fetch request must be inhibited until the store operation has been completed. This objective is achieved by compare unit 254 at the SAR's which compares every address received on bus 240 with the addresses in the SAR's. A successful comparison in compare unit 254 means that the request cannot be executed and that it must therefore be stored in Request Stack 245. The entry in Request Stack 245 is chained to the corresponding entry in SAR 241, so no attempt to execute the fetch request will be made until the store has been completed.

Various other multiple access conditions to a single memory address may also exist in the system. When multiple fetch requests are made to the same memory address, the fact that there is an unexecuted request to that address in Request Stack 245 is noted by compare circuit 253, and the two requests are chained together. These requests are executed on a first-in/first-out basis with the second request, in almost all cases, being applied to SAB 240 on the cycle immediately after the cycle that the first request is supplied to this bus. This is the only exception to the rule that a request stack entry is not applied to SAB 240 when the required module is busy. More than two requests to the same storage address would be handled in the same manner. If the request is to an address which is already in one of the five address positions of Accept Stack 246, this fact is noted by Compare Unit 252, and the request is validly entered into the accept stack even though the indicated module is busy. In this manner multiple access may be had to the same storage address with only a single storage select operation. Again, more than two request to the same address would be handled in the same manner. Finally, the presence of two successive store requests to the same address is detected by compare circuit 254 and the requests are chained together in SAR 241. Successive store requests to the same address are likewise handled on a first-in/first-out basis in order to preserve logical continuity.

It is to be noted that each module of MS 104 can retain the readout or stored data in its storage data register until the module is recycled. As above noted, this feature permits a fetch from an address to be performed following a fetch from or a store into that address of the module. Also, the Accept Stack 246 contains no transient information and will store data indefinitely unless during a machine cycle a clock pulse is gated thereto to step data down through the Accept Stack 246 and out the bottom. Consequently, no data will be lost if the MSCE is temporarily halted. This feature is quite advantageous for diagnostic error testing where the serviceman can cause the Main Storage 104 and MSCE 136 to progress by single machine cycles to enable each stage of the storage operation to be checked for error.

MSCE CONTROLS

The controls in MSCE 136 have two main functions. First, a decision must be made as to which addressing source is to be gated on to the SAB 240, and secondly, assuming that some address is put on the SAB 240, another decision must be made as to which of the instruction buffer units is to be selected.

The first decision may be considered as a priority allocation for it enables a selection between simultaneously calling sources. In every machine cycle, the priority conditions are examined to determine which source is to gate on to SAB 240 in the next cycle, and at the same time, the present contents of a previously selected source are being transmitted over the SAB 240. There is thus an overlapping of service and effectively the SAB 240 can service one storage access call during each machine cycle.

The general order of priority is:

1. EMS 105 data returns to CPU 100 or MS 102.
2. PSCE 137 request for data from MS 104.
3. Maintenance Console 102 returns data to the I Box 134 or E Box 133 or applies requests to MSCE 136 for MS 104 or EMS 105.
4. Request Stack 245 issue to MS 104 for a multiaccess request.
5. SAR 241 request for MS 104 or EMS 105 service.
6. Request Stack 245 to MS 104 or EMS 105 for service.
7. CPU 100 request to MS 104 or EMS 105 for a fetch.

Priority 1 is generated as a result of a previously issued request from CPU 100, or MS 102, for a fetch from EMS 105. When PSCE is about to select an EMS 105 storage module, a signal is sent to MSCE 136 to create a time slot on the SBO 155. Such a time slot on SBO 155 is created by not gating anything to SAB 240 during a cycle so that the accept stack has a vacant position. Nine cycles later there will be no data gated out of MS 104 this vacant position reaches the data out gating position in Accept Stack 246 and PSCE is free to put its data on SBO 155, and also, of course, to put the sink unit address on the Sink Bus 243 during the preceding machine cycle. Since the PSCE 137 created the time slot, it knows when the Sink Bus 243 and SBO 155 will be available and it gates its data out accordingly.

Priority 2 arises as a result of the notification by PSCE 137 to MSCE 136 of the need of some data device connected to the PSCE 137 for a storage reference to MS 104. The MSCE 136 continuously decodes the module designations in the upper eight positions of section 250 of Accept Stack 246 and signals to PSCE 137 the designations of the modules which are identified in those positions. Since it requires four machine cycles for the decoded designation to be transmitted from the MSCE 136 to PSCE 137, and for the PSCE 137 to respond by making a request, MSCE 136 notifies PSCE 137 of the availability of a module by signalling a not busy condition of a module four machine cycles prior to the end of the storage cycle. The PSCE 137 has priority over the other users of SAB 240, and it can then issue its request, which it knows will be addressed to a module, which will be available when the PSCE request is received by MSCE 136, and that the request will be received by the Accept Stack 246. It is the responsibility of the PSCE 137 to be ready to accept the data return at the time it is set onto SBO 155.

Priority 3 puts an address from MC. 102 on SAB 240 as soon as the requested module is not busy, i.e. its designation does not appear in any buffer of the section 250 of Accept Stack 246 and its busy signal is therefore not energized.

Priority 4 gives next priority to a second instruction of a multiaccess pair of instructions. When the first of such instructions is stored in Accept Stack 246, the MS signal on SAB 240, along with an identification of a buffer in Request Stack 245, causes the contents of the designated buffer to be the next instruction gated out on SAB 240 into Accept Stack 246, so that the instructions are executed in logical order, but without unnecessary intervening storage cycles.

Priority 5 enables a store to MS 104 to be executed when ready. As soon as one of the three SDB's 244 is set with data, the corresponding SAR 241 requests priority within the group of SAR's 241, where priority is on a first-in/first-out sequence among the ready SAR's. Thus, if the SAR has priority within the SAR's 241, and no higher priority has claimed SAB 240, the instruction on SAR 241 will be put on the SAB 240 for storage in Accept Stack 246, or Request Stack 245, in accordance with the busy-not busy condition of the requested storage module.

Priority position 6 is given to the Request Stack 245. Each buffer within Stack 245 with a valid instruction compares the designation of the storage module needed for execution of its instruction with the busy-not busy condition of the module as decoded from the designations of the modules in Section 250 of Accept Stack 246. If more than one request stack buffer compares its module designation with that of a nonbusy module, a sub priority of first-in/first-out controls which buffer shall be gated on to SAB 240. When a buffer of the Request Stack 245 designates for a fetch request, a storage address which is also contained within an SAR 241, the buffered fetch request is for the fetching of data which has not yet been stored and the request cannot be allowed to compete for priority. It will, however, be designated as a multiaccess buffer and given fourth priority when the instruction in SAR 241 is issued after the required data has been stored in SDB 244.

The last priority position is given to CPU 100 requests for storage service which may comprise a direct request for a fetch, the instruction being stored in either Request STack 245 or Accept Stack 246, depending upon the busy-not busy condition of the required storage module, or which may comprise storage of the instruction in an SAR 241 for a store cycle. As a safety feature, the CPU 100 cannot issue storage instructions when the Request Stack 245 is full. This prevents possible loss of the instruction for lack of a buffer to store it in.

To optimize the overlap operation of storage units, for optimum priority and optimum utilization of the SAB 240, knowledge of the future condition of availability of a storage unit is as valuable as knowledge of its present availability. The module designations in Section 250 of Address Stack 246 are therefore decoded to generate three module busy signals for each module. A first busy signal is the Busy to PSCE signal which goes not busy four machine cycles before the actual end of a storage cycle of a module. The use of this signal enables the PSCE, as above noted, to be preset to claim a module for operation as soon as its cycle times out. A second busy signal is Busy to Priority which drops two machine cycles prior to the end of the modules cycle. This signal when down allows the Maintenance Console 102 or Request Stack 245 to be preset to use the SAB 240 during select time.

The third busy signal for a module is Busy to Select which drops only one machine cycle before the end of the storage module cycle. When this line drops, a select signal can be generated to start the module on its next operating cycle when the SAR 241 or CPU 100 requests the module provided that the use of the SAB 240 is not claimed for a higher priority function. If the SAB 240 into the accept stack is so claimed, then the SAR 241 or CPU 100 request is inhibited. Obviously, all three of the busy signals for a module are down when the module is not cycling, and all signals will go busy together when the module starts to operate.

The second control condition is the decision of whether or not a storage module is to be selected for an address on the SAB 240. After it is decided in the priority controls which source, if any, shall gate an instruction on to SAB 240, the MSCE 136 must decide what to do with the information to appear on SAB 240. When data is set on SAB 240, it is stored in the topmost position of Accept Stack 246, an SAB valid Signal is set for one machine cycle, and the storage address on SAB 240 is sent to all storage modules. The Accept Stack 246 decodes this address to determine the designation of the module containing the address and checks the busy-not busy status of the busy to select signal for that module. If the busy to select signal is down, the selected module recognizes its address on SAB 240 and retains the requested address and starts cycling. At the same time, the topmost position of Accept Stack 246 is tagged valid.

As the capacity of MS 104 is limited, it may happen that the address set on SAB 240 represents a storage location in EMS 105, and if so, when this address present on SAB 240, it is routed into a buffer register in PSCE 137 for decoding and selection of a location in EMS 105, as will be later described. In the event that the buffer of PSCE 137 is not available, the storage request will be handled as a request for a busy MS 104 module.

In the event that the needed PSCE 137 or MS 104 module are busy, the instruction information which has already been gated into Request Stack 245 is tagged valid to prevent further stores into that buffer of Stack 245, and as above noted, will be issued to SAB 240 when the required storage module is about to go not busy. The multiple access considerations set out previously for double instruction references to a single address may prevent a selection of a nonbusy storage module whose address comes up on SAB 240, or may cause a second instruction to be set into Accept Stack 246 without another selection signal to a busy module. When the multiaccess situation is detected between the SAB 240 address as set in from CPU 100, and a storage address in a store instruction in an SAR 241, it is too late to prevent the issuance of a select pulse to the storage module required, and such a pulse will issue if the instruction would otherwise be executed. However, in this case, the Sink Address Section 249 of Accept Stack 246 is prevented from being set and although the storage module goes through its storage cycle, there is no sink signal sent out on Sink Bus 243, so no unit is alerted to gate in the information on SBO 155, and it is lost for that cycle.

PERIPHERAL STORAGE CONTROL ELEMENT

The Peripheral Storage Control Element (PSCE) 137 controls the flow of data between the MSCE 136, the Extended Main Storage 105, and the Input/Output (I/O) Channels 106 and 122, see FIG. 1. As indicated in FIG. 8, the PSCE 137 is comprised of three major sections, the Bus Control 260, the Common Channel Control (CCC) 261, and the Storage Channel (SC) 262. The Bus Control (SBC) 260 is the central unit of the PSCE 137 and communicates directly with MSCE 137, with EMS 105, with CCC 261, and with SC 262. All accesses to MMEMS 105 by CPU 100 through MSCE 136, as well as all accesses to MS 104 by either the SC or an I/O unit pass through Bus Control 260. In order to maximize utilization of EMS 105, the Bus Control 260 maintains a request stack that may contain up to eight requests. As any module of EMS 105 becomes available, the Bus Control 260 scans this stack and initiates a storage cycle if there is a request for the not busy module. Since the BC 260 will start cycling of any needed module as soon as it is not busy, storage request may be handled out of sequence. Requests to MSCE are similarly handled for as above noted, any module of MS 104 drops its busy to PSCE signal four machine cycles before the end of its storage cycle, thereby giving the Bus Control 260 of PSCE 137 time to call for use of the module as soon as it is not cycling. Since the PSCE has first priority on calls to MSCE 136, BC 260 can be sure that when it does issue a storage instruction to MSCE 136, the request will be accepted and BC 260 can proceed to another item.

The Common Channel Control (CCC) 261 provides for the attachment of up to five selector Channels 122 and one Multiplier Channel 106. The channels all attach directly to CCC 261 which in turn communicates with the BC 260. All channel storage requests are monitored by the CCC 261 to maintain priority among them, and the CCC 261 also controls the sequencing of the issued I/O instructions, machine interruptions and unusual conditions. When high-speed I/O devices fetch from MS 104, the CCC 261 takes on the responsibility of prefetching data into the buffers of Bus Control 260 to insure that data is available when needed.

The Storage Channel (SC) 262 controls data transfers from one storage to the other. The SC 262 appears to BC 260 as a control unit and its I/O device with both attached to a selector channel as 122. It responds to instructions of the selector channel type and uses the command and interrupt formats of such a channel. All communications between SC 262 and the storage modules are handled by the BC 260 and can be overlapped with other system activity.

BUS CONTROL

The basic internal structure of Bus Control 260 is shown in FIG. 9, and consists of five major elements. These are the input busses, the queue, the control stack, the output busses and the priority control. There are five input busses, of which two, EMS In Bus 264 and EMS In Bus 265, handle fetch returns from EMS 105 with Bus 264 being controllable to feed the PSCE Output bus SBO 155 when the EMS fetch is for CPU 100. The SAR 240 brings in requests passing through MSCE 136 and SBO 155 supplies data returns from MSCE 136. The Input Request Bus 266 enters all storage requests from the CCC 261, from SC 262, and from Maintenance Console 102.

Queue 268 is a stack of eight 115-bit buffer registers having a 72-bit data field (64 data bits, 8 parity bits), a 24-bit address field, a 9-bit mark field, a 6-bit key field and a 4-bit error field. Each request accepted by BC 260 will be assigned to one of the eight buffer registers until the request has been supplied. The function of the fields are:

Data:
: Hold data to be stored until the selected storage module has accepted store data during a store cycle, or to receive fetch data when available from a storage module during a fetch cycle.

Address:
: The storage address of the request is retained here until it can be received by storage.

Mark:
: An 8-bit byte with a parity bit to specify which bytes of the addressed double word (eight bytes) are to be changed during a store cycle. When a bit signal is present the corresponding byte is to receive a data byte from the data field.

Key:
: This field is for the storage protect key which must compare with that of the protection key for the addressed storage location.

Error:
: These four bits are separately settable to indicate which type of error has been detected in execution of the request. The indicated errors are Data Check (bad parity) Address Check (bad parity), Storage Protection Violation (wrong key used) and Invalid Address (not contained in the storage modules).

On a store request, the assigned queue register holds its data until the memory select signal is generated and the data has been gated into the data storage register of the storage module. On fetch requests, the buffer register of Queue 268 holds the data therein and remains busy until the storage fetch is complete and the data has been gated out to the requesting unit.

Queue Control Stack 269 is a set of eight 30-bit registers having the following data fields:

Primary Decode:
: twelve bits to indicate the storage being requested.

Source Address:
: Eight bits (7 bits plus a parity bit) to identify the unit requesting the storage operation.

Full/Empty:
: A bit which is set when a word has been returned due to a fetch request.

Hold:
: A bit to prevent a request from being erased after it has been executed. This bit is used for maintenance to prevent cancellation of a request and may also be used to eliminate a defective register for if this bit is set the associated control register cannot be stored into.

Active:
: A bit set to indicate that this control stack register is presently occupied by a pending request.

Operation:
: Three bits individually settable to indicate one of three CPU 100 operations, Set Tag, Insert Tag, and Test and Set.

Queue Link:
: Three bits plus a parity bit settable in combination to identify the queue register which has been assigned to this request.

The Control Stack 269 contains all information necessary to establish priority and initiate storage cycles for requests in the Queue 268. In order to determine a first-in/first-out relationship, the queue sequencing is accomplished by entering new requests into the bottom of the stack and moving all previous requests toward the top.

There are four output busses which are used to transmit data and control information to storages and channels. The EMS Request Bus 270 provides the data and control path from the registers of Queue 268 to EMS 105. The SBO 155 is used to send requested EMS data to MSCE 136 or the CPU 100 and SAB 240 makes requests for MS 104 data for EMS 105. The fourth bus is the CCC Bus 272 which returns data from EMS 105 to the Storage Channel 262 or the I/O Channels by way of CCC 261.

The Control Stack 269 is monitored by Priority Control 273 in order to provide for sequencing and routing of requests in the BC 260. The Control Stack 269 is scanned by Priority Control 273 for the following list of functions:

1. To assign a queue register of Queue 268 to a store or fetch request from CPU 100, SC 262 or CCC 261. The assignment is based on the next available register in Queue 268, and is conditioned by channel activity and priority among requesting elements.
2. To generate storage requests. This decision is based on the busy status of storage modules and on unit priority when the same storage is being requested by different units.
3. To return storage fetch data to the Queue 268. To perform this functions, the queue link data is sent to the storage module at the start of a fetch cycle and is returned shortly before the fetch data. The Input Priority Section 274 of the priority control controls the gates for moving data coming in on EMS Bus 264 into or around the Queue 268.
4. To return fetch data from Queue 268 to the requesting element. The decision depends upon the identity of the requesting unit. For a CPU 100 request fetch data is transmitted to SBO 155 as soon as possible after the fetch data is put in the Queue 268, but this is not necessarily in the same order as the requests were received. For the Storage Channel 262 data remains in the Queue 268 and may be readdressed if the transfer were on a double word boundary. Control words and single data words are returned to the channel when requested. For I/O requests through CCC 261, the data is transmitted when requested by the I/O device.

Every action of Bus Control 260 requires access to either the input busses or the output busses or both. However, most actions are independent of each other and may be taken concurrently. Some of the independent actions of Bus Control 260 are:

For Input Busses:

1. Fetch returns on SBO 155 from MSCE 104 to Queue 268.
2. Fetch returns from EMS 105 to Queue 268.
3. Fetch requests from CPU 100 on SAB 240.
4. Either an I/O store/fetch request or a Storage Channel 262 store/fetch request.

For Output Busses:

1. EMS 105 fetch return to CPU 100 on SBO 155.
2. A request to EMS 105 on EMS Request Bus 270.
3. A request to MSCE 136 on SAB 240.
4. Either a fetch return to CCC 261 or a fetch return to SC 262 on Bus 272.

COMMON CHANNEL CONTROL

The Common Channel Control 261 performs the prepriority function among the Channels 106 and 122 for storage requests and interrupt actions. Effectively, the CCC will pass to the Queue 268 any request received from a channel 106 or 122. It is only when two channels make simultaneous requests that one will be granted a built-in priority and be the first to have its request transmitted to Queue 268. In view of the difference in the operating speeds of a device connected to a channel and the internal operation of the PSCE, the momentary delay in transmitting a request is of no importance to the channel operation.

STORAGE CHANNEL

The Storage Channel 262 provides a fast data transfer from one storage to another and as above noted, this transfer can overlap other system activity. The transfer can be between all addressable high-speed core storages connectable to MSCE 136 and to PSCE 137, but cannot include paths to I/O devices connected to channels through CCC 261. A minor limitation is that the data items transferred cannot be bounded in storage addresses by any less than full word boundaries, i.e. no address of a word to be transferred, nor the address to which it is to be transferred can have other than two rightmost zeros.

The SC 262 communicates with the MS 104 and EMS 105 through the Bus Control 260, and consequently takes advantage of the Bus Control Queue 268. Since the function of SC 262 is to transfer words between storage locations, each action of SC 262 requires a fetch/store combination of requests. The SC 262 will send fetch requests to the Bus Control 260 as long as space is available in Queue 268. At the same time, the SC 262 will send the corresponding store address to the data portion of the queue register so that it will in effect accompany the fetch request. When Queue 268 makes the fetch request from the storage location specified in the address portion of the register, the store address is transferred from the data portion into the address portion of the register. Such a change converts the initial fetch request to a store request waiting for data and consequently when the fetch data returns into the data portion of the register, a store request is initiated to put the data into the other storage location.

The preceding description is intended primarily to present the overall operating environment for a high-speed adder as anticipated by the present invention, which adder would be necessary to a complex high-speed scientific computer of the type generally described. It will, of course, be understood that the preceding description has been largely general in nature and does not go into many of the details of the overall operation for obvious reasons. Reference is made to the following copending applications assigned to the same assignee as the present application for further detail of certain areas of the above-described computing system.

U.S. Pat. applications Ser. No. 578,745, now U.S. Pat. No. 3,449,724, entitled "Control System for Interleaved Memory" of L.J. Boland et al. filed Sept. 12, 1966, and Ser. No. 573,360, now U.S. Pat. No. 3,447,135, entitled "Peripheral Data Exchange" of S.A. Calta et al. filed Aug. 18, 1966 described the Main Storage Control Element (MSCE) and the Peripheral Storage Control Element (PSCE) shown on FIG. 3 and generally describe the details of the memory accessing. U.S. Pat. applications Ser. No. 576,157, entitled "Multiplying Apparatus for Performing Division Using Successive Approximate Reciprocals of a Divisor" of R.E. Goldschmidt et al. filed Aug. 30, 1966, now U.S. Pat. No. 3,508,038, and Ser. No. 576,401, entitled "Apparatus for Accumulating the Sum of a Plurality of Operands" of R.E. Goldschmidt et al. filed Aug. 31, 1966, now U.S. Pat. No. 3,515,344, describe the division and multiply units which constitutes the other half of the floating point execution unit of which the present high-speed adder comprises the first part.

U.S. Pat. applications Ser. No. 581,052, now U.S. Pat. No. 3,490,005, entitled "Instruction Handling Unit for Program Loops" of D.W. Anderson et al. filed Sept. 26, 1966 and Ser. No. 580,910, now U.S. Pat. No. 3,418,638, entitled "Instruction Processing Unit for Program Branches" of D.W. Anderson et al. filed Sept. 21, 1966 disclose the detailed sections of the instruction handling unit (I Box shown) on FIG. 3.

Finally, U.S. Pat. No. 3,462,744 issued Aug. 19, 1969 entitled "Execution Unit with Common Operand and Result Bussing" of R. M. Tomasulo et al. discloses details of the common data bus which handles instructions and controls the transfer of data within the floating point unit (FLPU) shown on FIG. 3 and described generally in other sections of the present application.

Reference to the above applications will provide valuable environmental background material which will materially aid in an understanding of the overall system organization. However, they are not considered necessary to a complete understanding of the present high-speed adder which forms the subject matter of the present invention.

GENERAL DESCRIPTION OF HIGH SPEED ADDER

The challenge in the design of the present add unit was to minimize the number of logical levels in the longest delay path. However, the sequence of operations necessary for the execution of a floating add impedes the design goal. The following characteristics of an add/subtract operation were considered in arriving at the design of the present adder. Since the radix point must be aligned before an add can proceed, the characteristics or exponents of the two operands must be compared and the difference between them established. This difference must be decoded into the shift amount, and the fraction with the smaller exponent, shifted right a sufficient number of positions to make the exponents equal. Since subtraction is to be performed by forming the two's complement of one of the fractions and then adding the two fractions in the fraction adder, one of the fractions must pass through true/complement logic. The two operand fractions are added in a parallel adder. The carries must propagate from the low order end to the high order end. Because of subtraction, the output must provide for both the true sum and the complement sum depending on the high order carry. When system controls call for left justification or normalized operation, the result out of the adder must be checked for high order zeros and shifted left to remove these zeros. The exponent must be reduced by the amount of left shift necessary to normalize the resultant fraction. The resultant operand must be stored in the proper accumulator.

The above sequence of operations requires a series of sequential execution stages each of which is dependent on the output of the previous stage. The present floating point adder provides means to arrange, change and merge these operations to provide fast, efficient execution for the floating point addition.

None of the steps can be eliminated. Each step is required in order to execute an add; but the steps are merged so that the interface between them is eliminated, and each step can be changed to provide only the necessary information to the next stage. For example, the long data format consists of 14 hexadecimal digits; therefore, any difference between the two exponents which is greater than 14 will result in an all zero fraction. This means the exponent subtractor does not have to generate a sum for the high order 3 bits. Instead, if the difference is greater than 14, a shift of 15 is forced. As a result, the exponent subtractor is faster and less expensive since it will require fewer components.

The add unit algorithm is separated into three parts—exponent comparison and preshifting, fraction adder, and post-normalization The first section, the exponent comparison and preshifting operation, merges the first three operations from the sequence given above. The second section—the fraction adder—merges the next two operations. The final section—post-normilization—merges the final three operations. The general hardware implementation of each of these three sections is discussed subsequently.

EXPONENT COMPARISON AND PRESHIFTING

The first stage of execution for all 2-operand instructions (floating add, subtract, and compare) is to compare the exponents and establish the establish the magnitude of the difference between them. The exponent (SK) of one operand is always subtracted from the exponent (SR) of the other operand (SR-SK). Exponent SK is always complemented as it is ingated at the reservation station.

If the output of the exponent subtractor is the true sum or the complement of the true sum, the output can be decoded directly at the Digit Preshift 592. But the exponent subtractor always subtracts SK from SR and if SK>SR the sum would be negative. Therefore, to eliminate the possibility of having to add a 1 in the low order position and complementing when SK is greater than SR, an end-around carry adder is used. This is shown by the example in Table I.

The exponent comparison can result in two states—SRSK or SK>SR. If SRSK there is a carry out of the high order position of the Exponent Subtractor 582 and the carry out is used to gate the fraction of operand SK to the Digit Preshift 592. The true sum output of the Exponent Subtractor 582 is the amount that the fraction must be shifted right to make the exponents equal. If SK>SR, there is no carry out of the high order position of the Exponent Subtractor 582, and the absence of a carry out is used to gate the fraction of operand SR to the Preshifter 592. In this case the complement of the sum output of the Exponent Subtractor 582 is the amount that the fraction must be shifted right to make the characteristics equal. In both cases the second operand fraction

TABLE I.—EXAMPLES OF EXPONENT ARITHMETIC

| | | | |
|---|---|---|---|
| SR>SK | SR=1 1 1 1 1 0 0 | | SK=1 1 0 1 0 0 0 |
| | 1 1 1 1 1 0 0 | SR | |
| | 0 0 1 0 1 1 1 | SK | |
| | 1 | Hot one | |
| (Result is true) | 1 1 1 0 1 1 1 1 | SR−SK | |
| SR<SK | SR=1 1 0 1 0 0 0 | | SK=1 1 1 1 1 0 0 |
| | 1 1 0 1 0 0 0 | SR | |
| | 0 0 0 0 0 1 1 | SK | |
| | 1 | Hot one | |
| (Result is complement) | 0 1 1 0 1 1 0 0 | | |
| Comp. Result Must add Hot one | 0 0 1 0 0 1 1 | | |
| | 1 | | |
| | 0 0 1 0 1 0 0 | SR−SK | |
| SR<SK (End-Around Carry) | | | |
| | 1 1 0 1 0 0 0 | SR | |
| | 0 0 0 0 0 1 1 | SK | |
| (No carry) 0 | 1 1 0 1 0 1 1 | | |
| Complement | 0 0 1 0 1 0 0 | Correct Result | |

(the one with the larger exponent) is gated to the true-complement input 591 of the Main Adder (fraction) 597.

The exponent of the unshifted fraction becomes the resultant exponent. It is gated to the Exponent Update Adder 609 and after updating, if necessary, it is gated to an exponent Result Register 189 and then to the accumulator specified by the instruction.

The output of the Exponent Subtractor 582 is decoded by the Decoder 595 and the proper fraction shifted right in the Digit Preshift 592 the necessary number of positions. The digit preshift is a parallel digit-shifter which shifts each of the 14 digits right any amount from 0 to 15. The decoding of the shift amount is designated into each level thereby eliminating serial logical levels for decoding.

The Digit Preshift 592 consists of two circuit levels. The first level shifts a digit right by 0-, 4-, 8-, or 12-digit positions. The second level shifts a digit right by 0-, 1-, 2-, or 3-digit positions. Thus, by the proper combination of these amounts any right digit shift from and including 0 to 15 can be executed. FIG. 10 illustrates diagrammatically the operation of the preshifter.

The unshifted fraction is gated to the True/Complement Gates (T/C) 591 of the adder. Here the fraction is gated unchanged if the effective operation is add and complemented if the effective operation is subtract. The true/complement gating is overlapped with the preshifter on a time basis. The output of both the True/Complement Gates 591 and the Digit Preshift 592 are the inputs to the Main Adder 597.

OPERATION OF MAIN ADDER

Most of the time required for binary adders is because of carry propagation time. Two operands must be combined and the carries allowed to ripple from right (low order) to left (high order). The usual method of finding the sum is to combine the half sum of bit *n* (higher order) with the carry from bit $n-1$ ($S_n = A_n \veebar B_n \veebar C_n$). The half sum is the exclusive OR of the two input bits ($A_n \veebar B_n$).

The two operand fractions are designated as A,B and the bits as $A_n$, $B_n$, $A_{n-1}$, $B_{n-1}$, etc. $C_n$ is the carry into bit position *n* which is the carry out from bit $n-1$. The carry ($C_n$) into bit position *n* is also a 3-term expression which included the carry into position $n-1$.

$$(C_n = A_{n-1} \cdot B_{n-1} V A_{n-1} \cdot C_{n-1} V B_{n-1} \cdot C_{n-1})$$

If the carry term is rearranged to read $$C_n = A_{n-1} \cdot B_{n-1} V \ (A_{n-1} V B_{n-1}) \ C_{n-1}$$

two new terms can be defined which separate the carry into two parts—generated carry and propagated carry. The generated carry ($G_{n-1}$) is defined as $A_{n-1}$ ** $B_{n-1}$, and the carry propagate function (often abbreviated to simply propagate or $P_{n-1}$) is defined as $A_{n-1} \ V \ B_{n-1}$. Now the carry expression can be rewritten as:

$$C_n = G_{n-1} \quad V P_{n-1} C_{n-1}$$
$$C_n = G_{n-1} \quad V P_{n-1} G_{n-1} V P_{n-1} P_{n-2} C_{n-2}$$
$$C_n = G_{n-1} \quad V P_{n-1} G_{n-1} V P_{n-1} P_{n-2} G_{n-2} V$$
$$P_{n-1} P_{n-2} P_{n-3} C_{n-3}$$

The expansion can continue as far as one desires and one could conceive of $C_n$ being generated by one big OR block preceded by several AND blocks (in fact, *n* AND blocks—one for each stage). But it is obvious that the limiting factor would be the circuit fan-in. Only a limited number of circuit stages can be connected together in this manner. This technique is defined as carry/look-ahead, and by cascading different levels of look-ahead the technique can be made to fit the circuit fan-in/fan-out limitations.

For example, assume that 4 bits can be arranged in this manner, and that each 4 bits forms a "group" (digit). The adder is now divided into groups, and the carries and propagates can be arranged for carry/look-ahead between groups just as they were for look-ahead between bits. It is possible to go even higher and define a section as consisting of one or more groups. Now the adder has three levels of carry/look-ahead, the bit level of look-ahead, the group (digit) level of look-ahead, and the section level of look-ahead.

The Main Adder 397 of the present adder is a carry/look-ahead adder. A group is made up of 4 bits (one digit) and two groups form a section. Since it must be capable of adding 56 bits, the fraction adder consists of seven sections and 14 groups. Each pair of input bits generate the three bit functions—half sum (A$\veebar$B), bit carry generate (AB) and bit propagate (A V B). These functions are combined to form the group generate and propagate which in turn are combined to form the section generate and propagate. A typical group is shown in FIGS. 11 (A and B) and the group and section look-ahead is shown in FIGS. 12 (A and B).

The high order sum consists of 9 bits to include the end-around carry for subtractions and the overflow bit for addition. The end-around carry is needed for subtraction because the fraction which is complemented may not be the subtrahend. This is illustrated by the example given in the description of the characteristic comparison in Table I. If the effective sign of the instruction is minus (the "exclusive OR" of the sign of the two fractions and the instruction is the effective sign) the effective operation is subtract. Also, the high order bit (9 bit of the high order section) is set to a 1, thus conditioning it for an end-around carry. If there is no end-around carry when the effective sign is minus the adder output is complemented.

POSTNORMALIZATION

Normalization or postshifting takes place when the intermediate arithmetic result out of the Main Adder 597 is changed to the final result. The output of the Main Adder 597 is checked for high order leading zero digits and the fraction is left-shifted until the high order digit is nonzero.

To accomplish this operation, the output of the Main Adder 597 is gated to the Zero Detector 602. The zero detector is simply a large decoder, which detects the number of leading zero digits, and provides the shift amount to the Digit Postshift 603. Since this same amount must be subtracted from the exponent, the Zero Detector 602 also must encode the shift amount for the Exponent Update Adder 609.

The implementation of the Digit Postshift 603 is the same as the Digit Preshift 592 except that the Postshift is a left shift. The first level of the Digit Postshift 603 shifts each of the 14 digits left 1, 1, 2 or 3 and the second level shifts each digit left 0, 4, 8 or 12. The output of the second level is gated into the add unit fraction Result Register 189 from which the resultant fraction may be routed to the proper floating point accumulator over the COB 197.

The exponent update is executed in parallel with the shifting of the fraction. The zero detector provides the Exponent Update Adder 609 with the two's complement of the amount by which the exponent must be reduced. Since it is not possible to have a postshift greater than 13, the high order 3 bits of the characteristic can only be changed by carries which ripple from the low order 4 bits. The exponent update adder makes use of this fact to reduce the necessary hardware and speed up the operation.

FLOATING POINT UNIT

As was previously set out in relation to FIG. 5, the floating point unit is comprised of the Floating Point Operating Stack (FLOS) 184, a set of eight buffer registers to retain an instruction, the six Floating Point Buffer Registers (FLB) 185, each a 64-bit register to receive an operand from storage and connected by gates to both the Common Data Bus (CDB) 196 and to the inputs to each of the execution units, a set of four Floating Point Registers (FLR) 187, each 64-bits wide and capable of receiving data from the CDB 196, and supplying data to the CDB 196 or to either Execution Unit, an Add Unit 188 having three pairs of input Storage Registers 191, and a Multiply/Divide (M/D) Unit 192 having two pairs of input Storage Units 195. The CDB can be gated into from the FLB's 185, the FLR's 187, the Add Unit 188 and the M/D 192, and can in turn be gated into the FLR's 187, any Storage Register 191 or 195 for the add and M/D units or to the SDB's 144 in MSCE 136. Another bus, the FLB bus 199, can also be fed the output from the FLB's 185 and connects to one Storage Register 191 or 195 of each pair for the add and M/D units and is also connected to the FXPU 143 for supplying the 64 bit operands as above set out for the fixed point unit. The FLOS 184, the FLB's 185 and the FLR's 187, together with the Control Circuits 200 may be considered the floating point instruction unit (FLIU) and it handles the load instructions to one FLR 187 from either another FLR 187 or from storage by way of an FLB 185, the load and test instructions where an operand is transferred between two FLR's 187 and tested for a positive, negative or zero condition and the store instructions wherein an operand in an FLR 187 is transmitted over Bus 197 to an SDB for storage. The M/D Unit 192 and the Add Unit 188 comprise the floating point execution unit (FLEU) and actually execute the instructions with the M/D Unit 192 performing the multiplies and divides, and the Add Unit 188 handling the remaining instructions.

FLOATING POINT INSTRUCTION UNIT

As previously described, the I Box 134 issues instructions to FLOS 184 and directs any required operands to the FLB's 185, the identification of the selected FLB 185 replacing that of the storage location specified in the original instruction. The first register specified in a floating point instruction is always one of the FLR's 187, it contains one of the operands, and is also the sink register to receive the results of the operation. The second register, if any, identified in the instructions can be either the FLB 185 which receives the operand from storage, or another one of the FLR's 187, or in the case of a store instruction, the SAR 241 containing the storage address.

Instructions are gated out of FLOS 184 in strict sequential order when they have been validly issued by I Box 134 (no conditional operation tag is set and the FLOS 184 position is tagged full) and are decoded in Control 200. Each operation as issued is decoded sufficiently to enable decisions about the unit to execute the instruction, the operand gating out and the setting of the sink ingating circuits. Normally, instructions are handled in Control 200 for two cycles, a decode cycle and a select cycle, with the cycles of sequential operations overlapped so that a decode and a select cycle are in simultaneous process.

Operations are issued from FLOS 184 at a maximum rate of one per machine cycle but, due to execution times, priority conflicts, etc. the instructions may not be completed in sequential order. This is somewhat of a problem in the preferred embodiment of the invention for two instructions may use the same sink register, the second instruction operating on the result of the first and normally would require a halt in operations on the second instruction until the operand was available. In the preferred embodiment, however, such a situation is not allowed to interrupt processing and the only condition for issuance of an instruction is the availability of a unit to execute it. The preferred solution to this problem of overlapped instruction is to transmit the operand to the executing unit if the operand is available, but if it is not available, to forward in its place, the identification of the unit which will supply the operand. Then when the operand is made available, it is gated into the waiting Execution Unit which then proceeds with the processing of the operands.

When an instruction is issued from FLOS 184, it is checked to determine the controls needed for the type of operation to be performed, i.e., (1) an operation for the Add Unit 188, (2) an operation for the M/D Unit 192, (3) a 2-operand operation requiring one operand from storage (an FLB 185 source), (4) a 2-operand operation using operands in two FLR's 187, (5) a single-operand instruction, (6) the sink FLR 187 is busy or available, (7 ) the source FLR 187 is busy or available, and (8) can the instruction be executed within the FLIU. The first, second and last are needed for a selection of the unit to execute the instruction, and the others are used to determine the routing of operands. The determination of the unit selection for execution is by the operation code and preliminarily decoded into five groups. The groups are:

1. Adder Unit Required—Includes all arithmetic operations to be executed by the Add Unit 188 and are

| Operation: | No. of Variations |
|---|---|
| Add | 8 |
| Subtract | 8 |
| Compare | 4 |
| Halve | 2 |
| Load Positive | 2 |
| Load Negative | 2 |
| Load Complement | 2 |

2. M/D Unit Required—Includes the operations to be executed by the M/D Unit 192 and are

| | |
|---|---|
| Multiply | 4 |
| Divide | 4 |

3. Operations handled in the FLIU including

| | |
|---|---|
| Load | 4 |
| Load and Test | 2 |
| Store | 2 |

4. Single operand instructions, a special indication is made for the single operand instructions above, i.e., for the 12 load and two halve instructions with a separate indication for the two store instructions which are also single operand but require special handling.

On the above list of instructions, one of the variables for each set is the length of the operands used for there is a full set of instructions for short precision operands of 32-bit length, and an equal set of instructions for long precision operands of 64-bit length. If four variations are noted, the other variable is the location of source operand, either an FLB 185 or an FLR 187. The add and subtract operations also have a third variable, i.e., whether the operation shall be performed with normalized or unnormalized operands. There is no need to decode the instruction for the length and source operand variables, for the instruction contains an SO-bit position which is set to indicate that the source operand is from an FLB 185, and an S/L-bit position which is set to indicate a short precision operation.

During the first or decode cycle, Control 200 transmits the operation code (4 bits) the SO bit, the S/L bit, a 4-bit sink operand tag, and a 4-bit source operand tag to the Unit Communication Controls (UCC, to be described in more detail at a later point), of all execution units which it will be remembered include the four FLR's 187, three sets of input registers for the Add Unit 188, and two sets of operand registers for the M/D Unit 192. The sink and source operand tags specify the operand Bus 197, 199, or 551, over which the operand will be supplied, and for the Busses 197 and 551, the identification of the unit which will supply that operand to the bus.

Only those execution units which are not busy will sample the output of Control 200 and they will sample every cycle until they are sent a select signal which latches in the decoded output of Control 200 and sets the UCC to a busy condition. The select signal in Control 200 will not be sent until a GO signal is generated to start the select cycle. The GO signal is dependent upon a variety of conditions within the FLPU 142 which typically include, 1. Precision match (instruction and sink FLR 187) or sink FLR 187 available.
2. Precision match (instruction and source FLR 187) or source FLR 187 available.
3. Execution unit available for instruction.
4. Not conditional operation (no CO bit).
5. Not a cancel operation.
6. Not FLOS 184 empty (F bit Set).

The second FLIU operation handling cycle is the select cycle and is entered when the GO signal is generated and starts with an updating of the FLPU controls. Updating consists of a combination of some of the following, dependent upon the operation to be performed.

1. Turn on unit select trigger for one cycle.
2. Turn on unit busy trigger for unit selected.
3. Set new address into the FLB's 185 status trigger and turn on go-when-full trigger.
4. Set new address into FLR 187 status trigger and turn on FLR's 187 busy trigger.
5. Set the sink FLR outgate trigger.
6. Set the source FLR outgate trigger.
7. Set FLOS 184.

During the select cycle, the unit select signal is sent directly to the UCC of the reservation station chosen to execute the operation, the source operand (if available in a FLR 187) is gated to the FLR Bus 551 and to the execution unit to receive it. It will be remembered that during the decode cycle, every free UCC receives, among other signals, the source and sink tags which are the identification of the busses 197, 199 or 551, over which the unit will receive the source and sink operand. If the source operand is available in a source FLR 187, it will be transmitted on the select cycle along with the identification of the sending FLR 187. Since all free UCC's for the execution units are set to the source and sink tags on the decode cycle, and are retained in that state when the select signal is received, the set UCC will respond to the unit identification signal to gate the source operand into the execution unit.

To save a number of machine cycles, and to reduce the number of registers and data handling operations, a forwarding system has been incorporated in the preferred embodiment to eliminate combinations of store and transmit cycles for a GPR 187. Consider for example, the sequence of instructions wherein an operand in a sink FLR 187 is processed and the result is returned to the sink, the first result is gated out to a bus as a source operand, is processed and the second result is returned to another FLR 187. During the time the first operand is being processed, the sink FLR 187 retains the name of the unit which will send the first result to it and as soon as the first result is stored in the FLR, it will be retransmitted to another execution unit. Clearly, one machine cycle could be saved and the FLR 187 freed for other operands if the first result could be directly to the execution unit which is waiting for it. This is accomplished in the present embodiment of the invention by the process of forwarding to the execution unit, the tag stored in the status register of an FLR 187 called for in an instruction if the operand is not in the FLR 187, and thereupon setting the FLR 187 to a not-busy status so that it can be utilized in another instruction. Now the receiving unit knows the identification of the execution unit which will put the required operand on a data bus and will accept it without the need for the operand to pass through an FLR 187. Thus, one machine cycle is saved and the number of FLR's 187 needed for free flow of operands is reduced. These tags for the source and/or sink GPR's are supplied to the execution units during the decode cycle, and are retained by the unit select signal at the start of the select cycle. If any execution unit should put the required operand on a data bus during this select cycle, the selected execution unit is in condition to gate the operand into its receiving gates. In the same manner, if the source operand is present in an FLB 185, the address of the unit selected to receive it over the FLB Bus 199, or a direction to use the CDB 196, would have been sent to the FLB 185 during the decode cycle, and the FLB 185 would have been instructed to go-when-full. Since it was full, it would have transmitted its data out on the indicated bus with its identification on the CDB 196, or the identification of the receiving unit on the FLB Bus 199. The selected receiving unit, upon an equal compare of the identification of the name in its status registers, and the name on the CDB 196, or recognition of its own name on FLB Bus 199, would gate the operand into its input registers during the select cycle. If the operand is not available, the receiving unit tests the identified bus on every cycle until the correct operand is available for gating in and in the meanwhile it waits.

FLIU HANDLING OF ARITHMETIC OPERANDS

When the conditions for the GO signal are met, the operands for an arithmetic operation having one operand supplied by storage are handled for two cycles. The GO conditions are an execution unit available and either a match between the precision bits of the instruction and the sink operand or the operand is available in a GPR 187. If the sink GPR 187 has the operand available, it will be outgated to Bus 551 during the select cycle for gating into the selected execution unit, and if it were tagged busy, its tag bits in the status register would have been forwarded to the execution unit on the decode cycle. The second operand is always in an FLR 185 for this type of operation and if the FLB 185 has the operand available, it is outgated to either a Bus 552, to the CDB 196, or to the FLB Bus 199, along with its identification for CDB 196, or that of the receiving unit for Bus 199 to control ingating to the execution unit. If the FLB 185 does not have the operand yet available, the FLIU sets a go-when-full trigger for the bus selected (GWF - FLBB or GWF - CDB) and the operand together with the FLB name or that of the receiving unit will be transmitted out as soon as the operand arrives and the outgating bus is available.

If both operands are to be supplied by FLR's 187, then in addition to the above conditions, a GO signal requires a precision match for the instruction and source operand, or that the source operand be available. If both of the two FLR's are busy during the decode cycle, their tag bits in their status register areas would have been transmitted on the decode cycle and the FLR s 187 set to a not-busy status, but if one operand is available, that operand along with the FLR identification is gated out to Bus 551 during the select cycle. When both operands are available in the FLR's 187 during the instruction decode cycle, an extra machine cycle is required for operand transmission. The source operand is transmitted over Bus 551 during the select cycle and then the sink operand is gated to Bus 551 during the extra cycle. The extra cycle is gained by suppressing the stepping signal for FLOS 184 and holding up on the gating signal for the sink operand to Bus 551. A two-cycle trigger is set on the select cycle and turned off during the extra cycle. When the two-cycle trigger is on, it sets the outgates for the sink FLR 187 and steps FLOS 184 at the start of the extra cycle. This extra cycle is never needed for single-operand FLR to FLR operations as there is no sink operand to send to the execution unit.

OPERATIONS WITHIN FLIU

The two load operations of transferring an operand from storage to an FLR 187 are strictly data transfer with no data manipulation and are handled within the FLIU area. The operand is fetched from storage by the I Box 134 and is tagged for one of the FLB's 185 which is identified in the instruction in FLOS 184. When the operand arrives at the FLB, the FLB Full tag is turned on and the operand is available. When the instruction in FLOS 184 is decoded, the address of the source FLB 185 is sent to all not-busy execution units as above described and the GO signal for the select cycle depends on the availability of the sink FLR 187, or a precision match on operand lengths. When the GO signal is on, either during the decode cycle or thereafter, the updating and select cycle will follow. The updating consists of setting the FLB 185 address into the tag register of the sink FLR 187 and turning on the go-when-full (GWF-CDB) for the source FLB 185. During the select cycle, if the operand has been returned to the FLB 185 at this time, its full tag and go-when-full tags are both set on, and it will be gated out to the FLB Bus 552, and thence through CDB 196 into the FLR 187. If the operand has not been received, the full Trigger is not on, and nothing more happens in the select cycle. When the operand is returned to the FLB, it will be gated out as soon as the CDB 196 to the FLR is available. The other four load operations, i.e., load (short/long) and load and test (short/long) are all data transfers from one FLR 187 to another FLR 187, with or without the test of the transferred operand for a zero, positive, or negative fraction part (all operands herein are in floating point format). For the data transfer function, the Source FLR 187 is gated to the FLR Bus 551, through the CDB 196, and into the Sink FLR 187. If the data is already present in the source FLR, the operation requires three machine cycles, the first of which is the decode cycle in which the sink FLR 187 has its UCC set to the address of the source. The GO signal merely requires availability or a precision match for both the source and sink FLR 187. When the GO signal is set, the update activity will inhibit the step FLOS signal, inhibit the normal outgating of the sink FLR 187, so that the source FLR will be the only one which can be gated out, inhibit the CDB 196 priority logic, effectively reserving a time slot on the CDB 196, and turn on a move data trigger. In the first data cycle the move data trigger will thereupon turn on the outgate for the source FLR and the ingate for the sink FLR 187. It will also generate the step FLOS signal and turn off the sink FLR busy signal if it is on. In the second data cycle, the first available time slot which can be guaranteed to be clear on the CDB, the operand is passed over the CDB 196 to the sink FLR 187. For the other situation in which the source operand is not available in the source FLR 187 at the update time, the operation is simpler. In this case it is only necessary to move the tag from the source FLR to the sink FLR and set the source busy trigger off, and the sink busy trigger on. It will be remembered that the transfer of the tag informs the sink FLR that the operand it is expecting will be put on the CDB 196 by the named unit. Every busy execution unit monitors the tag of CDB 196 so that when the CDB tag matches the units tag, the ingating can be opened in the next cycle to enter the wanted operand.

The load and test operation in addition to transferring the selected operand will set the condition code triggers in the I Box 134, provided that the CC bit in FLOS 184 remains set at the decode time. The move data trigger will also turn on the zeros Tester 553 so that when the data moves over CDB 196, the Tester 553 will, if the CC bit from FLOS 184 is set, test the data with the required short/long precision as specified by Control 200. For the second case above where the data is not in the source FLR 184, the tag from the source FLR is transferred to the Tester 353 at the same time it goes to the sink FLR 187. When the Zeros Tester 553 recognizes the tag on the CDB as that for its operand, it responds by performing the required test.

The other strictly FLIU operations are the two stores (short/long) in which the contents of a designated sink FLR 187 are transferred over Bus 197 to the SDB 244 identified in the instruction. The store operation requires either two or three machine cycles depending upon the conditions which generate the GO signal. The required conditions are either a precision match or an available signal for the sink FLR 187, and an empty condition in the names SDB 244. The empty condition is known to the FLIU since the status of each of the three SDB's 244 is sent to the FLPU 142 for monitoring. The store operation for an operand already in an FLR 187 requires the same three cycles as above set out for the register to register load, i.e., a decode cycle and two select cycles. When the GO signal is set, the FLIU will update at the start of the first select cycle by turning on the outgate trigger for the sink FLR 187, by inhibiting the CDB 196 priority logic, thus reserving the second cycle time slot on the CDB, by inhibiting the step FLOS signal and by turning on the move data trigger. The move data trigger will enable a gating out of the sink FLR 187 to CDB 196 by way of FLR Bus 551, will turn on a select to the SDB 244, and will generate the step FLOS signal. For the other situation where the sink FLR 187 is tagged busy and has not yet received its operand, only one select cycle is needed in addition to the decode cycle. In the decode cycle, the tag of the busy FLR 187 is moved to the SDB 244's UCC and the SDB is sent its select signal on the next cycle to latch in the tag bits. The sink FLR 187 is then set to not-busy and thus freed for further use and the UCC of the selected SDB monitors the CDB 196, Lines 197, to detect when its wanted operand will be on the Bus 197.

The precision match above referred to is the agreement of the S/L bit of the instruction being decoded with the similar S/L bit of the operand to be processed. Clearly, a long precision instruction should not be performed on short precision operands, nor can a short precision operation be performed on a long precision operand without loss of significant data. A conflict between the precision settings is indicative of either a programming or data transfer error and the indicated instruction should not be performed. Instead, an interrupt process should be initiated to notify the operator of the type of error and the operands involved. If the FLR 187 is available, i.e., not storing an operand, there is no conflict possible and the operation can proceed. Insofar as the CDB 196 is concerned, all units which gate onto the CDB do so in long precision completely filling the CDB 196. At the same time, all units which ingate from the CDB 196, have split ingates and each will gate in either the short or long operand as indicated by the setting of its S/L bit latch. The S/L bit latch will have been set in a previous cycle, either a decode, an update cycle, or a select cycle when the tag bits were set. The ungated part of the CDB 196 will not be utilized on this operation.

The FLOS 184 is a set of eight buffer registers holding the floating point instructions from the I Box 134. In general, the FLOS 184 is similar to the FXOS 201 described above, and has a set of Ingate Controls 555 which can be set to progressively open the gates between the Bus 133 from Box 134, to one of the FLOS Registers 184. After an instruction from I Box 134 has been stored in an FLOS Register 184, the Ingate Controls 555 are stepped by a signal from the I Box 134 to designate the next FLOS Register 184, for ingating the next instruction. There is also an Outgate Control 556 which selects one of the FLOS Registers for gating out to a Bus 557 going to Control 200. After the instruction on Bus 557 is decoded by Control 200, the step FXOS signal above mentioned, steps the outgate Controls to gate out the next FLOS Register 184 to Control 200 for instruction decoding. Instructions will be issued from FLOS 184 in the same order as received.

When the FLOS 184 is empty, the Outgate Control 556 will be set to indicate the same FLOS Register 184 as the Ingate Control 555 and that register, even though it is empty, is continuously outgated to Control 200. As soon as the first instruction is received from I Box 134 on Bus 133, it passes through the FLOS Register to Bus 557 and into Control 200 to be decoded in the same cycle as it is received. The Ingate Controls 555 are incremented as the instruction is received and the Outgate Controls 556 are stepped as the instruction is decoded so the Outgate Controls 556 cannot logically get ahead of the Ingate Controls 555. The FLOS Counter 186, FIG. 4B, has previously been mentioned and is incremented every time the I Box 134 sends an instruction to FLOS 184. The FLOS Counter will be decremented by one every time the Outgate Controls 556 receive a step FLOS signal, and hence the value in the FLOS Counter 186 will indicate the number of unexecuted instructions in FLOS 184. When the Counter 186 has a value of eight therein, the FLOS 184 is full and I Box 134 is blocked from issuing any further floating point instructions to FLOS 184 until a step FLOS signal is issued to step the Outgate Controls 556 and thereby release one FLOS Register position.

FLOS SIGNALS

The control signals from the I Box 134 to FLOS 184 are largely similar to those above set out in the description of the FXOS 201 and will therefore be only briefly described at this point. The control signals are:

1. Condition mode
2. Activate condition ops
3. Cancel conditional ops
4. Set condition code to FLOS
5. Valid operation to FLOS The FLOS 184 also returns some control signals to I Box 134. These signals are:

1. Condition code outstanding
2. An FLR is busy
3. Decrement FLOS counter 186
4. FLB busy release (six signals—one per FLB)

Briefly described, the conditional mode (CO) signal is sent so long as I Box 134 is operating in conditional mode. All instructions issued during this time will have the CO bits set in its FLOS Register 184 as it is gated into the FLOS register. When an instruction having this CO bit set is outgated to Control 200, it is not decoded and the FLOS stepping will be stopped, thus arresting issue of further instructions.

The activate conditional ops indicates that I Box 134 has determined that the previously conditionally issued instructions may now be processed. When this signal is sent, any FLOS Register having an unexecuted conditionally issued instruction will have its CO-bit latch set off. The previously conditional instructions are now valid and can be issued in the normal manner.

The cancel conditional ops signal is just the opposite of the activate signal for it indicates that the I Box 134 has determined that the previously issued conditional instructions are not to be executed. This signal when present will turn off the full-bit latch of each instruction having a CO bit set. These instructions will now be issued by the FLOS in cancel mode. In the cancel mode, Control 200 will not select any arithmetic units, store instructions are not processed, and no tags are changed. The FLB's 185 will, if one is involved in an instruction and has its busy tag bit set on, will have a cancel trigger set so that it can send an FLB release signal to I Box 134 immediately if it is already storing an operand or when it does receive the data.

The set condition code (CC) signal is sent to all areas of the machine whenever I Box 134 issues an instruction which can change the state of the condition code register. The CC signal will set the CC-bit latch of the instruction then being stored in FXOS 201 or FLOS 184 and will reset the CC bit latch in all other instructions in either the FXOS 201 or FLOS 184. Any instruction which has been conditionally issued will not have its CC bit reset however unless the I Box is operating in conditional mode in which case setting of a CC-bit latch in a conditional instruction will not reset the CC-bit latch in an unconditional instruction. When the I Box 134 is in the normal mode, the setting on of a CC-bit latch in an instruction in FXOS will not only turn off any CC-bit latch in all other valid instructions in FLOS 184 (also FXOS 201), but will also reset the CC-bit latches in Zeros Tester 553 and any of the Input Buffers 191 of the Adder Unit 188. The net result of the CC-bit latch setting is that at most two CC bits can be set at any time, one for the normal instructions and one for the conditionally issued instructions. The signal condition code outstanding is sent to the I Box whenever a CC bit latch is set in the normal instructions in FXOS 201, in FLOS 184, in Zeros Tester 553, or in an Adder Unit Buffer 191.

The Valid Operation to FLOS signal enables the FLOS to gate in the instruction on Bus 133 and sets the F/E bit to full to indicate a valid instruction.

The FLR Busy signal is sent to the I Box so long as any FLR has a busy signal set. This indicates that the last instruction issued by FLOS 184 has not been fully executed and thus that processing is still proceeding. When this signal drops, the I Box knows that the FLOS is empty of unconditionally issued instructions.

The six FLR busy release signals turn off the busy signals which the I Box 134 turns on when it assigns an FLB 185. When the FLB 185 has received and outgated the operand, or the operand has been canceled the busy signal for this FLB 185 in the I Box 134 is turned off to indicate that the FLB is free for another assignment.

The instruction format as transmitted by I Box 134 to FLOS 184 comprises the FLOS control signals i.e., the F/E bit, the CO bit and the CC bit, which have previously been described. In addition to these signals the FLOS 184 also receives the short/long (S/L) precision bit, a 4-bit operation code field, a 2-bit field to identify the sink FLR 187, a source operand (SO) bit to define the source address as either the address of an FLR 187 or the address of one of the FLB's 185 or the SDB 244's, a 3-bit source address field to identify either an FLR 187 or with a set SO bit, one of the FLB's 185 or an SDB 244.

FLOATING POINT BUFFER BUS

The FLB Bus 199 is used to transmit long or short source operands to the floating point execution units, or to the registers of the FXPU 143. The only units which can gate on to the FLB Bus are the six FLB's 185. When any FLB 185 has its GWF-FLBB latch set on and its F/E bit is set to full, a signal is sent to the FLBB Controls 559. The priority among the FLB's 185 is simple priority with the upper FLB having first priority down to the lower unit having least priority. When a request is made for the use of FLBB 199, and if no FLB 185 of higher priority is requesting the Bus, the FLB request is accepted and the FLB 185 will be outgated to the FLBB 199 on the next cycle. During the accept cycle, the unit identified in the FLB sink address register will be notified to gate in the FLBB 199 data during the next cycle. These units which can gate in data from the FLBB 199 are the three source operand registers 191 for the Add Unit 188, the two Source Operand Registers 195 for the M/D Unit, or the Fixed Point Buffers 204, 205, 206, and 207, see FIG. 6.

FLOATING POINT REGISTERS

There are four floating point registers (FLR) 187, each of which is 72-data bits wide to hold a 64-bit floating point operand and the required parity check bits. An FLR has associated with it a group of status bits to indicate the condition of the operand. These bits are the S/L bit which controls the precision of the next data to be ingated into the FLR 187 or the precision of the data stored therein, the busy bit which indicates when set that the FLR 187 has been selected to receive an operand from a source connected to the CDB 196, and that the operand, if any, is not available, a group of four tag bits which indicate the source of the operand to be gated into the FLR 187 (busy bit on) or the source of the operand in the FLR 187 (busy bit off) and two special multiply tags, ME busy and ME M1/M2, used only in short precision multiply operations as will be set out later. Each FLR 187 also includes a 4-bit comparator which if the busy bit is on, compares the setting of the four tag bits with the source addresses on CDB 196, and upon an equal comparison, open the input gates to the data register to gate in the operand on the next cycle.

The status bits are updated on each instruction issued by FLOS 184 in which the FLR 187 is the sink register, unless the data in the FLR is outgated only, i.e., in store or compare operations. The updating consists in setting the S/L bit to the precision of the operation, setting the tag bits to the address of the unit which will execute the instruction and turning on the busy bit.

All FLR's 187 outgate to the Floating Point Register Bus (FLRB) 551 which is connected to be selectively gated into any of the Add Unit Registers 191, or any of the M/D Unit Registers 195, or, for some of the Move instructions, to CDB 196. The FLR's ingate operands only from the CDB 196.

COMMON DATA BUS

The Common Data Bus (CDB) 196 is capable of transmitting long floating point operands and results between FLB's 185, FLR's 187, SDB's 244, the Add Unit 188, and the M/D Unit 192. Each unit which uses the CDB 196 is assigned an identification, a combination of four binary bits, and when a unit requires use of the CDB to transmit an operand, it must make a priority request for use of the Bus 196. Priority is assigned to the top FLB 185 first, through the FLB's in order to the lowest FLB 185 in sixth place, followed by the three adder unit pairs of operand registers 191 on a first-in/first-out basis, and lastly the two pairs of M/D Registers 195 also on a first-in/first-out basis. As was noted earlier, when the FLIU requires use of the CDB, it can suspend the priority of the CDB controls so that in effect the FLIU has an overriding priority. When a request is received at the priority part of CDB 196, and no unit with a higher priority is requesting the bus, an accept signal is returned to the requesting unit and the identification of the requesting unit is transmitted to all sampling units on the CDB tag lines. Both of these signals are maintained for one cycle. When the requesting unit receives the accept signal, it will gate out its data to the CDB 196 on the next machine cycle.

Each unit which can sample the CDB 196 has a 4-bit tag register which will have been set on a decode cycle of the FLIU and a comparator. When the unit's busy tag is set, it will test every identification sent on CDB's tag lines until it finds a tag equal to the setting of its tag register, and it will then ingate the data transmitted over the bus on the next cycle. Thus when a unit finds that the unit which is to transmit the operand for which it is waiting, is going to put that operand on CDB 196, it opens its input gates to accept the operand.

Since it is quite possible in a two-operand instruction for both required operands to be from FLR's 187, and also possible that at the decode time in the FLIU, neither of the FLR's 187 has received its operand, the CDB 196 contains two sets of 4-bit lines into which each FLR may have its tag bits gated. One of these sets will receive the tag bits from the sink FLR and the other will receive the tag bits from the source FLR. This arrangement will save a cycle on each decode of such an instruction for there will be no need to send the two sets of tags in separate decode cycles. The execution units which scan the tags from the sink FLR 187 are the three sink operand storage registers 191 of the Add Unit 188, the two Sink Operand Storage Registers 195 of the M/D Unit 192, and the three SDB's 244. The units scanning the source operand tags are the three Source Operand Storage Registers 191 of the Add Unit 188, the two Source Operand Storage Units 195 of the M/D unit 192, the four FLR's 187, and the Zeros Tester 553.

As an example of how the sequencing of instructions having dependent operands is accomplished by utilizing the tags of the FLR's 187 in conjunction with the CDB 196, consider the following sample program. It will be noted that in FIG. 5, the FLB's 185 are numbered from 1 to 6, the FLR's 187 are given the even numbers 0, 2, 4, and 6, and the three pair of Input Buffers 191 for Add Unit 188 and the two pairs of Input Buffers 195 for the M/D Unit have been numbered. The numbers are for identification only as except for priority on the FLB's 185, there is no distinction between the registers of a group.

At the end of this sequence of instructions, the following tag pattern exists:

| REGISTER | TAG |
|---|---|
| FLR0 | FLB5 |
| FLR2 | M/D2 |
| M/D1, Source | |
| M/D1, Sink | FLB1 |
| M/D2, Source | |
| M/D2, Sink | FLB2 |
| A1, Source | M/D2 |
| A1, Sink | M/D1 |
| SDB1 | A1 |

None of the units may begin execution until they have received both operands. Therefore, each of the multiplications will start on the cycle after their respective FLB's 185 use the CDB 196 to load the number 0 and 2 FLR's 187. The add operation cannot start until the last multiplication has used the CDB 196. The SDB 244 will sample the CDB 196 when the A1 uses the bus for its result. It does not matter which of the independent multiplications finishes first. Also, the load storage to register instructions are not dependent upon completion of previous instruction except on precision conflicts. The busy bit of an FLR 187 is reset once the tag has been used to sample the CDB. This is also the only time at which the CDB is gated into an FLR.

SUMMARY OF CDB OPERATION

On the decode cycle, the instruction is decoded, the instruction code and the tags of the busy FLR's 187 are sent to all execution units, the precision of the FLR operands is checked against the precision of the instruction, status changes and the required output gates are set up, and decisions are made about the availability of operands and a unit to execute the instruction. When the conditions are met, the GO signal is generated,

| Instr. | Reg. | Busy | Tag | Remarks |
|---|---|---|---|---|
| Load FLR0 from FLB1 | FLR0 | 0 | 0 | This is how a Storage-Register load instruction appears to the FLOS. Upon reaching the bottom of the FLOS, the OP is decoded, and a check is made on the status of the sink register FLR0. If a precision conflict exists, the FLOS will wait until the sink FLR has Busy=0 to proceed. |
| | FLR0 | 1 | FLB1 | When no precision conflict exists a GWF–CDB signal is sent to FLB1 and the sink FLR status is updated. If the FLB is already full or is being loaded, it will request the CDB as soon as it receives the GO signal. If the FLB is not loaded, it will request the CDB as soon as it becomes full. |
| MULT FLR0 by FLB2 | FLR0 | 1 | FLB1 | Now the FLIU checks for the availability of a multiply unit. If FLR0 were not busy, its operand would be transmitted to the selected multiplier, say MD1 sink along with the select signal. Since FLR0 is busy, the tag, FLB1, is sent instead and M/D is thus instructed to get its sink operand off the CDB when FLB1 is using the CDB. The sink FLR tag is updated to M/D1. |
| | M/D1 Sink | 1 | FLB1 | |
| | FLR0 | 1 | M/D1 | |
| | FLB2 | 1 | M/D1 | FLB2 is tagged with the M/D1 address and instructed to Go-When-Full via the FLB bus. When the operand arrives from storage, the FLB2 will transmit it to M/D1's source register. If there is a precision conflict, the FLOS will wait until the register 195 has a Busy=0 before proceeding. |
| Load FLR2 from FLB3 | FLR0 | 1 | M/D1 | The above occurrences are repeated for this set of OPS using FLR2, M/D2 Sink and different FLB's. |
| | FLR2 | 1 | FLB3 | |
| MULT FLR2 by FLB4 | FLR0 | 1 | M/D1 | |
| | FLR2 | 1 | M/D2 | |
| Add FLR2 to FLR0 | FLR0 | 1 | A1 | Next comes a Register to Register instruction where both FLR's are busy. The sink FLR Tag is updated as before, assuming adder A1 Sink is available. The tag of the source FLR is also shipped to A1 source but the source FLR2 is not updated. Only sink FLR's have their tags changed. |
| | FLR2 | 1 | M/D2 | |
| Store in SDB1 | FLR0 | 1 | A1 | When the store instruction is decoded, a check is made via the store controls on the availability of SDB1. If it is available, a select signal is sent to it by the FLOS control. The sink FLR tag A1 was sent to the SDB during the decode cycle of the store instruction. The select signal informs the SDB1 to keep the A1 tag, compare it to the CDB tag, and sample the CDB on the cycle after a match is detected. The sink FLR is not updated on store instructions. |
| | FLR2 | 1 | M/D2 | |
| Load FLR0 from FLB5 | FLR0 | 1 | A1 | It should be noted that Load Register from Storage Instructions may be executed even though the sink registers are still tagged busy. The only inhibiting condition is a precision conflict. If none exists, the FLB is given the GWF–CDB signal, and the sink FLR tags are updated. |
| | FLR2 | 1 | M/D2 | |
| | FLR0 | 1 | FLB5 | |
| | FLR2 | 1 | M/D2 | |

and the select cycle is initiated. The unit select signal and one of the available register operands are sent on the select cycle.

These decode and select cycles are overlapped so that the decode cycle of instruction 2 is simultaneous with the select cycle of instruction 1. Instructions are issued in strict sequence from FLOS 184 dependent only on the availability of an executing unit if no precision conflict exists. When a precision conflicts exists, the register operand(s) must be available (when a conditionally issued instruction is reached in the operation of the FLOS 184, it is not issued, and the FLOS stops until the conditional hold is removed).

Executing units perform their functions as soon after they have been selected as both operands become available. These units acquire storage operands from the FLR's 185 over the FLB Bus 199 either one cycle after they receive the select signal or one cycle after the FLB is loaded from storage, whichever is later. Register operands are either sent with the select signal via the FLR Bus 197, or are taken off the CDB 196 when the address of the unit whose result is to be sent over the CDB 196 matches the tag sent to the waiting unit by the FLOS 184.

The use of the CDB 196 and forwarding of tags allows strict sequencing of dependent instructions, out of sequence execution of independent instructions, and simultaneous entry of operands into an FLR 187 and all units waiting for that operand. Two cycles before an arithmetic unit completes execution, it requests the CDB for a time slot for its result. If no priority conflict exists, it will be given the bus at the conclusion of its execution. Bus conflicts may be resolved arbitrarily, since the tags ensure correct sequencing. When a unit is granted the bus, its identifying number is sent to all other units, to the SDB's 244, and to the FLR's 187. SDB's 244 never put anything on the CDB, but take off operands according to the tags. FLB's on the other hand never take any operands off the CDB 196 but request the use of CDB 196 if they are full and a GWF-CDB signal has been received from FLOS 184.

UNIT COMMUNICATION CONTROLS

There are three Unit Communication Controls (UCC) 560 for the Add Unit 188, one UCC 560 for each pair of Input Operand Registers 191, and two UCC's 561 for the M/D Unit 192, one UCC 561 for each pair of Input Operand Registers 195. The FLR's 187 and the SDB's 244 also have elementary UCC's but as the only function of their UCC's is to monitor the busy status and tag register to detect an ingate condition from the CDB 197, these UCC's will not be further described herein. The purpose of the UCC's 560 and 561 for the Add Unit 188 and the M/D Unit 192, respectively, is to control the gating of the operands from the three data busses FLR Bus 551, FLB Bus 199, and CDB 196 into the operand storage registers 191 and 195. Each UCC 560 and 561 receives the following information during the decode cycle:

1. Sink Tag—The sink tag is a 4-bit tag which identifies the sink operand source. A nonzero tag identifies a unit whose result on the CDB 196 will become the sink operand. If the sink tag bits are all zero, the sink operand will be coming from the FLR's 187 via the FLR Bus 551.
2. Source Tag —The source tag is a 5-bit tag which identifies the unit supplying the source operand. The bit field contains 4 bits identifying the source of an operand on the CDB, and an SO bit specifying the FLB's 185 as the source. If the source tag bits are zero and the SO bit is one, the source operand will come from one of the FLB's 184 via the FLB Bus 199. When the source tag is zero, and the SO bit is zero, the source operand will come from one of the FLR's 187. If the source tag is nonzero, the tag will identify a unit whose result on the CDB 196 will become the source operand.
3. Bus Tag—The bus tag is a 4-bit tag which identifies the unit whose result will be transmitted over the CDB 196 during the next cycle.
4. S/L Bit—The S/L bit is a part of the instruction field from FXOS 184. It indicates whether the operation will be short or long precision.
5. Select Bit—The select bit signifies that the information which was gated in from the control Unit 200 is valid for this unit.

The operation of each UCC 560 and 561 with references to the flow charts FIGS. 13, 14, 15 and 16 is as follows:

The select line, when it appears, will turn on the unit busy trigger 563. While the UCC is not busy, the sink and source tag fields and the S/L bit from the FXOS Control 200 are ingated into their respective latches. It should be remembered that the tag field, S/L and the read-in latches are set each cycle if a set condition signal is present, and are reset if they were on and the set condition signal is not present. If the unit busy trigger is on, the tag field and S/L triggers will become locked at the start of the next cycle, whereas the read-in triggers, after being turned on, will be reset and held off to prevent further reading in to the latches.

The FLIU sends the sink and source tag bits for each operation at the same time and shortly after the select signal has latched up the unit selected in the previous cycle.

The select line is a private line from FLOS Control 200 to each execution unit, and as mentioned previously, sets the unit busy trigger, which inhibits the read-in of any following tags. The read-in triggers for each bus (sink and source) are set upon condition each cycle. If the unit is selected, these triggers will be reset at the start of the next cycle and will be held reset.

The operands for any arithmetic operation can appear on the data busses as in this table:

| Source operand | Sink operand | Sink tag | Source tag |
|---|---|---|---|
| CDB 196 | CDB 196 | ≠0 | ≠0 |
| CDB 196 | FLR Bus 551 | =0 | ≠0 |
| FLR Bus 551 | CDB 196 | ≠0 | =0; SO=0 |
| FLR Bus 551 | FLR Bus 551 | =0 | =0; SO=0 |
| FLB Bus 199 | FLR Bus 551 | =0 | =0; SO=1 |
| FLB Bus 199 | CDB 196 | ≠0 | =0; SO=1 |

The two operands can be read in from the CDB 196 on the same cycle if the one operand is doubled. The source tag and the sink tag are then identical, and both sink and source full triggers, and CDB operand read-in triggers, are turned on. When both operands are to come from the FLR's 187 it is not possible to determine which operand comes from a particular FLR, since the tags for both operands are zero. The FLIU will send the source operand over the FLR Bus 551 before the sink operand if the source operand is available. For this case, the UCC will not turn on the sink full trigger and will not generate a sink register ingate signal until the source read-in trigger is reset. The sink read-in trigger, however, will be set and held for two cycles.

If either of the operands are coming from the CDB 196, the time at which the data will appear with respect to the select cycle is undefined. If either of the operands is coming from the FLR Bus 557, the earliest time at which the data can be received is the next cycle after the select signal is received. If the source operand is from the FLB Bus 199 the earliest time at which the data can be received is the second cycle after the select cycle.

The source tag bits are examined for an all zero condition, Block 564. If the all zero condition is not present, entry point 1, FIG. 40, and the source tag is identical to the bus tag, Block 565, (determined by exclusive or circuitry on a bit by bit basis), the following will occur:

a. If the unit busy trigger is on, Block 563, indicating that this unit has been selected and the source full trigger, Block 567, has not been set, the source full trigger and the CDB read-in trigger will be turned on.

b. If the unit busy trigger, Block 563, is not on, the source full trigger and the CDB read-in trigger will be set, but no operand will be ingated.

If the unit busy trigger, Block 563, is on, the CDB read-in signal for this unit's source operand storage will be generated. If this is a long precision operation, the entire source reservation station is read into; for a single short precision operation, only the high order source operand bits are read in. This is true for all operand read-in signals. The source full trigger will be reset when the unit receives a CDB accept signal. If the unit busy trigger is not on, the source full trigger will be reset at the next cycle unless there is a tag match and information will be read in.

The situation, see FIG. 39, where both the source tag field and the SO bit are zero, Block 568, is also a possibility. If the unit is busy, Block 563, and the source full trigger is not set, Block 567, or if the unit is not busy, both the source read-in from FLR bus trigger and the source full trigger will be turned on. If now the unit goes busy, data will be read in from the FLR Bus 551 into the source operand storage register.

If the source tag field is zero but the SO bit is one, Block 568, and the FLB ready line, Block 569, is set, the source full trigger and the source read-in from FLB Bus trigger will be set. If the unit is busy, Block 563, the FLB Bus will be read into the source operand storage register.

The sink tag field is also examined, see FIG. 41, for an all zero condition, Block 571. If the all zero condition is not present and the sink tag is identical with the bus tag, Block 572, the sink full trigger and the read-in from CDB trigger will be turned on provided that:

a. the unit is not busy, Block 563, or b. the unit is busy, Block 563, and the sink full trigger, Block 573, is off.

If the unit is busy, Block 563, the read-in sink operand signal is generated, and the sink full trigger will be reset when the unit receives an accept signal. If the unit is still not busy, the sink full trigger will be reset in the next cycle, unless there is another tag bit match.

If the sink tag field is zero, Block 571, the sink read-in from FLR Bus trigger is turned on provided that the unit is not busy and also if the unit is busy but the sink full trigger, Block 575, is not on. The sink full trigger is set under these same conditions provided that the source read-in from FLR Bus trigger, Block 576, is not on. If the unit is busy, and the Block 576 is not on, the signal for read-in from the FLR bus into the sink operand storage register is generated.

Figure 16:
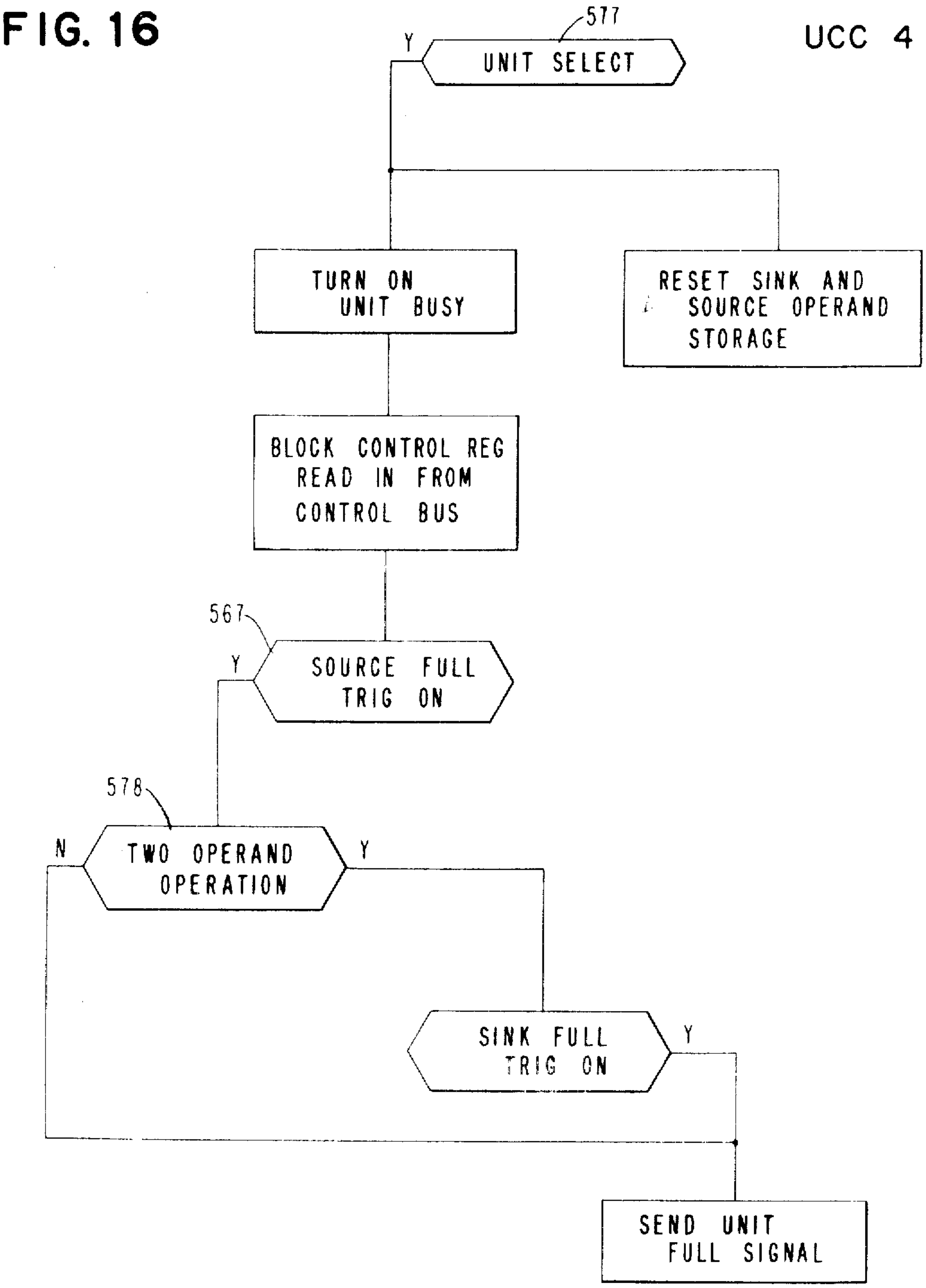

The select signal for a particular unit, Block 572, FIG. 16, will also reset the unit's operand storage registers and will transmit a unit full signal to the start control unit if:

a. the source full trigger, Block 578, is on, and it is a 1-operand operation, or b. it is a 2-operand operation, Block 578, and both source and sink full triggers are on.

The sink full trigger will be normally reset when the unit receives an accept signal. However, if the unit busy trigger is not on, Block 563, FIG. 15, the sink full trigger will be reset at the next cycle, unless there is a further tag match.

FLOATING POINT ADD UNIT

Floating point number systems are generally used for scientific types of computation as contrasted to commercial computation for the range of numbers in scientific arithmetic can range from very large to extremely small in value, while commercial operations use a much smaller range. Another distinction is in accuracy of results where the scientific operations are concerned more with relative magnitudes, with little interest in the low denominations of the operands, whereas commercial calculations must be exact to the lowest denomination. The floating point number system has the advantage of a built-in scale factor express almost all numbers of whatever magnitude to the same accuracy. Conventionally, a floating point number will be written as a fraction part multiplied by a base digit raised to some exponent, e.g.

.5486912 – – – –×10 to the fifth power.

The floating point section of the preferred embodiment of the invention writes floating point numbers with hexadecimal digits (base 16) and will write the magnitude of the fraction part as either 6 or 14 hexadecimal digits (short or long precision, a hexadecimal digit being four binary bits). An exponent of seven binary bits expressing a number from 0 to 127 decimally is written in bit positions 1 through 8, and since the exponent is expressed in an excess 64 notation, the actual value of the exponent can range from a −64 to +63. The base which is raised to the exponent is 16, but as this base value is constant, it is implicit and need not be expressed in the floating point number representation. The leftmost bit of the floating point number is the sign bit to indicate whether the fraction whose magnitude is given is a positive or a negative value.

The steps involved in the addition or subtraction of two floating point numbers start with a comparison of the exponents of the two numbers involved to determine which number has the smaller exponent and the difference between the exponents. For each unit of the exponent difference, the smaller number is shifted one hexadecimal order (four binary bit positions) to the right and its exponent increased by one unit until the exponents are the same. In the present embodiment all of this shifting and exponent updating may be done in one step. When the two numbers have the same exponent, they may be added or subtracted as required unless the shifting needed for the smaller number is such as will shift it entirely out of the significant hexadecimal denominational orders, i.e. 6 for a short precision, or 14 for a long precision number, in which case, the larger operand is retained unchanged. If the operation is add, it is possible that there has been a carryout of the highest hexadecimal denomination. If there has been such a carryout, the entire result is normalized by being shifted one order to the right and the exponent incremented by a unit. On the other hand, it it possible in a subtract operation that there will be one or more hexadecimal orders at the left end which have only zero bits therein. This result will be normalized by a determination of the number of consecutive hexadecimal digits at the left end, a left shift of that number of hexadecimal denominations, and an updating of the exponent by subtracting that number from the original exponent. It is to be understood that a normalized number in the present embodiment is a number which has a significant digit representation in any one or more of the four left end bit positions, and not as in binary machines where the left bit position of a normalized number must contain a significant digit representation. If the adder output for either addition or subtraction is a normalized number, no output shifting or exponent updating is required. It may also be noted that there are a number of unnormalized addition and subtraction operations, and for these there will be no shifting of the result, and only so much shifting of the inputs as is needed to bring the exponents to equality.

The above description is based on the assumption that the larger number has a positive sign in which event a carryout of the highest order meant an overflow requiring a one digit right shift in an addition operation, or a positive remainder in a subtraction operation. Since, as will be shown, only the smaller input number can be right-shifted, and as there is no true/complement circuit between the shifter and the adder input, the smaller number will always be entered into the Adder 188 in its original form as a true magnitude. The larger number is entered through a true complement unit and will be entered as the complement for all operations on which the effective sign is negative. The effective sign is the sum, modulo two, of the number of negative signs between the sink operand, the source operand and the operation sign. If there are none, or two negative signs, the effective sign is positive, and if there are one or three such signs, the effective sign is negative.

There are two possible interpretations for a carryout of the highest order of the floating point adder, for if the effective operation is addition, a carryout indicates an overflow condition requiring a right shift of four bit positions and exponent incrementing for normalizing, but if the effective operation is subtraction, a carryout indicates a negative remainder, and with the entry of the carryout as an end-around carry, the so-called "fugitive one," the adder output is the correct magnitude of the negative remainder and will be gated out true. If there is no carryout, the remainder is positive and will be complemented at the output of the adder. Thus, an effective sign indication of subtraction always causes complementing of the input through the true/complement gate, and causes either complementing of the adder output, if there is no carryout, or an end-around carry within the adder if there is a carryout.

ADD UNIT INSTRUCTIONS

The floating point add unit performs the following set of instructions, all in either short or long precision:

1. Add normalized
2. Add unnormalized
3. Subtract normalized
4. Subtract unnormalized
5. Compare
6. Load complement
7. Load negative
8. Load positive
9. Halve The adds, subtracts and compares are two-operand instructions and the remainder have only the one operand. All instructions will set the condition code except the halve instruction. The operation of the add unit for the two-operand adds and subtracts has been set out above, and compare is considered to be a subtract operation, but the result is not gated out of the adder since only the setting of the condition code is desired. As a special feature to improve precision of a short precision instruction, the smaller operand is gated into 28-bit positions rather than the 24 bits of a short precision fraction, the extra four bits being on the right end to preserve through the adder one digit which would otherwise be shifted out and lost. The digit thus preserved through the adder is not gated out of the adder output, but could cause a change in the next left digit if an end-around carry occurred within the adder.

In the one-operand instructions, the source operand is the only one in the Operand Storage Registers 191 for the instruction, and will be gated out true through the true/complement input into the adder input and there added to zero. For load positive, the output sign is forced positive, for load negative, the output sign if forced negative, and for load complement the output sign is inverted. For the halve operation, the output is shifted one bit position to the right in the result register outgating circuits and the exponent and sign bits are unchanged. The result will not be normalized if the highest hexadecimal order position is thereby set to zero.

FLOATING POINT ADD UNIT STRUCTURE

The data paths for the parts of the operands in the Add Unit 188, FIG. 5, are shown in detail in FIG. 17. Here, the Operand Storage Registers 191, are shown as each separated into four parts, the 56-bit fraction magnitude part, the 7-bit exponent magnitude part, a group of seven bits, each bit being the parity of one fraction byte, and a parity bit for the exponent. There are six registers in each group, three for sink (SK) operands, and three for source (SR) operands, the three pairs of registers enabling three add unit instructions to be buffered until their operands are available.

Considering first the exponent side, the two exponents for the two operands to be processed are gated out of the Buffers 191, onto Bus 580 for the sink exponent and onto Bus 581 for the source exponent. The two exponents are gated into the inputs of Exponent Subtractor 582 where the sink exponent is subtracted from (by adding its complement) the source exponent. This order is selected to simplify the hardware for one operand instructions where the source operand is the only one used. If the source operand has the larger exponent, there will be a carryout signal on a Line 584 from the highest order of Subtractor 582, and the subtractor output on Bus 585 will be the true value of the number of hexadecimal digit orders which the sink operand must be shifted to the right in a Digit Preshifter 592 to equalize exponents. If there is no carryout signal on Line 584 from Subtractor 582, the sink operand is the larger and the signals on the output Bus 585 of Subtractor 582 are the complement of the number of hexadecimal digit orders which the source operand is to be right shifted in Preshifter 592. When the two exponents are equal there will be a carryout signal on Line 584, but the result on Bus 585 will be equal to zero indicating no shift of the operands, and since there is a carryout of Subtractor 582, it is the sink operand which will be passed through the Preshifter 592.

On the fraction side of FIG. 1, the source and sink fraction parts of the operand storage registers are gated to the Source Bus 588 and to the Sink Bus 589, respectively, as will be later described. The Busses 588 and 589 connect to an Assign Gate 586 which is controlled by the signal on Line 584 from the exponent carryout. If there is a significant signal, then the source operand on Bus 588 is gated out to a True/Complement (T/C) Unit 591, and the sink operand on Bus 589 is gated out to Preshifter 592, but if there is no significant signal on Line 584, then the sink operand on Bus 589 is directed to the T/C Units 591, and the source operand on Bus 588 is gated to Preshifter 592. The T/C unit is controlled by a Line 593 from the UCC 560, to be later described, to pass the operand either in true or ones complement form for an effective addition or subtraction as above noted.

The output signals of Subtractor 582 on Bus 585 converted in a Decoder 595 to control signals for Preshifter 592. Preshifter 592 is substantially similar in function and structure to Shifter 218 of the FXPU 143 but is smaller in that it has only two levels of gating and can only right shift. The first level of gating can shift the 56-bit fraction operands 0, 1, 2, or 3 hexadecimal digits to the right, and the second gating level can shift the operands either 0, 4, 8, or 12 hexadecimal digits to the right, enabling any shift from 0 to 13 digits. The gates in each level are controlled by signals from Decoder 592 and by a S/L precision signal on a line 596 from the UCC 560, so that if the shift is six or more for a short precision fraction, or is 14 or more for a long precision fraction, no operand is passed through the Preshifter 592, and for short precision fractions, only the left 28 bits of the shifted number will be gated out for the reason set out above.

The two operands from the T/C Unit 591 and Preshifter 592 are entered into a Main Adder 597 of the carry propagate type, see the description of the CPA 276 in the FXPU above, and their sum is gated out through a True/Complement Interface 598 into a set of Latches 599. The T/C Interface 598 is controlled as above noted by the effective sign signal on Line 593, and by the carryout signal on a line 601 from Main Adder 597, to complement the adder result signals if, as above noted, the effective operation is subtraction and there is no carryout signal on Line 601. The output of Latches 599 goes to a Zero Detector 602 and a Postshifter 603. The zero detector will, if there is a carryout in an effective subtraction operation, decode the main adder result from Latches 599 to determine how many of the consecutive hexadecimal digits starting at the left end are zeros and will put this number on a Bus 605. The number on Bus 605 will be converted in a Decoder 606 to a number of shift control signals which are supplied to Postshifter 603. Decoder 606 is also controlled by the effective sign Line 593 and by the Main Adder Carryout Line 601 to cause a shift of the main adder result in Latches 599, one hexadecimal digit to the right if there has been a carryout in an effective addition operation, or to shift the result to the left the number of digits indicated by Detector 602 if the effective operation is subtraction.

The Postshifter 603 is similar to Preshifter 592 in that it has two levels of gating, a first level for left shifts of 0, 1, 2, or 3 digits, and a second level for left shifts of 0, 4, 8, or 10 digits. There is a built-in right shift of one denominational order so that a zero shift is effectively a one digit right shift and all left shifts will appear as a set of control signals from Decoder 606 for one more than the correct left shift. The maximum left shift for which Postshifter 603 can be set is 14 digits which is effectively a 13 denominational order left shift to put the right hand digit into the left denominational order. A 14 denomination left shift can be determined by Zeros Detector 602 when the result is all zeros, but Decoder 606 will not respond to this extent of shift and none of the gates of Postshifter 603 are opened so there will be no number passed through to the Latches 189. The output of Postshifter 603 is gated into the Add Result Latches 189 from which it may be gated to CDB 197.

Since any shift in Postshifter 603 changes the magnitude of the fraction output, the exponent part must be updated when a postshift is made. The larger exponent of the two in Register 191 for the two operands being processed is gated out on a Bus 607 to one input of an Exponent Update Unit 609. The other input of Updater 609 is gated to either the output Bus 605 of Zeros Detector 602, or to a line 610 which is activated when an overflow condition is detected in Decoder 606. The Exponent Updater 609 will subtract from the exponent value on Bus 607, the shift value on Bus 605, or will effectively add one to the exponent if a right shift signal is present on Line 610. The updated exponent at the output of Updater 609 is gated into a seven digit section of Result Latches 189 and is gated out of Latches 189 to CDB 196 with the fraction magnitude.

ERROR CHECKING

The checking of Add Unit 188 for errors in generally a conventional parity scheme with parity of inputs and outputs checked at the byte level and internal parity checked to the 4-bit digit level. Considering briefly the checking of the exponent side of FIG. 17, the exponent byte on Bus 580 for the sink operand is gated into a Parity Generator 611 where two parities for the two digit halves thereof are generated on a two line Bus 613, and the two parities combined to a single parity bit on an output Line 614. The parity bit in the operand word for the exponent byte is gated on a line 615 and both line 614 and 615 are inputs to an Exclusive Or 617 which will put an error signal on Input E Error Line 618 if the two parities are different. An identical parity generator 620 receives the source operand exponent on Bus 581 and generates two digit parities on Bus 621 and a byte parity bit on line 622. Line 622 and the parity bit on line 624 are combined in Exclusive Or 625 to put an error signal on Input Error Line 618 if the source exponent has a parity error.

There is a corresponding parity checking logic for each byte of the source and sink operands. The sink operand on Bus 589 is an input to parity generator 627 which generates 14-digit parities on a Bus 628, and seven byte parities on a Bus 629. The parity bits on Bus 629 are individually combined in Exclusive OR's 631 with the parity bits from the original sink operand and the outputs of the Exclusive OR's 631 are OR'ed together to an Input Error Line 632 to signal if any corresponding pair of parity bits are different. The source operand on Bus 588 is similarly passed to Parity Generator 635 which puts out the 14-digit parity signals on a Bus 636 and seven byte parity signals on a Bus 637. Bus 639 carries the original parity bytes from the original source operand and its bit signals are combined in Exclusive Ors 640 with the signals on Bus 637 to generate individual byte parity error signals which are combined to a single error signal on Input Error Line 632. These exponent and fraction parity checks will detect any single bit error in the operands entering the Add Unit 188.

To check the correctness of operations within the Add Unit 188, the digit parity Busses 628 and 636 are inputs to an Assign Gate 641 controlled by line 584 to switch the source and sink digit parity bits to Bus 642 for the operand with the larger exponent, and the other operands digit parity bits to a Parity Preshifter 645. Parity Preshifter is similar to Preshifter 592 but is smaller and shifts its input to the right one position for each unit of exponent difference rather than four bit positions as in Preshifter 592. Parity Preshifter 645 is controlled by the output of Decoder 595 and acts to eliminate from its output those digit parity signals corresponding to digits eliminate in Preshifter 592. The remaining parity bits from Parity Preshifter 592 are sent to Parity Generator 649 which generates a single parity bit for its output. The two parity bits from Parity Generators 644 and 649 are combined to a single parity bit for both input operands in Parity Generator 651 which single parity bit is sent to a Latch 652.

This single parity bit must be combined in a Parity Generator 653 with the parity of the carries generator and Predictor 655 is responsive to the Main Adder input operands from T/C Unit 591 and Preshifter 592 and to the carry signals generated within the Main Adder 597 to generate predicted carry signals. This Carry Parity Generator and Predictor 655 is functionally similar to that shown in U.S. Pat. No. 3,078,039, issued on Feb. 19, 1963 to S.F. Anderson, and titled, "Error Checking System for a Parallel Adder." There is a minor difference in that the checking system of the patent is applied only to alternate denominational orders of the Main Adder 597 and will thus detect any error which would effect a plurality of denominational orders and may not be detected by a parity check. Single errors not found by the carry checking system will be found by the conventional parity checking of the carry signals. The output of this predictor is held in a set of Latches 656 which can be gated out to a set of Exclusive OR Circuits 657 to compare the actual carry signals with the predicted ones and send a signal on an intermediate Error Line 659 if a mismatch is found. At the same time the carry signals from Latches 656 are sent to the Parity Generator 653 where the predicted parity of the output of Main Adder 597 is generated on a Line 660. The output signals from the Main Adder Latch 599 are entered into another Parity Generator 661 which provides a single parity bit for the entire sum on a Line 663, and the parity signals for each digit of the sum on a Bus 664. The signals on Lines 663 and 660 are combined in an Exclusive OR 665 to generate a signal on a second Intermediate Error Line 667 if the predicted and actual sum parity signals are not the same.

The parities of the digits on Bus 664 are entered into a Parity Postshifter 668, where they are shifted either right one position or left up to 13 positions. Parity Postshifter is similar to the Digit Postshifter 603 and is controlled by the same signals from Decoder 606 to shift the parity bits the same number of positions as the digit positions the main adder sum is shifted resulting in elimination of those parity bits corresponding to shifted out digits. The remaining digit parity bits are combined in a Parity Generator 669 to supply the byte parity bits for the sum to the Result Latches 189. The actual sum gated onto CDB 196 from the Result Latches 189 is converted in a Parity Generator 671 to the byte parity signals which are compared in Exclusive OR's 672 with the predicted byte parity signals from Parity Generator 669 to generate an error signal on a Result Error Line 673 if any mismatch is found.

The correctness of the Exponent operations is checked in a similar but simpler manner. The digit parity bits from Parity Generators 611 and 620 on Busses 613 and 621, together with the predicted carry signals from Exponent Subtractor 582, as generated in a carry Generate and Predict Circuit 675, and held in a Latch 676, are combined in a Parity Generator 677 to determine the predicted exponent difference parity on a Line 679. The parity of the actual exponent difference on Bus 858 is generated in Parity Generator 680 and combined in Exclusive OR 681, to generate a signal on Intermediate Error Line 683 if there is an error. Also the actual carries from the Exponent Subtractor are compared with the predicted carries in a set of Exclusive OR's 684 to signal any carry error on Intermediate Error Line 685. The final exponent byte is checked by generating the parity of the high order digit on Bus 607 in a Generator 687, the parity of the low order digit on Bus 607 in a Generator 688, the parity of the high and low order digits on the Zero Detector Bus 605, or on Bus 610 in Generators 689 and 691, respectively, and combining these parities together with the carry signals generated within the Exponent Updater 609 in a parity generator 692, to determine the predicted parity of the exponent. This predicted parity will be held in an output Latch 189, and when the Result Operand is gated to CDB 196, it will be compared in an Exclusive OR 696 with the parity of the actual exponent on CDB 196 as supplied by Parity Generator 695. Any difference between the predicted and actual parity will result in an error signal on Result Error Line 697.

ADD UNIT CONTROLS

The Unit Communication Controls (UCC) 560, FIG. 5, whose operation has been described above, and with reference to FIGS. 13, 14, 15 and 16, are shown in FIG. 18. There are three UCC's 560, one for each sink-source pair of operand storage registers 191. Each UCC 560 comprises a 4-bit Sink Tag Register 701 and a Source Tag Register 702, which are set on every instruction decode cycle by Control 200, FIG. 5, in accordance with the instruction over the Common Sink Tag Bus 703 and Common Source Tag Bus 705, respectively, so long as the unit adder represented thereby is not selected. Each pair of operand storage Registers 191, and the corresponding UCC 560, are considered to represent an add unit for only one add result can be gated to CDB 196 on any cycle, and it has been found that a common Add Unit 188 with three sets of input buffer registers can do the same work as fast as three completely separate add units. When the source tag is zero, FIG. 13, the Source Ingate Control 706, when the unit is not busy, or when the Source Full Trigger 707 is off, with a set Unit Busy Trigger 709, will condition the Source Gate 710 to gate in the operand from the FLR Bus 551, FIG. 5, or the FLB Bus 199 and to set the Source Full Trigger 707 when the unit adder is identified on the FLR Bus or FLB Bus tag lines. If the Unit Busy Trigger 709 is now set by a select signal from Control 200 on an individual Unit Select Line 711, the operand on the FLR Bus 551, or FLB Bus 199, will now be gated into the Source Operand Register 191 for the selected unit adder.

Figure 14:
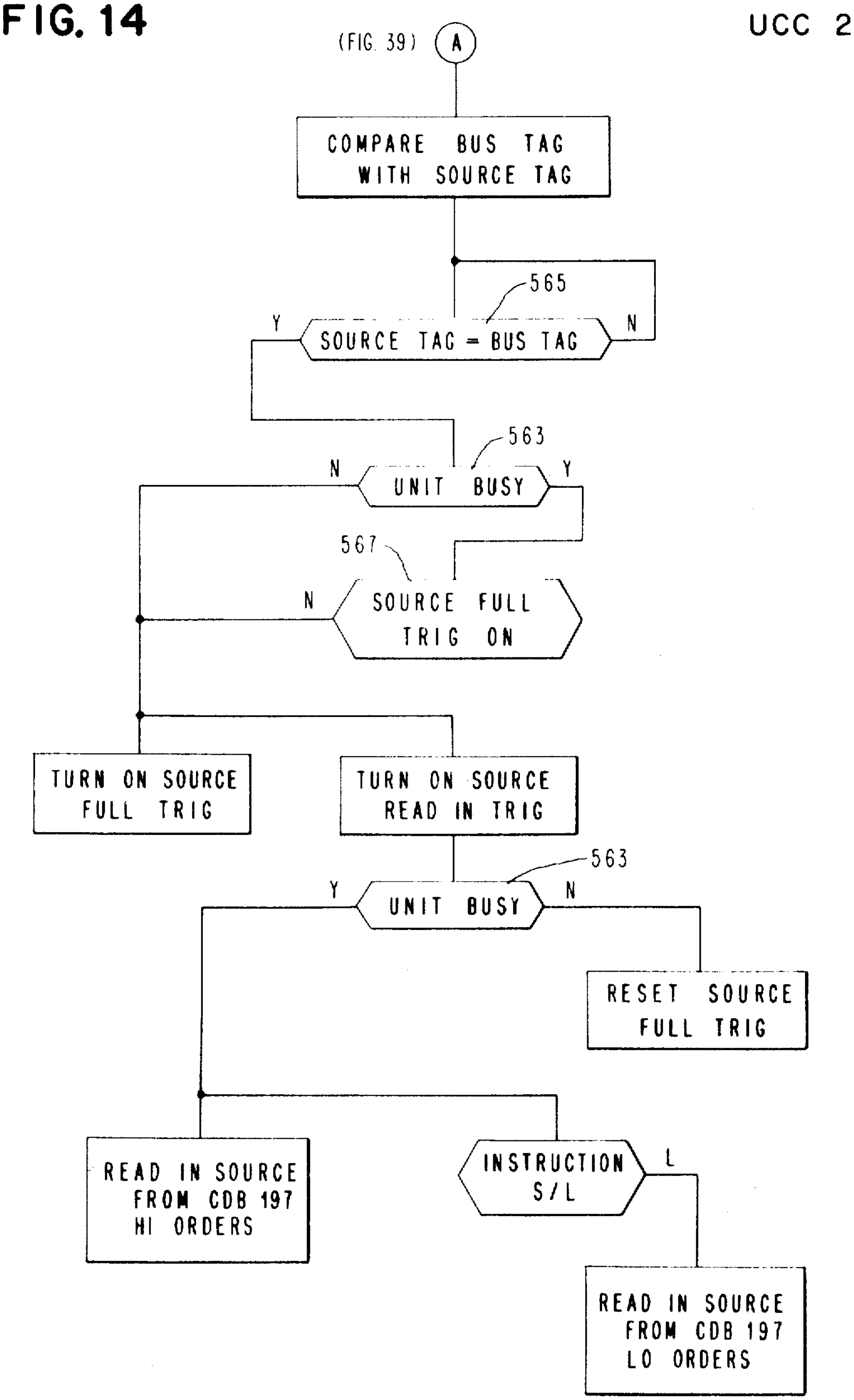

If the source tag is not zero, the source tag in Register 702 is continuously compared with the CDB 196 tag on lines 712 in a Source Comparator 713, see the flow chart FIG. 14. When equality is not found, or if the equality is found and Source Full Trigger 707 is not on, the read-in Gate Controls 710 are set to read in the source operand from CDB 196, and if the unit is now selected by a signal on Unit Select Line 711, the operand will be gated in from CDB 196 to the corresponding Source Operand Register 191.

Figure 15:
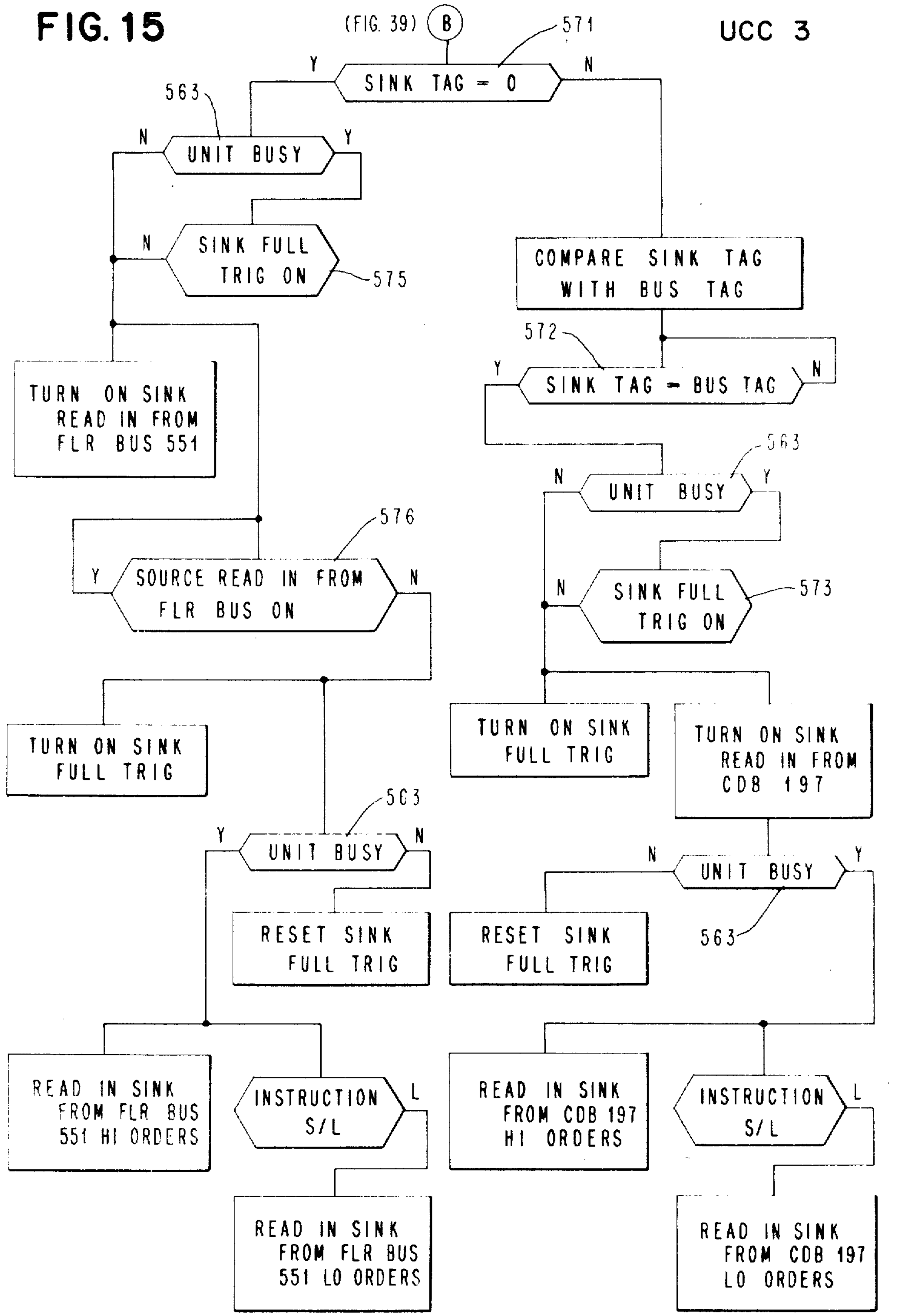

A similar set of controls are in the UCC 560 for the sink operand, see the flow chart, FIG. 15. If the sink tag in Register 701 is zero, and the Unit Busy Trigger 709 is not on or if it is on, then the Sink Full Trigger 713 is off, the Gate in Sink Operand Control 714 will be set to gate the sink operand into Sink Operand Register 191 when the unit is named on the FLR Bus 551, unless the Source Gate Control 710 is on and the source operand is being gated in. If the source tag in Register 701 is not zero, then when the CDB 196 tag on Line 712 is compared with, and found equal to, the number in the Sink Tag Register in a Sink Tag Comparator 716, the Sink Full Trigger 713 and the Sink Ingate Control 717 are set to control Sink Gate Control 714 for storing the sink operand in the corresponding Sink Register 191. If the unit is now selected by Control 200 setting the Unit Busy Trigger, the next operand on CDB 196 will be gated into Register 191.

When the Unit Busy Trigger 709 is on and both the Sink Full Trigger 713 and Source Full Trigger 707 are set to indicate that both operands are stored in Registers 191, the Unit Full Trigger 718 will be set to signal on a Line 720 that the unit is ready for execution of its operation. It should be understood, as indicated in FIG. 16, that if the instruction is a single operand one, the Unit Full Trigger 718 will be set when only the Source Full Trigger 707 and Unit Busy Trigger 709 are set on.

The Start Control 726 is to establish a priority for starting an add operation for any add unit (pair of operand storage registers 191 and UCC 560). The start control will give priority to the units in the order in which they have been selected, but only if the Unit Full Trigger 718 is set on. A two denomination counter 727 capable of being incremented and decremented is used to keep a count of the number of add units selected at any time. The counter is incremented by a signal on a Select Line 711 for any of the add units entering an Increment Control 728 and will be decremented each time an accept signal is received on one of the three Accept Lines 730 connected to the Decrement Control 731. Counter 727 does not wrap around and cannot be incremented above three, nor decremented below zero. When at three the Counter 727 prevents Control 200 from issuing any more add unit select signals and when at zero it blocks any further requests for CDB 196 time slots. The Increment and Decrement Controls 728 and 731 are interconnected so that simultaneous select and accept signals on lines 711 and 730, respectively, will cancel each other and not alter the value in counter 727.

The control over add unit start signals is exercised by a Push Down Stack 732 which is essentially a three-stage shift register having two bit positions per stage and each stage of which can be set to a zero condition to represent an empty stage or to one of three values to represent one of the three add units. The value in Counter 727 is used in the Stack Input Circuits 734 to indicate how many stages of Push Down Stack 732 are set, and which stage of the Stack 732 should be next set. A signal on a Select Line 711 in conjunction with the Counter 727 value activates the Stack Input Circuits 734 to set the lowest available stage of Stack 732 to represent the add unit selected. The unit representing settings of the stages of Stack 732, together with the signals from the Unit Full Trigger 718 of the three UCC's 560, are received by a Priority Control 735 which will select the next add unit to be sent a start signal. The Priority Control 735 as above noted will select the add units in the order of their selection provided the Unit Full Trigger 718 is on. Selection of an add unit is enabled by the setting of a Start Trigger 736 for the unit selected which will set signals on Start Lines 738 to gate the operands of the add unit selected into the Add Unit 188 circuits, FIG. 17, and will simultaneously set a request trigger for a time slot on the CDB Bus 196. When a Start Trigger 736 has been set, its signals are sent to a Stack Reset Control 739 which will reset the stage of Push Down Stack 832 which contains the identification of that add unit. Such clearing of a stage of Stack 732 will cause every higher stage to be pushed down one stage to shift the order of priority. The request trigger will remain on until the CDB 196 sends an accept signal for the unit on one of the Lines 730.

It is to be noted on FIG. 17 that the Add Unit 188 has two sets of latches for the fraction part of the operands, the Intermediate Latches 599, 656, and 652, and the Result Latches 189, and thus two sets of operands can be in process simultaneously, one set being entered into the Main Adder 697, and the earlier set being transferred into the Result Latches 189. It is then possible to have a Start Trigger 736 on the next cycle after a first pair of operands have been gated into Add Unit 188, and thus start a second pair of operands into Unit 188 and set a second request trigger. The CDB 196, as above noted, will maintain priority on a first-come/first-served basis among the add units started. A third Start Trigger 736 cannot, however, be set until the first set of results are cleared from the Result Latches 189 to allow the other operands to proceed through Add Unit 188. The conditions for issuing the start and request signals from Start Control 726 are shown in the flow charts FIGS. 19 and 20. If the Add Unit 188 is not full, Block 740, as above described, the Priority Unit 735 tests the lowest stage of Stack 732 to see if the add unit, if any, names therein has its Unit Full Trigger 718 set, and if it finds a match will exit to the entry point on FIG. 20 for that add unit 1, 2, or 3, and if no match is found, control is passed to a second part of Priority Circuit 735. The second part of Priority Circuit 735 makes a similar test of the middle stage of Stack 732 to see if the add unit, if any, named in this stage has its Unit Full Trigger 718 set and, if so, the control passes to the entry on FIG. 20 for that add unit, but if no match is found, then the second circuit passes control to the third part of Priority Circuit 735, entry point 4 on FIG. 20. This third part of Priority Circuit 735 tests the upper stage of Stack 732 to see if the add unit named therein has its Units Full Trigger 718 set and if so, it passes control to the entry point 1, 2, or 3, for that counter, but if no match is found here, it signals that no add unit is ready for execution. When the Priority Circuit 735 finds a set Unit Full Trigger for an add unit named in one of the stages of Stack 732, it turns on the Start Trigger 736 for that unit.

When the Start Trigger 736 is on for an add unit, the request trigger for that unit is turned on and that trigger will, if the operation is one of the compare instructions, request the FLIU for a time slot to transmit its condition code to the I Box 134, or if the operation is not a compare to request the CDB 196 for a time slot thereon.

So long as the Add Unit 188 is not in scan mode (a diagnostic procedure) the turning on of the Start Trigger 736 for a unit will also gate the Source Operand Stage Register 191 to the Add Unit 188, and if the operation is a 2-operand one, it will also gate the sink operand storage register into Add Unit 188.

There are three Instruction Decoders 742, one for each add unit, and each of which can be set to the instruction code output from Control 200 on Bus 743 when a unit select signal is received on the corresponding Select Line 711. Each Instruction Decoder 742 includes a decoder to control the gating signals within Add Unit 188, a first cycle trigger, a second cycle trigger, and outgating controls for each section of each of the operands of its Registers 191, i.e., the sign bit, the seven exponent bits, the left six hexadecimal digits of its fraction, the right eight digits of its fraction, and the exponent and fraction parity bits.

The sequence of operations within an Instruction Decoder Unit 742 is shown for one unit in FIG. 21. As all three units are similar, this flow chart will apply to all. When the start Trigger 236, FIG. 18, is turned on, Block 744, FIG. 21, the first cycle trigger is turned on and gates the exponent, long or short precision fraction, sign bit and both sets of parity bits into the Add Unit 188 from the Operand Storage Registers 191 holding the operand or operands for the instruction. The first cycle trigger will also set the ingating trigger for the Main Adder Result 597 into the Latches 599, and will turn on the second cycle trigger, Block 746. During the next machine cycle, the second cycle trigger will, depending on the sign of the output of Exponent Subtractor 582, FIG. 17, gate the larger of the source and sink exponents over Bus 607 into Exponent Updater 609, and also will gate the sink sign for a 2-operand instruction or the source sign for a 1-operand instruction to the sign control logic, see FIGS. 22 and 23.

The Execution Control Unit 748 of the Add Unit 188 includes logic to reset the UCC 560 and Instruction Decoder 742 for a unit, to activate the gates of the Result Latches 189, to control the output sign setting, and to control the condition code setting. The Unit Reset Logic 749 will on receipt of a CDB 196 accept or compare signal on one of the Lines 730, generate a reset signal for a group of Latches of the unit involved. The reset latches include the Valid Condition Code, Start Trigger 736, Request Trigger, First Cycle Trigger of Decoder 742, Unit Busy Trigger 709, the Source Full Trigger 707, and the Sink Full Trigger 713, for the unit accepted.

The Outgate Trigger 750 and the Ingate Trigger 754 are responsive to the S/L precision bit set into each Instruction Decoder 742 and to the unit accept signal on an Accept Line 743 to control the ingating from Latch 599, Parity Generator 669, the Exponent Updater 609, and Parity Generator 692 into Result Register 189, and to control the gating from the Result Register 189 on to CDB 196. Only the appropriate bit positions in the result will be entered into Result Register 189 under control of the Short Precision Output Line 752 or the Long Precision Output Line 753 from the Outgate Trigger 750, and only these bit positions will be gated to the CDB 196 by Outgate Trigger 750.

The Condition Code Network 756 will respond to a Set Condition Code Line 757 and a unit select signal on a select Line 711 to set a valid condition code trigger for that unit, and when the instruction for that unit is executed, this trigger will enable the setting of the condition code bits on a pair of condition code lines 758 for transmission through the FLIU to the condition code latches in I Box 134. The outgating of these condition code bits is dependent upon the receipt of an accept signal on the Units Accept Line 730 which can be signalled by either a CDB 196 accept or an FLIU accept signal. The Condition Code Lines 760 and the Sign Line 761 to the condition code network will indicate either a zero fraction, a positive fraction, a negative fraction, or a fraction overflow for an add or subtract operation, or when the operation is a compare one, whether the source operand is equal to, greater than, or less than the sink operand.

The operation of the Condition Code Network 756 is set out in the Flow Charts FIGS. 24 and 25. When the condition code is set by Line 757, the unit select signals on Lines 711 are tested and the activated one will set the valid condition code trigger for the selected unit and for each unit will send a signal to entry 1 on FIG. 25. Also, when the valid condition code trigger is on, the Network 756 is responsive to the turning on of the unit accept trigger by the Units Accept Line 730 for the unit whose valid condition code trigger is on to set the outgating trigger for the CC Bus 758. When the outgate trigger turns on, it gates the set condition code to Bus 758 and simultaneously signals the FLIU that the needed code is on that Bus. Referring now to FIG. 15, when the valid condition code trigger of any unit is set, the Network 756 also executes a number of tests on the code signals and operand signs. Starting at the entry point 1, the FLIU is signalled that there is an outstanding instruction which is to set the condition code. If the code is to be set and the select signal for an adder unit is received, the network waits until the second cycle trigger of the Instruction Decoder 742 is set and then proceeds to set the code. If the instruction is a compare operation, Block 762, the signs of the two operands are compared, Block 764, to see if they are the same for otherwise the operands cannot be equal unless they are both all zeros. If the signs are unlike and the result fraction from Main Adder 597 is not zero, then the sign of the sink operand is tested to set the right code bit if the sign is positive and the left code bit if the sign is negative. If the operand signs are alike and the result fraction is all zeros, then the condition code is 00 and no code bits are set. When the result fraction is not zero, the sink sign bit is tested for a positive condition and the exponent subtractor carryout is tested to determine if the source operand exponent is larger or smaller than the sink operand exponent, and if there is an end-around fraction carry in Main Adder 597. From these conditions the larger of the sink or source operands can be determined, and the condition code bits set accordingly. When the operation is not a compare operation, Block 762, the result fraction is tested for an all zero condition, which if found does not set the condition code bits. If the result fraction is not zero, but there has been an overflow of the exponent updater, then both condition code bits are set, but if the result is a normal number, then the right condition code bit is set for a negative output sign and the left bit is set for a positive output sign.

The meaning of the condition code settings may be summarized as follows:

| Code | Add/Sub. | Compare |
|---|---|---|
| 00 | Result Zero | Equal. |
| 01 | Result negative | Source less. |
| 10 | Result positive | Source greater. |
| 11 | Exponent Overflow | |

The sign control logic of FIG. 18 comprises the Effective Sign Generator 765 and the Sign Modifier 766. The effective sign generator receives the sign signals from the operands being gated out of the Operand Storage Registers 191 into Add Unit 188, the add, subtract or compare instruction signals from the Instruction Decoders 742, and delayed start signals from Start Triggers 736 through Latches 768 to signal on Line 593 to the Add Unit 188, whether the instruction is to be effectively an addition or subtraction. If, among the three sign signals, one or all three are negative, then the operation is effectively a subtraction but if none or two are negative, then the operation will be in effect an addition. For addition, the T/C Unit 591 of FIG. 44 will be set true and for subtraction, it will be set to complement the operand passing therethrough. The delayed start signals through gates 768 are further delayed in a second set of latches to control the gating of the sign of the result fraction into the Result Register 189. These start signals in the Sign Modifier 765, together with the effective sign on Line 593, and the instruction code from the Instruction Decoders 742, together with the carryout signals from Exponent Subtractor 582 and Main Adder 597 enable the sign modifier to determine the sign of the result fraction and to transmit it to Result Register 189 over Line 761. The sign of addition or subtraction instructions will be the sign of the sink operand on addition, and in subtraction if there is an end-around carry in, both the Exponent Subtractor 582 and Main Adder 597, or if neither has an end-around carry. For the load positive, load negative or load complement (single operand instructions) the sign to line 761 is forced to the required sign by the Sign Modify Unit 766 under control of the Instruction Decoders 742 and the unit start signals from Latches 769.

The operation of the sign control logic is described in the flow charts of FIGS. 22 and 23 where when the first cycle trigger is on in an Instruction Decoder 742, the effective sign is computed by inspecting the sign of the sink, Block 771, the sign of the source, Block 772, and the sign of the operation, Block 773, to detect if none or two of the signs are positive, in which case, the operation is addition and the operand to the T/C unit is gated through true. If either one or all three of the signs are negative, the operation is effectively a subtraction, and an effective subtraction trigger is set. The setting of the effective subtraction trigger will set the T/C unit to pass the operand through in ones complement form. The output sign to the Result Register 189 is determined as in FIG. 23, where if the first cycle trigger is on (FIG. 22) a control signal is sent to entry point 1, FIG. 23. Here when the effective sign is determined, FIG. 22, when the second cycle trigger comes on in the Instruction Decoder 742 for an operation being performed, the operation code is tested for an add or subtract instruction, Block 775, and if such operation is not found, then the test is for a load positive, Block 776, a load negative, Block 777, or a load complement, Block 779, and the output sign is set correspondingly. If the operation is an addition or subtraction then the effective sign is inspected to see if it is an effective add operation in which case the output sign is set to the sign of the sink. If the effective sign is a subtraction, however, then the carryout signals of the exponent subtractor, Block 780, and of the Main Adder 597, Block 781, are inspected to see if either both or none have had an end-around carry signal, in which case the sign of the output is the sign of the sink, or if only one of them has had an end-around carry, in which case the sign of the result will be the sign of the sink complemented. When the output sign is determined in Sign Modifier 766, it is sent into the left end position, the sign position, of Output Register 189.

DESCRIPTION OF DETAILED LOGICAL SCHEMATIC DRAWINGS

The following description of FIGS. 26 through 38 is presented in a somewhat general fashion as it is manifestly impossible to explain the detailed operation of every logical block of such a large major functional unit of a computer. In general the functional units set forth in the FIGS. are embodied in the logical modules which are disclosed in and will be generally described with reference to FIGS. 37A—C. The overall interconnection between FIGS. 27 through 36 is indicated in FIG. 26. The functional names utilized for the various FIGS. is the same as the functional blocks set forth and described with reference to FIG. 17.

In each of the groups of drawings it will be noted generally that the inputs appear at the left-hand side of the composite drawing and the output connections appear at the right-hand side. Further, all of the inputs and outputs are labeled with reference to the functional unit from which they came or to which they are going where appropriate. Since a number of the drawings represent only a small fraction of the total functional unit any attempt to specifically reference terminal connections between the drawings is not feasible. However, it is believed that the interconnections would be clearly apparent to a person skilled in the art.

Further in all the drawings certain heavy lines appear which represent a data flow path for one or two bit positions or bits of information as they would progress through the system from the input storage registers to the result storage registers. These data flow paths will be specifically described with reference to the individual drawings subsequently in this section of the specification.

It should be clearly understood that it is believed that the general description of the present high-speed adder complex as set forth in the Sections III and IV, completely describes the present invention and would allow a person possessing ordinary skill in the computer arts to construct a high-speed adder in accordance with the principles of the present invention as disclosed herein. The present description of the detailed logical schematic diagrams is included in an effort to specifically set forth a very detailed preferred embodiment of the invention. For example, the specific configuration of the exponent subtractor, exponent update adder, the Pre- and Postshifting Units as well as the main adder could vary considerably in design, specific circuit implementation, and timing and still fall within the teachings of the present invention.

Figures 31, 31A:
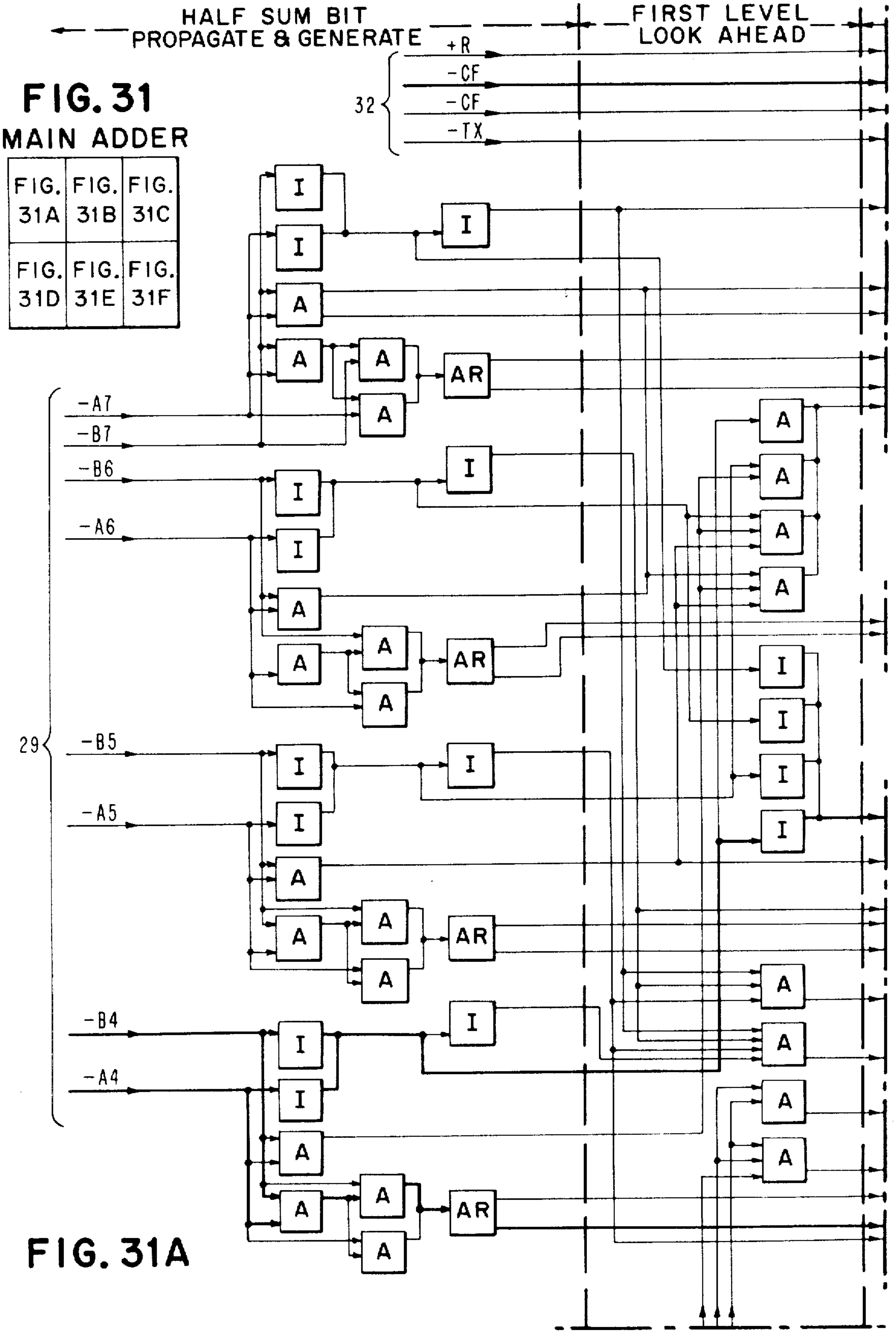
Figure 31B:
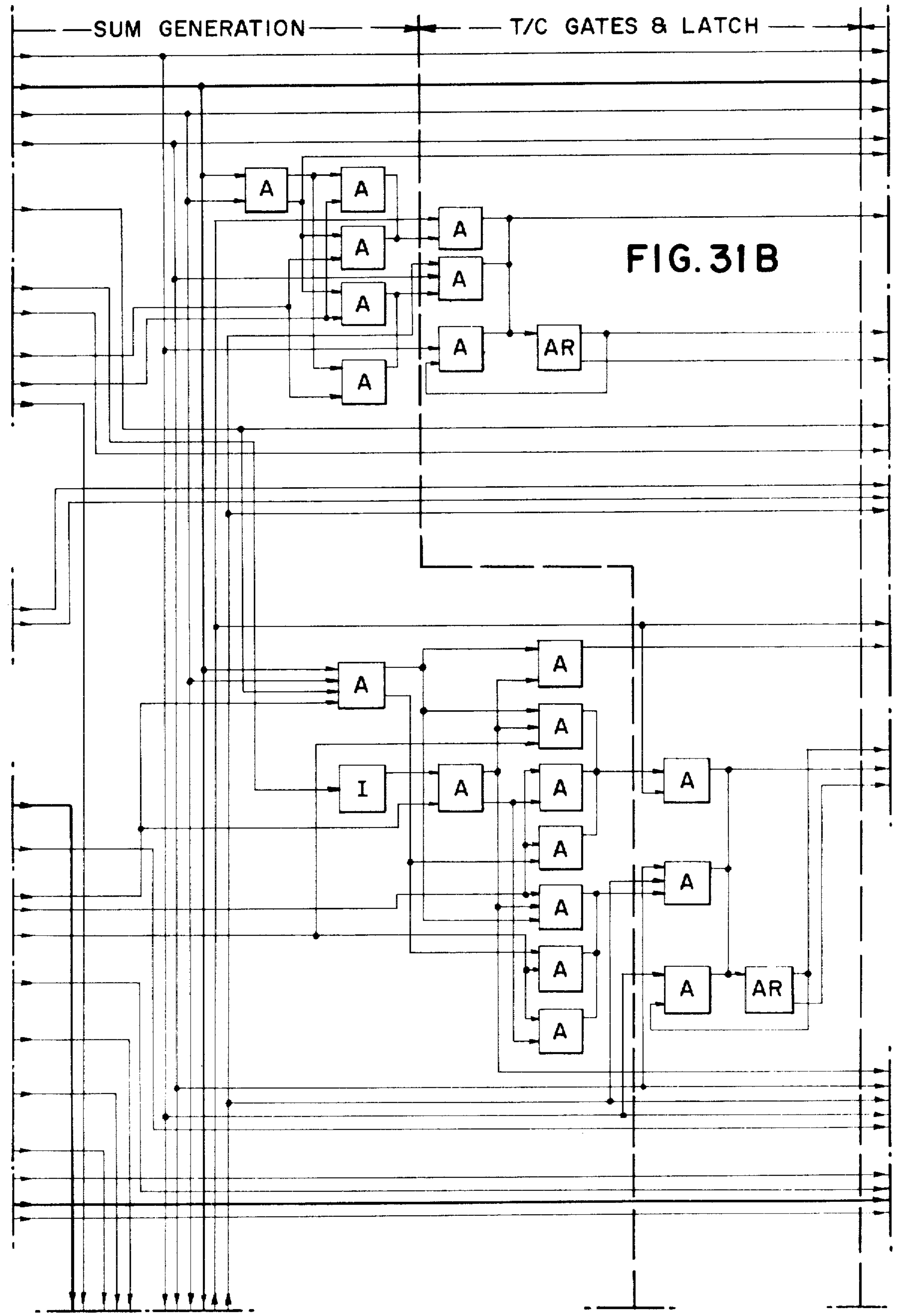
Figure 31C:
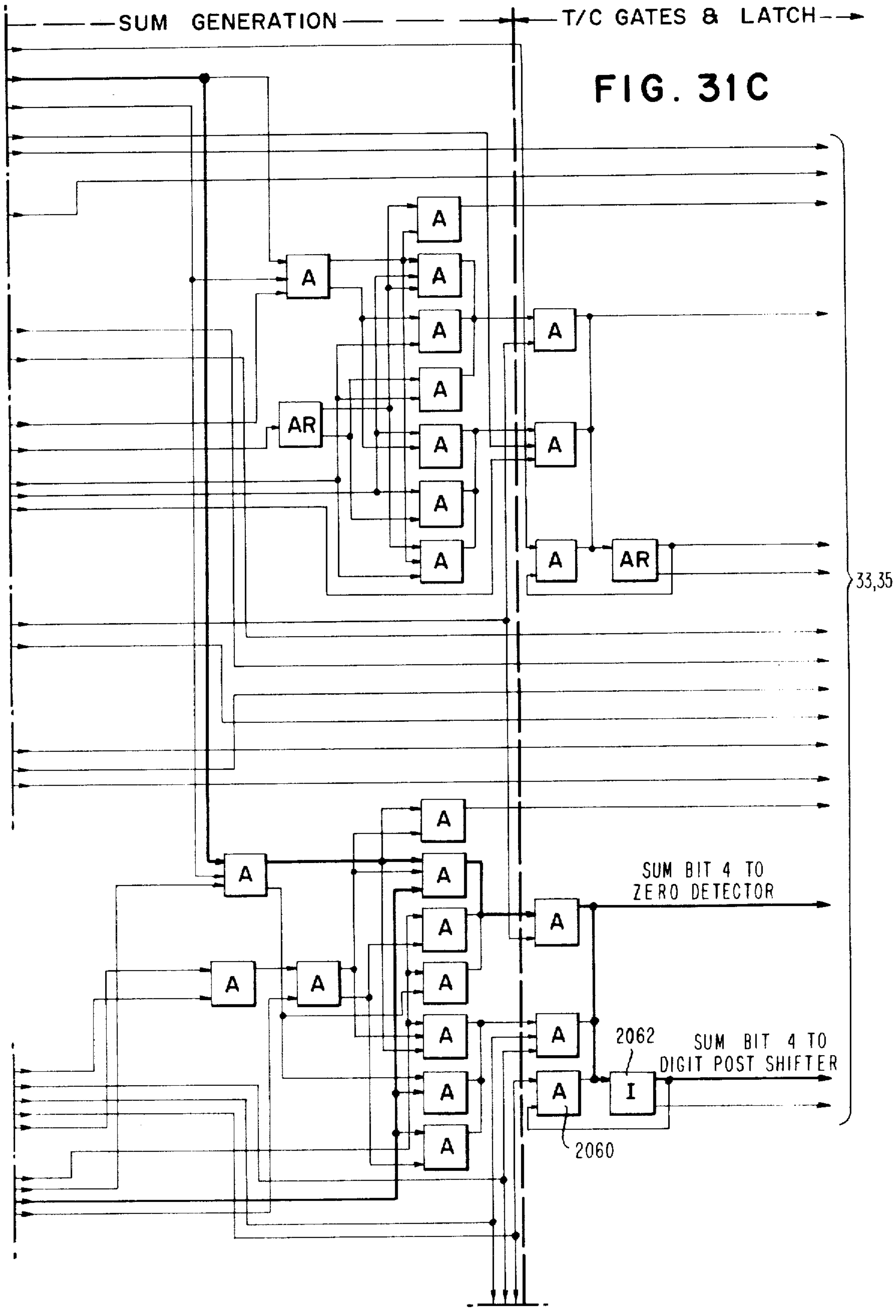
Figure 31D:
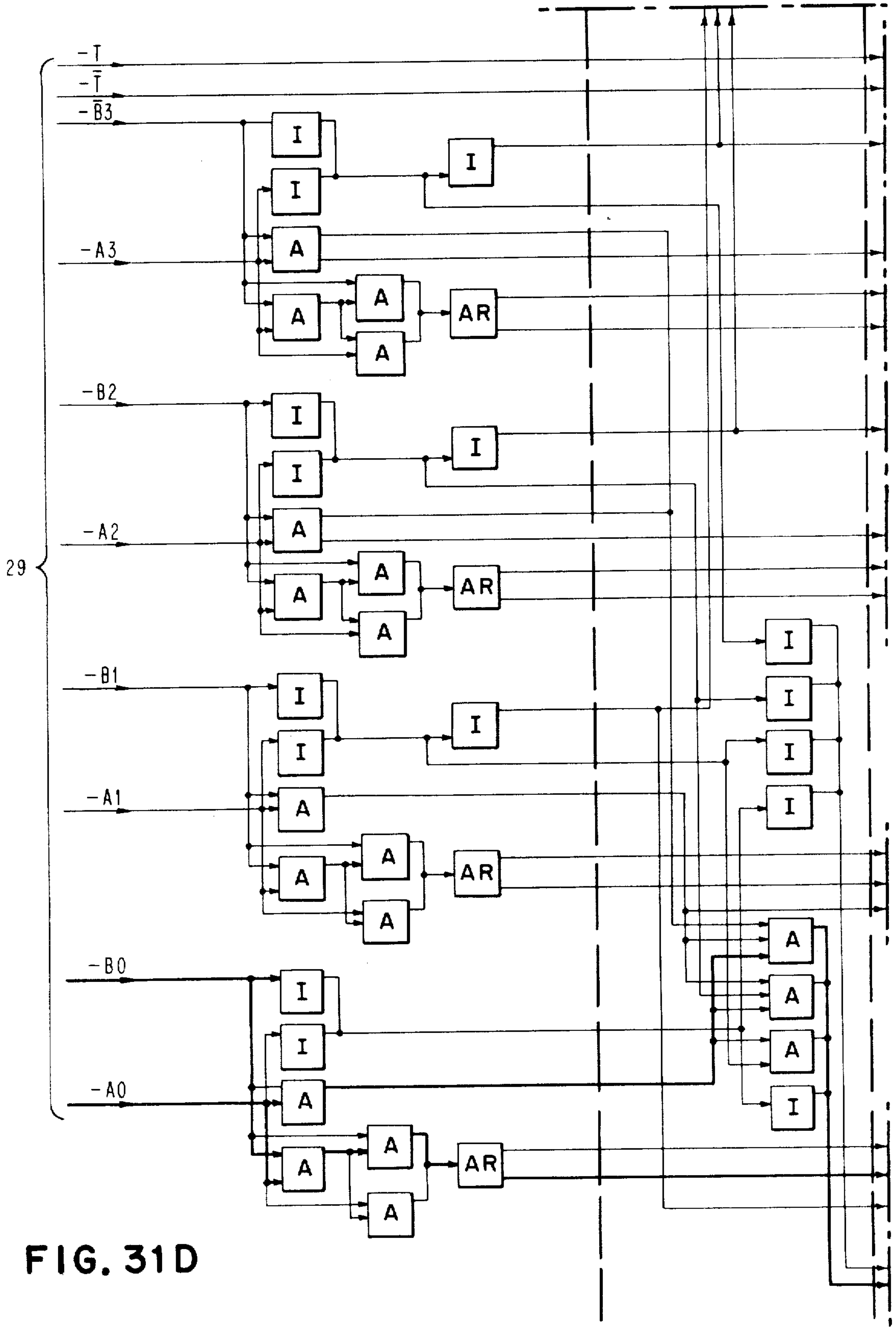
Figure 31E:
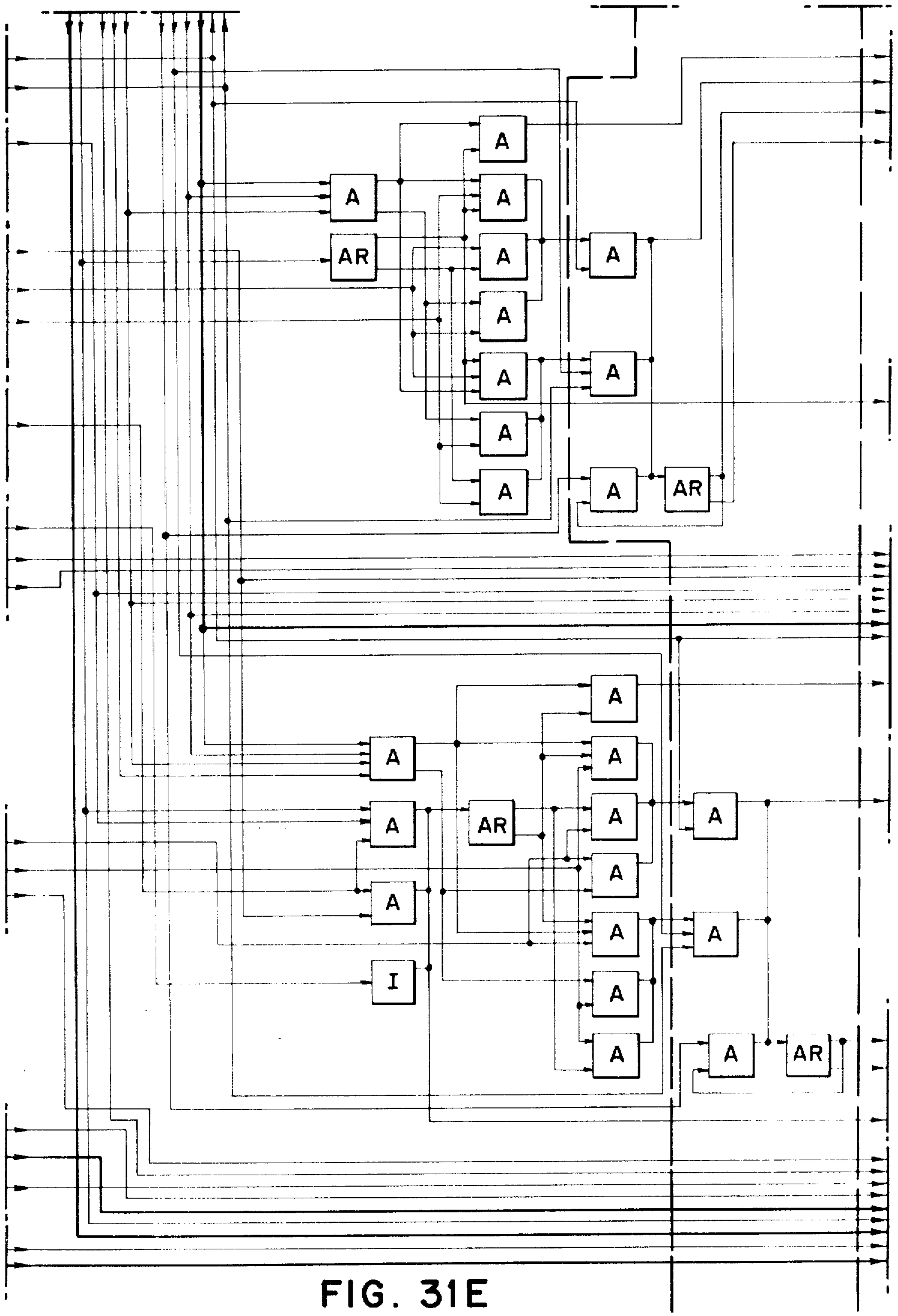
Figure 31F:
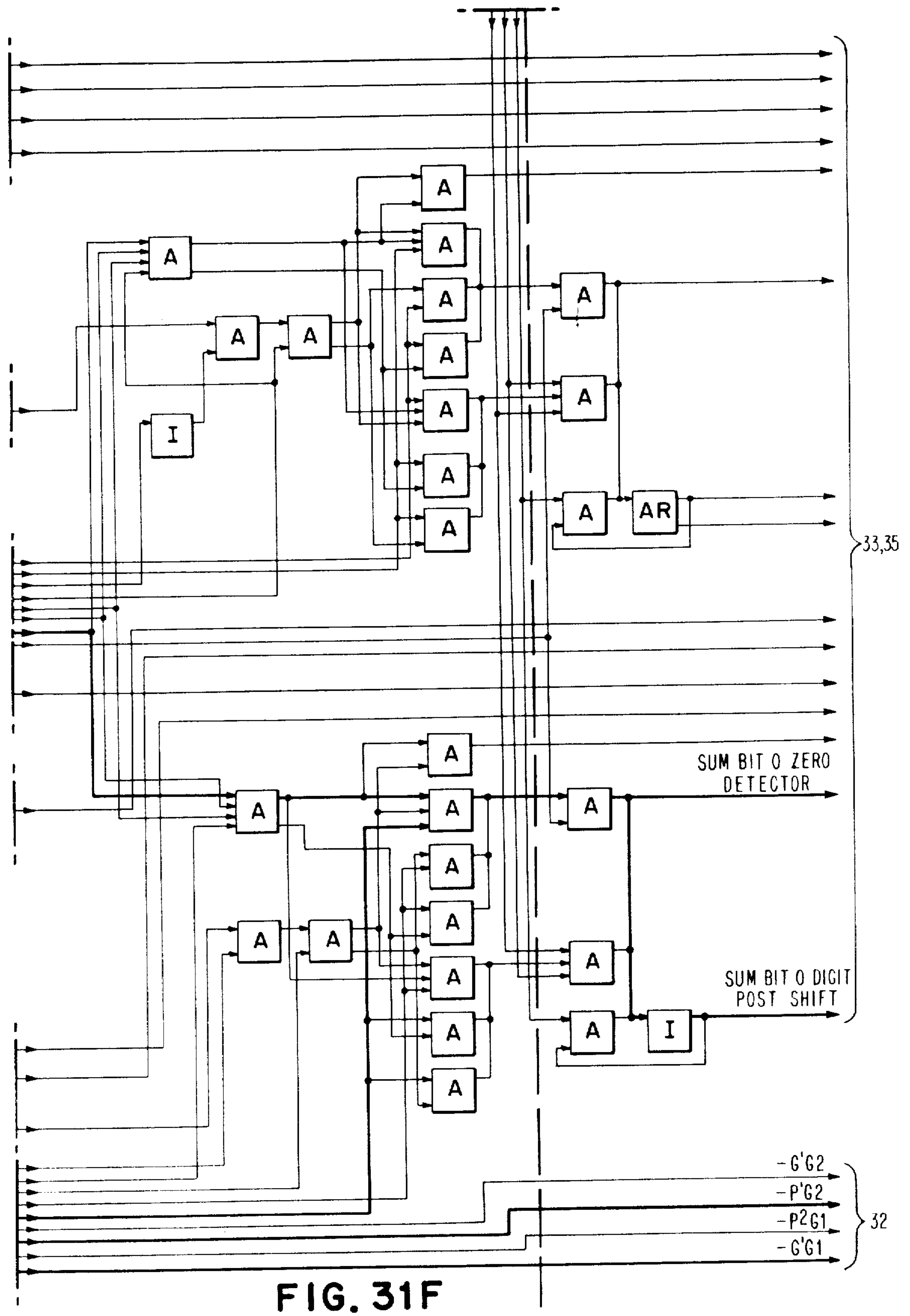
Figures 32, 32F:
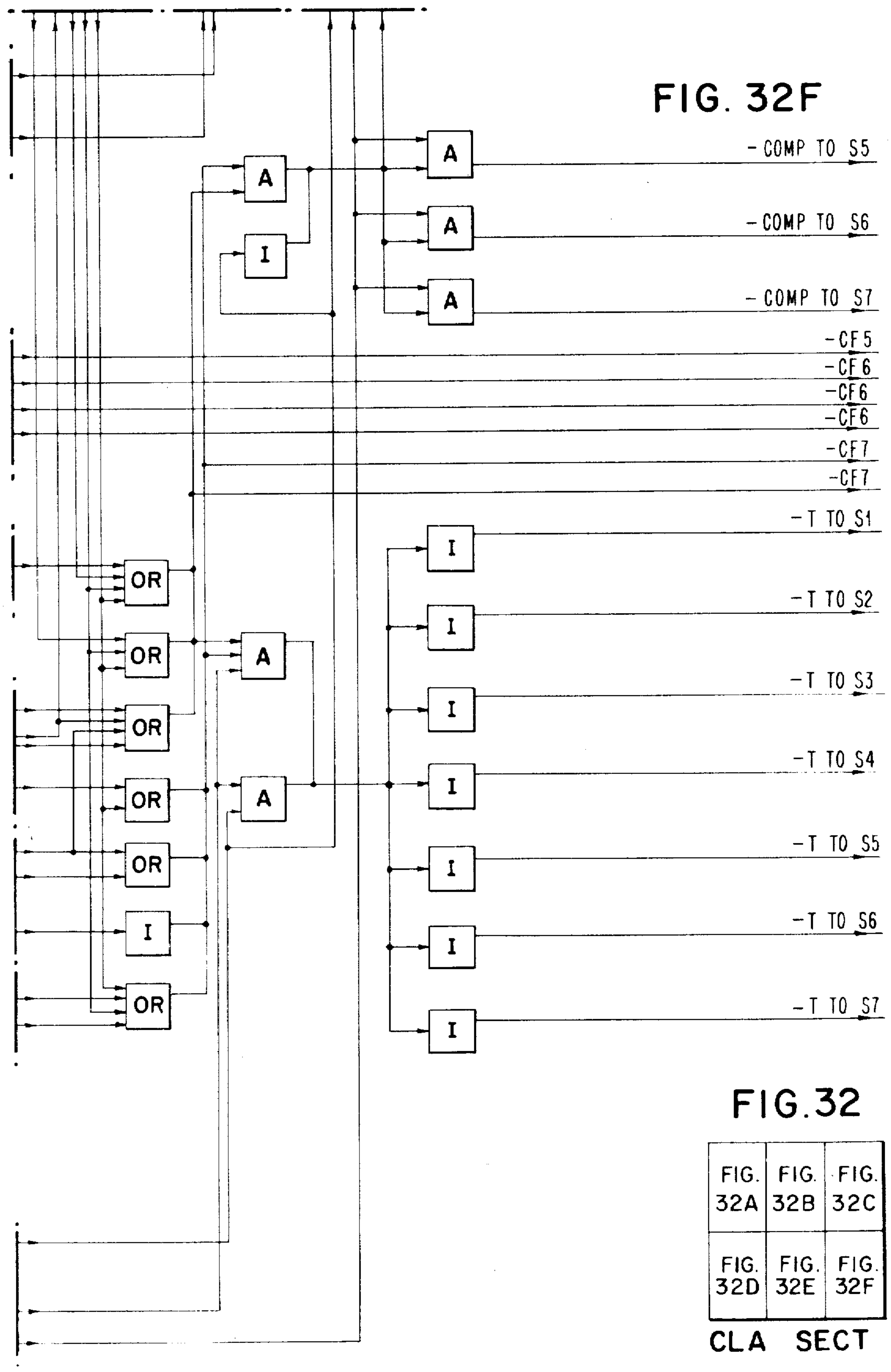
Figure 32A:
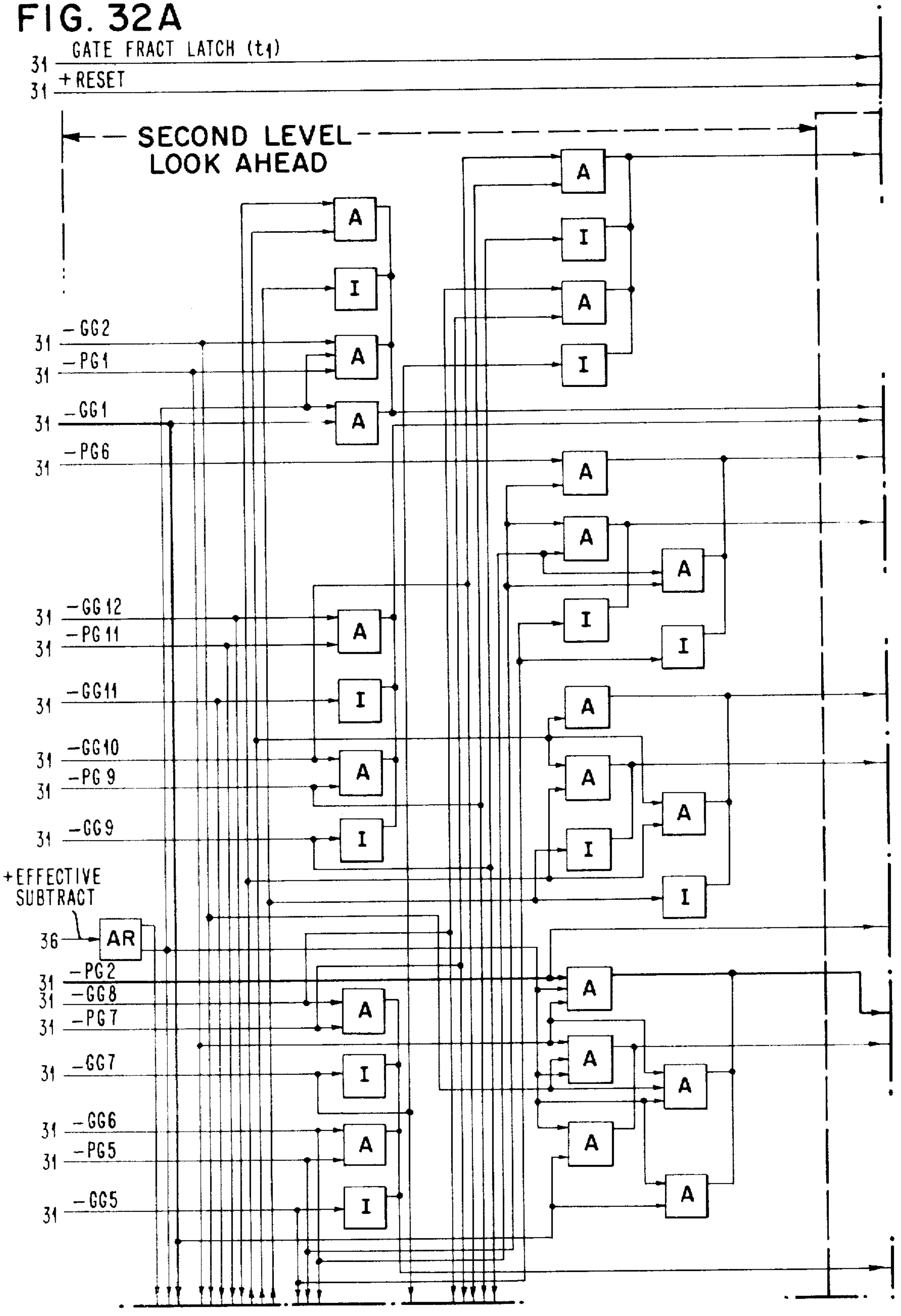
Figure 32B:
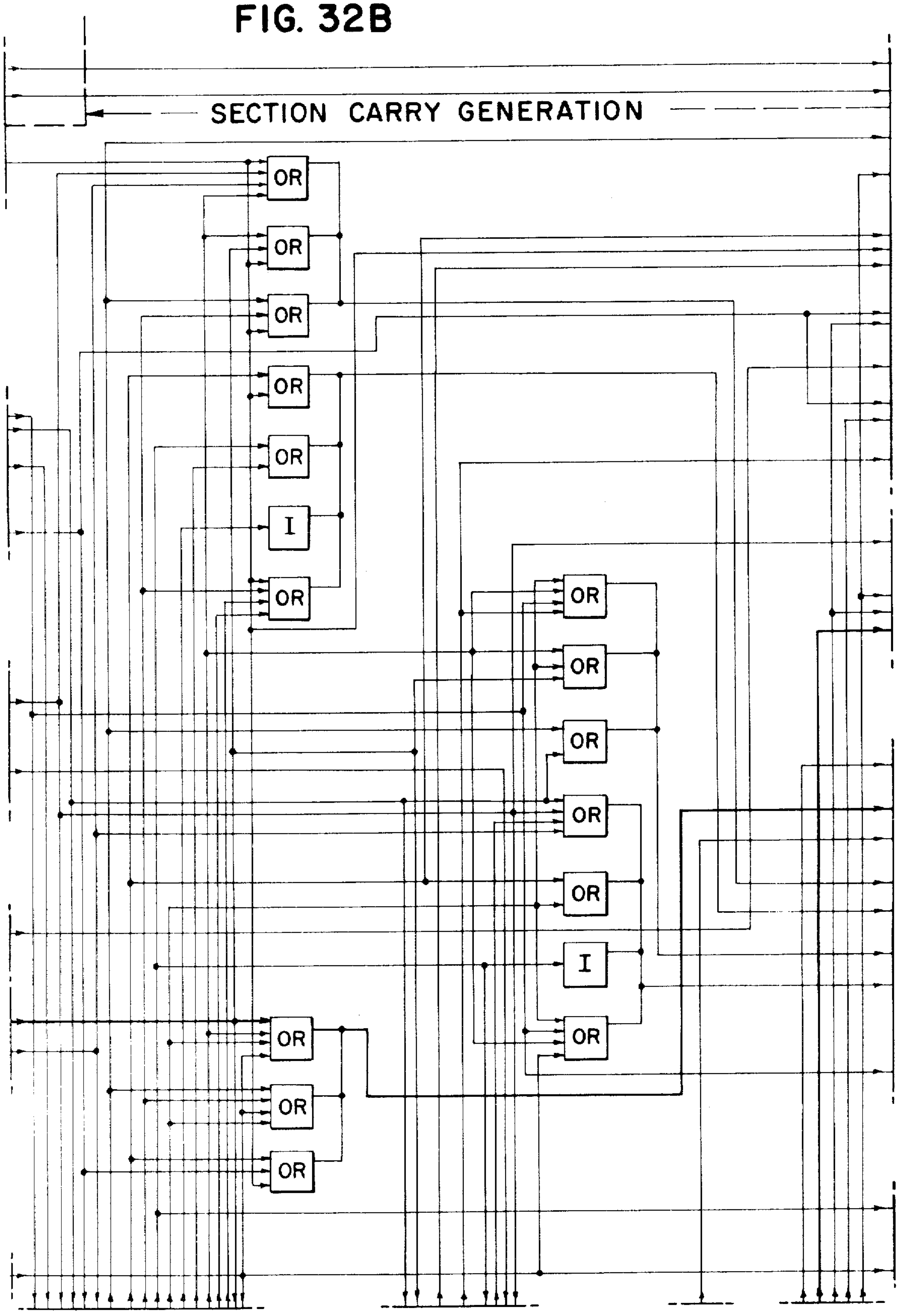
Figure 32C:
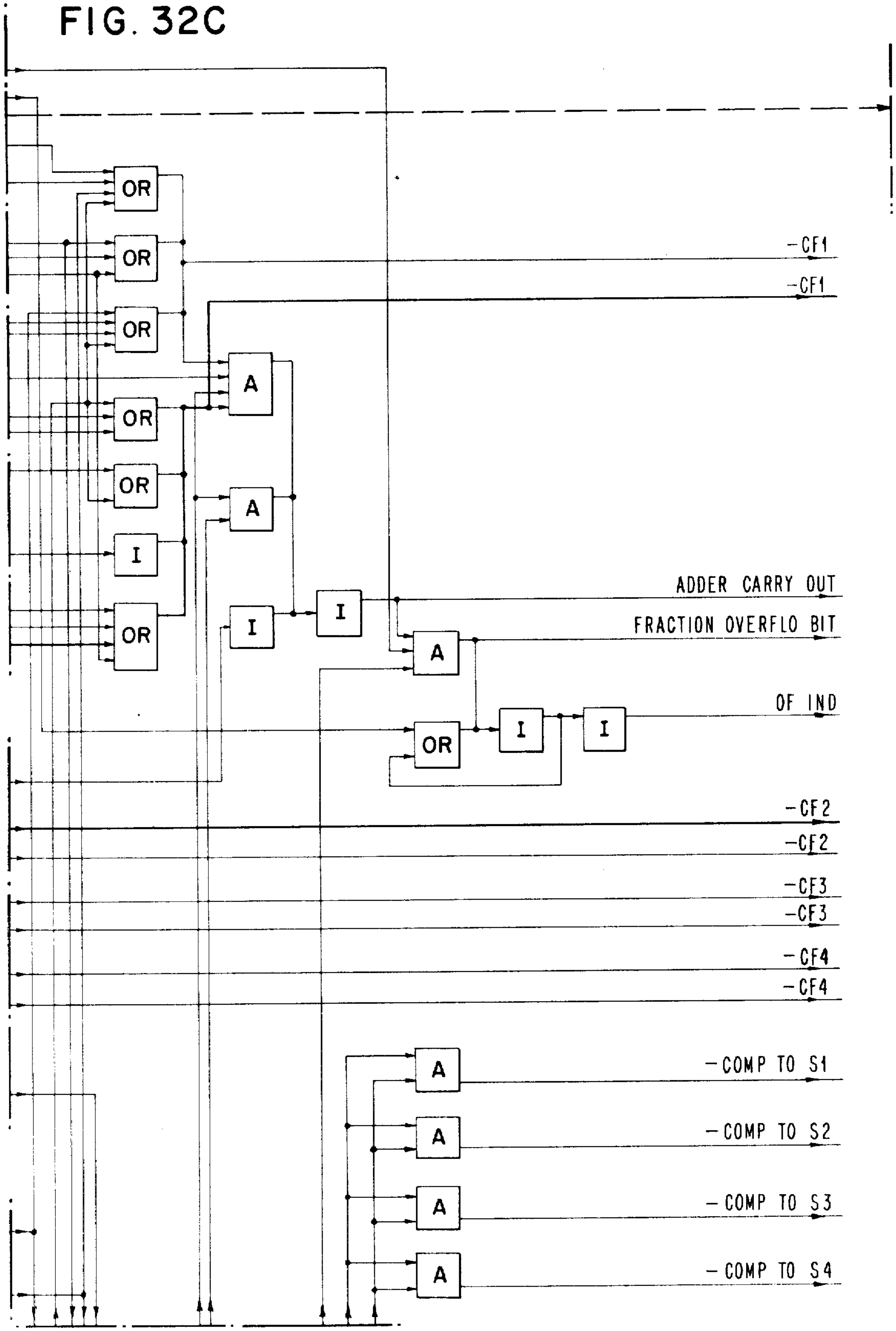
Figure 32D:
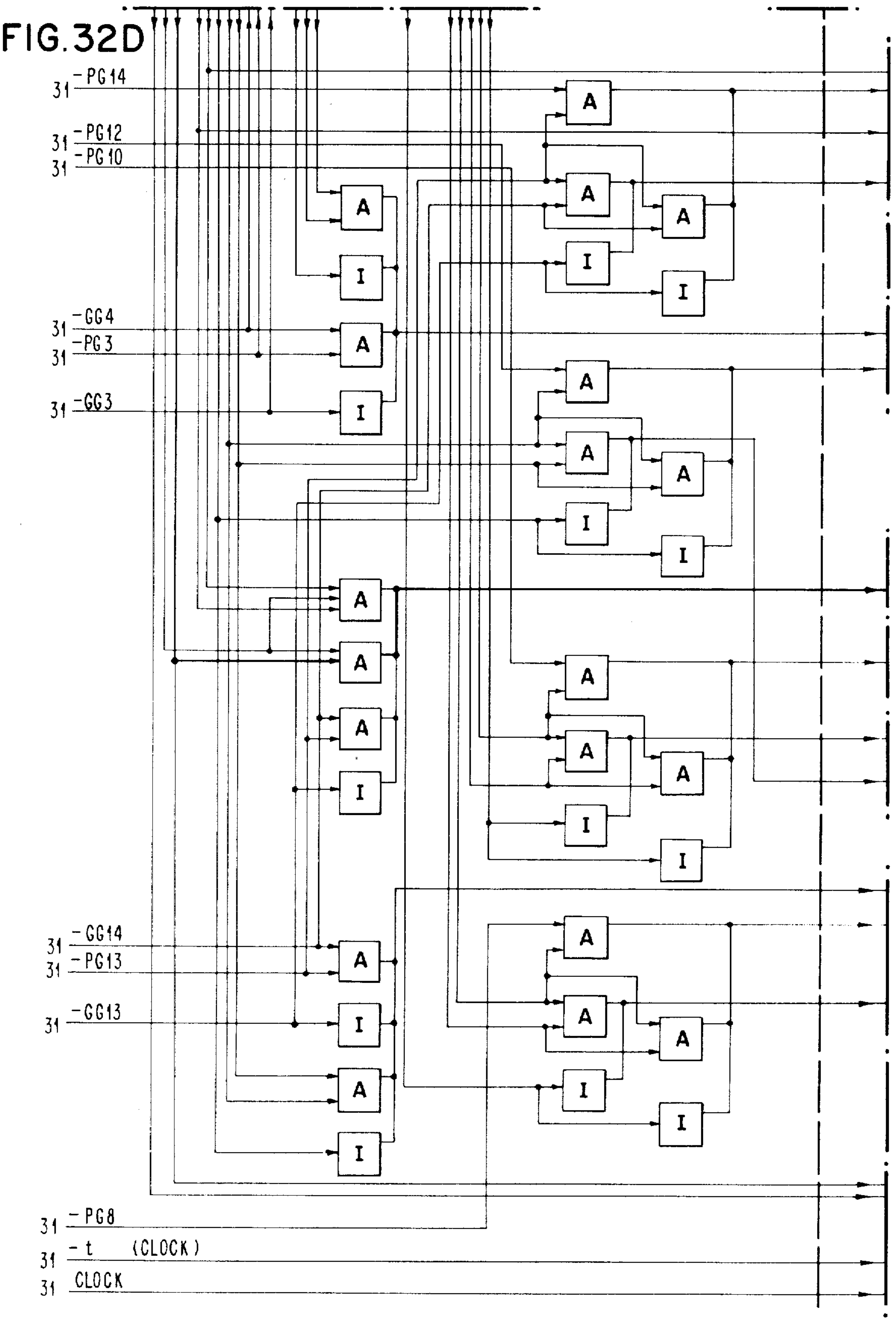
Figure 32E:
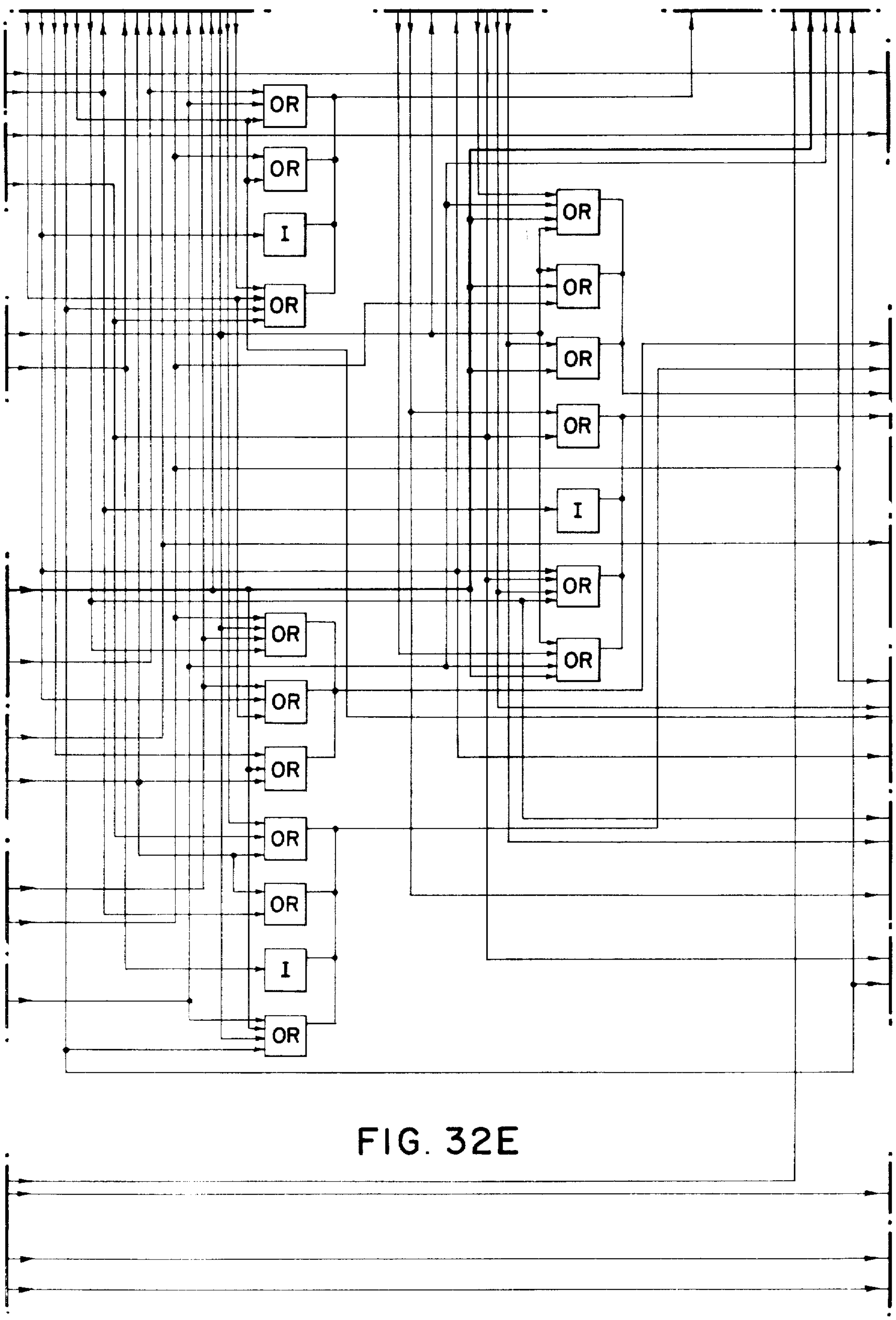

For example, while a particular embodiment of a highly parallel carry/look-ahead adder is illustrated as the Main Adder of FIGS. 31 and 32, it should be apparent that anyone of a large number of highly parallel carry/look-ahead-type adders could equally well be utilized. For example, a general reference to high-speed adders of this type is made to the article by O.L. MacSorley, entitled "High Speed Arithmetic in Binary Computers," appearing on page 67 of the January 1961 issue of the Proceedings of IRE.

It will further be noted that on a number of the drawings duplicate logical elements are shown for performing the same function. These are merely powering up stages to compensate for excessive fan-out i.e., where a great many circuits must be driven from a single logical output. These circuits have been left largely as they were designed as representing the best embodiment of the invention.

FIGURE 26

Figures 27, 27D:
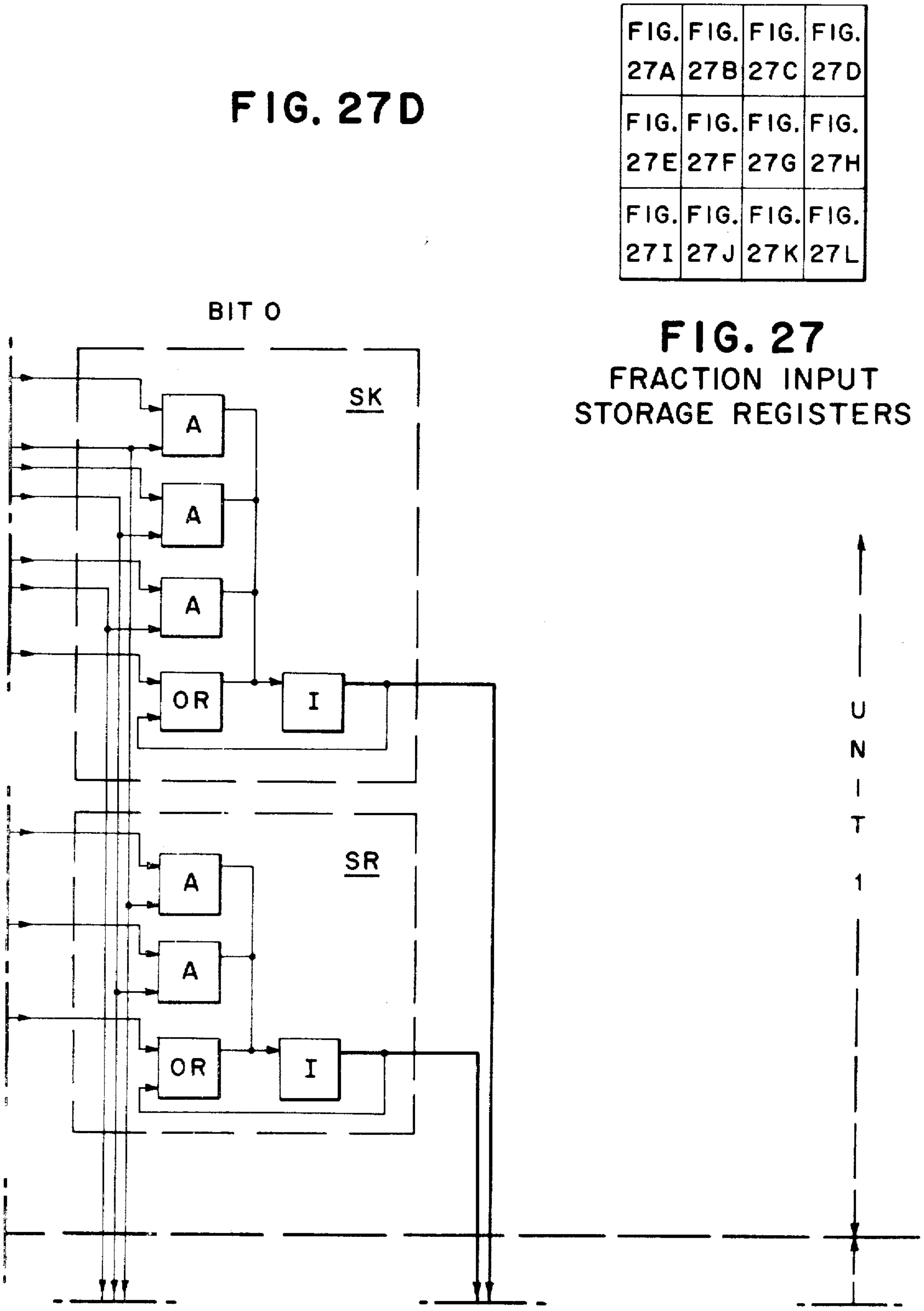
Figure 27A:
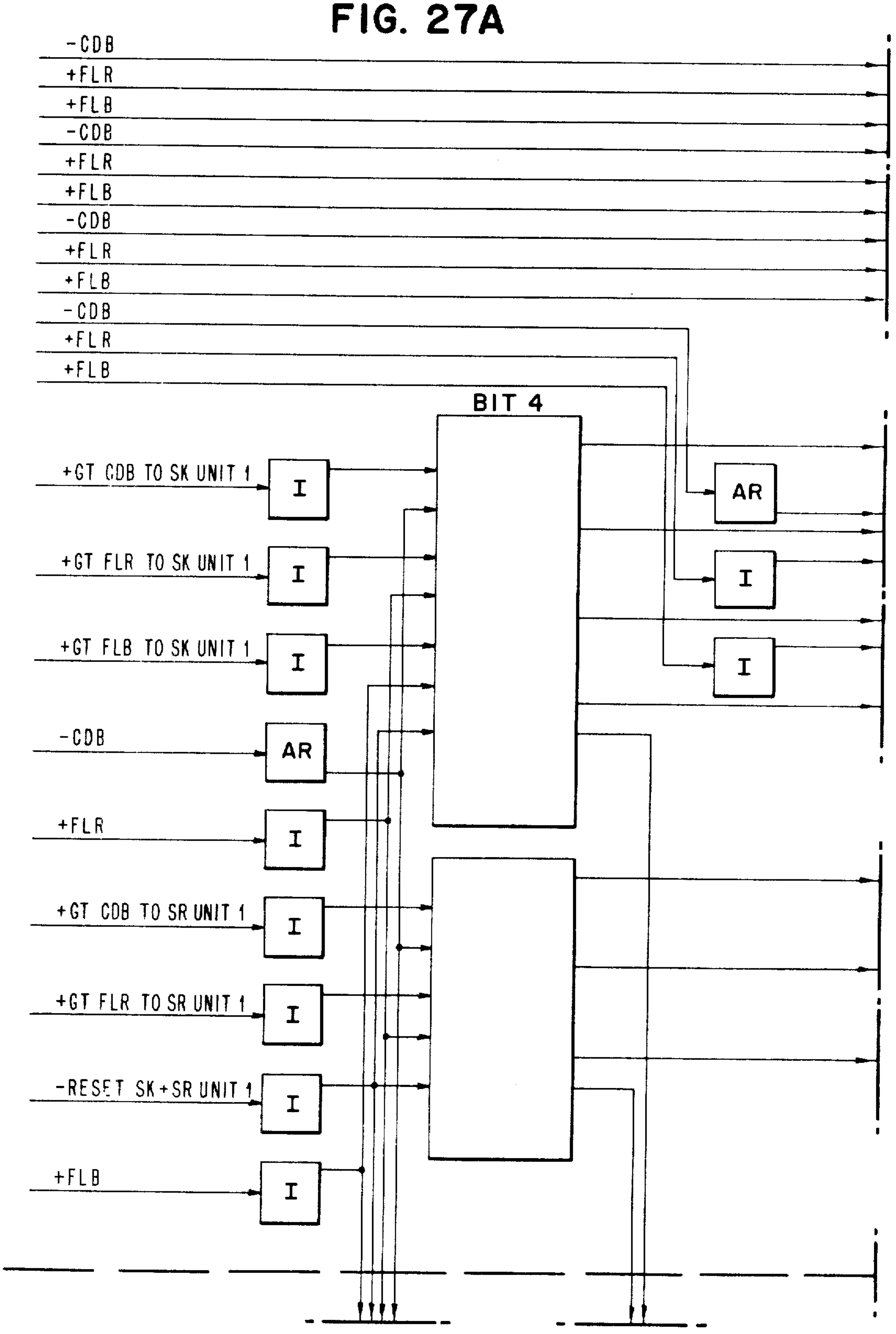
Figure 27B:
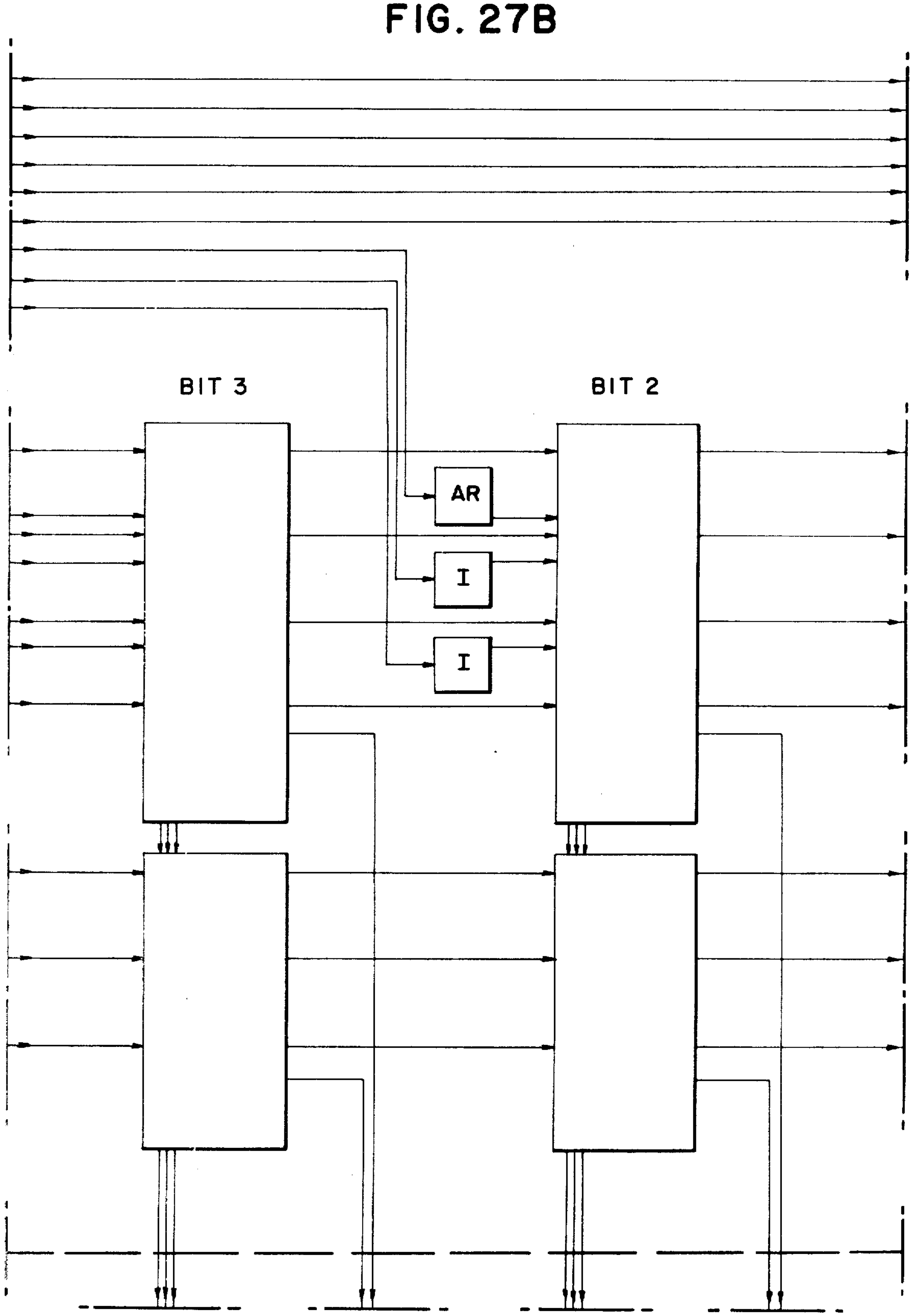
Figure 27C:
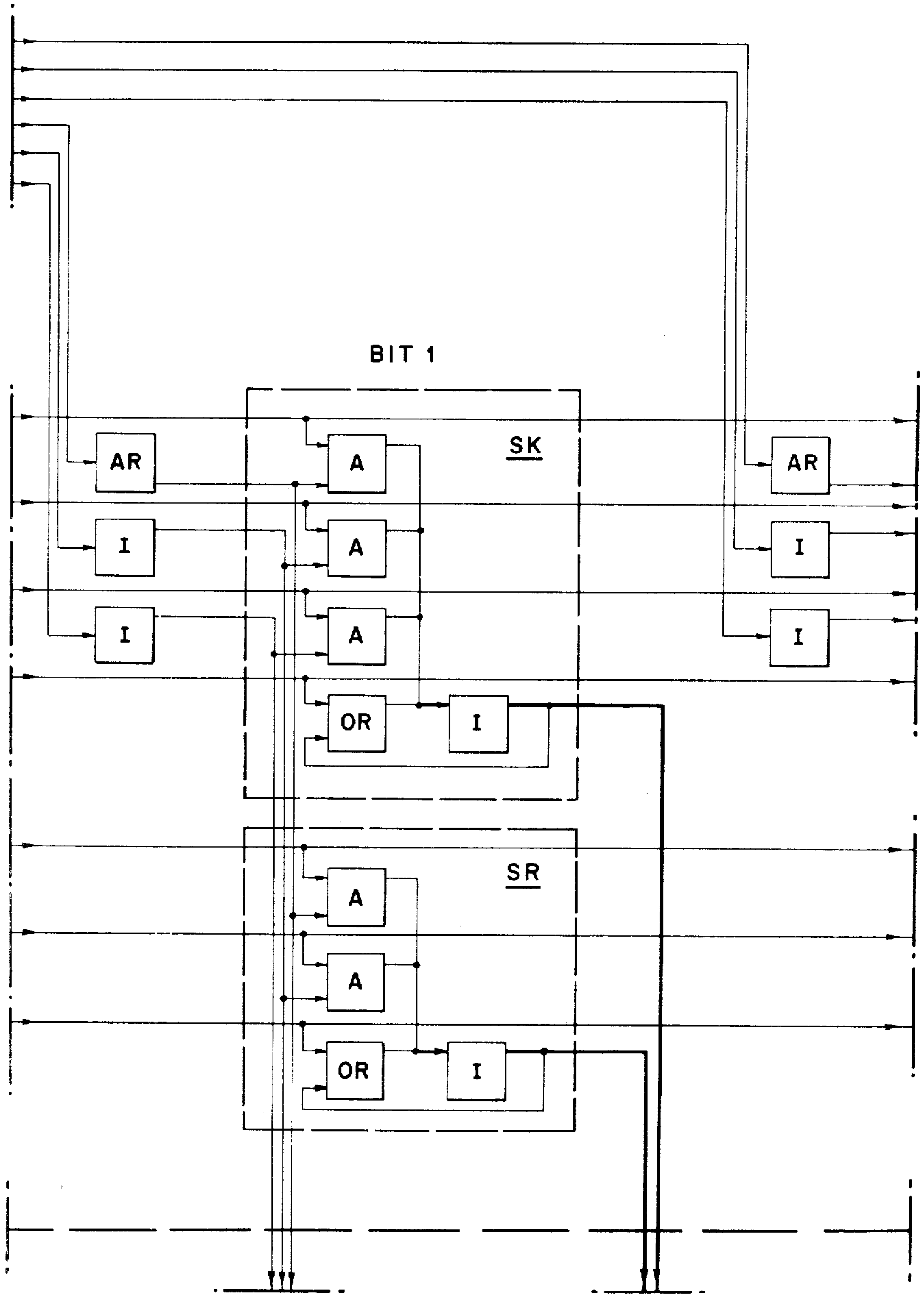
Figure 28:
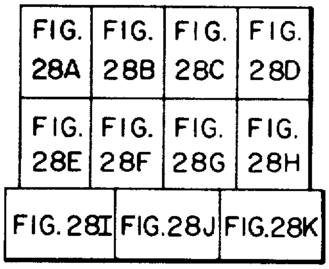
Figure 28A:
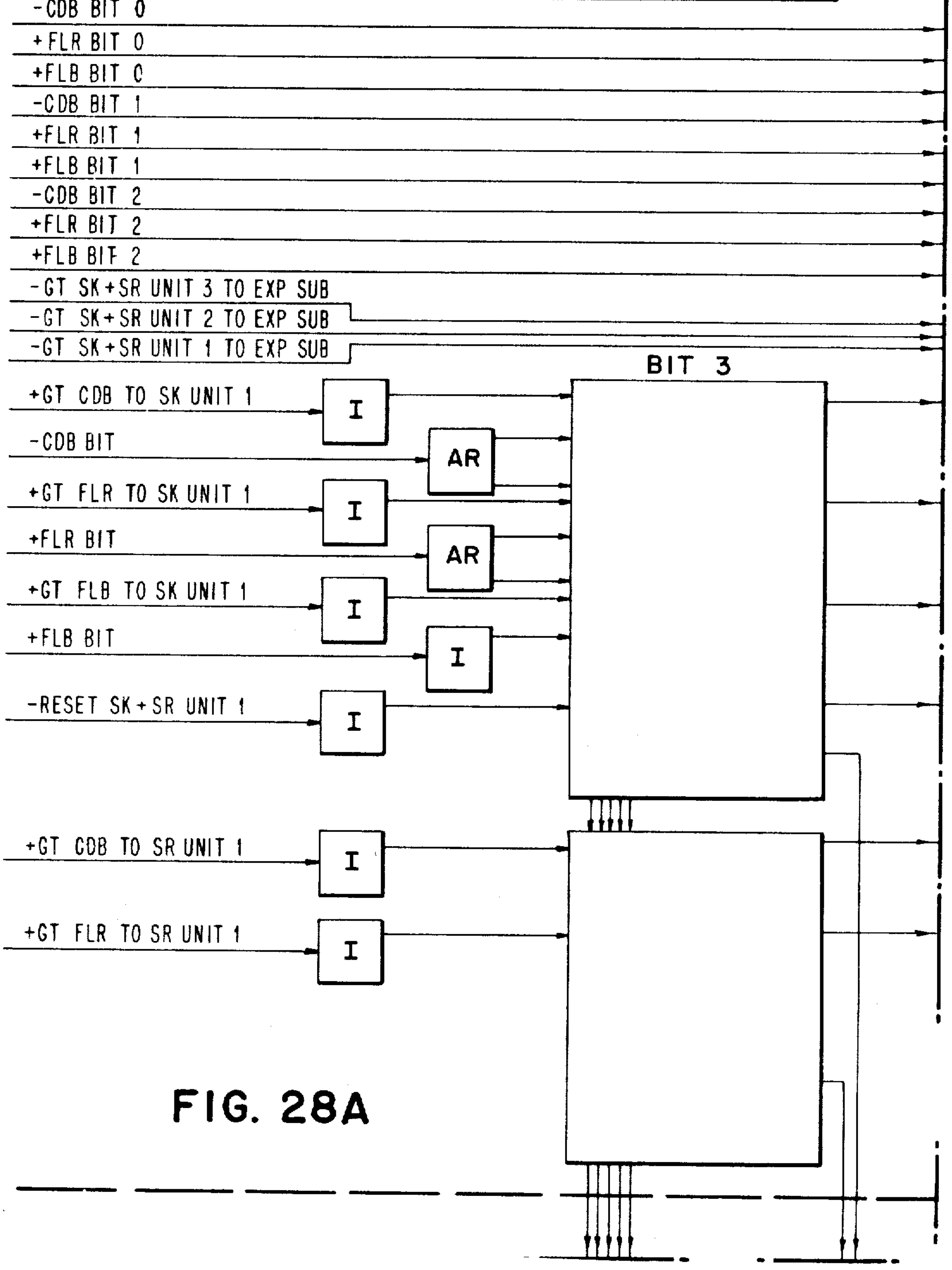
Figure 28B:
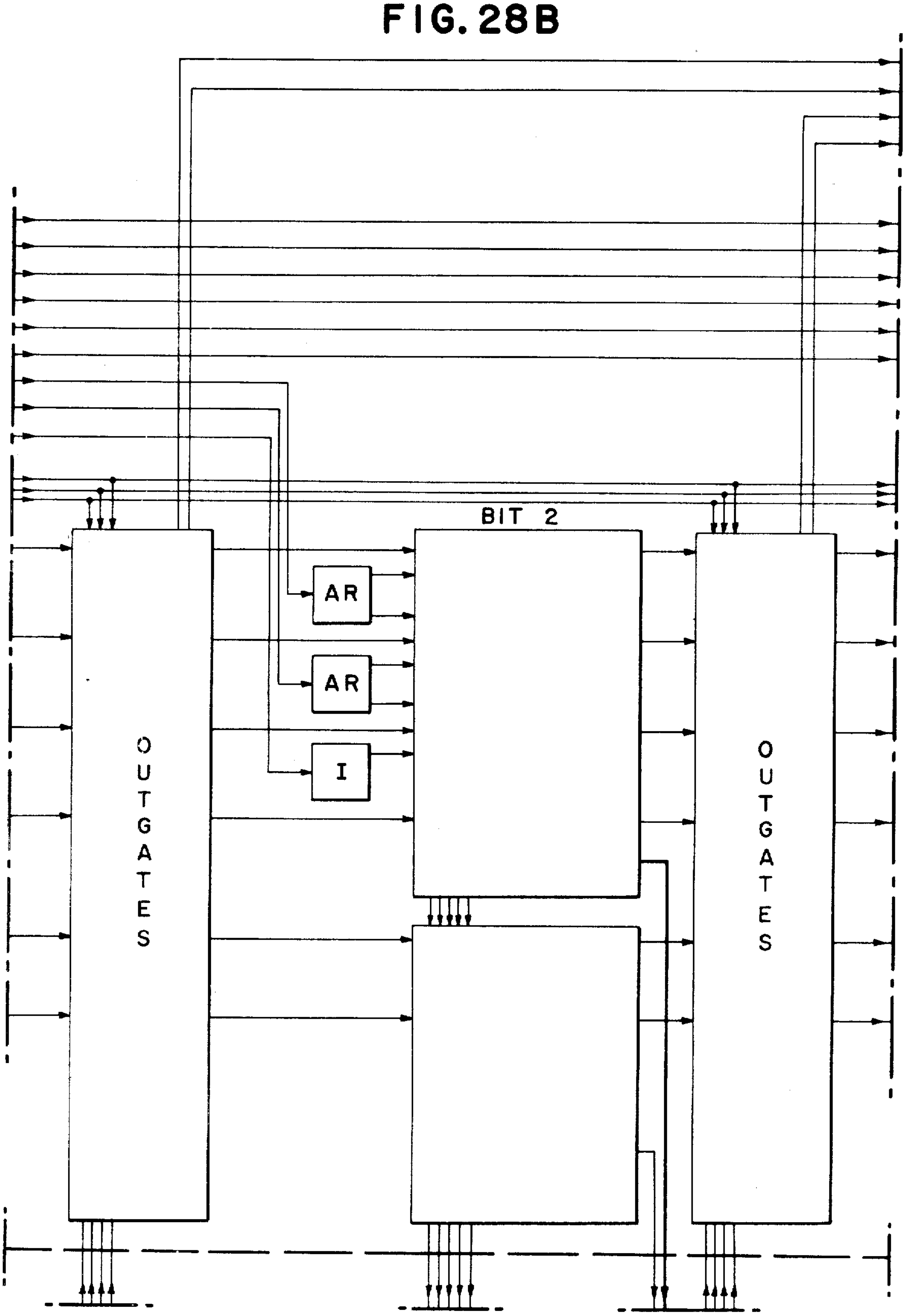
Figures 29, 29K:
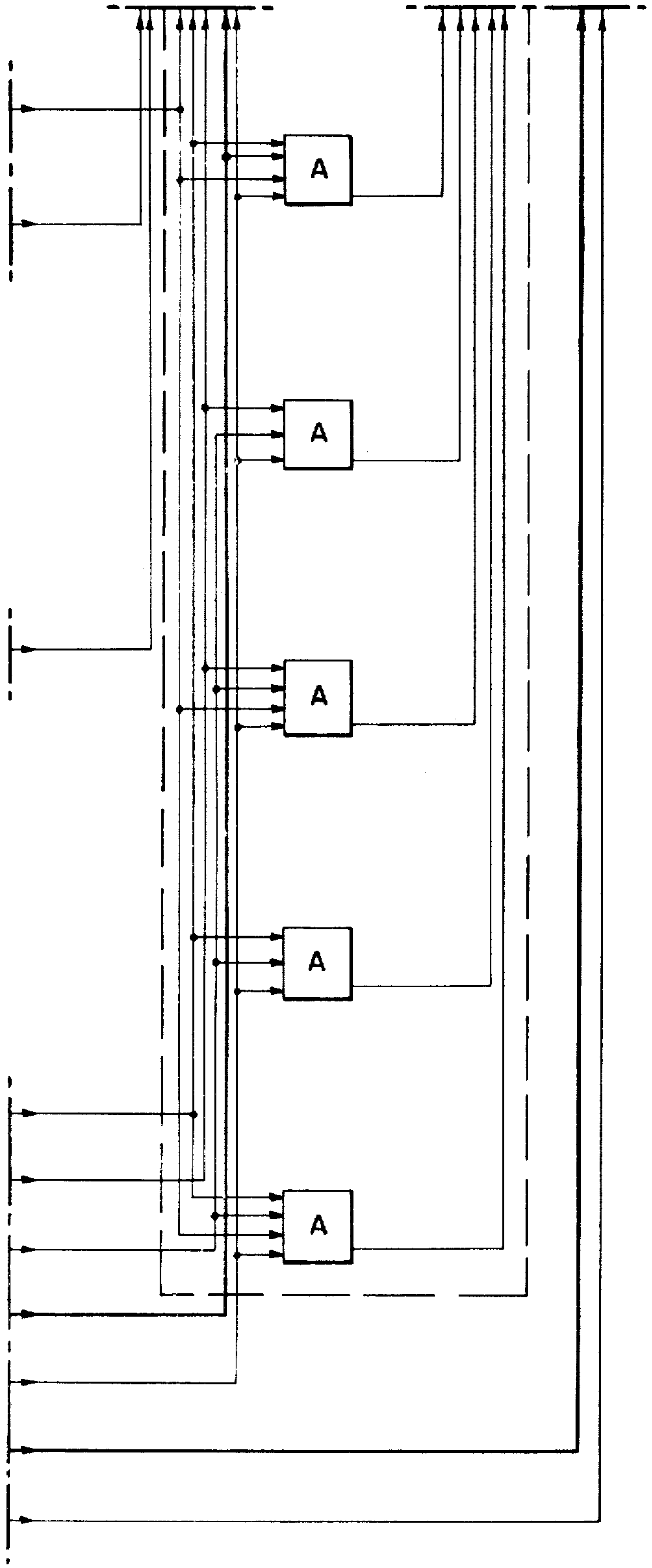

This FIG. constitutes a combination functional block diagram data flow chart and organizational diagram for FIGS. 27 through 36. As will be noticed, the individual blocks of this FIG. contain the same functional names as those in FIG. 17. Thus, FIG. 29 is entitled Sign Gate (586), Digit Preshift, (592), True/Complement (591). For those blocks of FIG. 26 indicating more than one function, it will be appreciated that the logical circuitry necessary to perform, for example, the previously enumerated functional operations is all contained in the designated logical schematic diagram. It is further apparent that certain of the blocks reference only one function and thus one functional unit from FIG. 17. In this case, only the logical circuitry necessary to perform the single function is disclosed. Thus, FIG. 26 indicates the data flow path through the present adder system and also the relative interconnection of the various functional units. It further clearly specifies the particular functional units of FIG. 17 which are disclosed on the various logical schematic composites.

FIGURE 27

FIGS. 27A through 27L constitute a logical schematic diagram of the input storage registers. As was stated previously in the specification relative to FIGS. 5 and 17, the fraction input registers and exponent input registers comprise three Units, 01, 02, and 03. These units are indicated on FIG. 27 by the horizontal discontinuous lines. Each unit is indicated as having a bit storage position for both the sink (SK) and source (SR) registers. As will be further seen from the drawings in FIGS. 27C and 27D which specifically show the individual logic for the bit position 0 and the bit position 1 for both the source and sink registers the upper or sink storage position may receive its input from one of the source busses indicated as CDB, FLR or the FLB. The lower or source bit storage position receives data from the CDB or FLR busses. These inputs are shown generally at the left-hand side of the drawing and are clearly labeled.

Figure 27E:
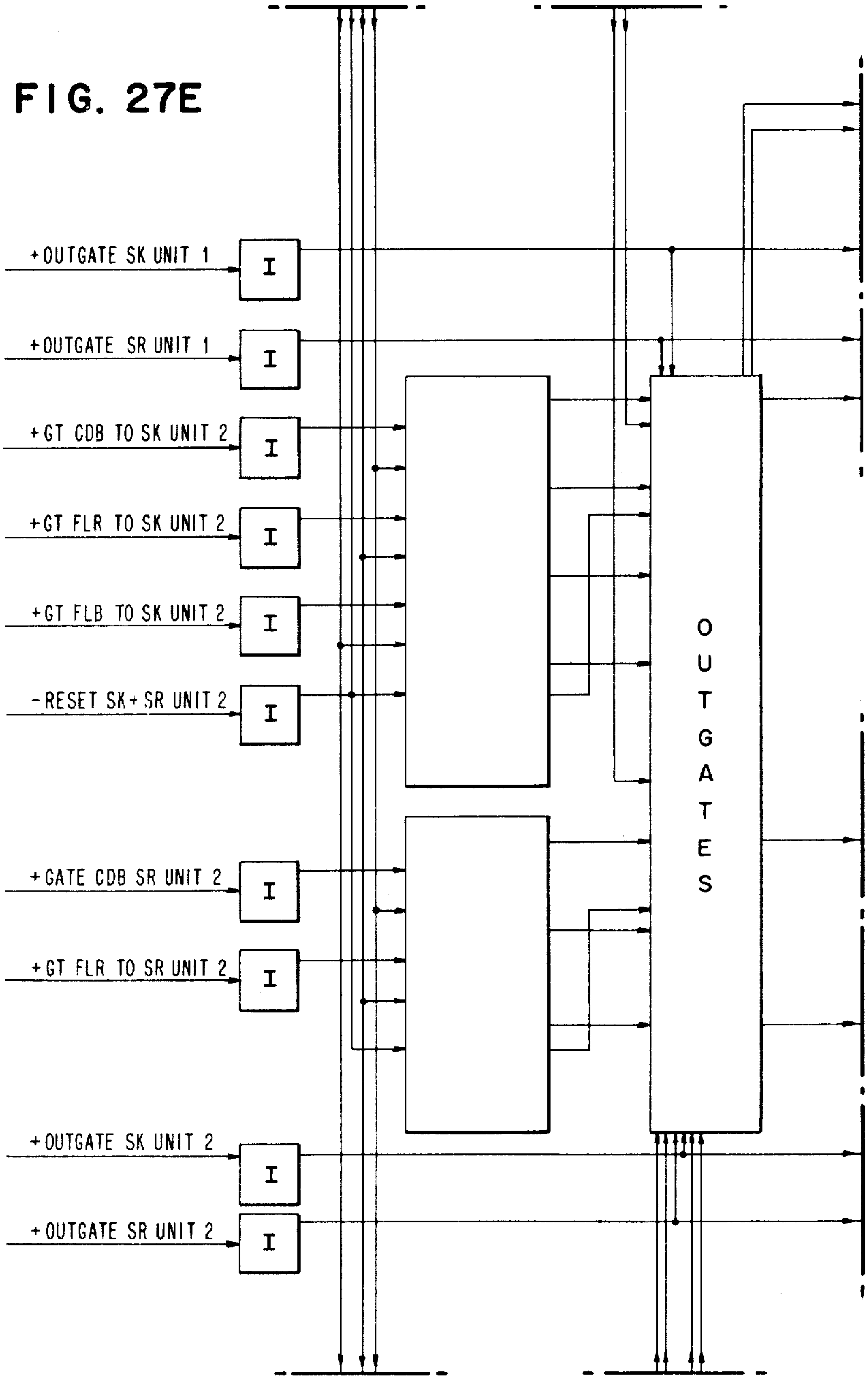
Figure 27F:
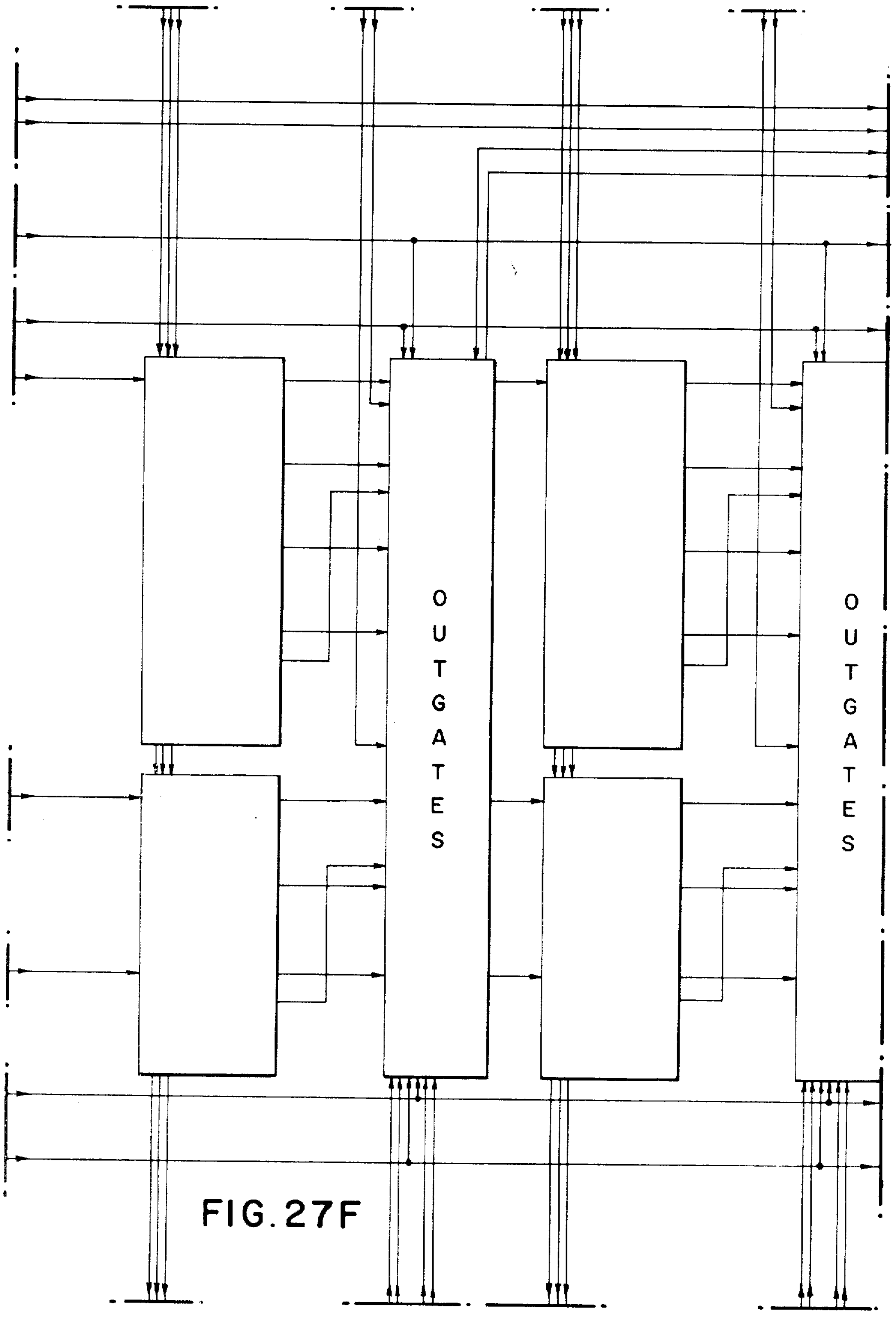
Figure 27G:
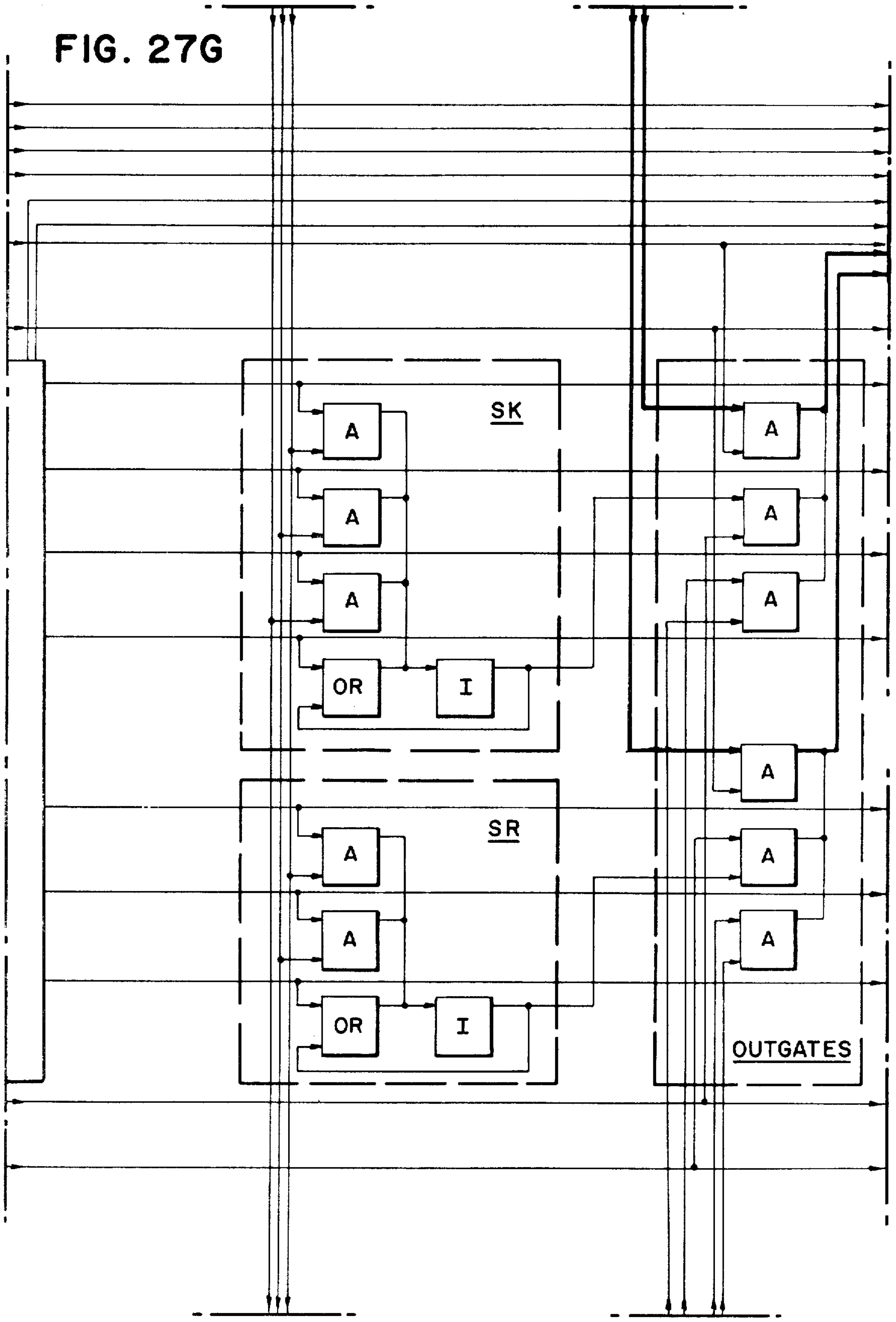
Figure 27H:
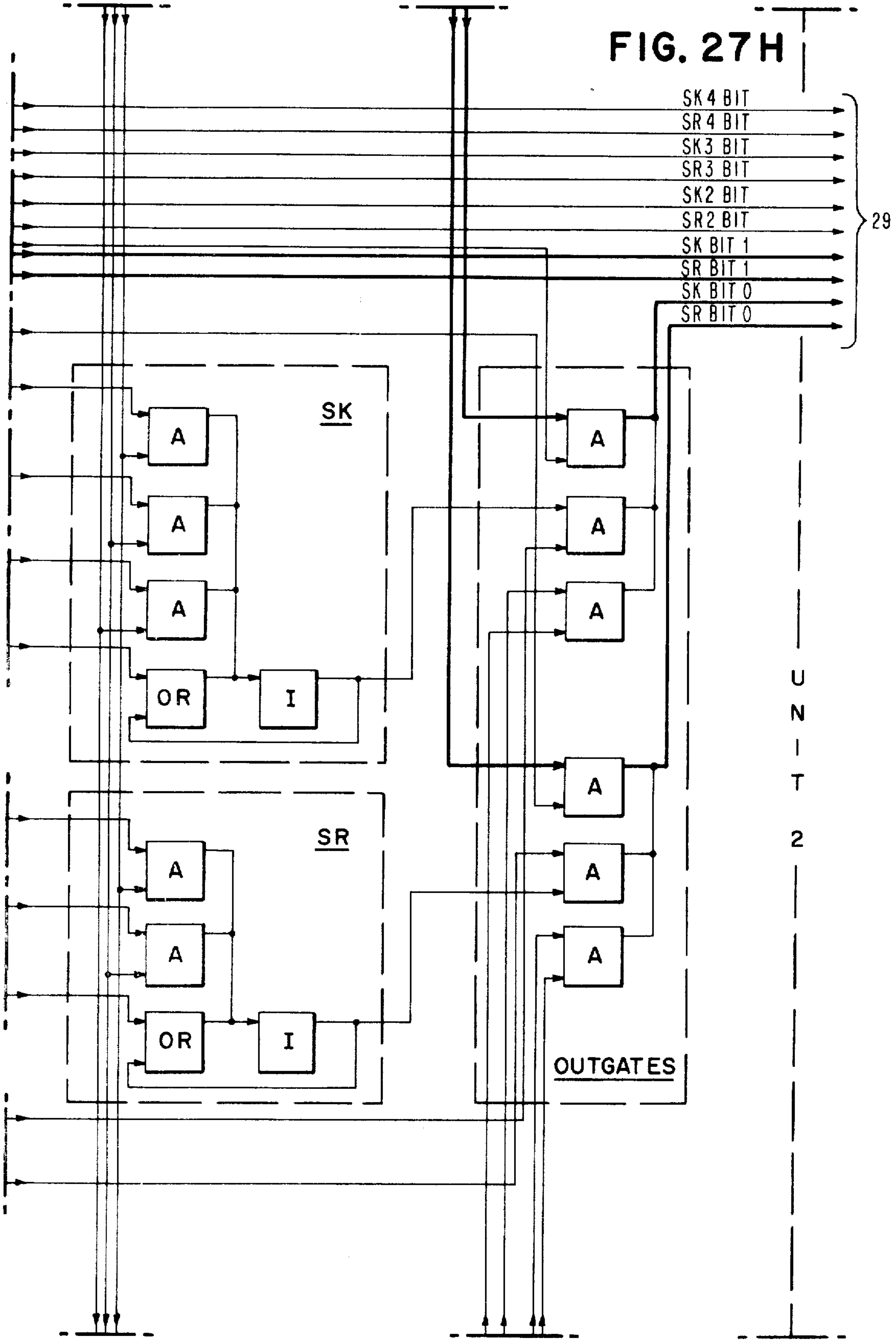
Figure 27I:
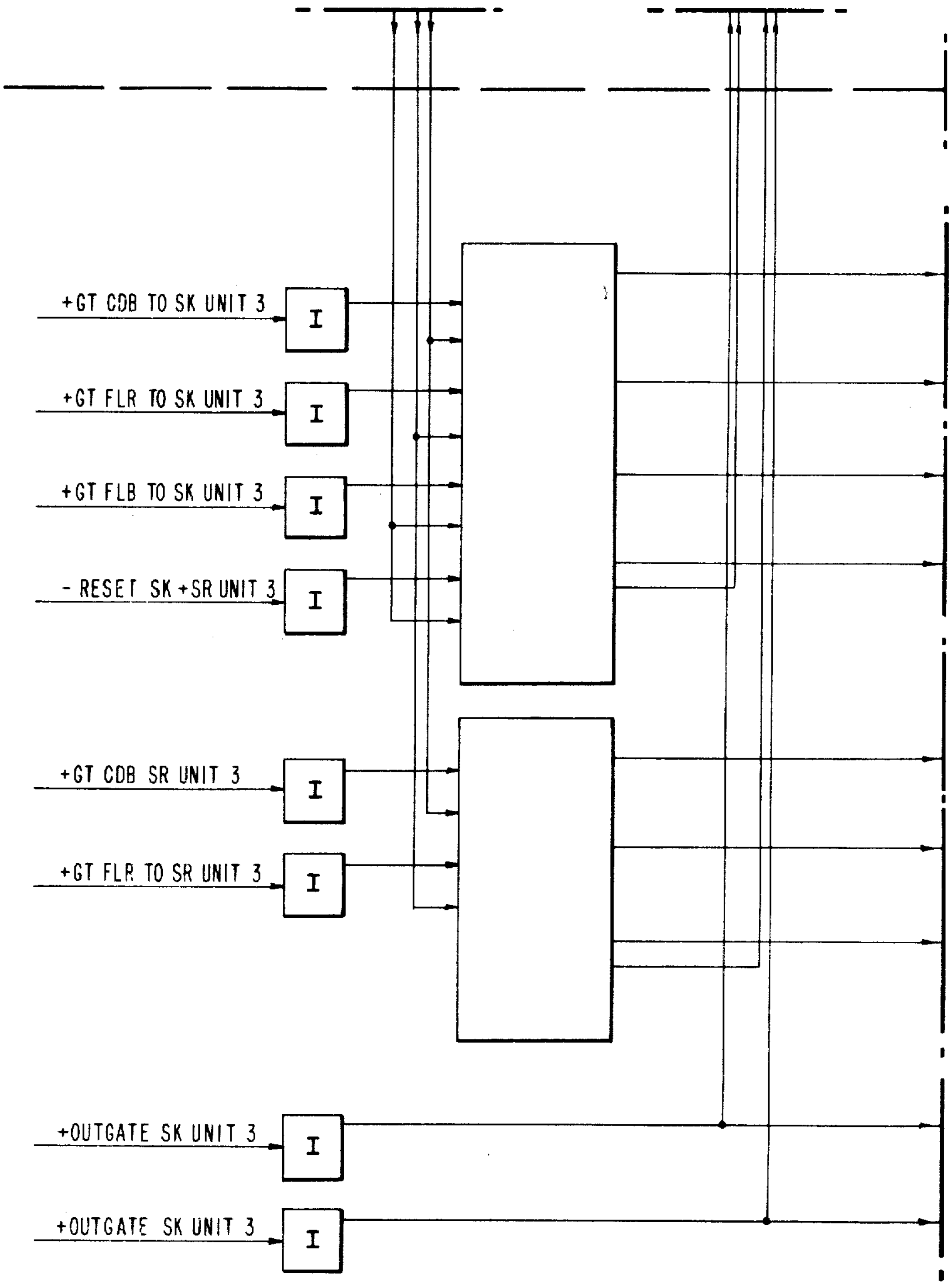
Figure 27J:
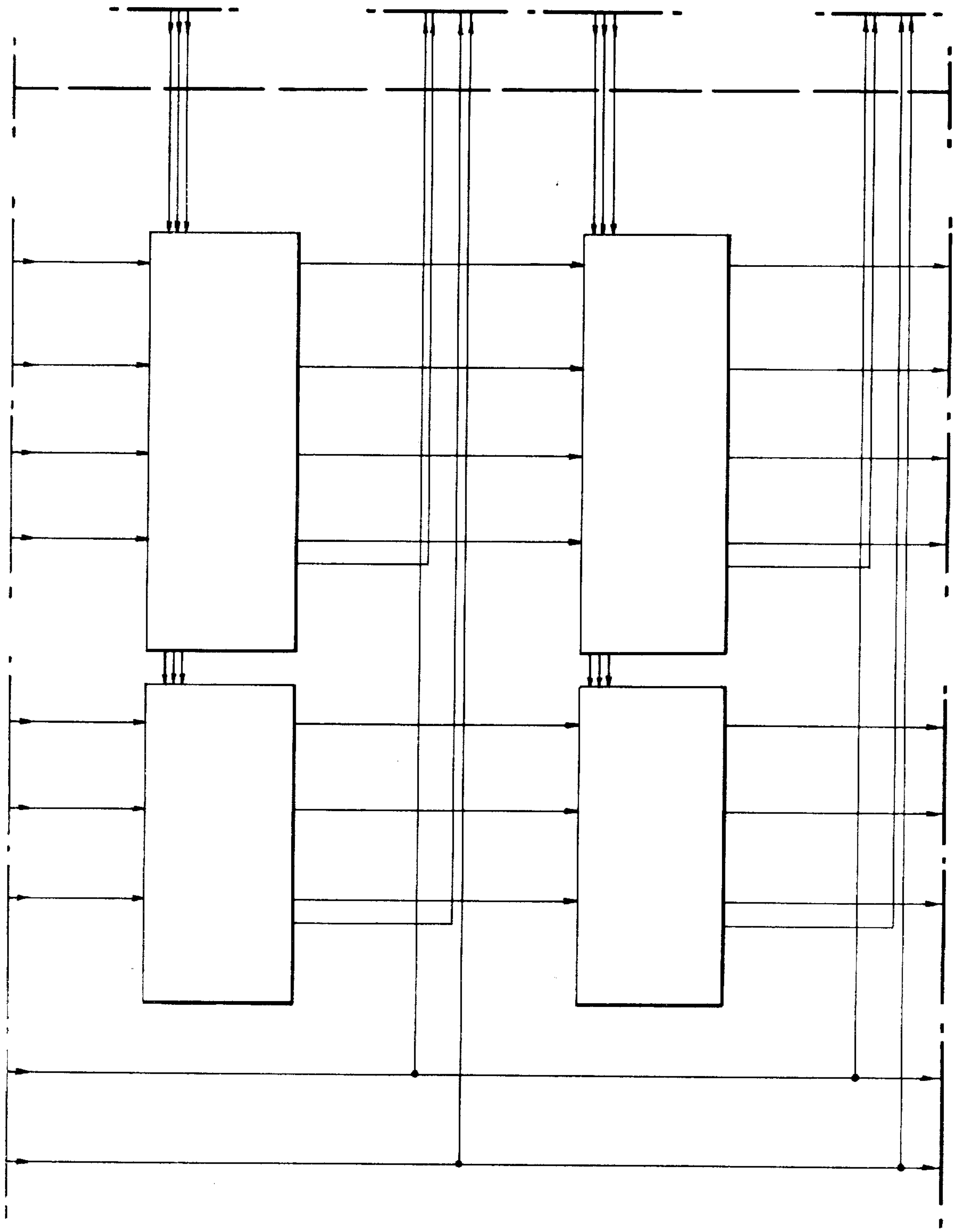
Figure 27K:
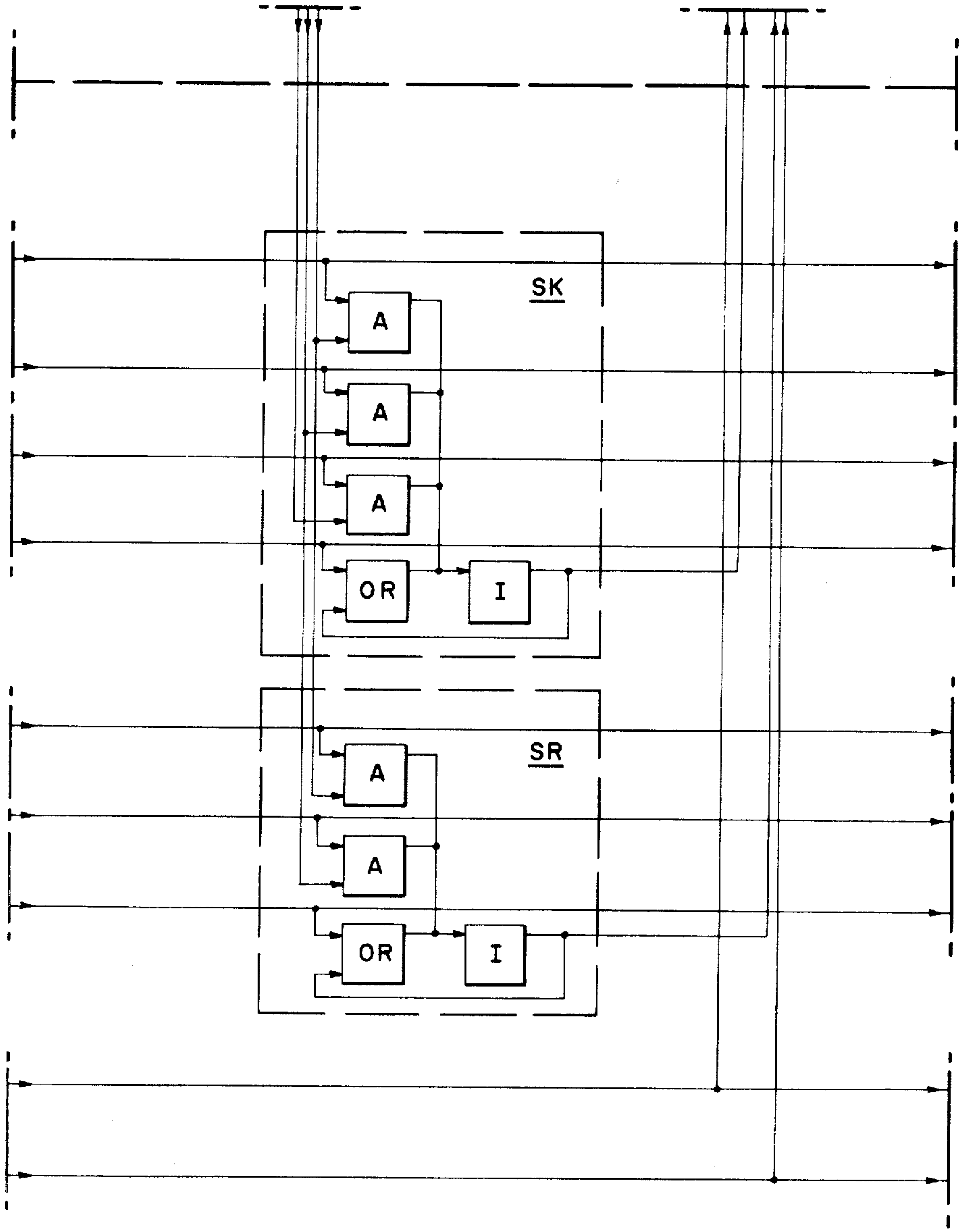
Figure 27L:
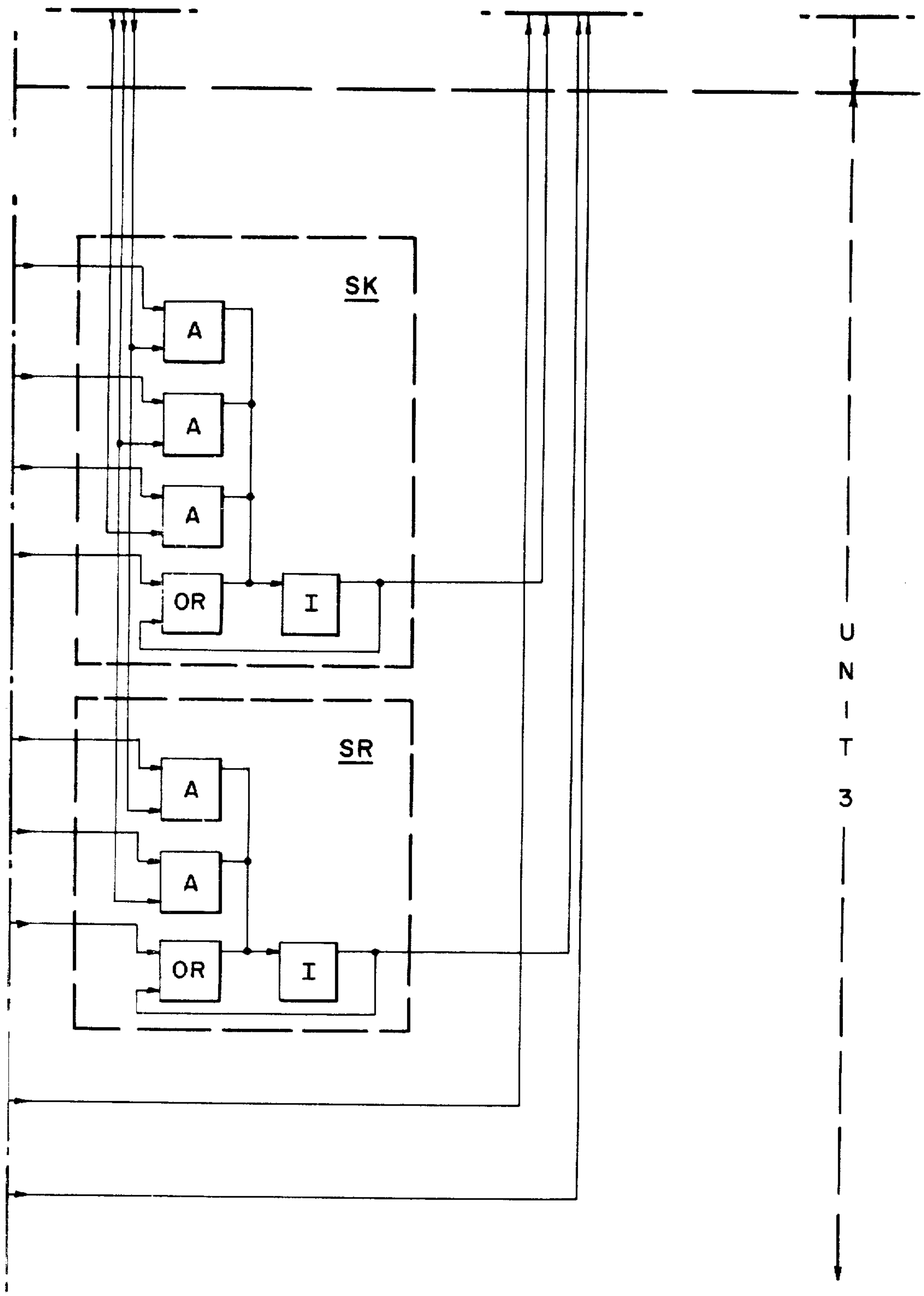

The outgates are shown in detail on FIGS. 27G and H and are appropriately labeled.

The outgates function to gate data from the storage registers to the subsequent adder circuitry. There is an outgate for each bit position which serves selectively Unit 1, 2 or 3. Thus, there are six AND gates in each outgate block. The upper AND gate in each group of three shown serves to gate out this sink and source register of Unit 1 and the next two AND gates serve Unit 2 etc.

It will be readily appreciated by examining the two sets of detailed outgates and the four heavy lines emanating therefrom, that the other inputs to the four AND circuits, which are shown energized, are provided by the Outgate SK Unit 1 and Outgate SR Unit 1 input lines on FIG. 27E. Thus, these two lines control the outgates for the entire Unit 1. The similarly labeled lines provide the outgating circuitry for Unit 2 and Unit 3. Thus, when the two aforementioned outgate lines are energized all of the outgates shown in FIGS. 27E, 27F, 27G. and 27H are similarly energized so that all of the bit positions of Unit 1 for both the sink and source register storage positions will be gated out over the specified output line.

While only 5-bit storage positions are shown in the logical schematic for this section, it is of course to be understood that there would be 56 such bit storage positions in the complete 56-bit fraction storage sections, however, each 5-bit section would be essentially like that shown in the composite of FIGS. 27A through 27L.

FIGURE 28

This FIG. comprises a logical schematic diagram of the exponent and sign input of storage registers shown in FIG. 26 and comprising the exponent magnitude section of the input registers shown on FIG. 17. This set of registers is virtually the same in organization as the fraction input storage registers shown in FIG. 27. The FIG. is also similarly organized in that Unit 1, Unit 2 and Unit 3 are shown as horizontal segments. The primary difference between the fraction and exponent input stations is that the exponent input registers contain two sets of outgates. These are shown in FIGS. 28C, D and J. As indicated in the drawings the upper pair of outgates on FIGS. 28C, and D perform the function of gating the exponent into the Exponent Subtractor 582. The lower pair of outgates on FIG. 28K perform the function of gating the selected sink or source exponent which ever was determined to have been larger to the Exponent Update Adder 609.

As stated previously, the actual bit storage logic is the same for the exponent as for the fraction. Referring to the bit positions 0, 1, FIGS. 28C and 28D5 it will be noted that the upper or sink (SK) portion of the register comprises three AND gates 2000, 2002, and 2004. These form the three input gates to this register since as was stated previously, especially with reference to both FIGS. 5 and 17, in the specification, the sink register may receive its input from either CDB, FLR, or FLB busses. These input lines are clearly labeled at the right-hand portion of FIG. 28. Similarly, the source (SR) register comprises two input AND gates 2010 and 2012. This register may be loaded from either the CDB or FLR bus. In both bit storage positions, it will be noted that the actual holding or storage portion of the circuit comprises the OR circuit 2006 and the inverter 2008 for SK register and the OR circuit 2014 and inverter 2016 for the SR register. Referring again to the drawings and especially the outputs from the 2 bit positions in Unit 1, which are shown, the heavy line indicates the output path that these registers take when information is gated to the exponent subtractor and subsequently to the exponent update adder during the various stages of system operation.

Figure 28C:
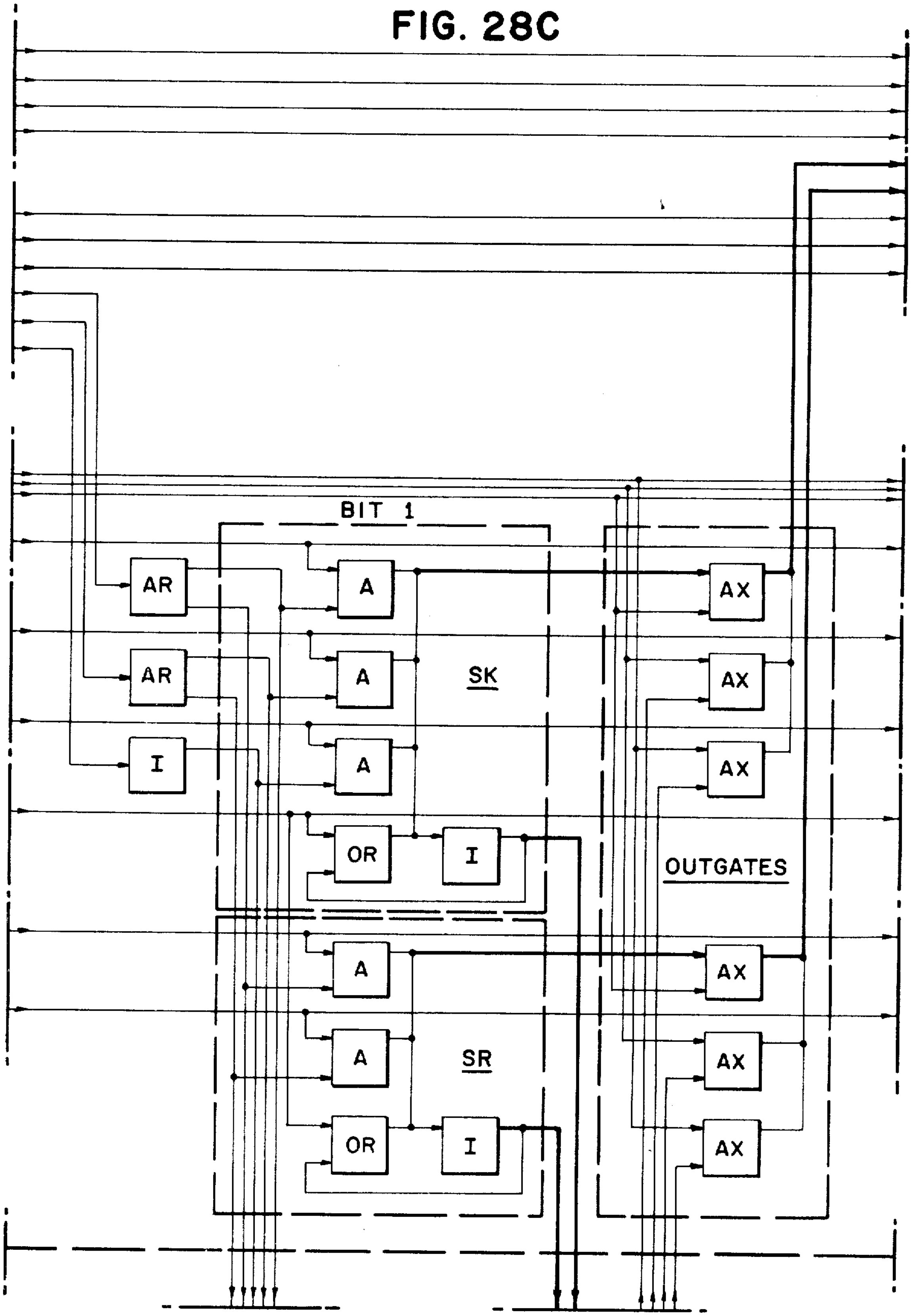
Figure 28D:
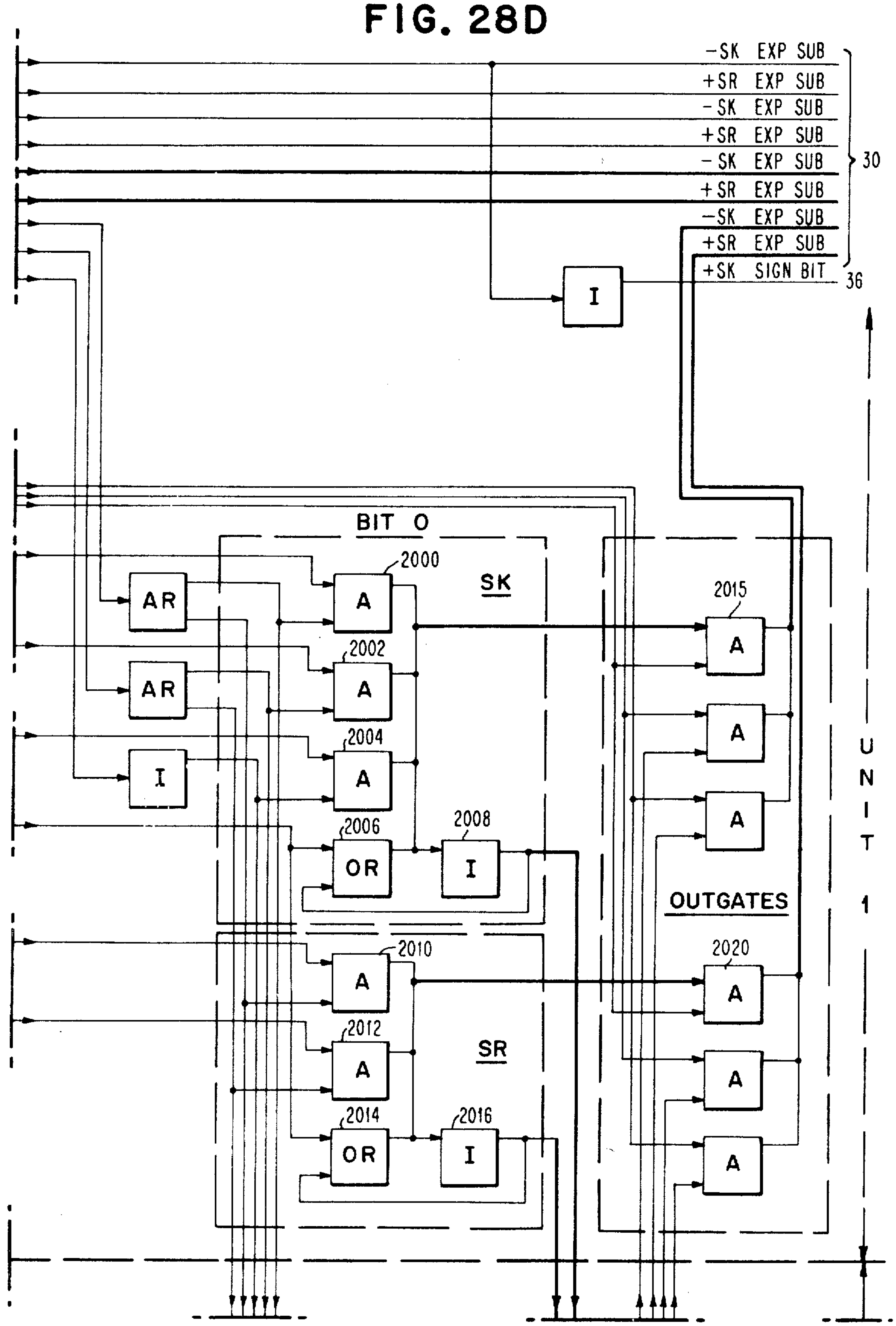
Figure 28E:
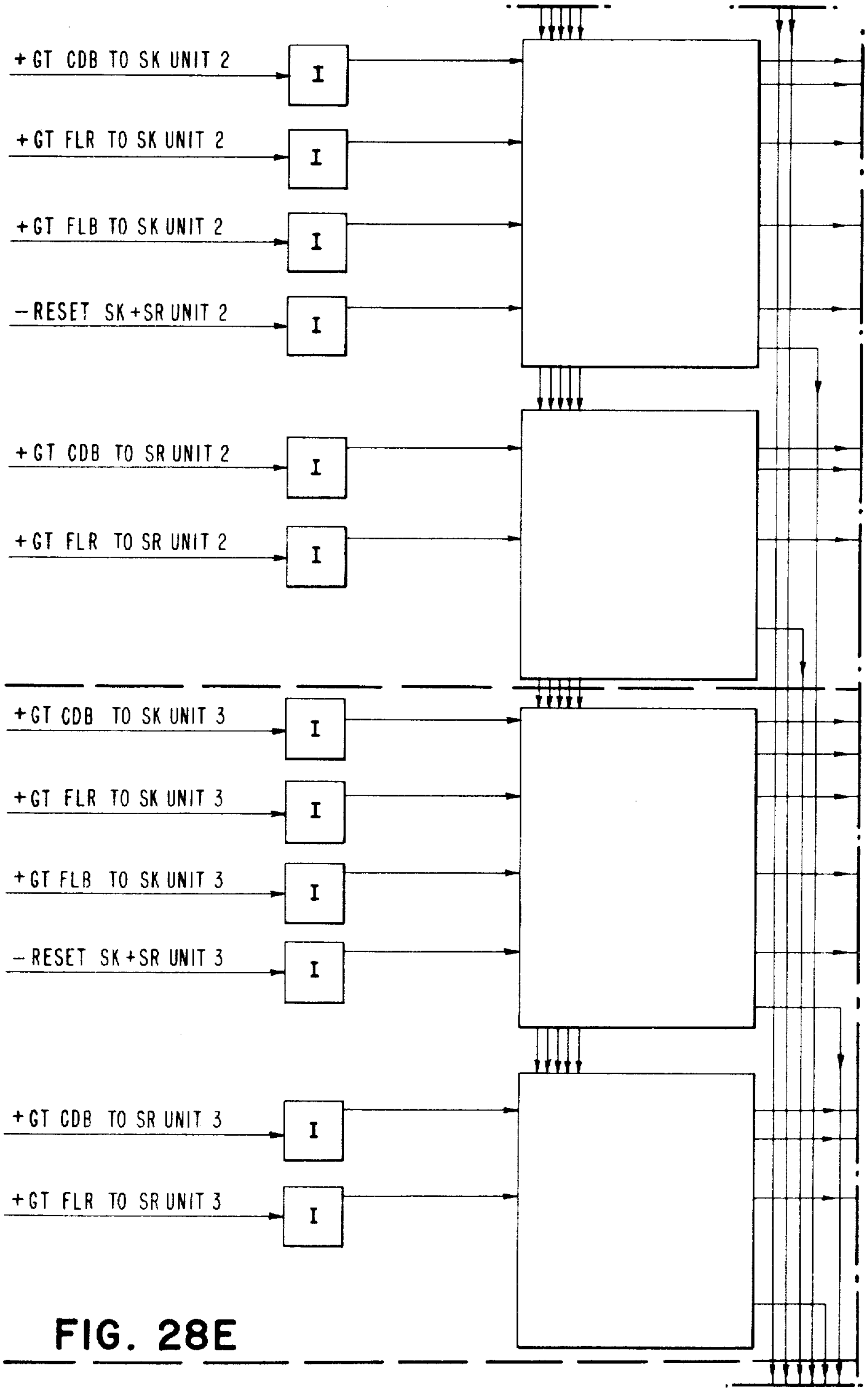
Figure 28F:
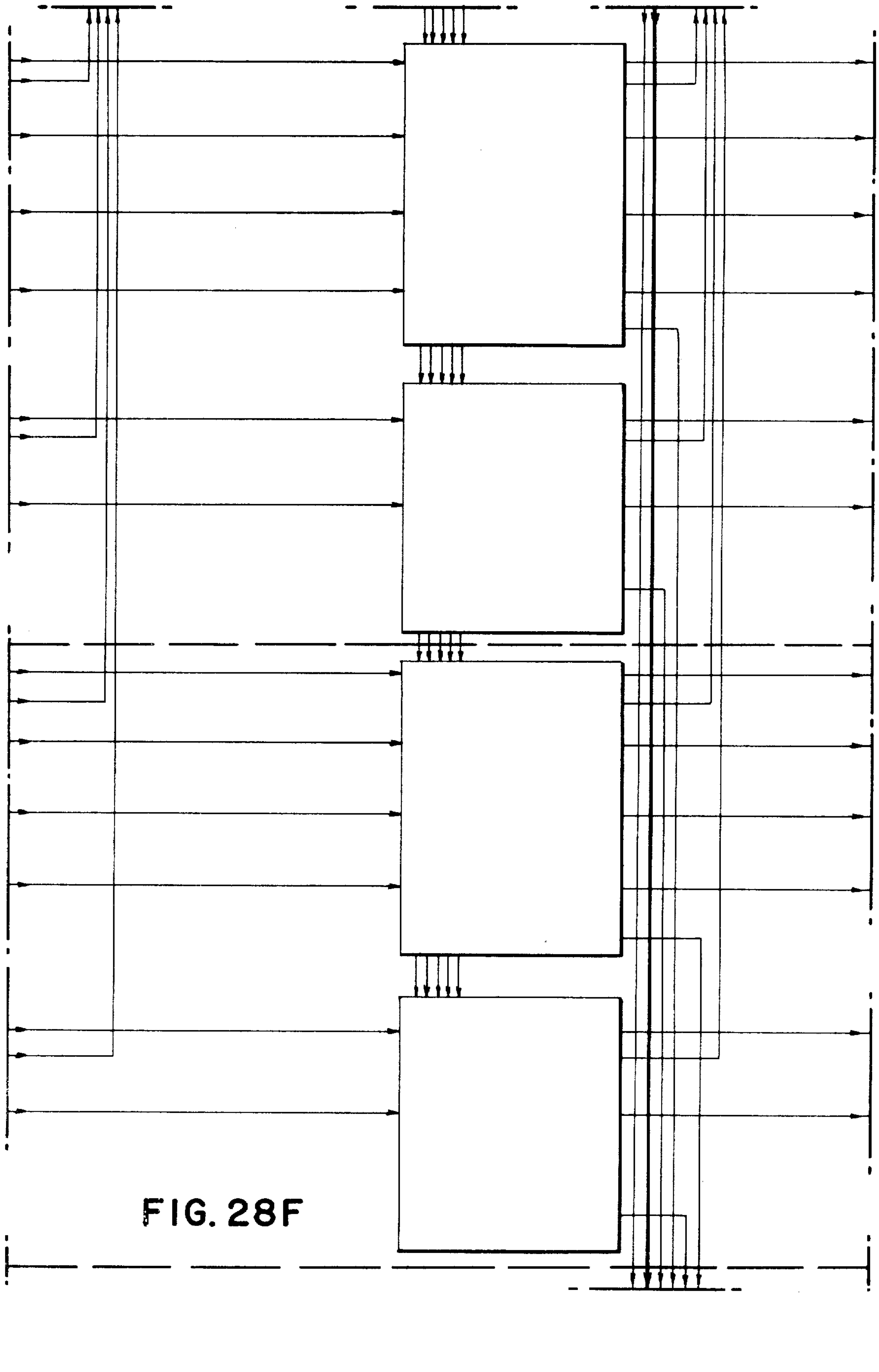
Figure 28G:
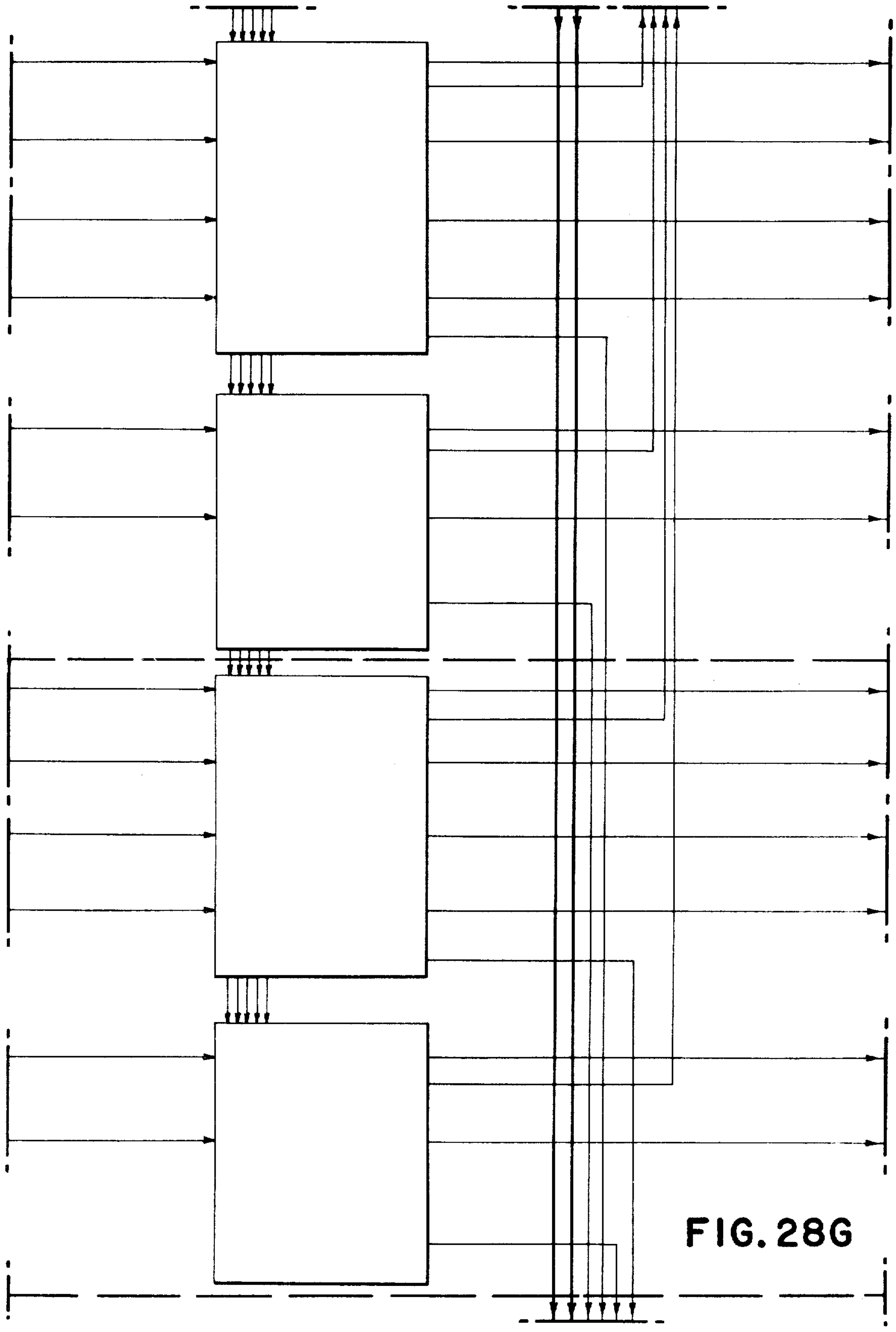
Figure 28H:
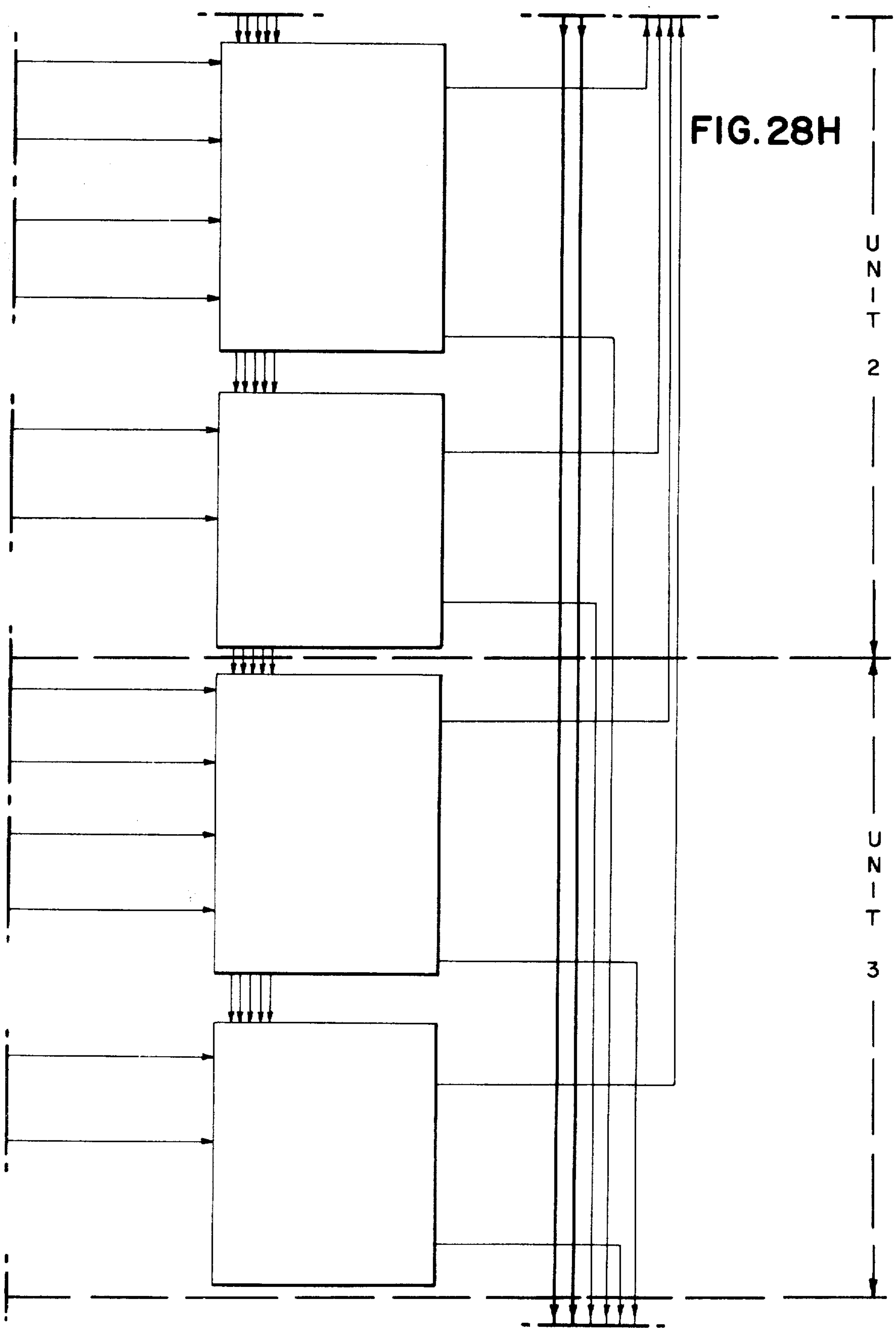
Figure 28I:
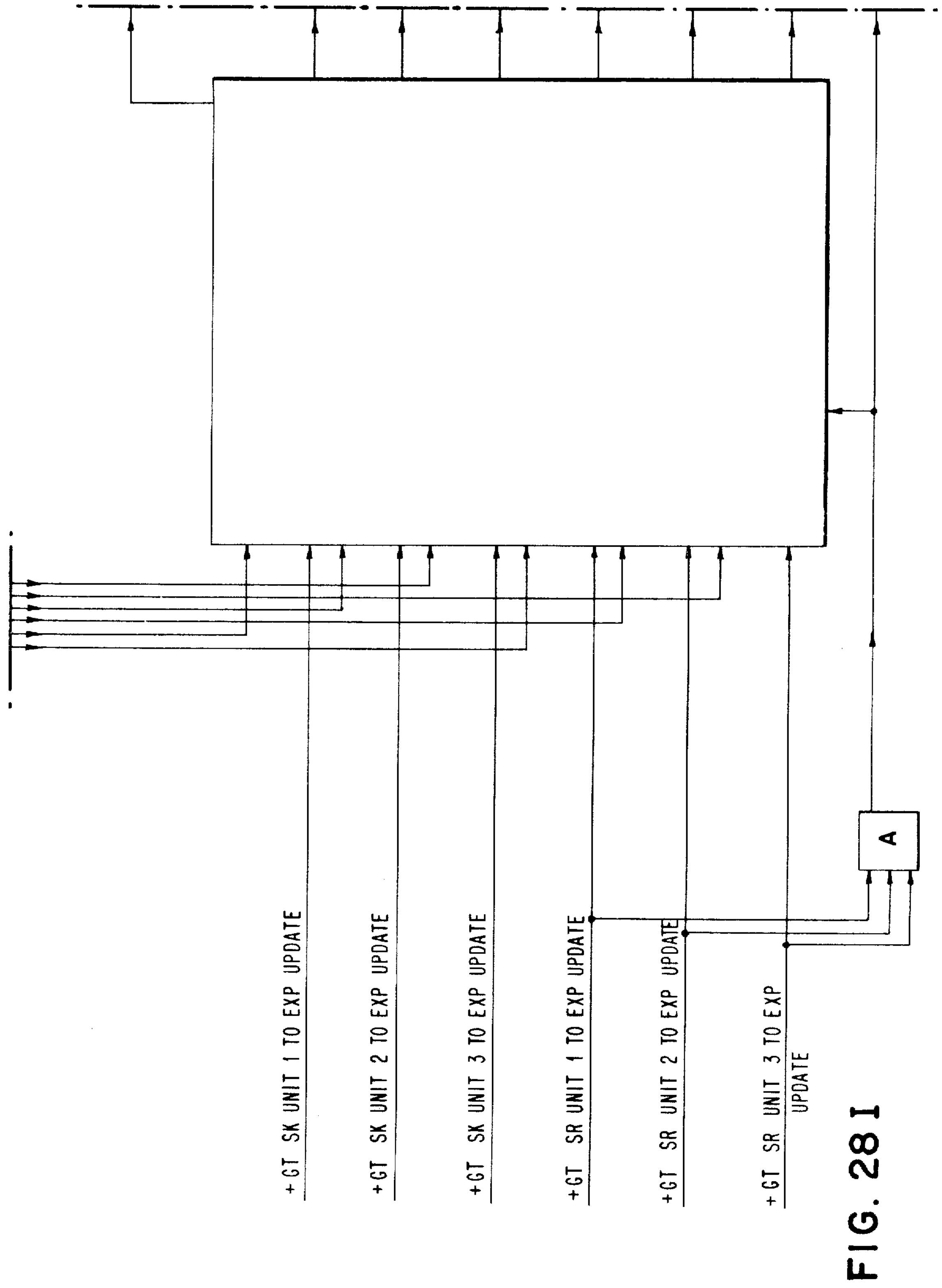
Figure 28J:
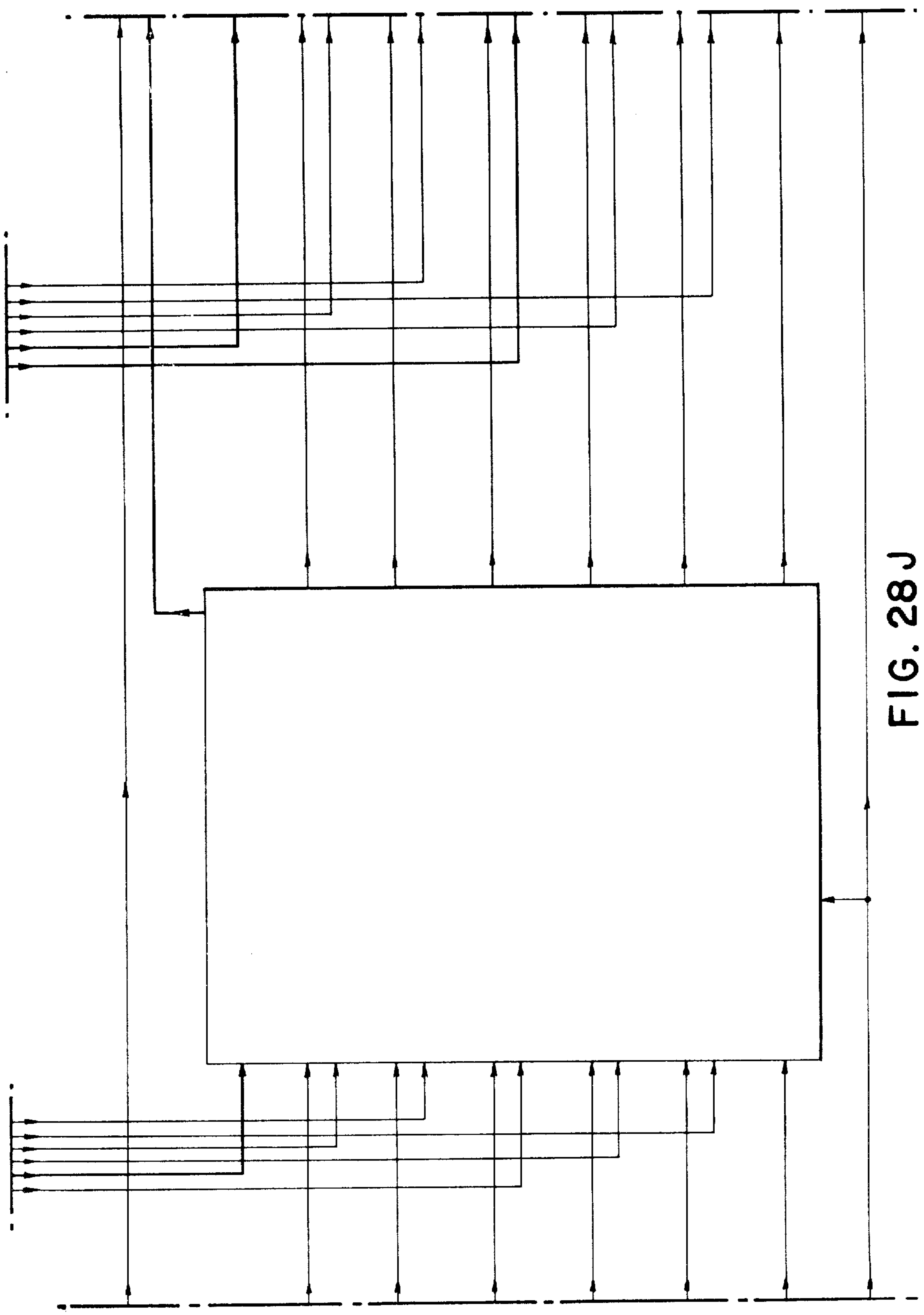
Figure 28K:
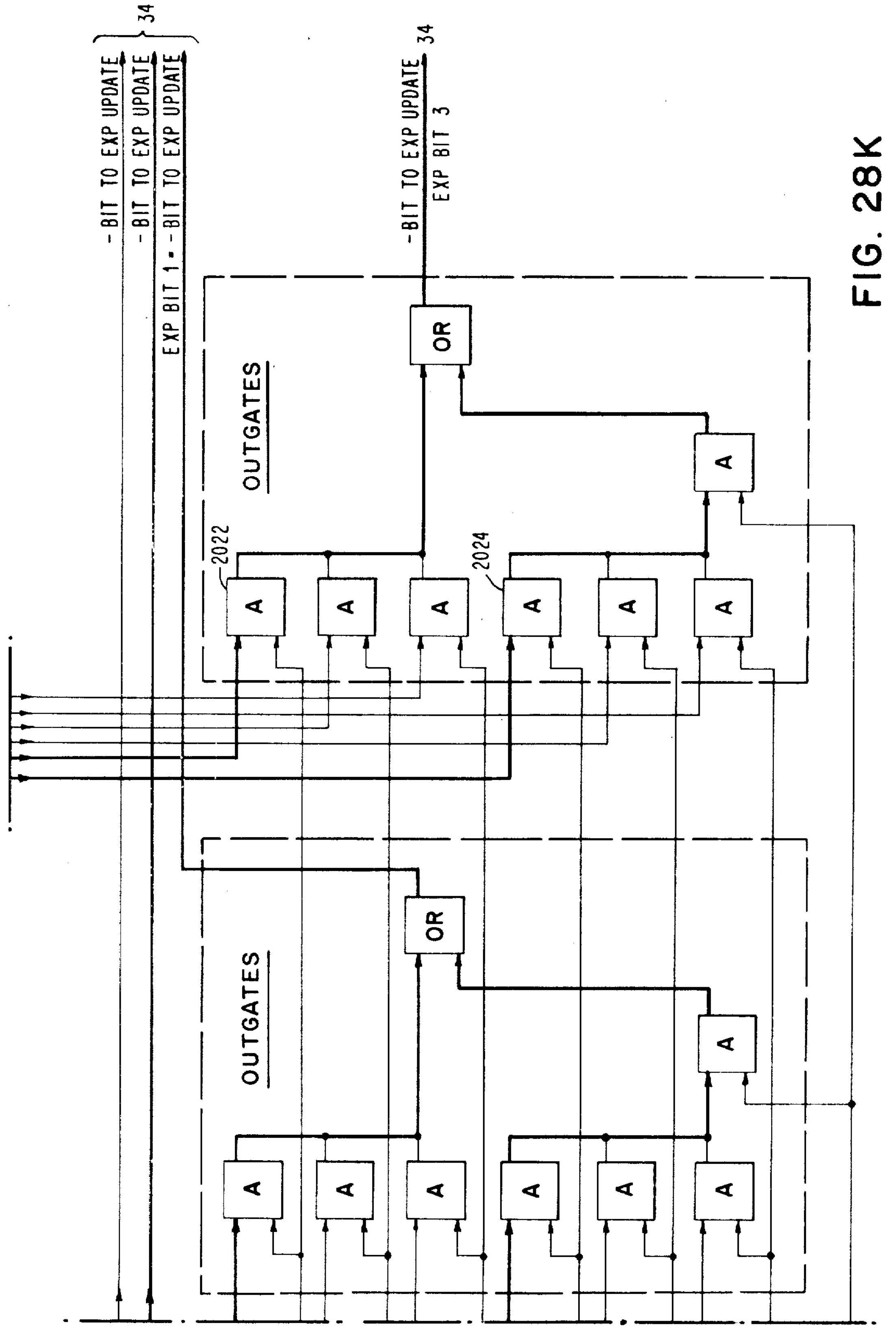

The outgates shown on FIGS. 28C and 28D operate in exactly the same fashion as the outgates shown in FIG. 27. Each set of outgates it will be noted comprises six AND gates wherein a given pair such as 2018 and 2020 may gate the contents from both the sink and source registers for Unit 1 over the appropriately labeled output lines to the exponent subtractor. It will also be noted that the output from the storage registers also proceed to the lower set of outgates shown in detail in FIG. 28K. For example, the two AND gates 2002 and 2004 are capable of gating the bit stored in bit position zero of Unit 1 on the appropriate output line. The bit which is ultimately gated, i.e., whether AND circuit 2022 or 2024 is energized is determined from the results of the exponent subtract operation wherein it will be determined whether the sink or source operand is the larger. It will thus be the larger or final (subject to normalization or overflow) operand that will be transferred to the exponent update adder.

Although only four individual bit storage positions are shown in FIG. 28, all of the other bit storage positions will be identical to those shown and merely require a duplication of the parts and obviously of the specific bit inputs from the input busses.

FIGURE 29

This FIG. comprises a composite logical schematic diagram of those functional blocks of the present adder denoted on FIG. 17 as the Assign Gate 586, the True/Complement Gates (T/C) 591 and the Digit Preshift 592. As with most of the other detailed logical schematic drawings, this FIG. likewise only shows a relatively small number of input bit positions. However, all of the inputs are clearly labeled in the left-hand portion of the drawing and the outputs similarly labeled at the right-hand side of the drawing. The assign gates appear at the right-hand portion of the composite FIG. and perform the function of routing either the sink bits to the T/C gates and the source bits to the shifter or conversely routing the source bits to the T/C gates and the sink bits to the shifter.

In the example shown in the data flow on FIG. 29 in the dark lines, bits 0 and 4 for both the sink and source register are illustrated wherein the complement of the sink bits are passed through the true/complement gates and the source bits are passed through the shifter with a shift of 0.

Figure 29A:
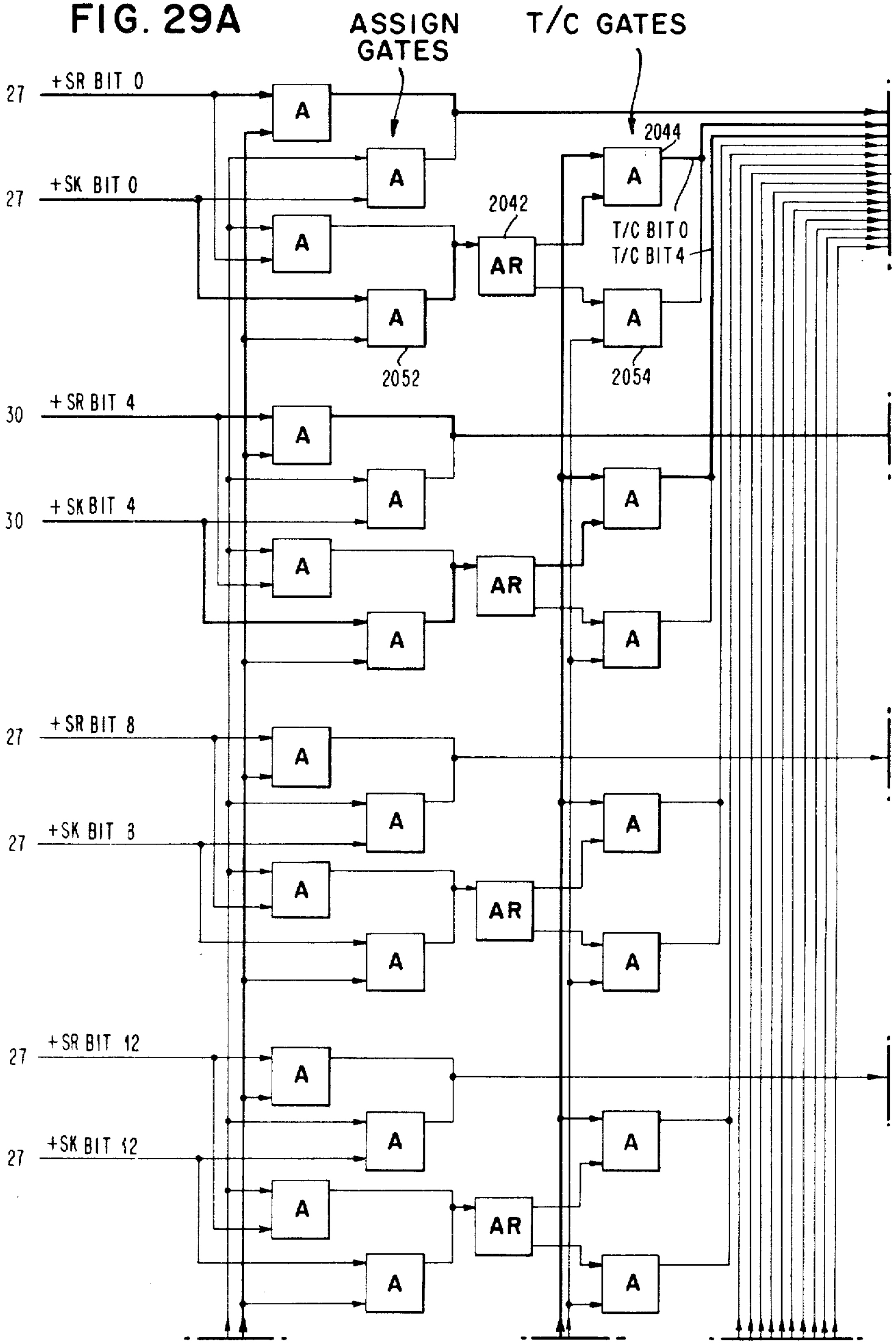
Figure 29B:
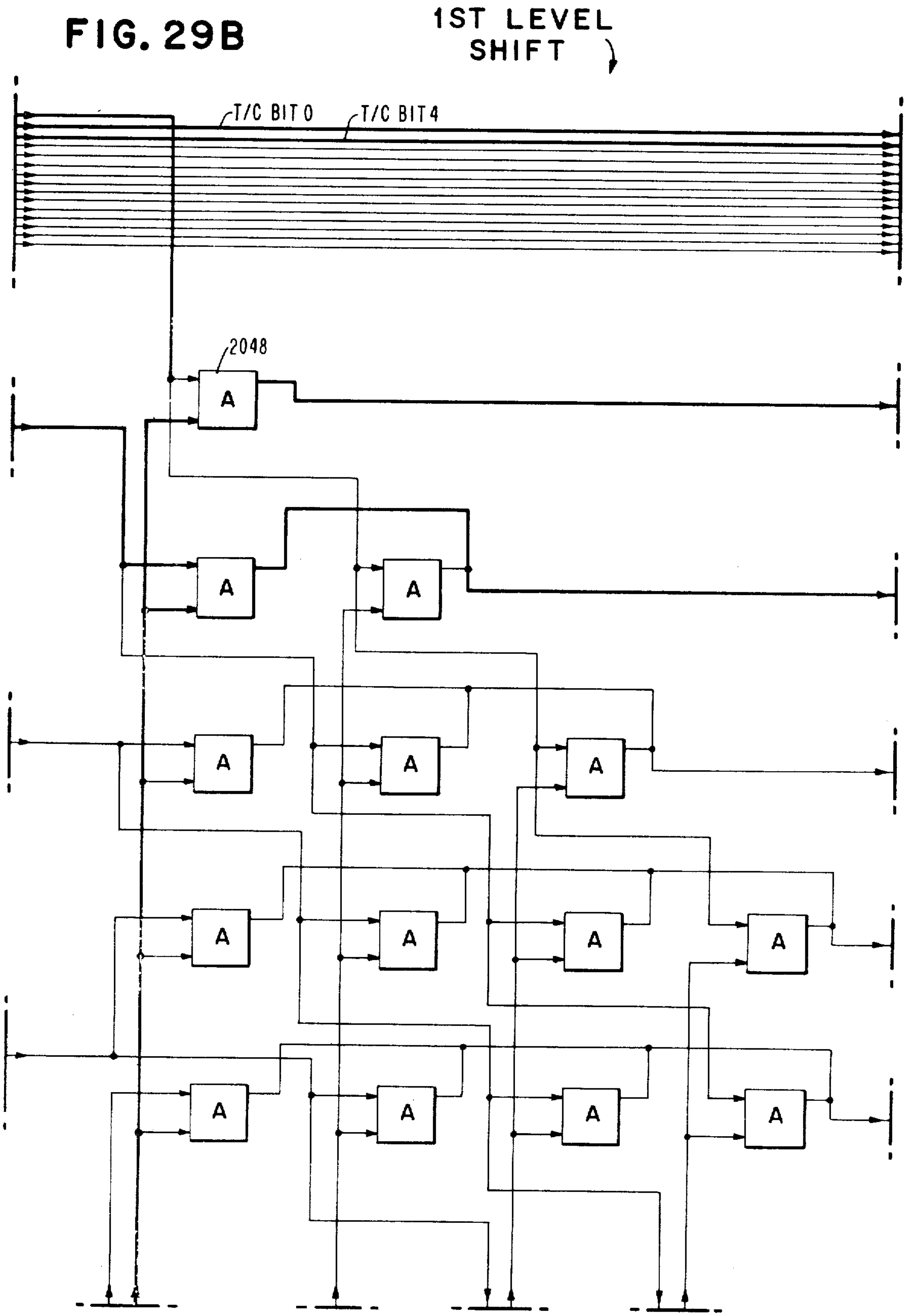
Figure 29C:
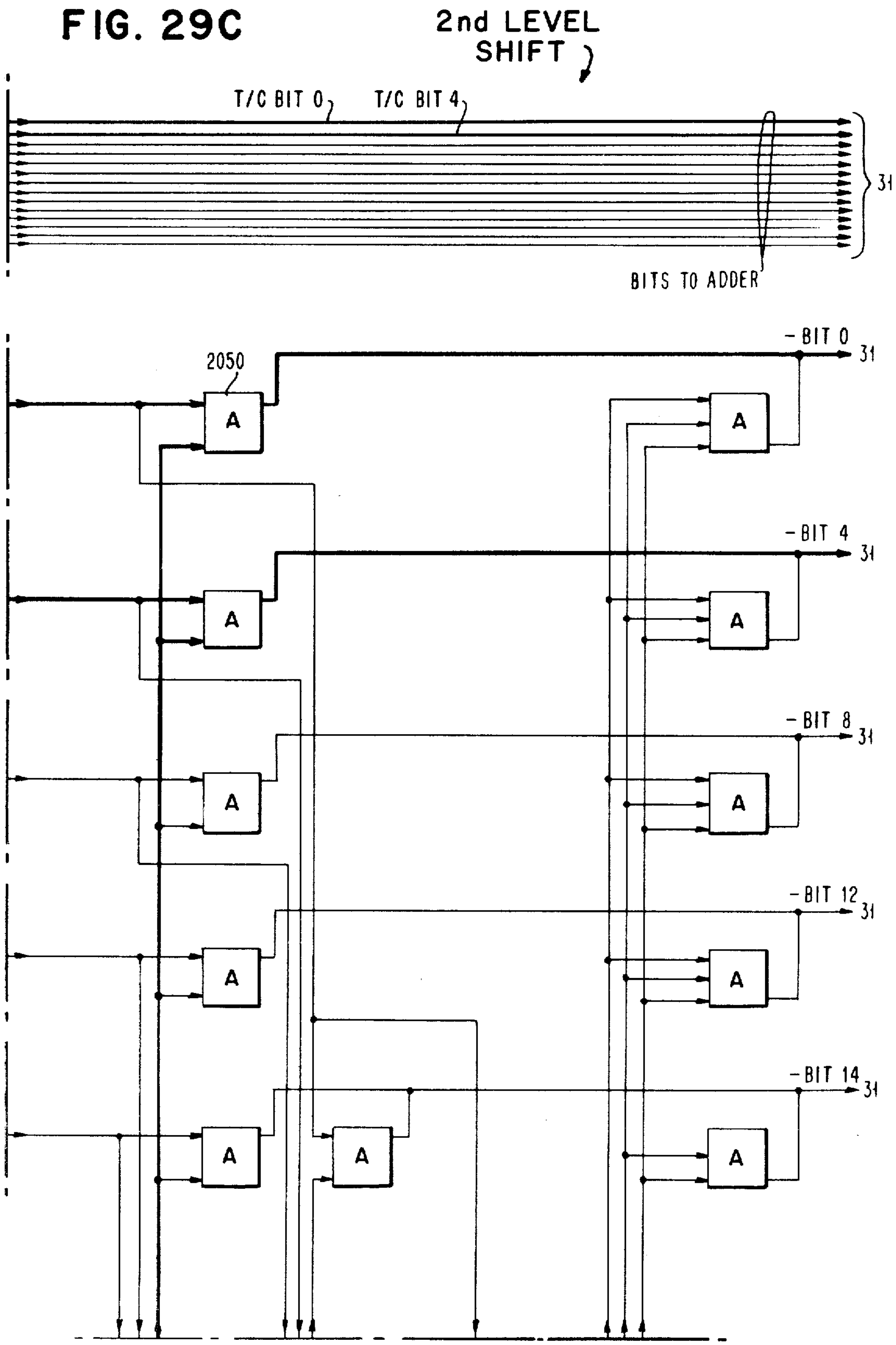
Figure 29D:
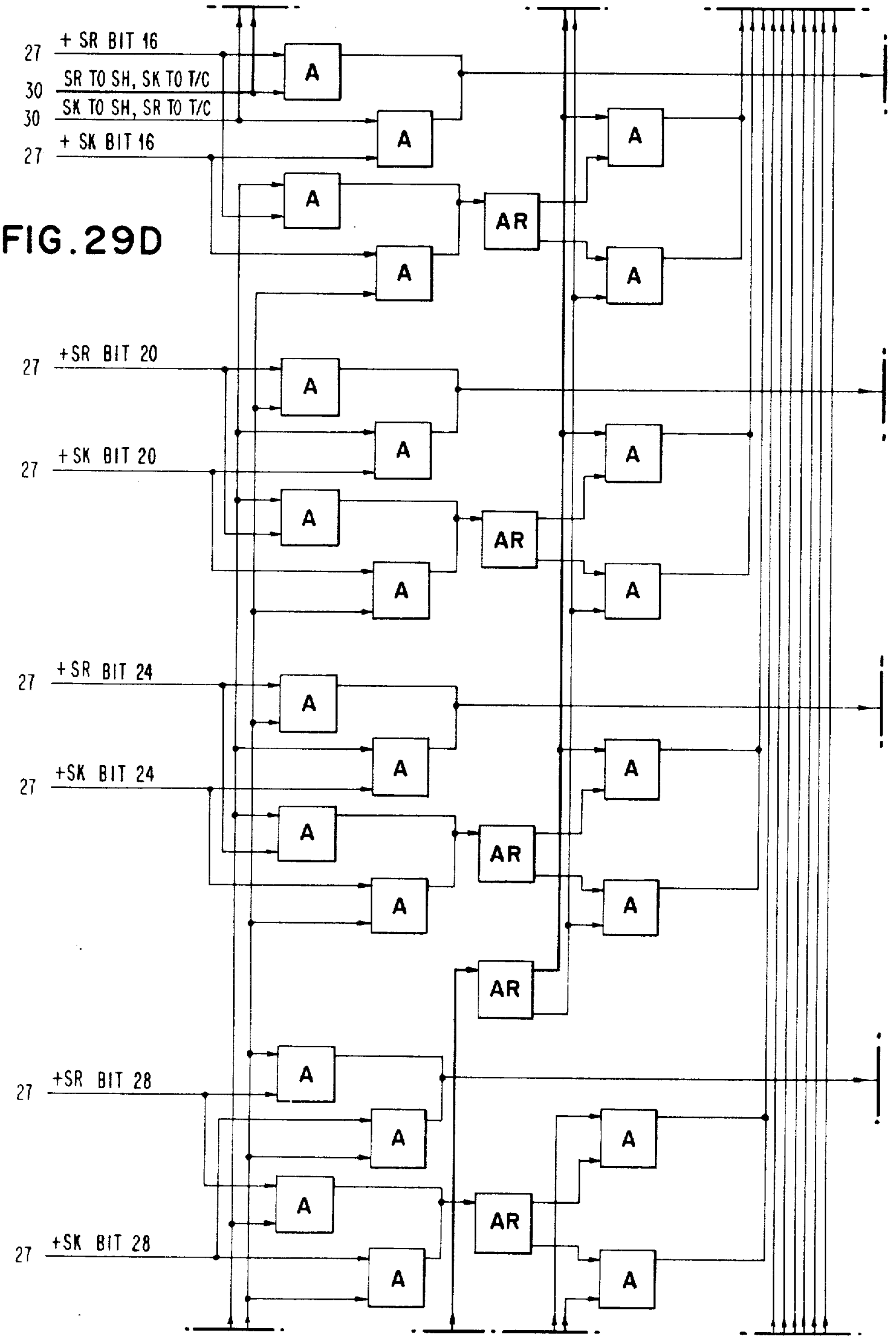
Figure 29E:
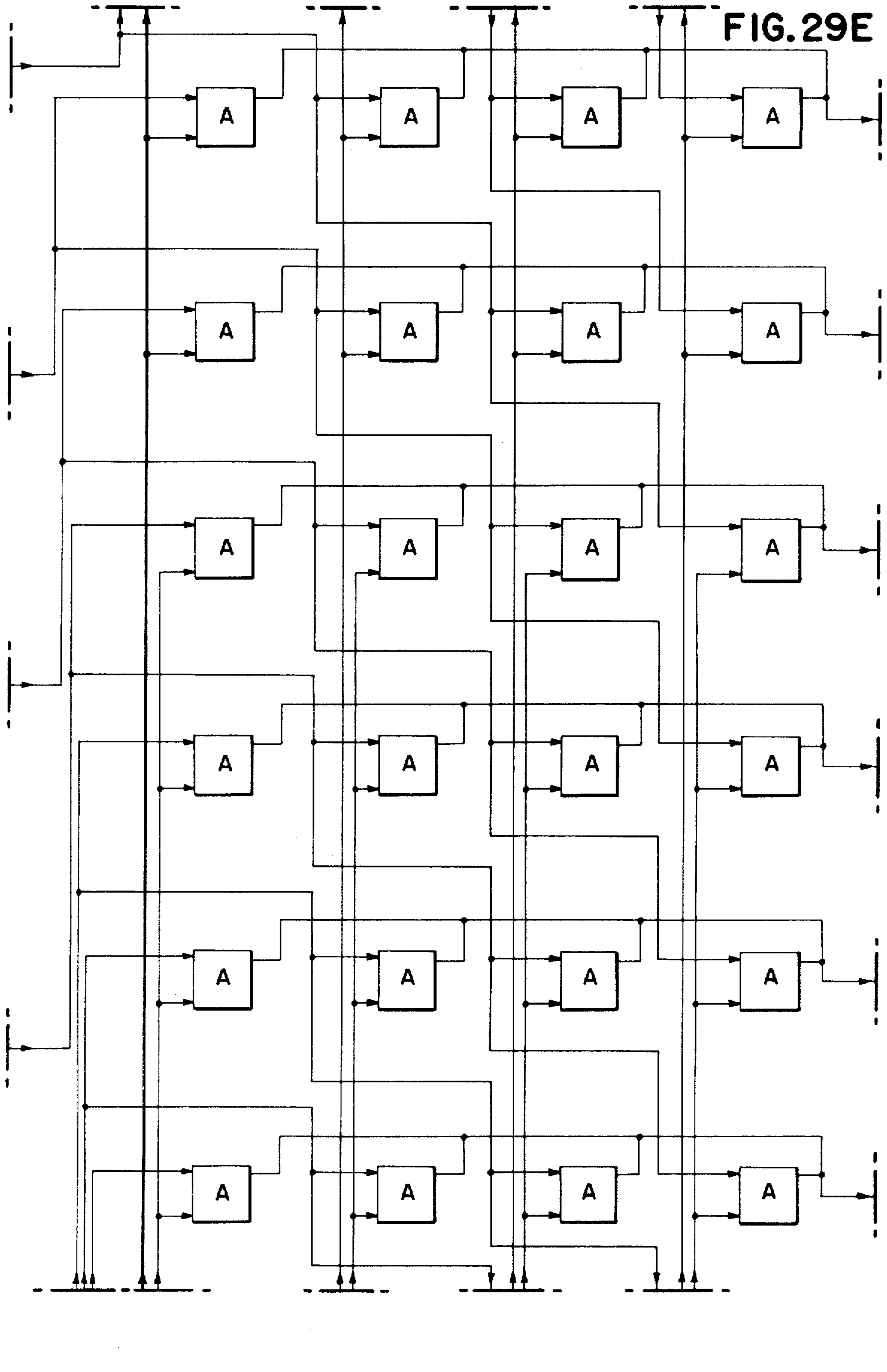
Figure 29F:
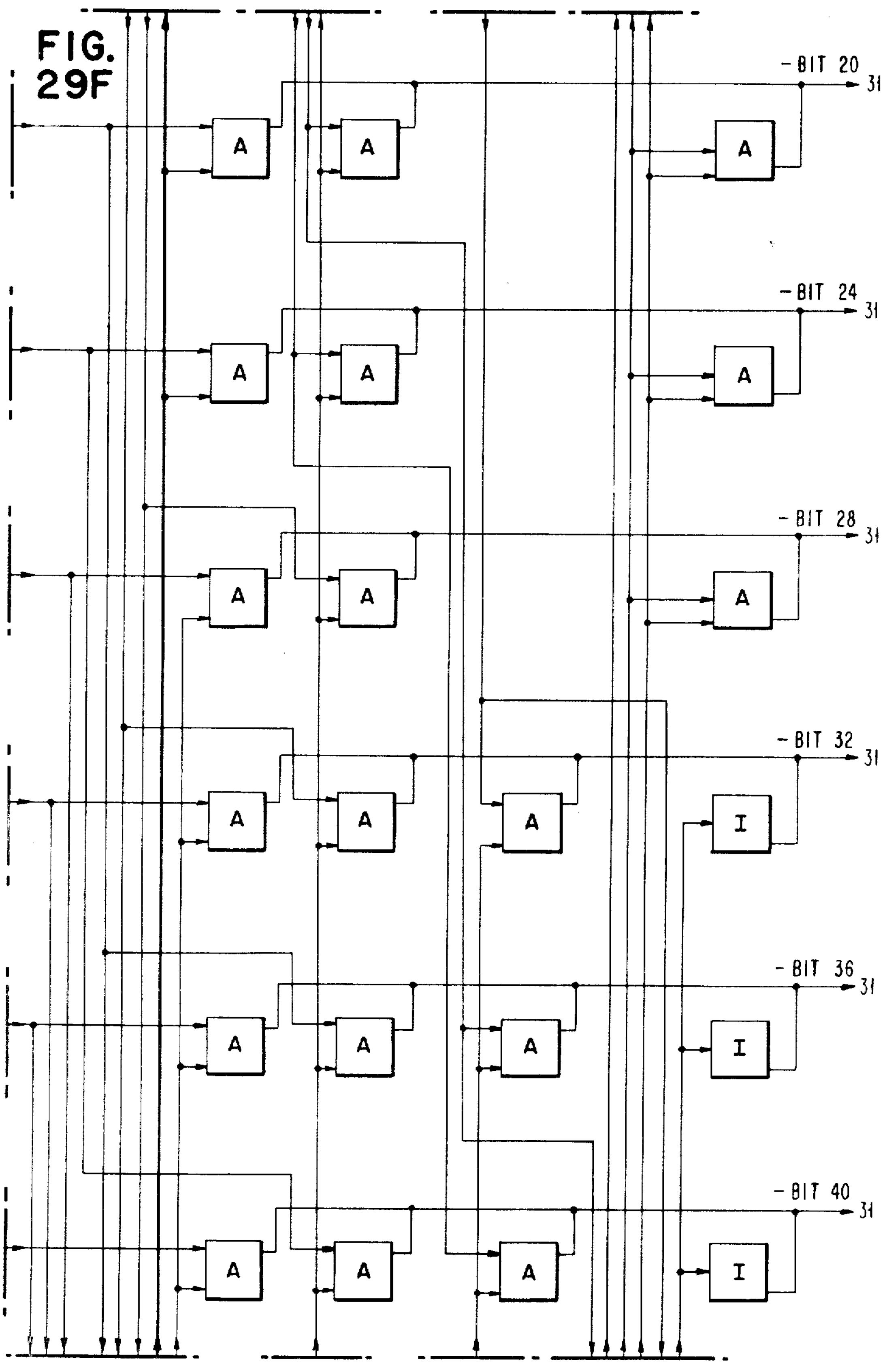
Figure 29G:
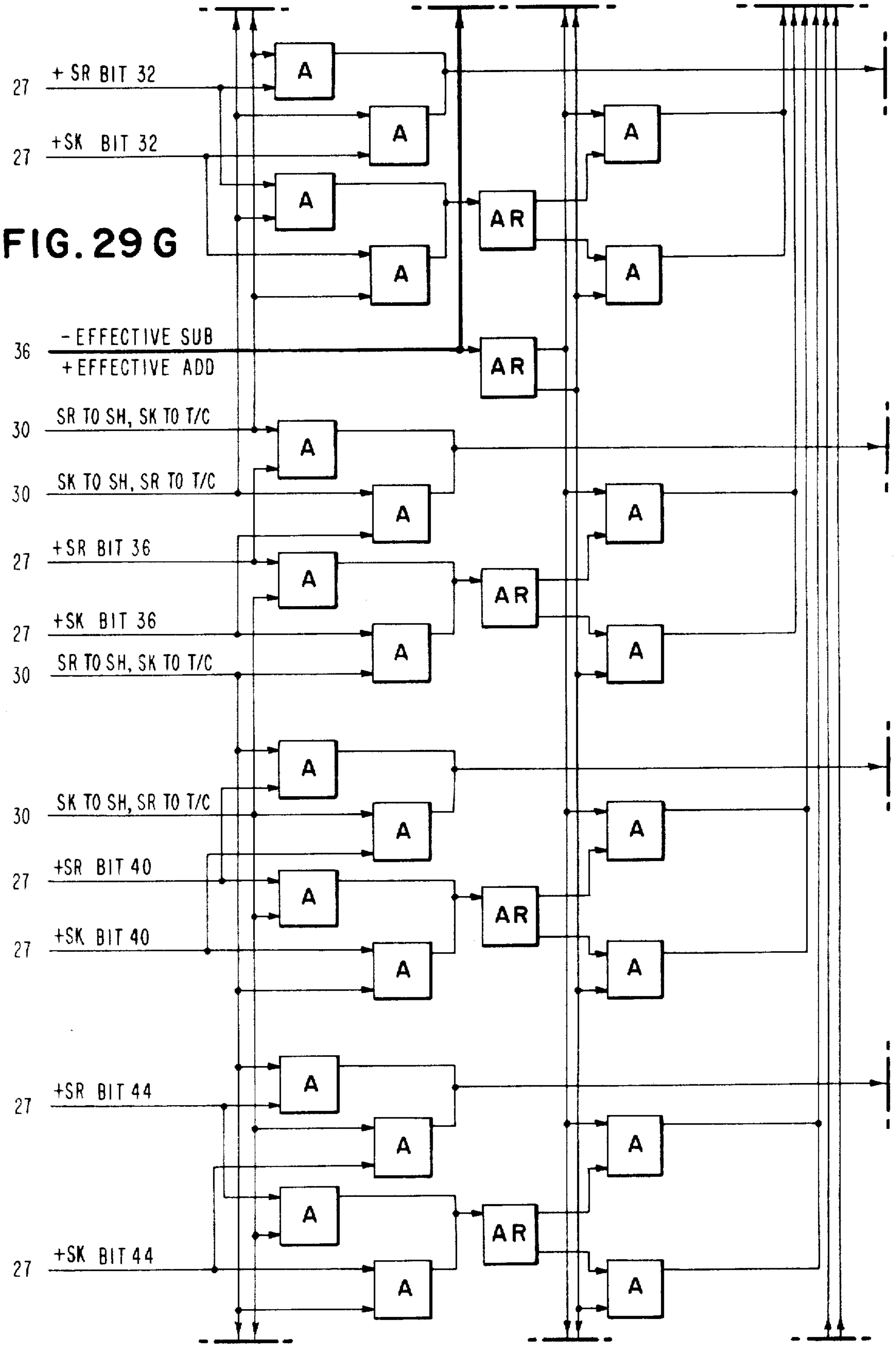
Figure 29H:
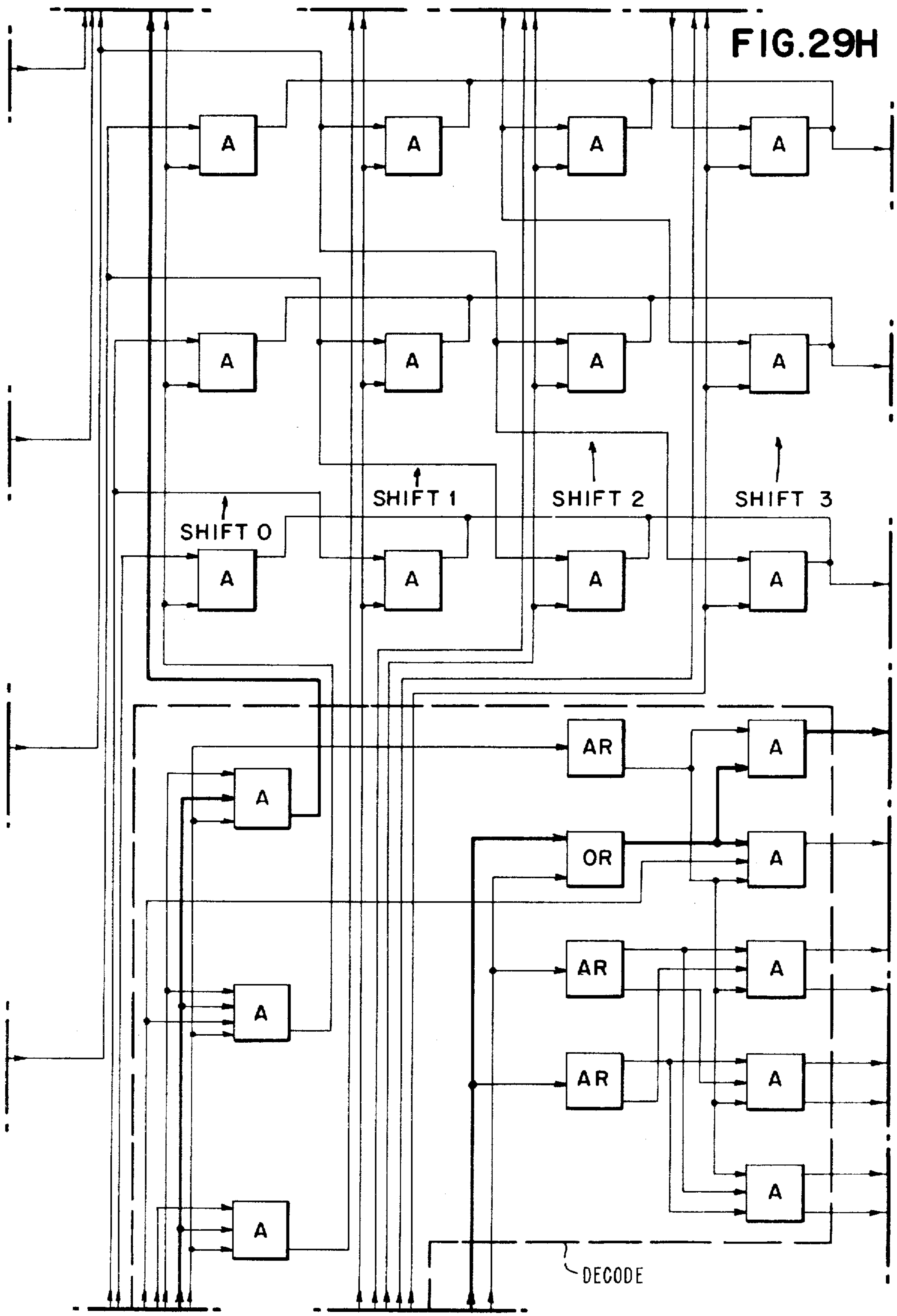
Figure 29I:
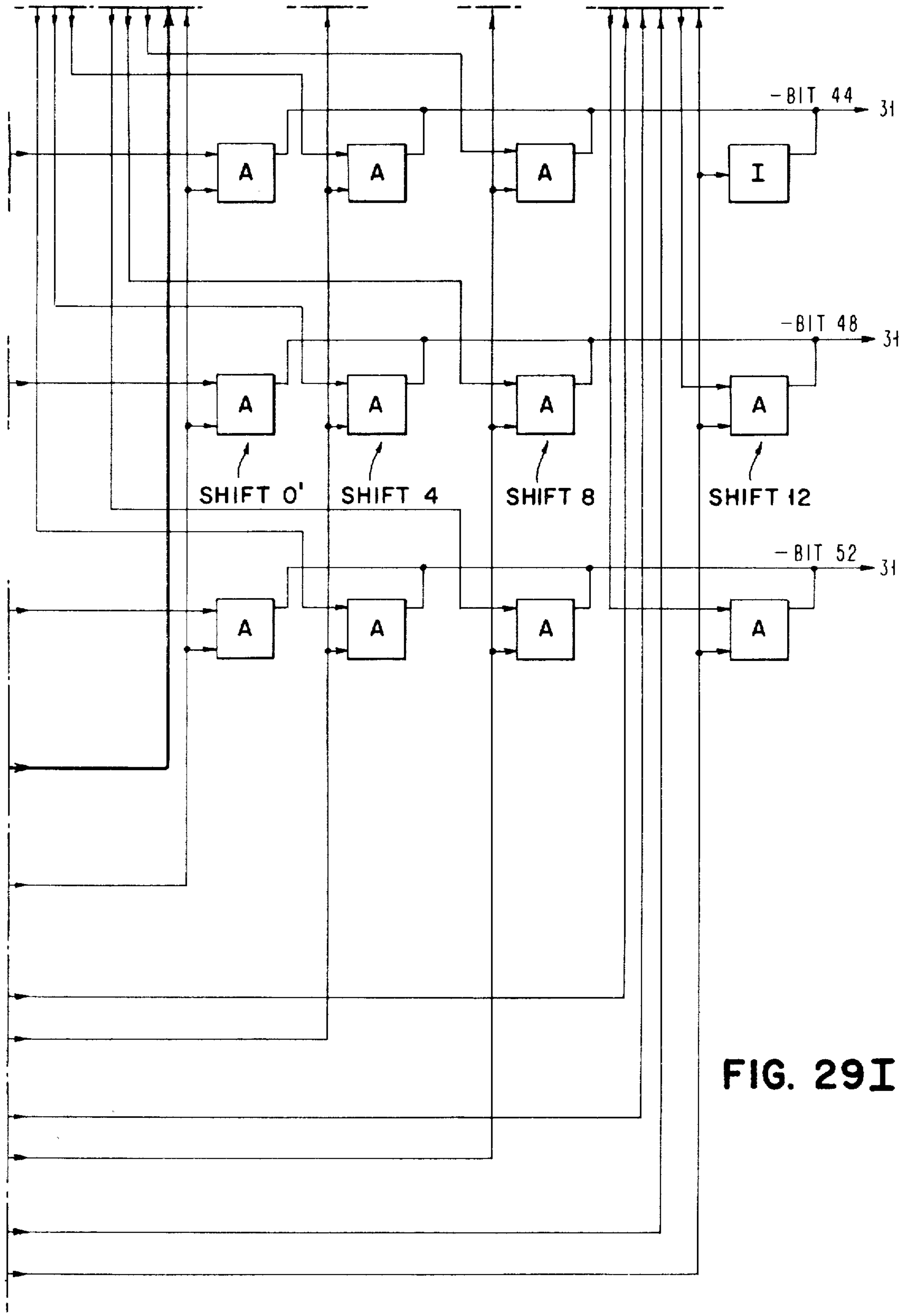
Figure 29J:
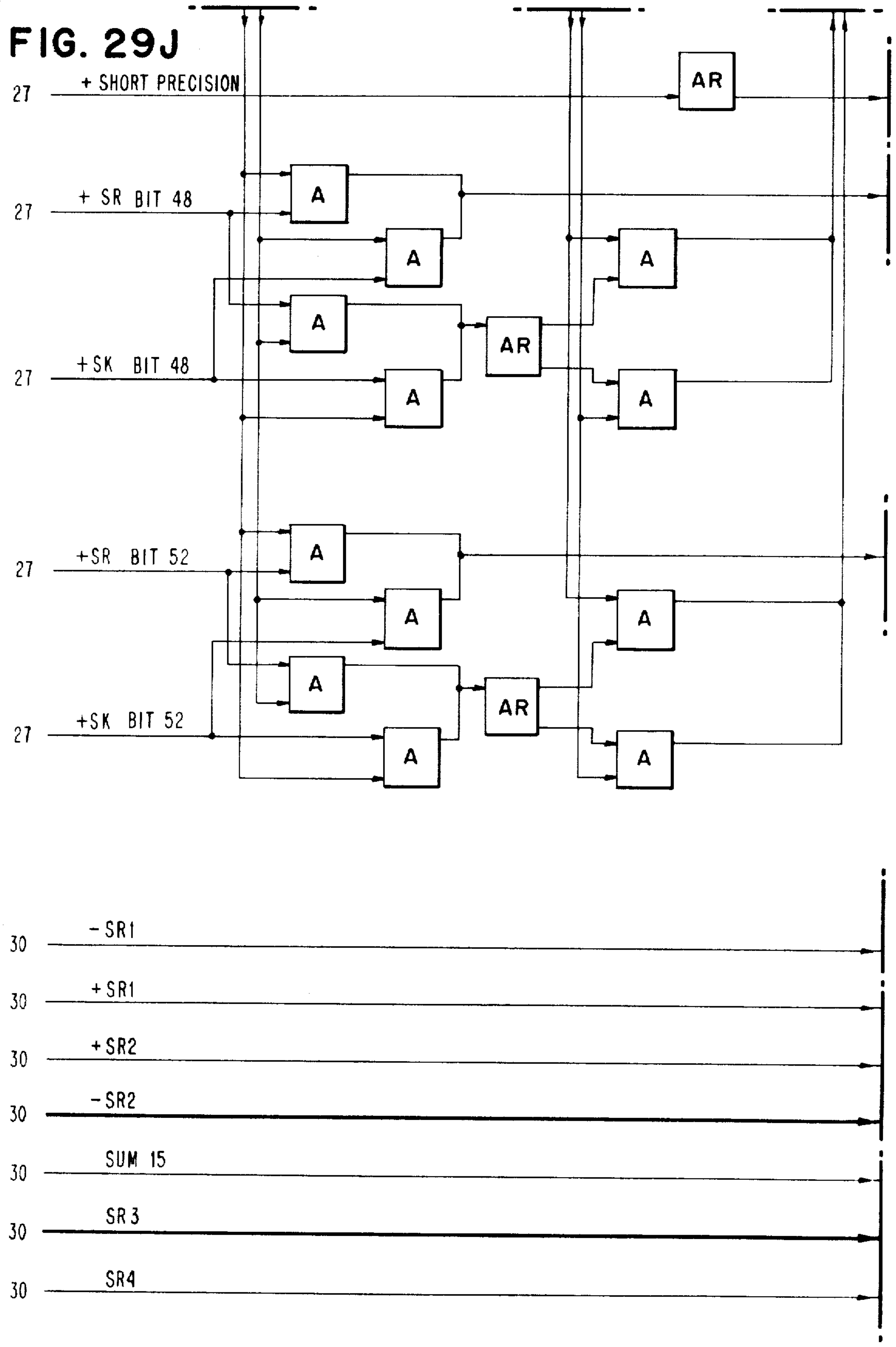

Referring now specifically beginning with FIG. 29A to follow two bits, one of the sink and the other of the source register as indicated by the heavy line, SR bit 0 passes first through AND gate 2046 the other input to which comes from the line on FIG. 29D marked SR to shifter, SR to T/C. The output of AND gate 2046 then goes into the AND gate 2048 on FIG. 29B and then 2050 on FIG. 29C where it becomes bit 0, which is then passed into the main adder. It will be noted that the AND gate 2048 is in the first level shift and that the AND gate 2050 is in the second level shift of the shifter. It will be apparent by following the line which emanates from the AND gate 2046 that if a first level shift other than 0 had been called for one of the other AND gates in the first level shifter would have been enabled thus passing the bit or shifting the bit an appropriate number of spaces, i.e., 0, 1, 2, 023. Similarly AND gate 2050 is in the second level shift and if a second level shift had been called for again following the tree, one of the other AND gates in the second level shift would have been enabled to pass this bit to an appropriately higher level position.

Returning now again FIG. 29A following the sink bit the line marked SK bit 0 passes through the AND gate 2052 thence through the amplifier inverter 2042 (AR) and thence through AND gate 2044 and out over the line marked T/C bit 0. If a complement of the bit SK bit 0 had been desired AND gate 2054 would have been energized thus taking the other output from the amplifier invert (AR) 2042 and this output would have similarly appeared on the output line marked T/C bit 0. The other inputs to the two T/C gates 2044 and 2054 come from the input line on FIG. 29G marked "effective sub, effective add." As is apparent, either a positive or negative signal will appear on this line depending upon the effective operation called for and whether or not the sink bit is to be transmitted to the main adder in true or complement form. Obviously this condition will be determined by the particular instruction called for. The shifter inputs come from the input lines at the bottom of FIG. 29J and energize the particular shifter AND gates desired for the particular magnitude of shift required from the decode.

FIGURE 30

Figure 30:
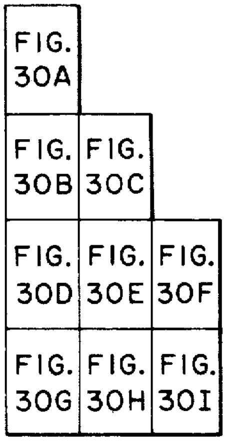
Figure 30A:
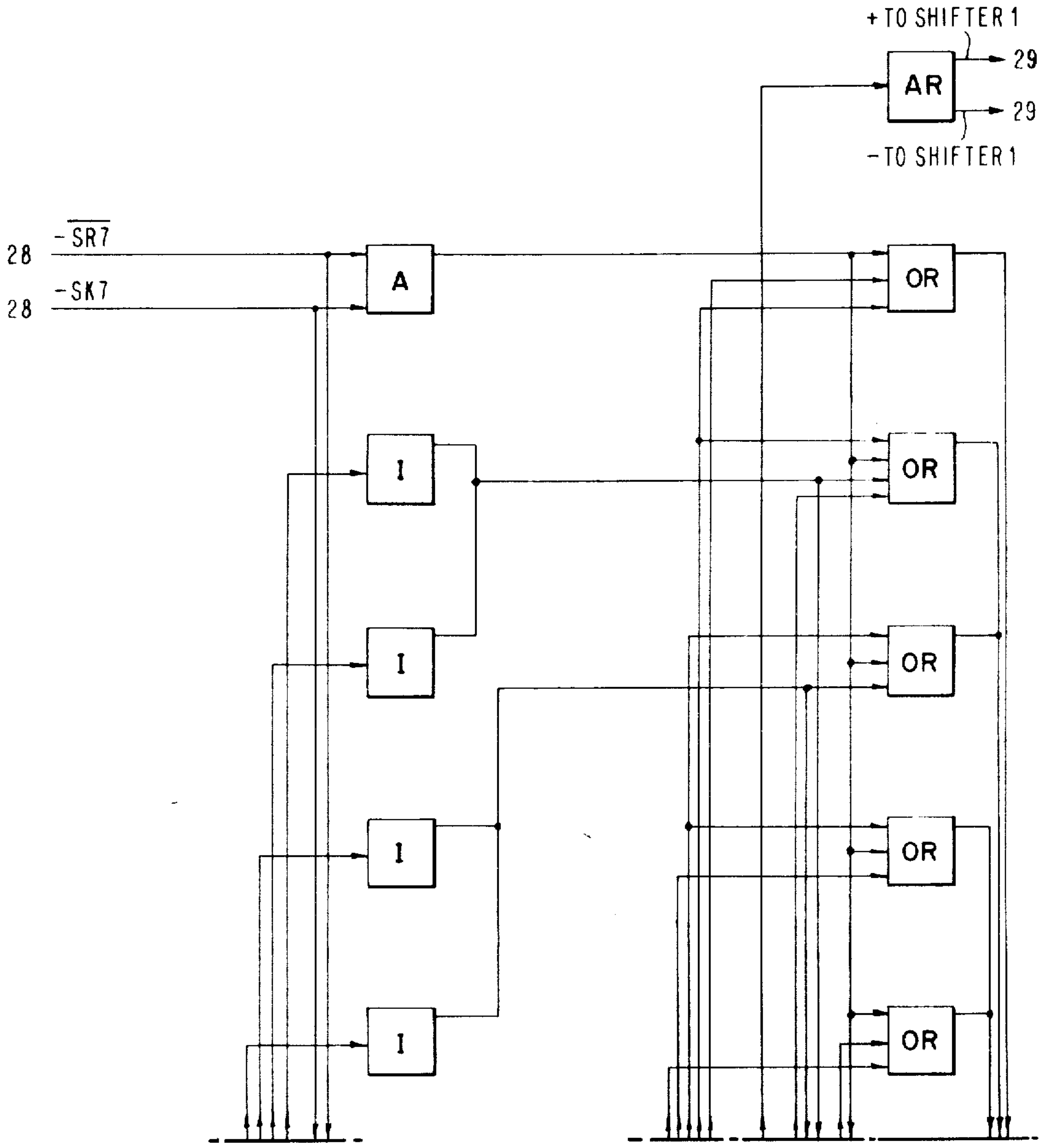
Figure 30B:
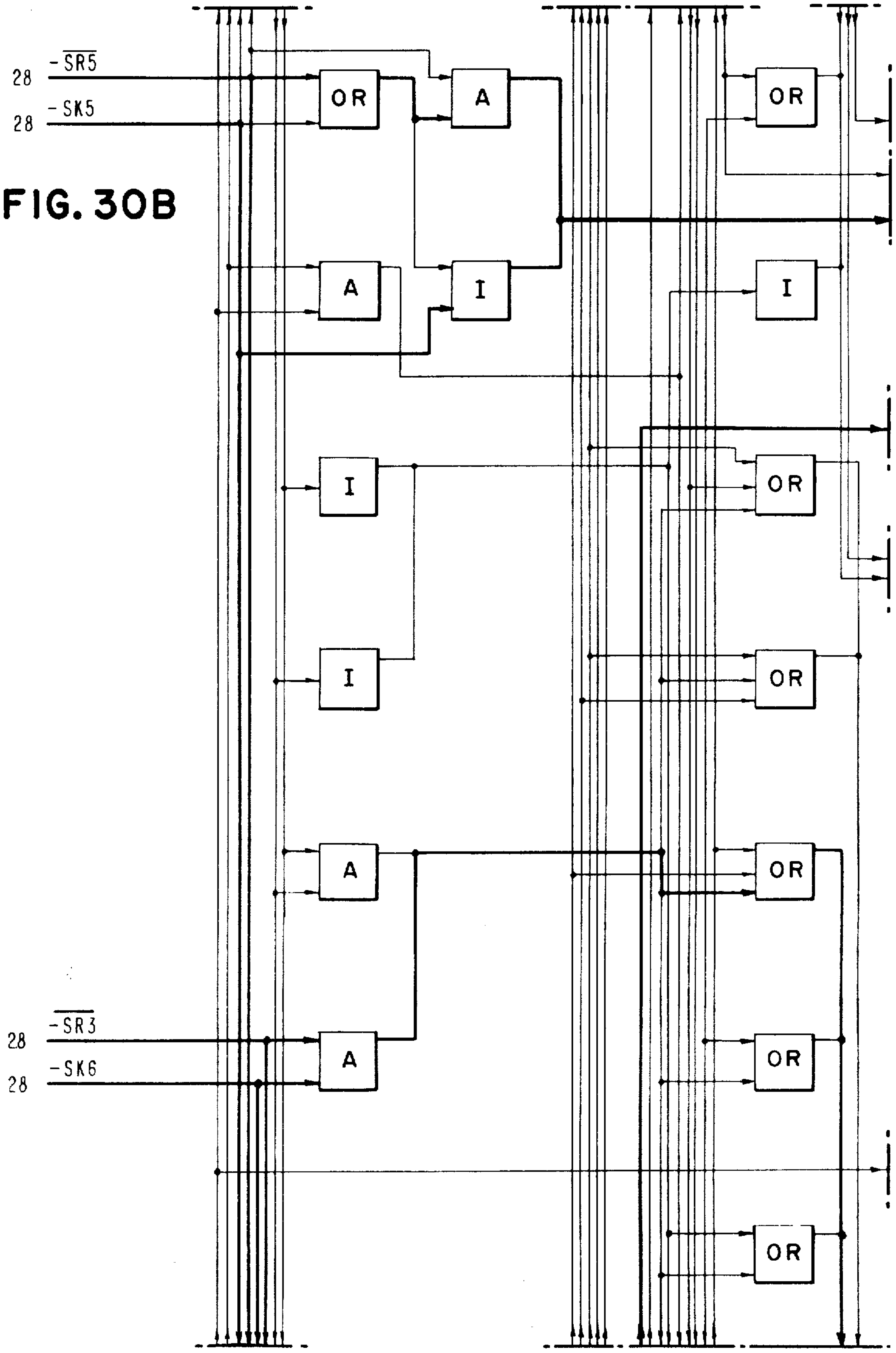
Figure 30C:
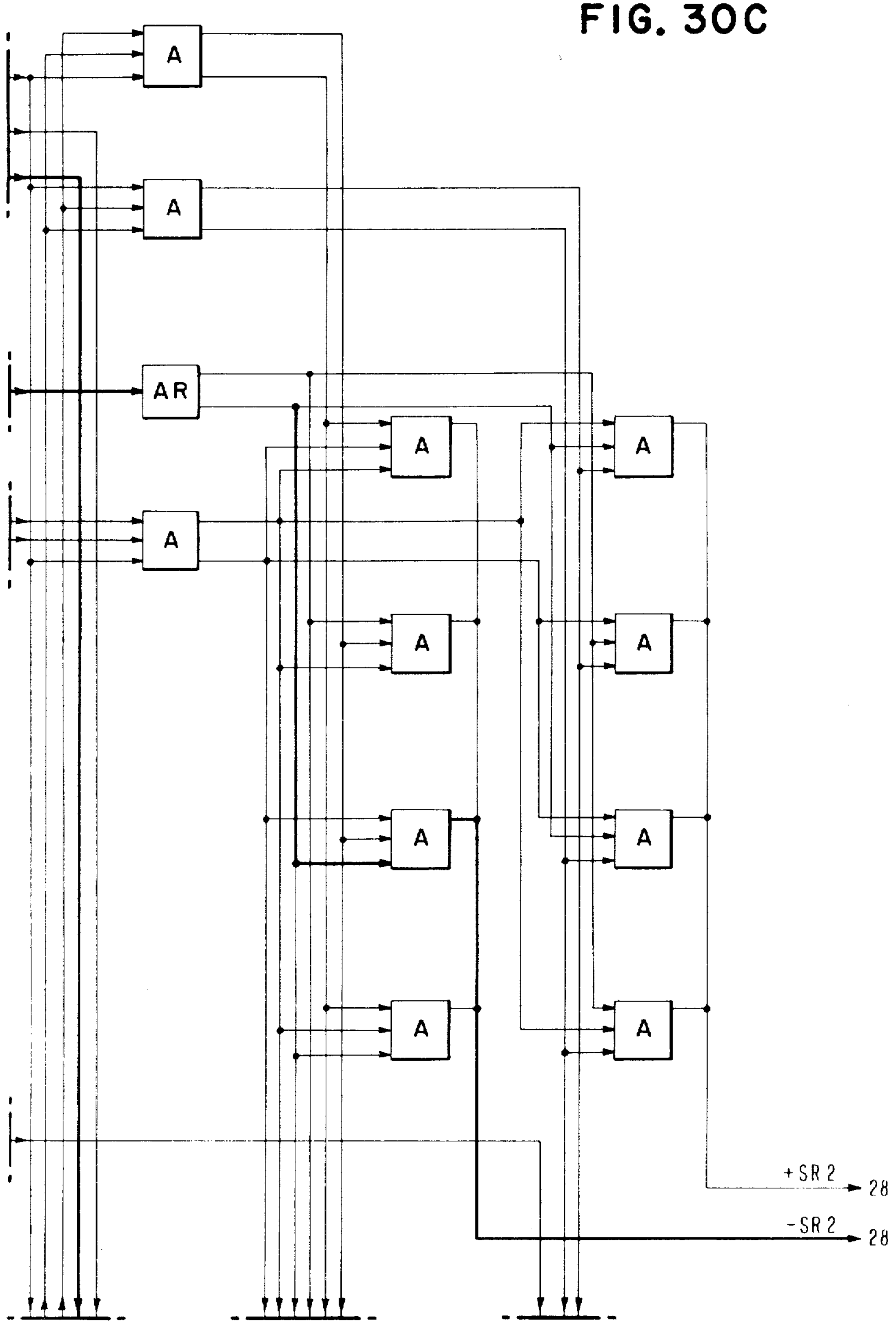
Figure 30D:
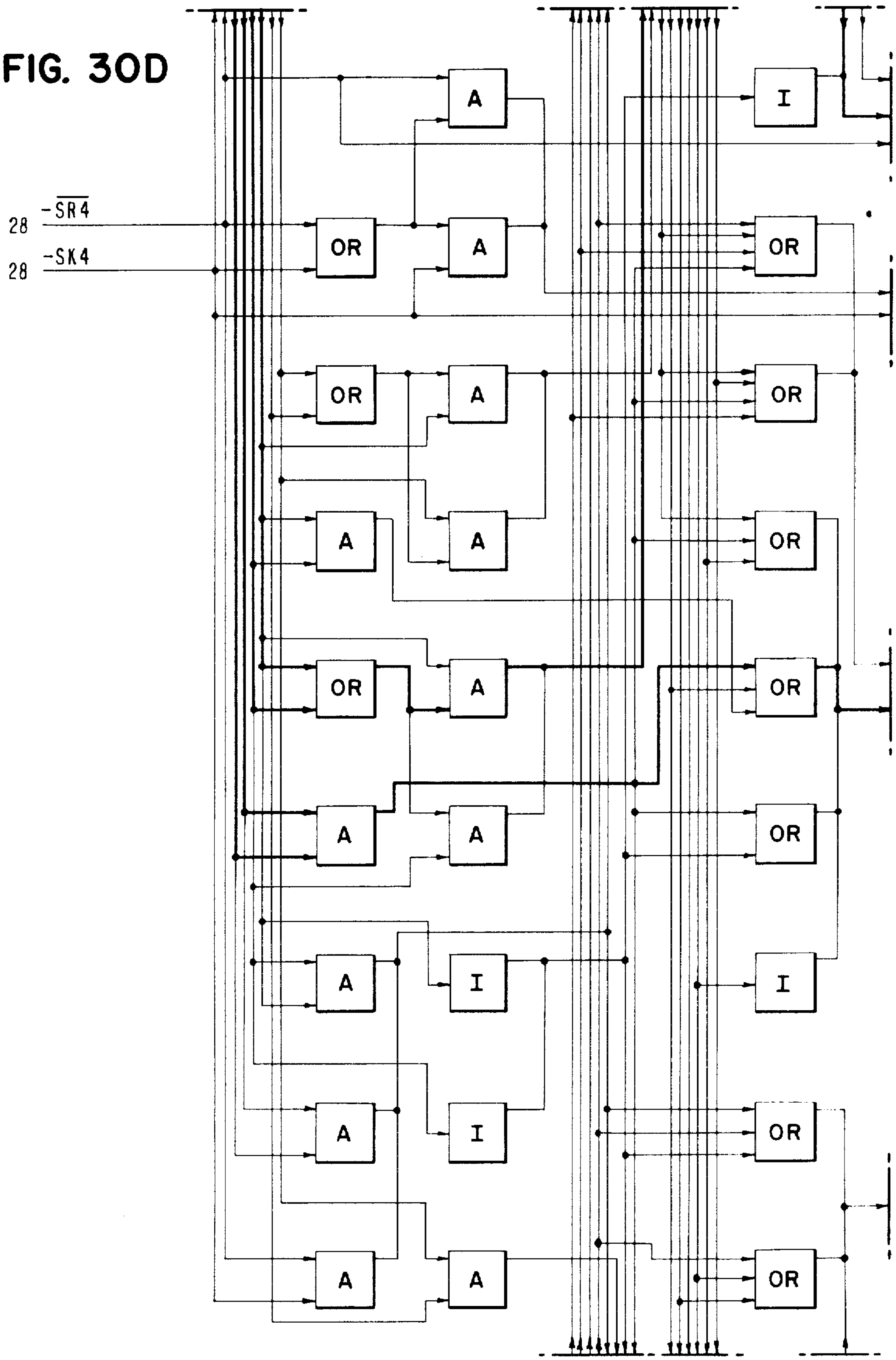
Figure 30E:
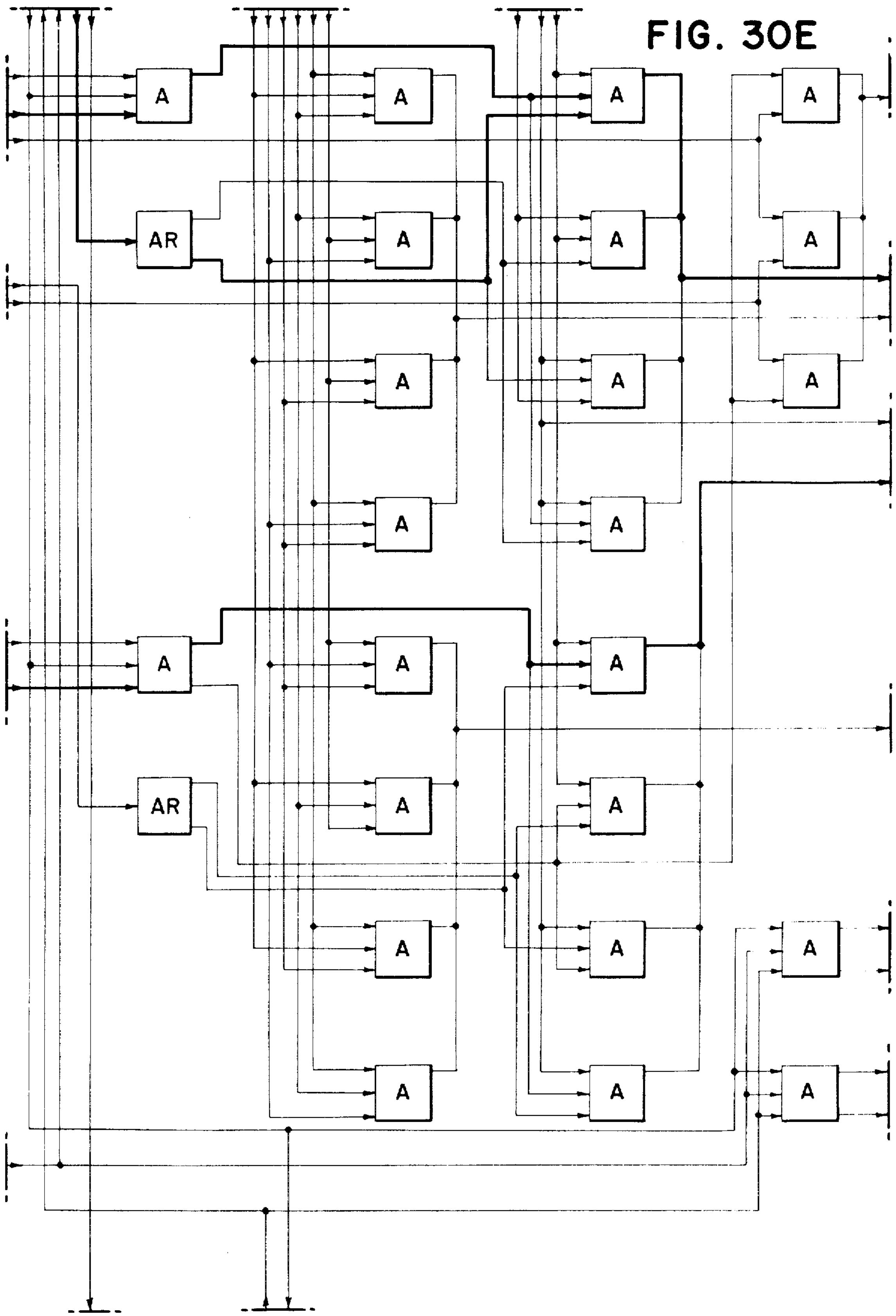
Figure 30F:
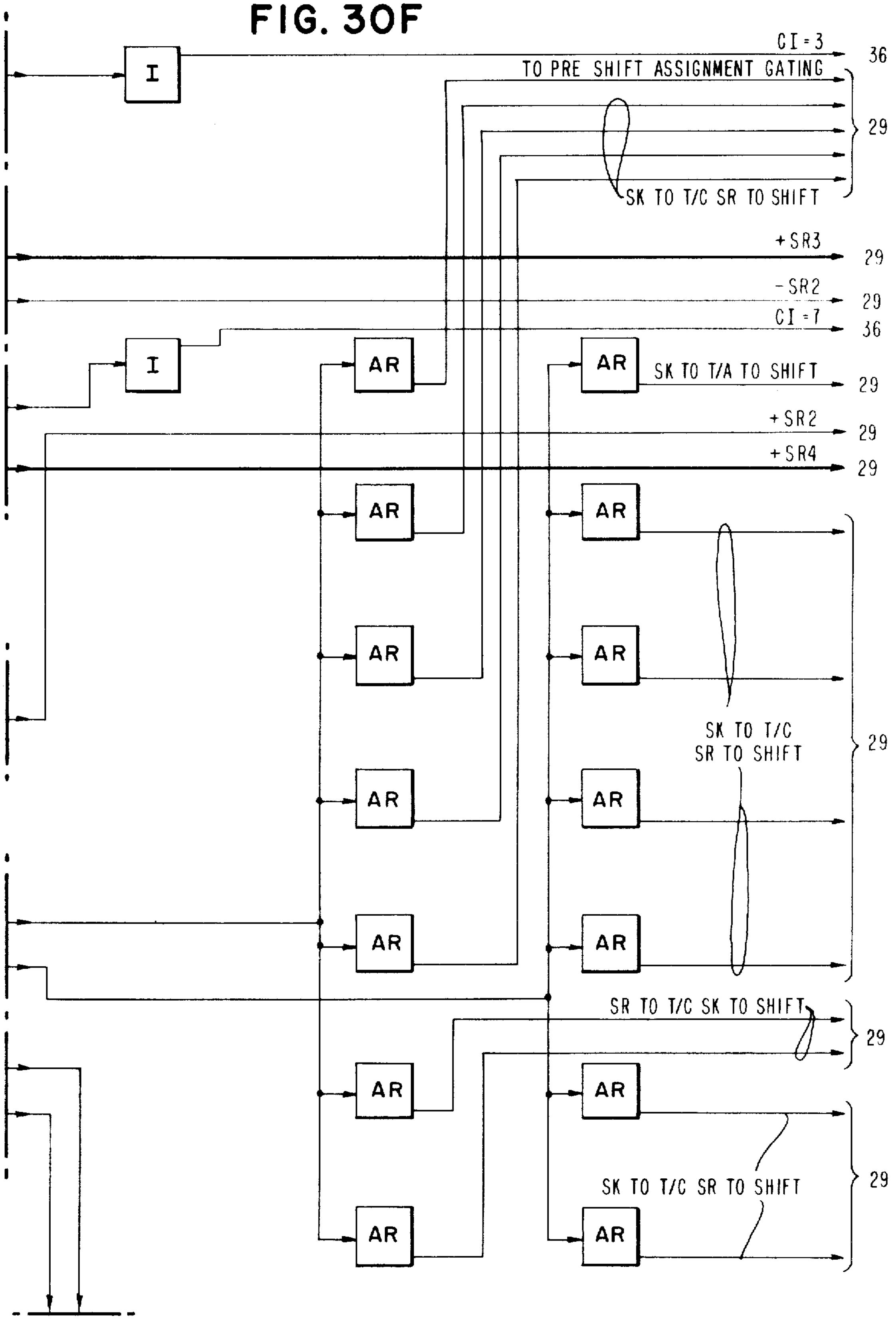
Figure 30G:
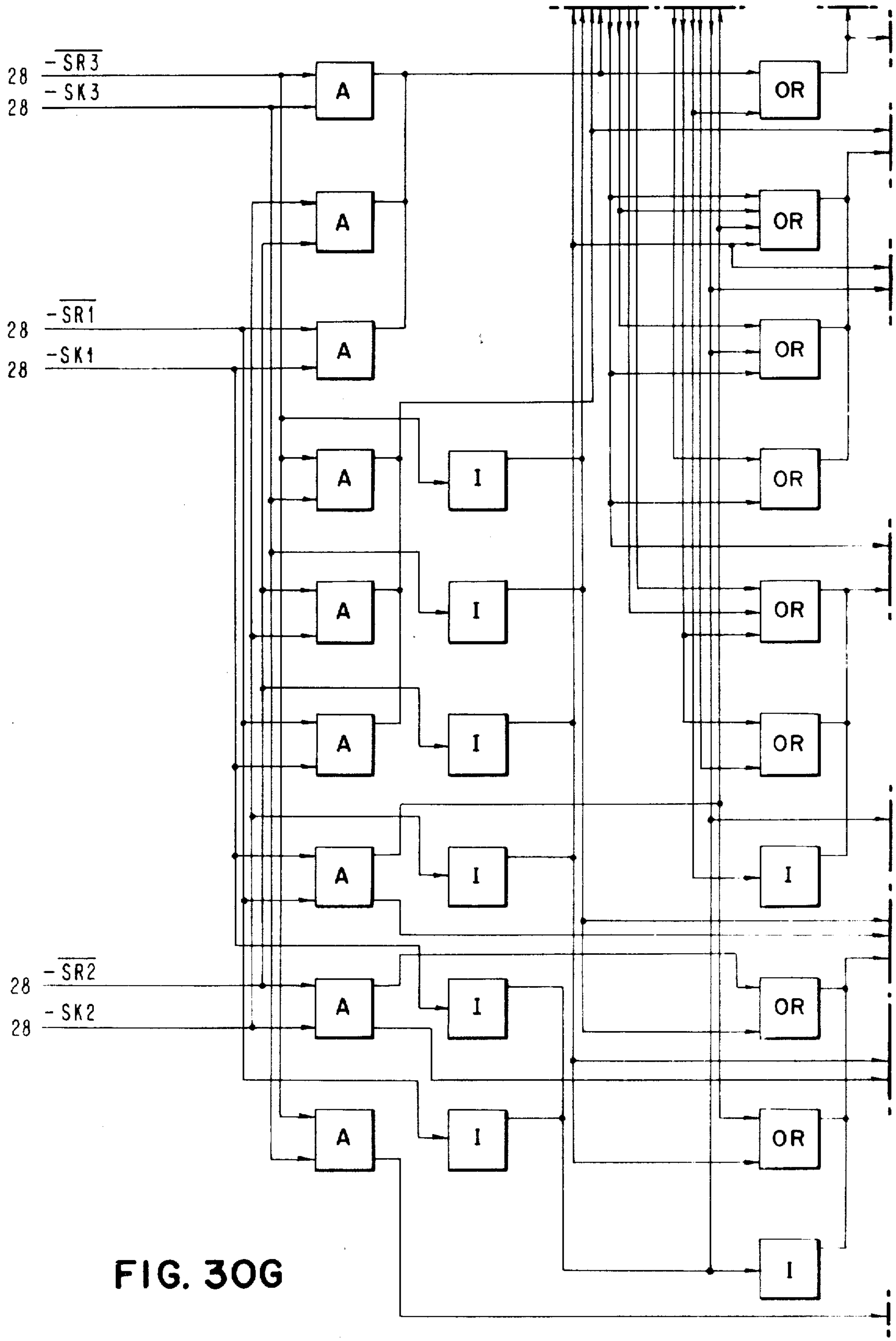
Figure 30H:
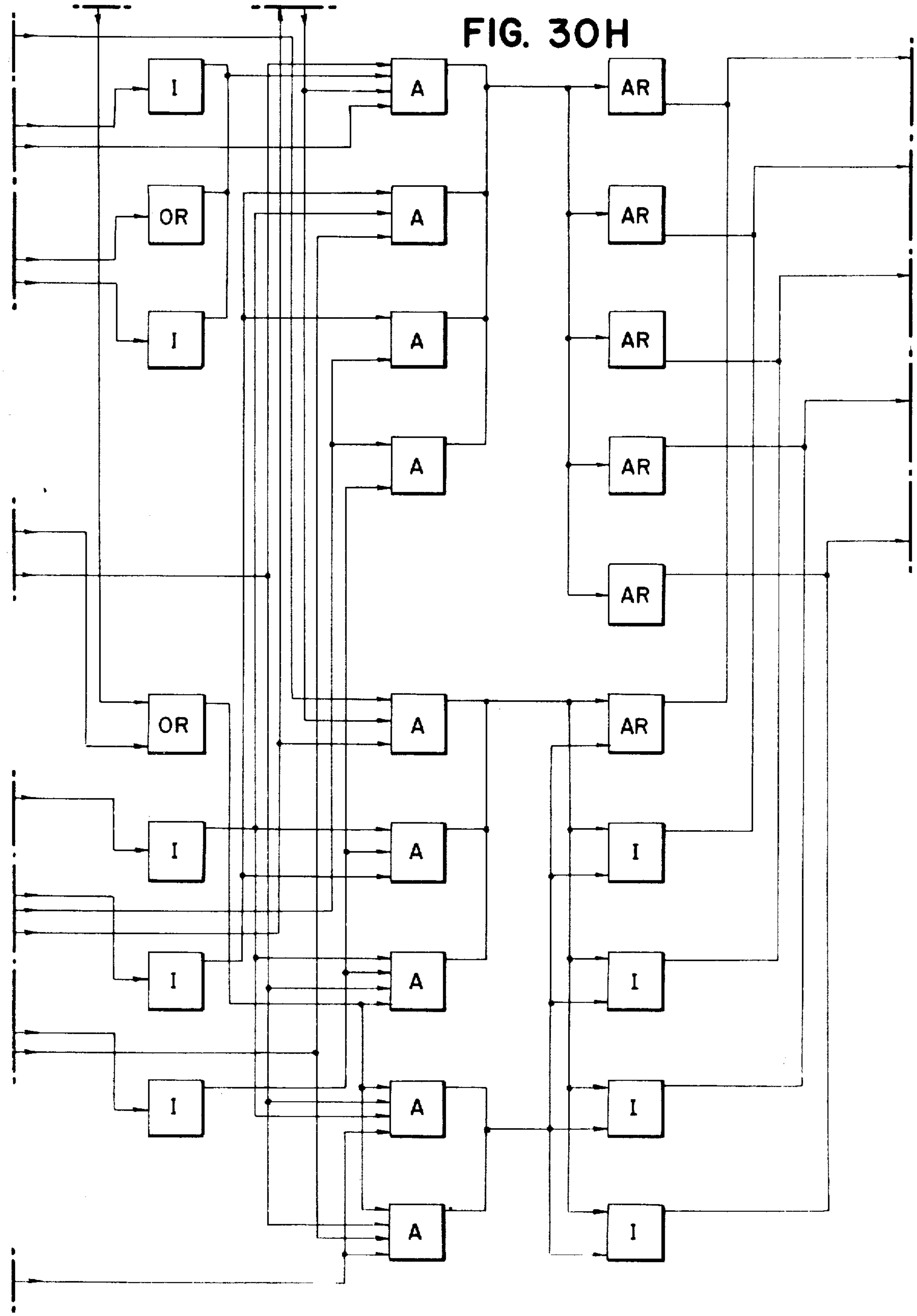
Figure 30I:
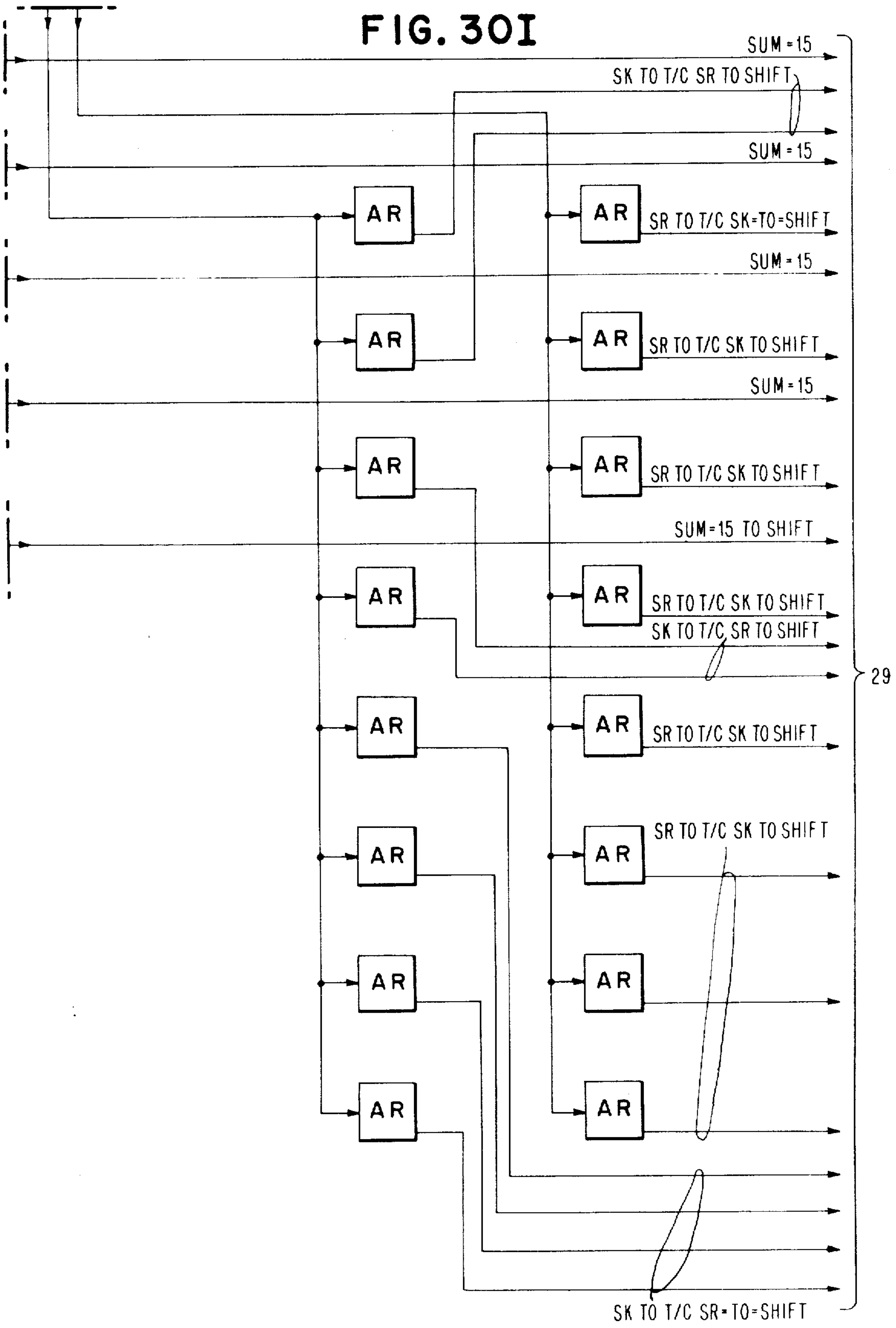

This FIG. discloses the logic necessary to perform the exponent computing operation and provides an output indicative as to whether the Sink or Source operand is to be gated directly to the main adder through the T/C Gates and which operand is to be gated to the digit preshift. The exponent subtractor as will be apparent to one skilled in the art, is actually an adder and the subtraction is accomplished by always gating one of the operands (i.e., the sink) to the adder in complement form whereupon an add operation occurs. Referring now to the composite logical schematic drawing of FIGS. 30A through 30I, the two heavy lines entering FIG. 30D represent the sink and source bits for the fifth and sixth bit positions. These are merely chosen at random as they have no particular significance other than a generally show the data flow wherein the bits first enter the half adders and then the carry generate and propagate circuitry and finally enter the final adders which provide the output. The relative inputs and outputs on this FIG. are clearly indicated as are the various outputs which are connected directly to the digit preshift on the lines marked "Shifer." The actual decoding network which calls for the various levels of shift are on FIG. 29 and are appropriately labeled. Such decoders are well known as is the particular simplified carry/look-ahead adder utilized in the present exponent subtractor. It will also be noted that the shifting signals and the gating signals specifying which of the sink or source operands is to be transferred through the true complement gates and which is to pass through the shifter are also developed in this section as a result of the sign and carry indications from the instant adder. It will also be noted that there are a plurality of output lines calling for precisely the same function and connected to the same input lines. This is solely for the purpose of providing for the necessary fan-out or required driving signal to appropriately operate the circuitry of FIG. 29.

FIGURES 31 & 32

These two composite FIGS. will be described concurrently since they constitute the Main Adder 597 which adds the two operand fractions emanating from the Digit Preshift unit 592 and the True/Complement (T/C) 591. As will be apparent from the bit numbering in the inputs at the left-hand side of FIG. 31, this FIG. contains only a portion of the preliminary and the final adder stages. However, the logical schematic circuitry of FIG. 32 contains the entire carry/look-ahead circuitry for performing requisite look-ahead for the various intergroup and intersection carries which must be processed with such a system. As stated previously with reference to the MacSorley article, the operation of highly parallel carry/look-ahead adders is well known in the art and it will not materially enhance the present disclosure to proceed through the propagation of sums and carries in infinite detail. However, it will be noted that the various half adders and carry/generate sections and some generate and propagate sections which are appropriate are labeled on these two FIGS. at the top of the composite drawings. Approximately vertical dotted lines are utilized in the drawings to separate the variously labeled functional sections of the adder.

As stated previously, the primary adder section of FIG. 31 contains all of the bit inputs for one section or 8 bits. Obviously seven such sections are required for the requisite 56 fraction bits. Referring again to the FIGS. the heavy dark lines flowing through both the FIGS. are utilized to indicate generally data flow through the adder and, referring specifically to FIG. 31F, it will be noted that a number of outputs are labeled going to the CLA unit of FIG. 32. The two dark line outputs from FIG. 31F are again showing entering FIG. 32A and the outputs from this sheet are indicated as going back into the main adder of FIG. 31 on various carry forward (CF) lines. The main adder latch or storage register is again made up of the same logic elements as in the input stations of FIGS. 27 and 28 referring briefly to FIG. 31C it will be noted that the AND gate 2060 and inverter 2062 comprise a bit storage location for the fourth sum bit. Referring still to the output lines of FIGS. 31C and 31F it will be noticed that each bit output goes to two locations, i.e., to the Zero Detector 602 and the Digit Postshift 603.

FIGURE 33

This logical schematic diagram illustrates that portion of the circuitry for performing the complete zero detect operation and the complete decode operation for the output of the main adder. As was explained in detail previously, this section examines the final sum for leading zeros and depending upon the number of complete digit zeros (i.e., 4) found, assigns a shift magnitude to the digit postshift and an update amount to the exponent update adder. As will be remembered since the present system operates on the hexadecimal digit basis, there being 14 such digits in the 56-bit fraction digit shift occurs only if the leading digits contain all zeros. For example, referring to the inputs on the left-hand of the composite sheet of FIG. 33, it will be noted that all of the bits from zero to 55 from the main adder come in the aforementioned 4 bit groups. Thus, a one digit or 4 bit left shift would be called for if all of the first 4 bits or first digit were all zeros. If any of these 4 bits contained a one, a shift would obviously not be in order.

As will be further remembered from the previous description, the present shifter provides for a fraction overflow condition by assuming an overflow and shifting to the left one digit if there is none. The present example as indicated by the heavy dark line entering FIG. 33A in the left-hand portion thereof, assumes that this bit contains a "one" which obviously would result in no normalization as far as the shifter was concerned for ordinary circumstances. However, since with the present shifting arrangements this condition will require a left shift of one digit, it will be noted following the dark line of the left-hand input to the right that this condition provides an output on the shift "one" line (S1) at the right-hand side of FIG. 33B. Similarly, if the first 4 bits were all zeros, the line marked shift 2 (S2) would be up. It will also be noticed by referring generally to the right-hand portion of the composite drawing, that the shift amounts or magnitudes are decoded for two levels of shifting to make up the possible 15-digit shifts.

Figures 33, 33G:
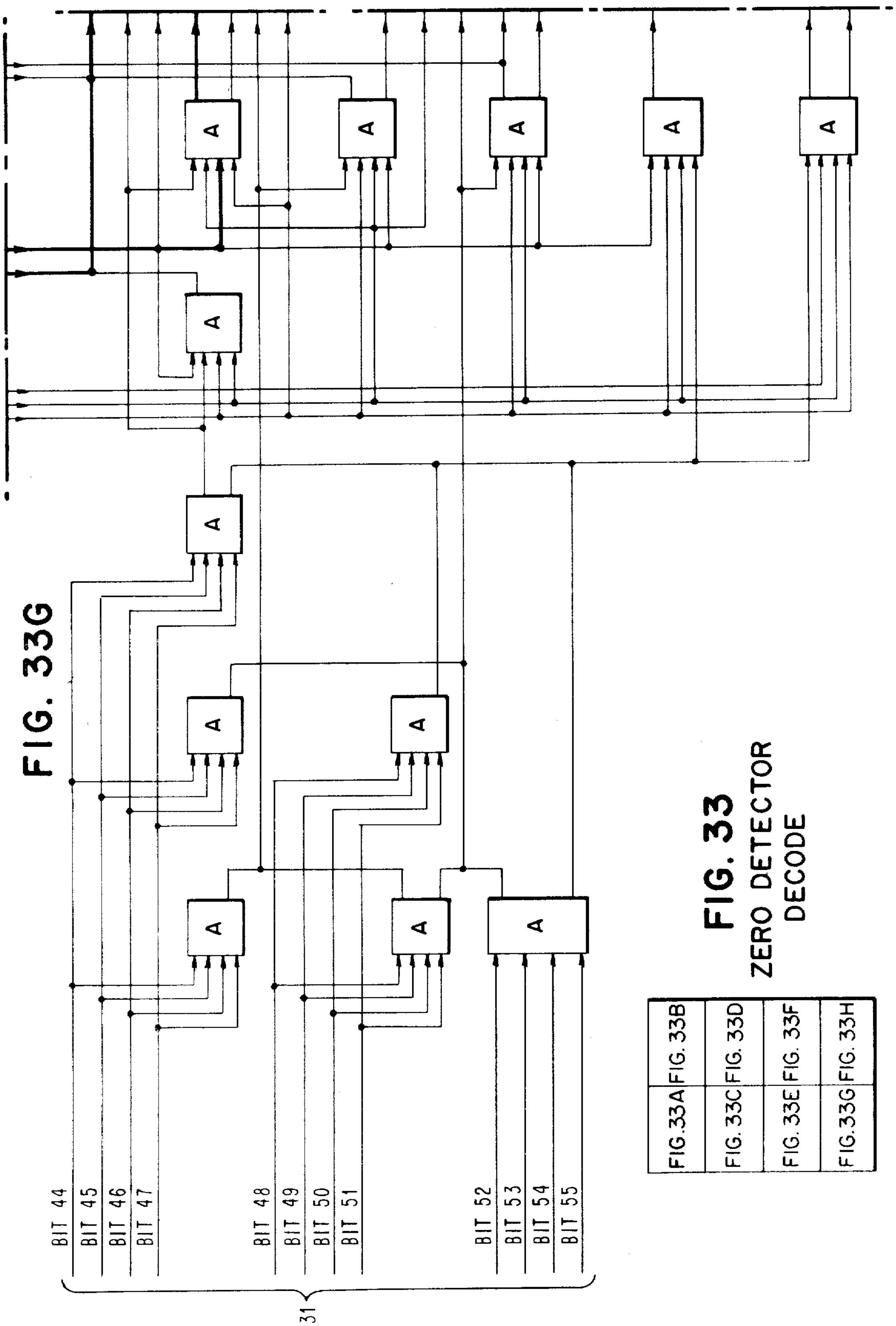
Figure 33A:
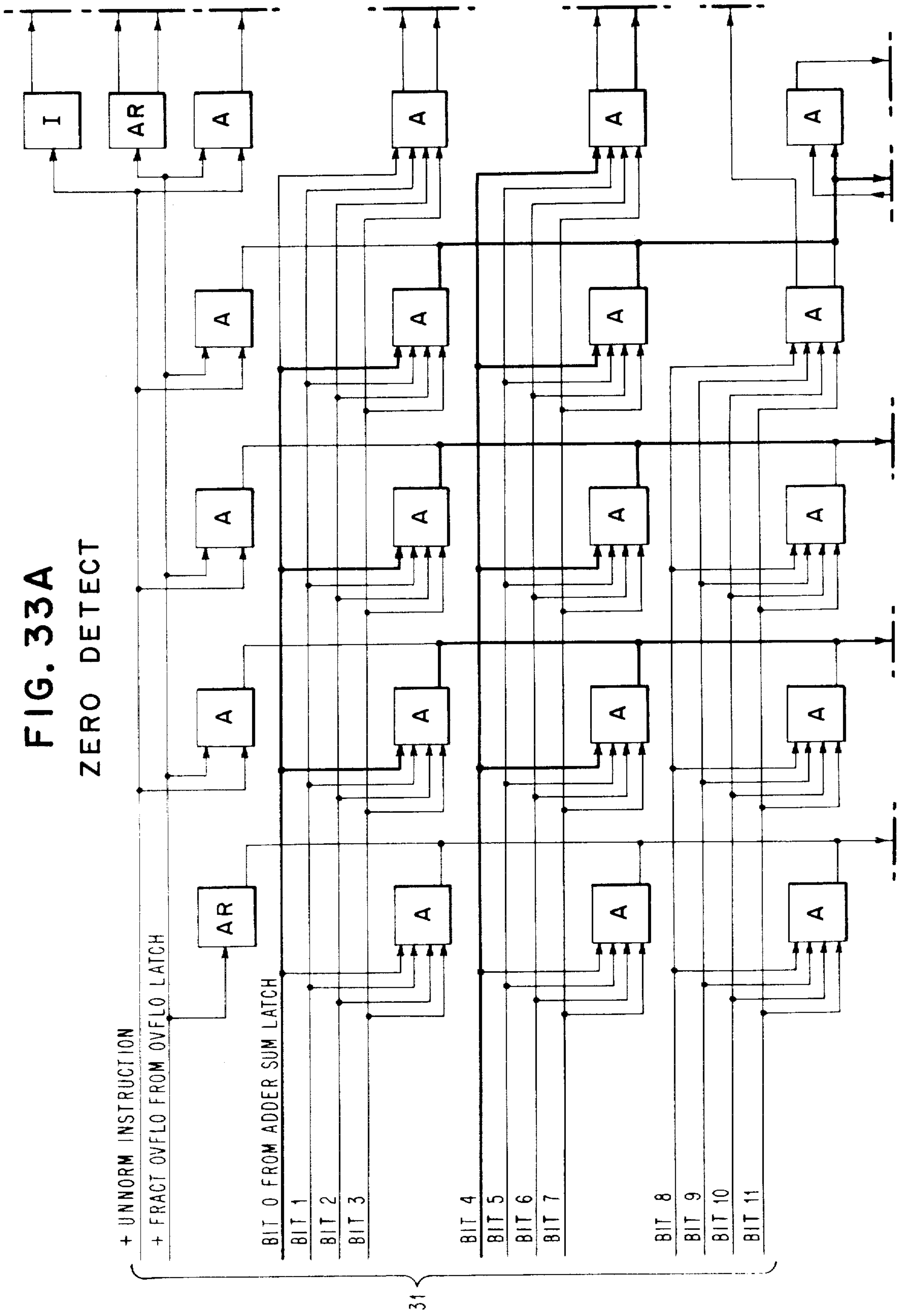
Figure 33B:
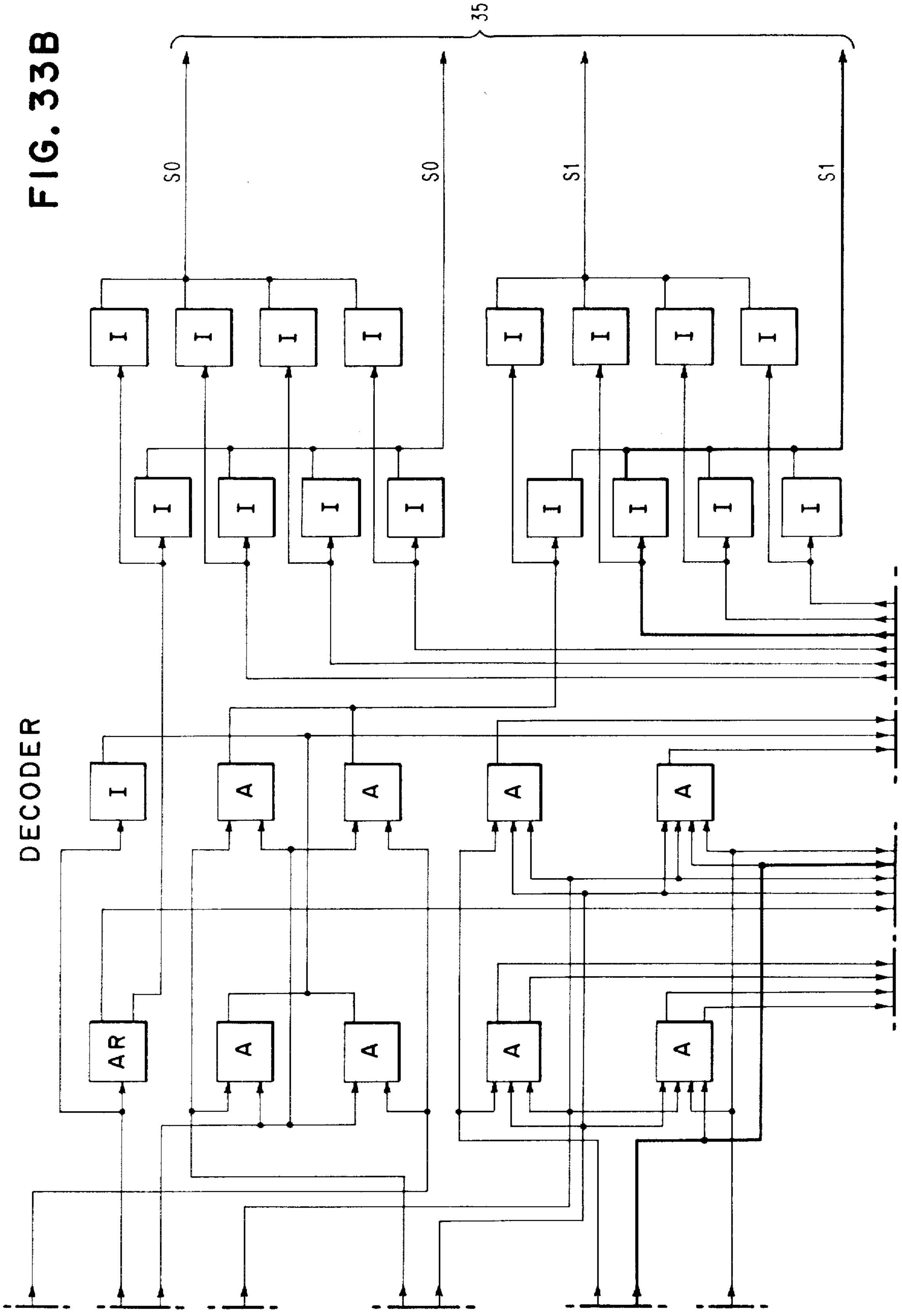
Figure 33C:
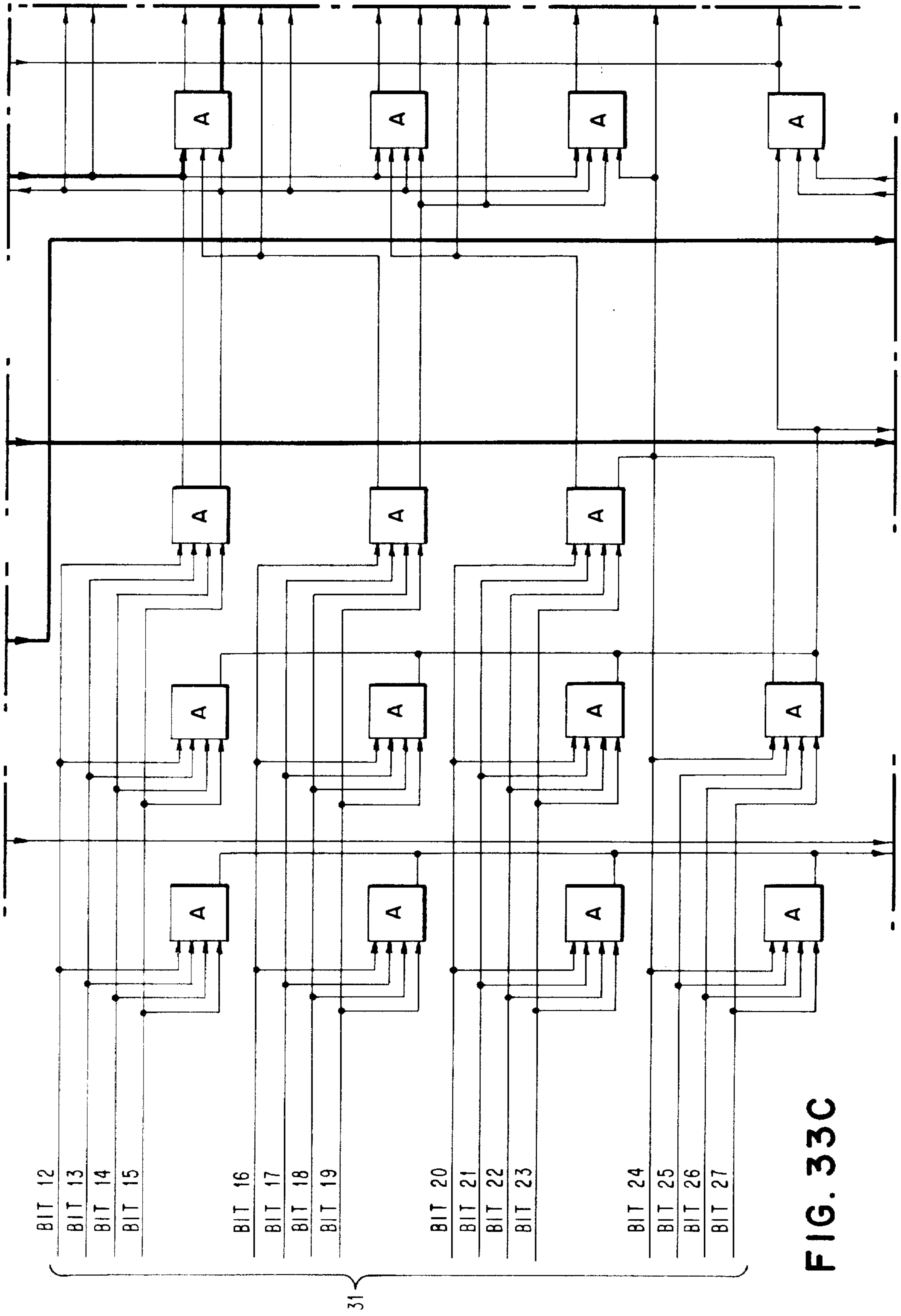
Figure 33D:
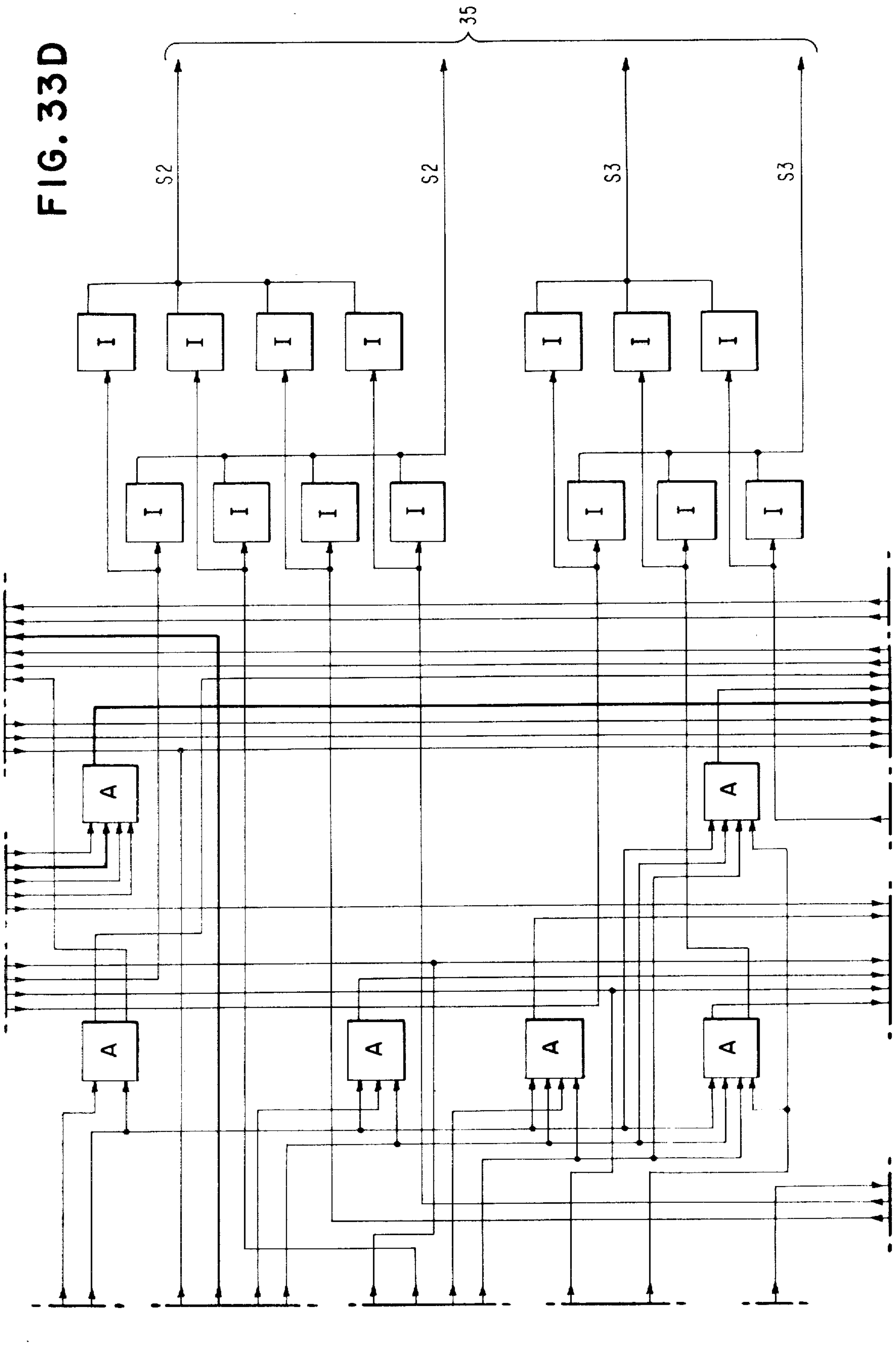
Figure 33E:
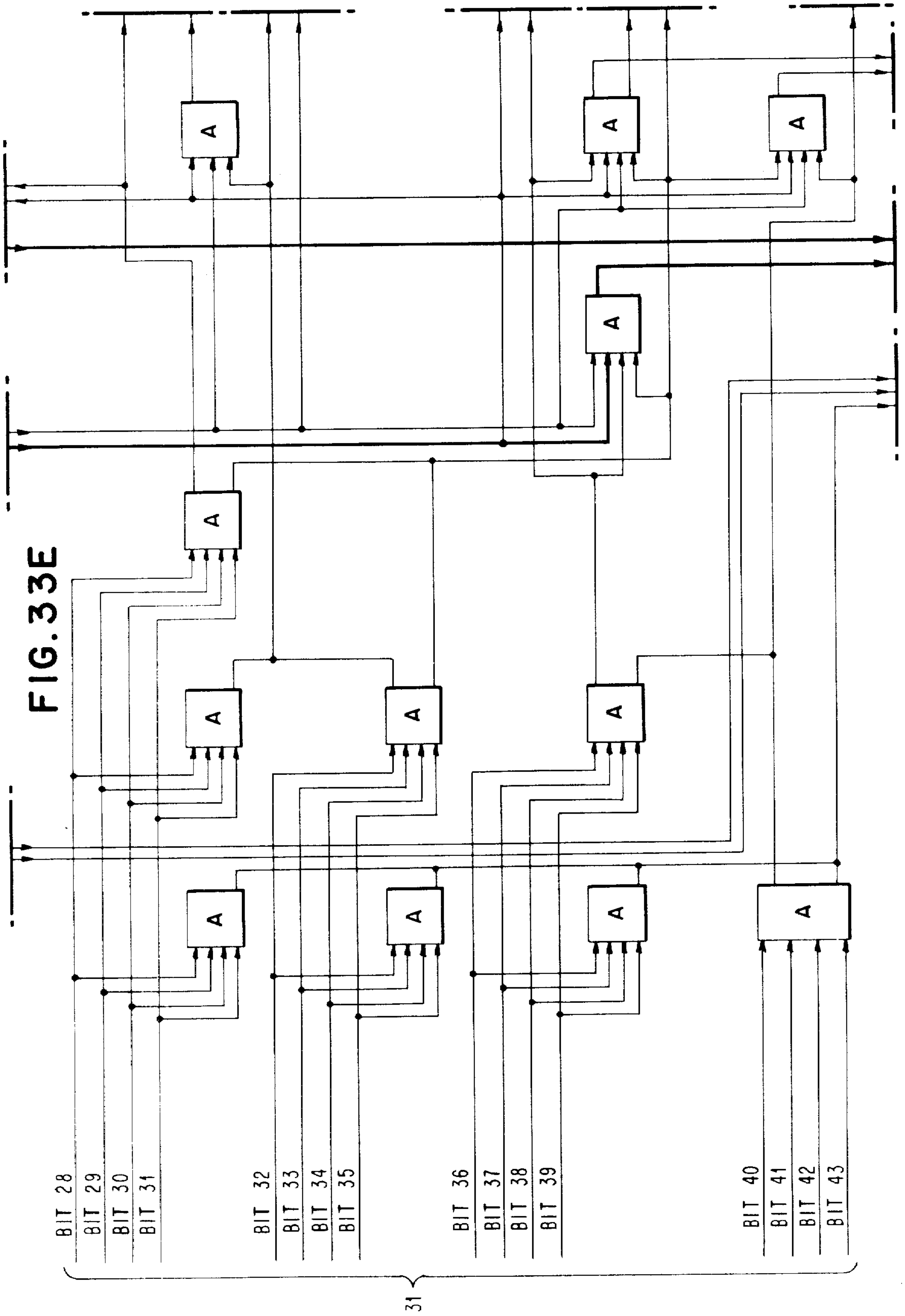
Figure 33F:
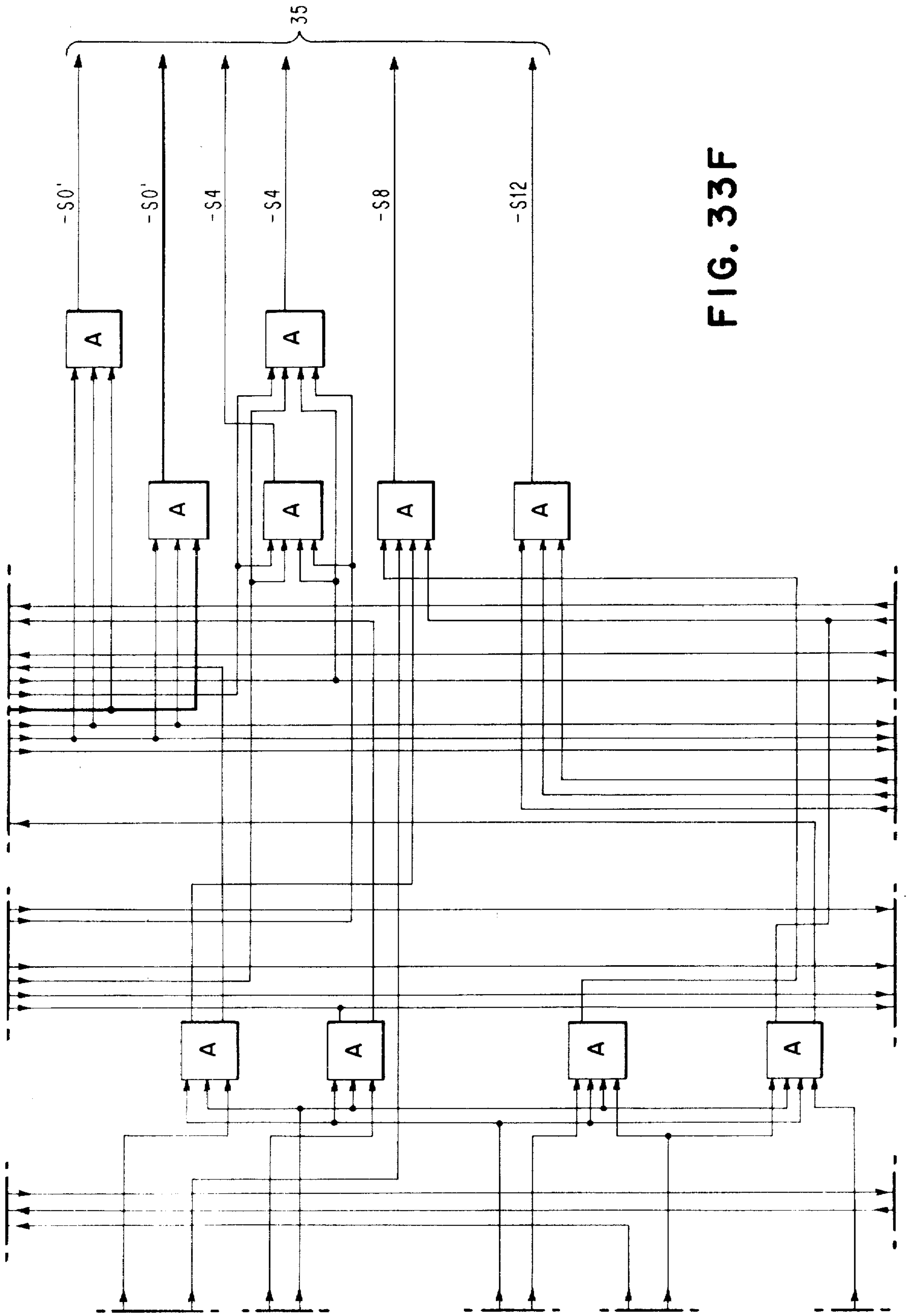
Figure 33H:
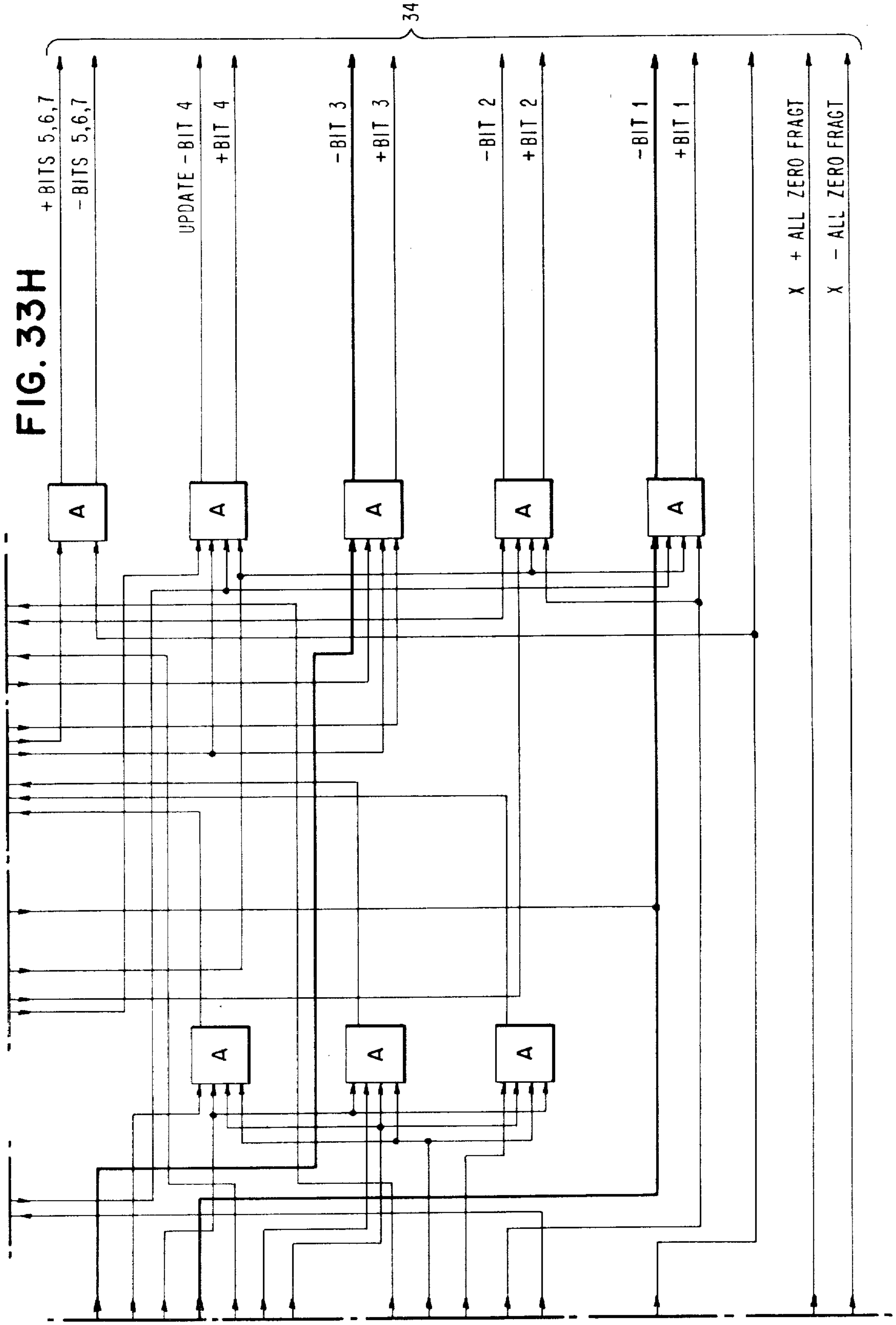
Figure 34A:
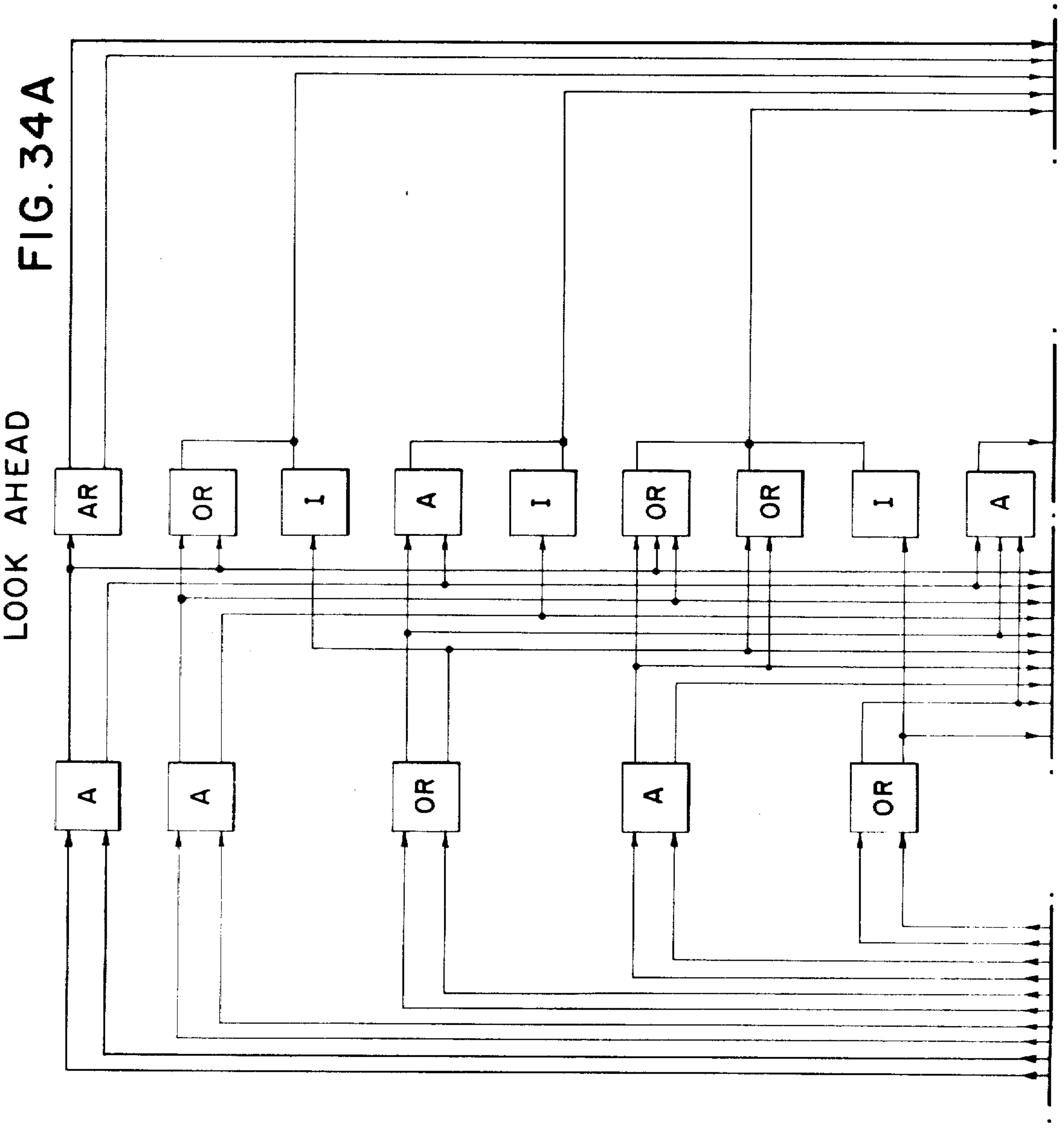
Figure 34:
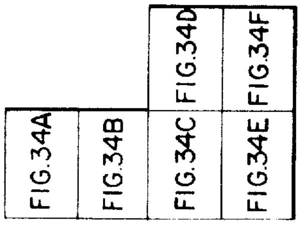
Figure 34B:
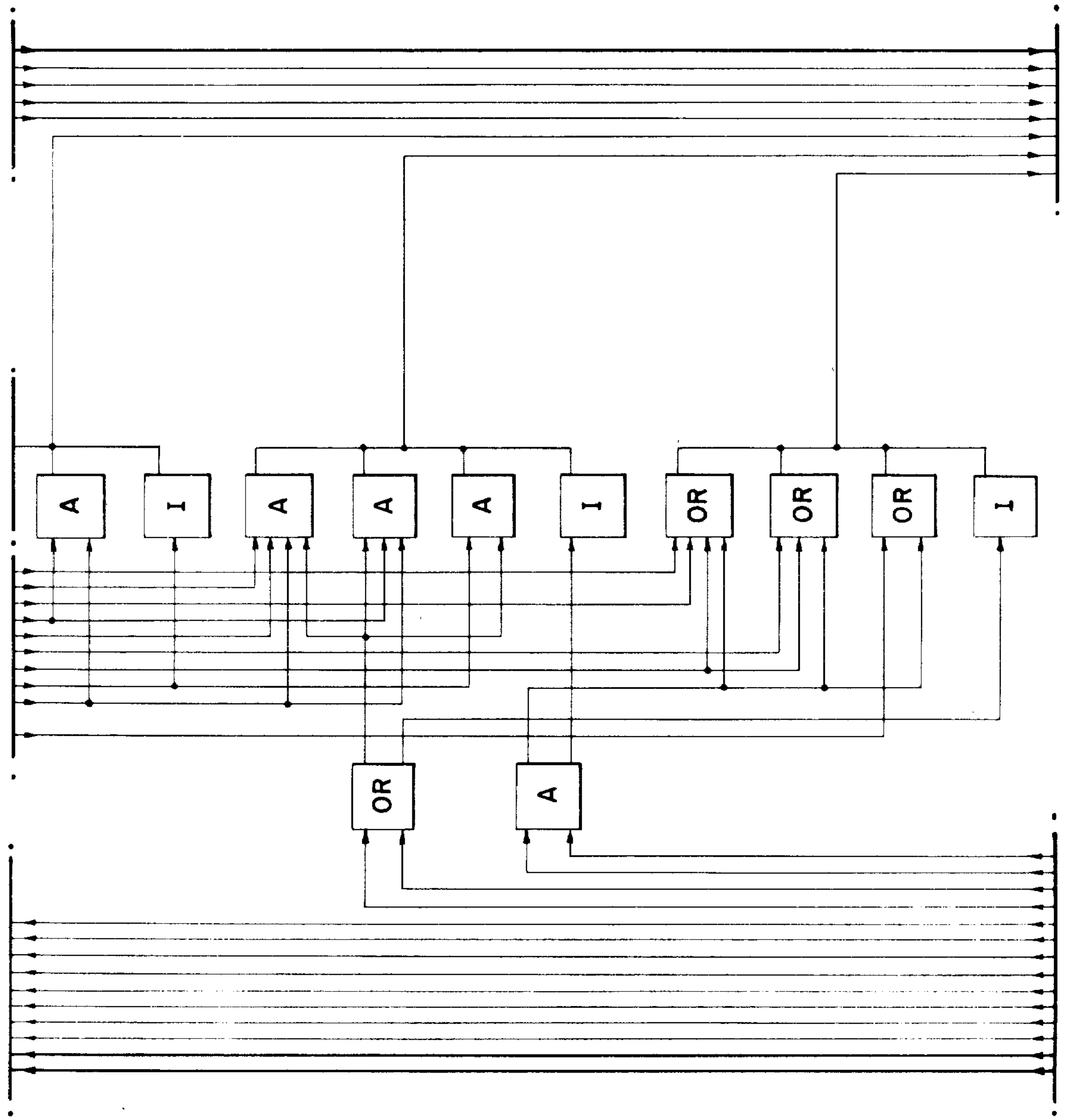
Figure 34C:
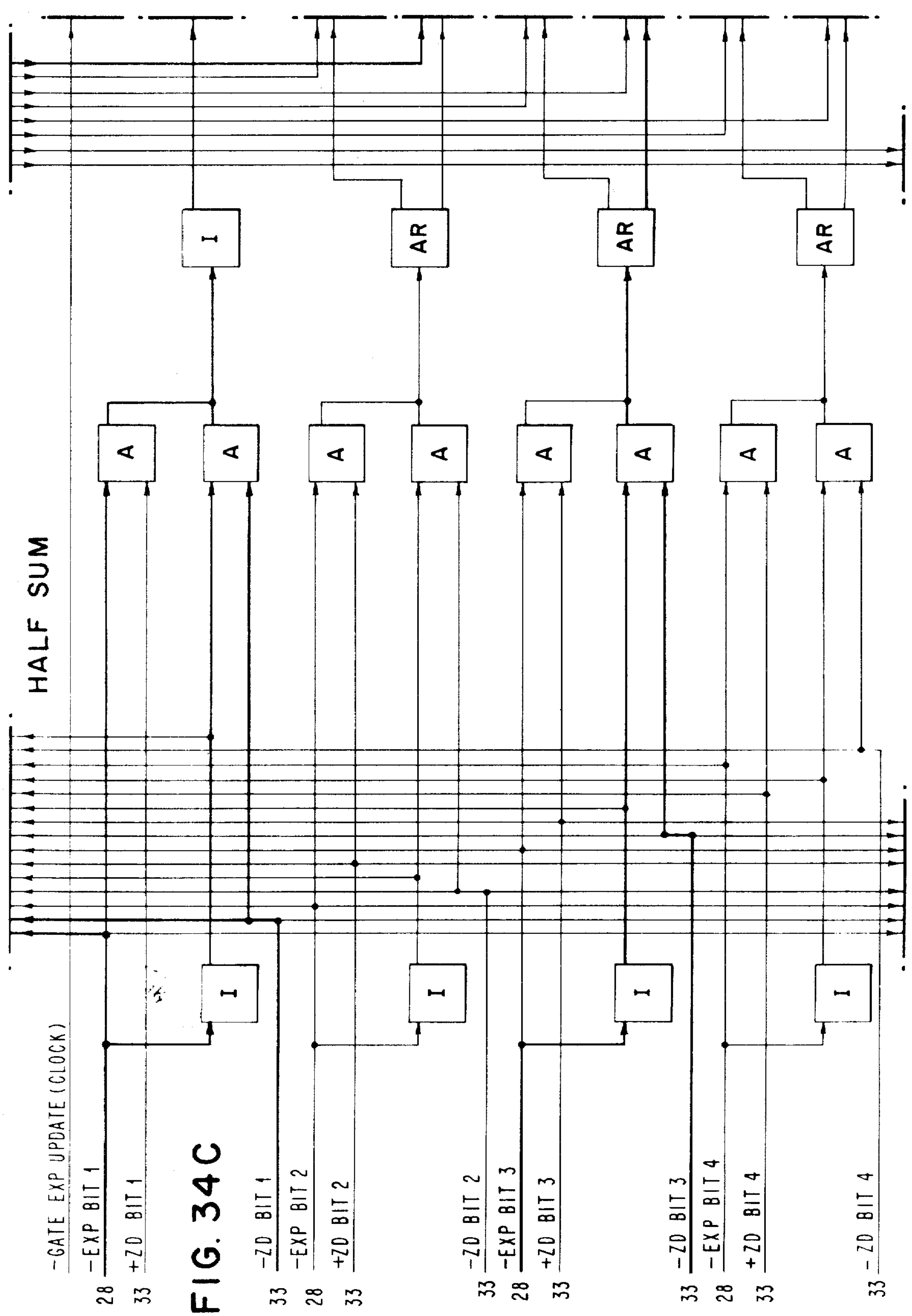
Figure 34D:
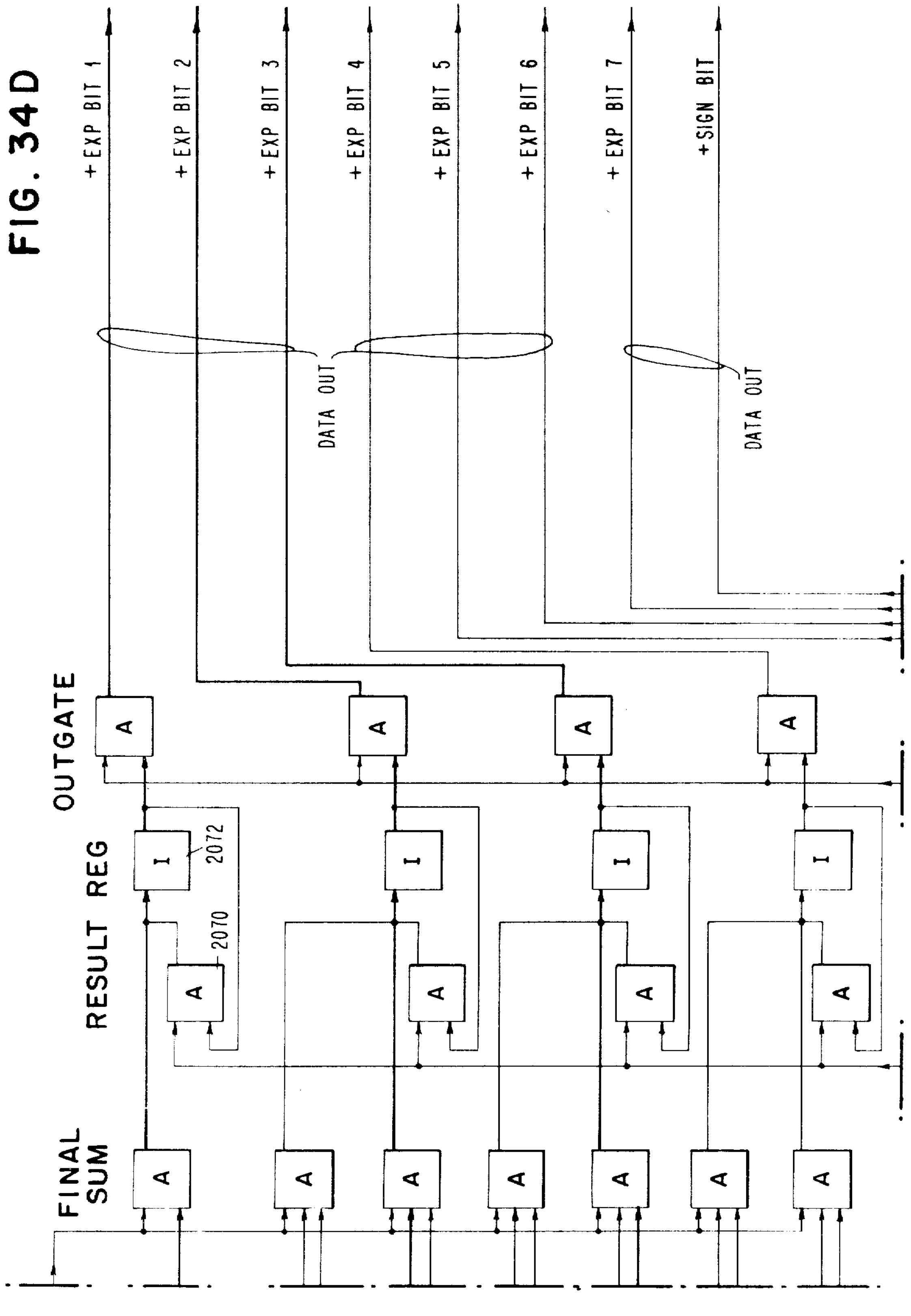
Figure 34E:
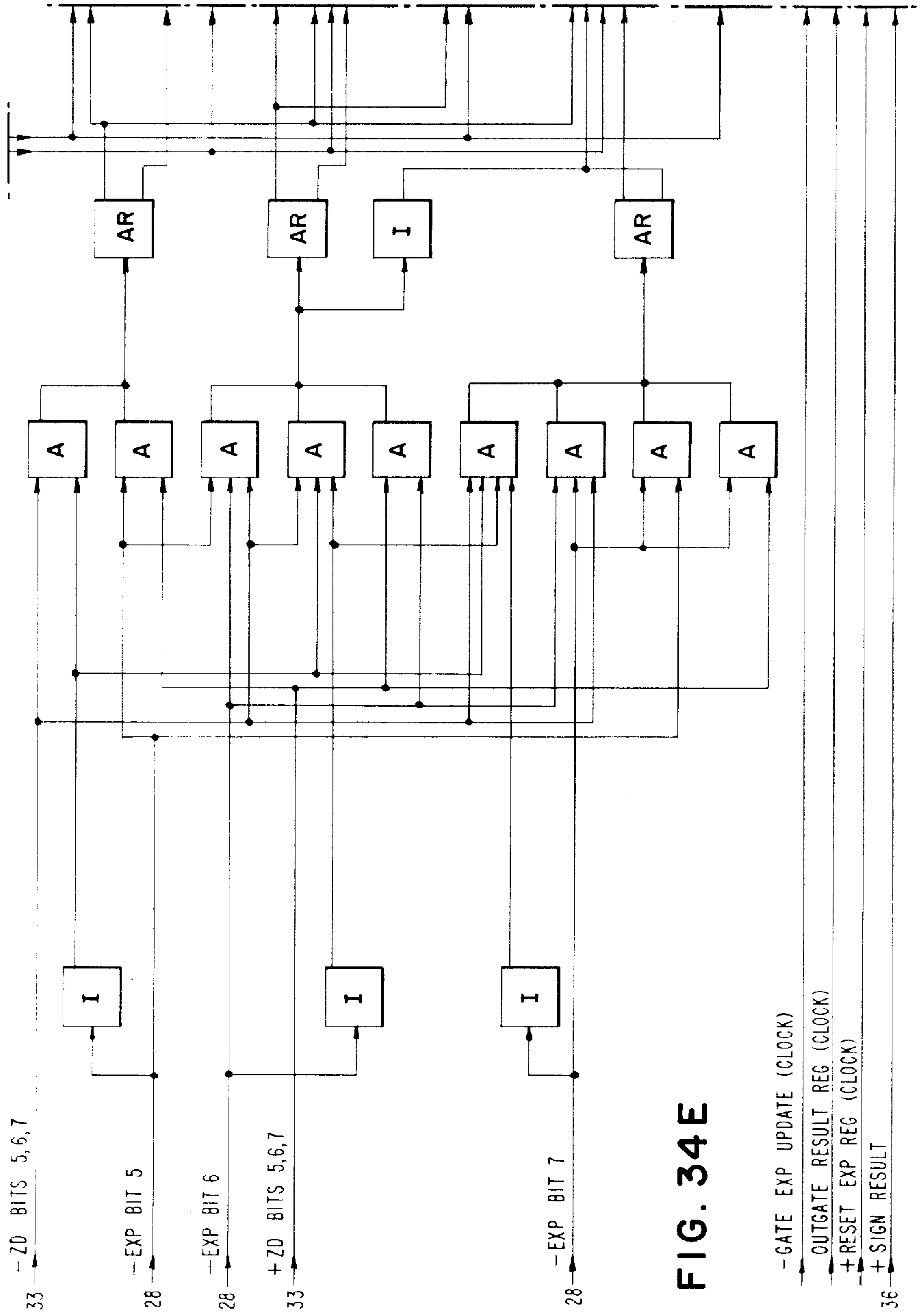
Figure 34F:
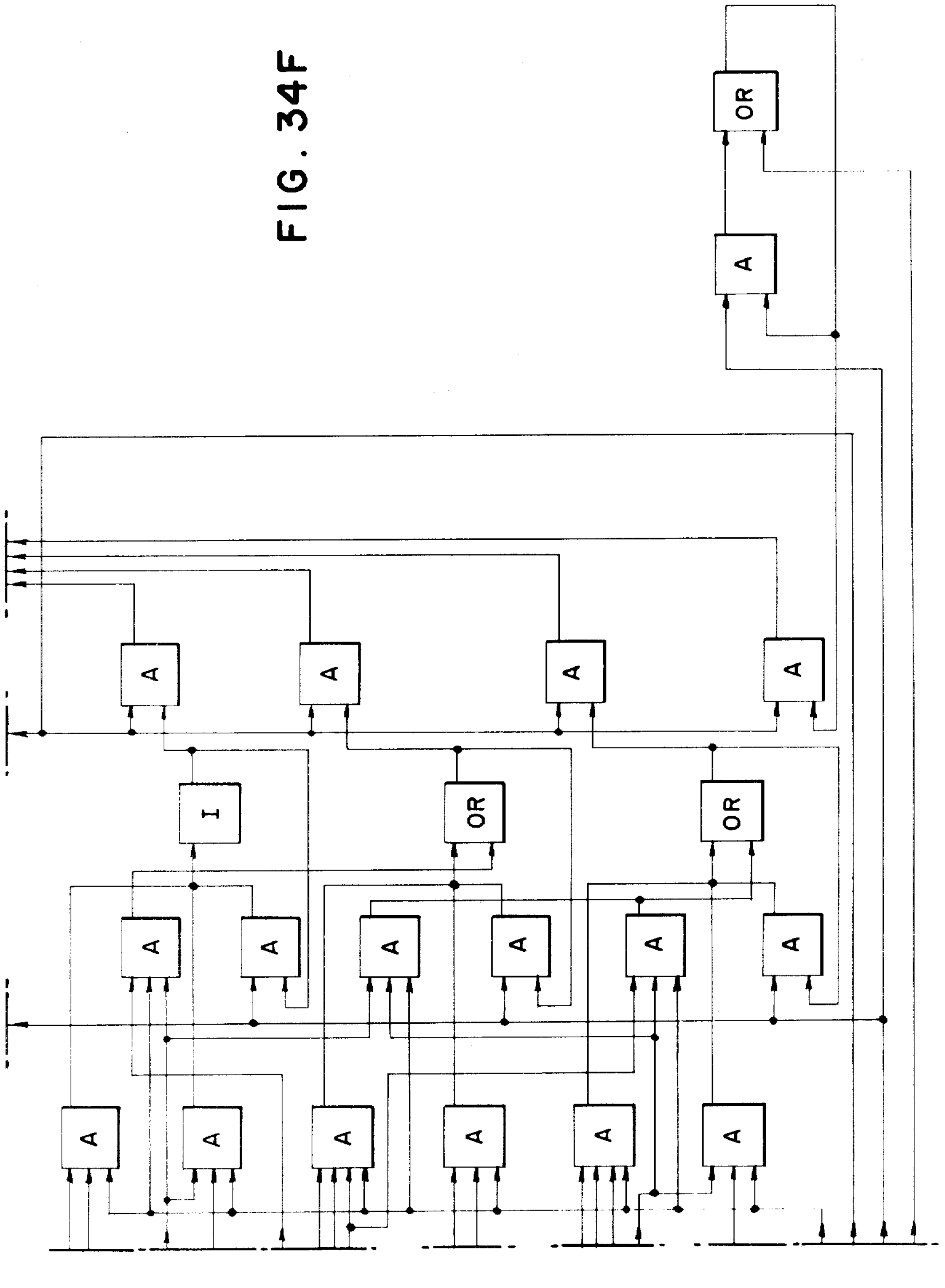
Figures 35, 35F:
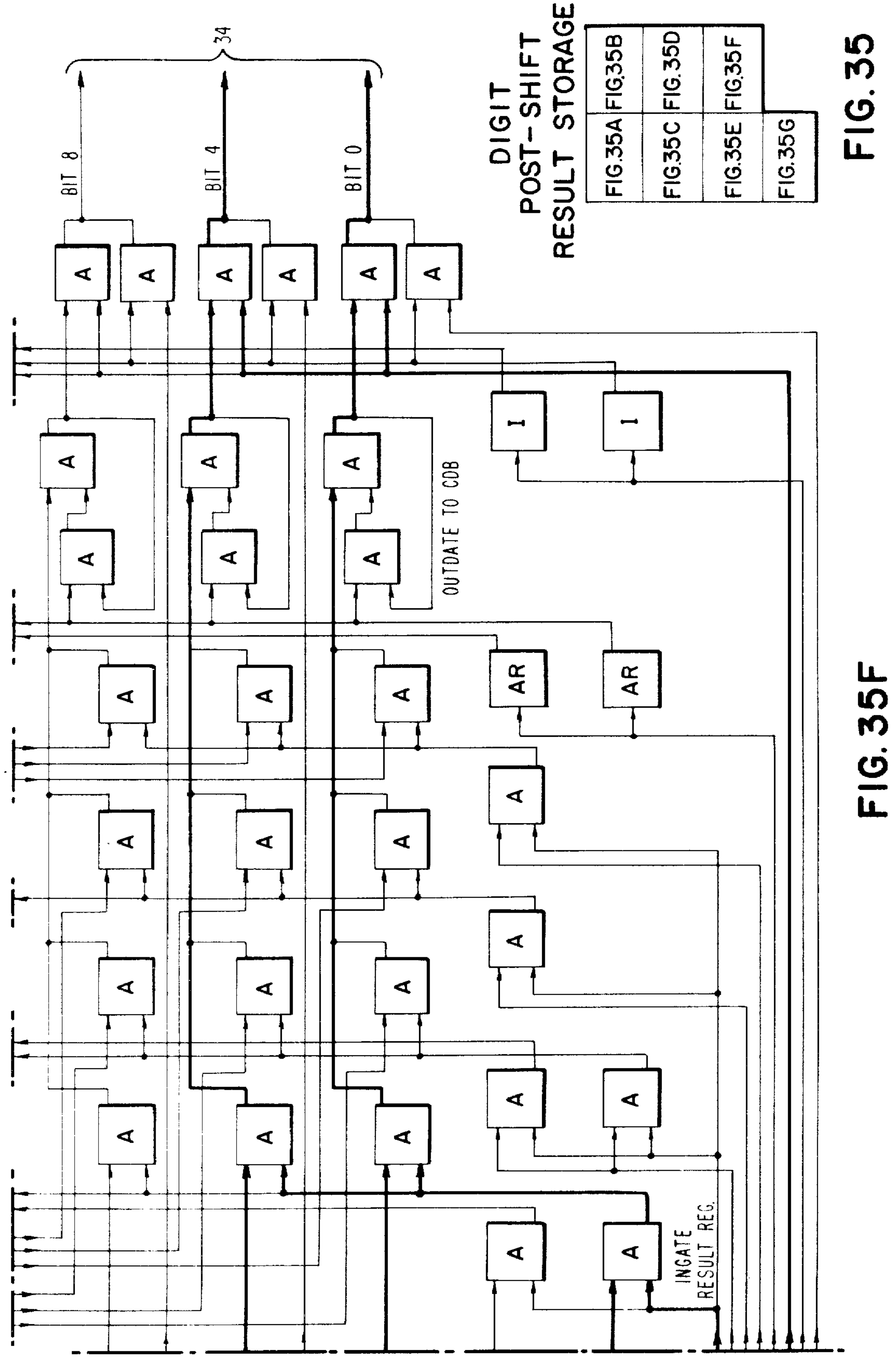
Figure 35A:
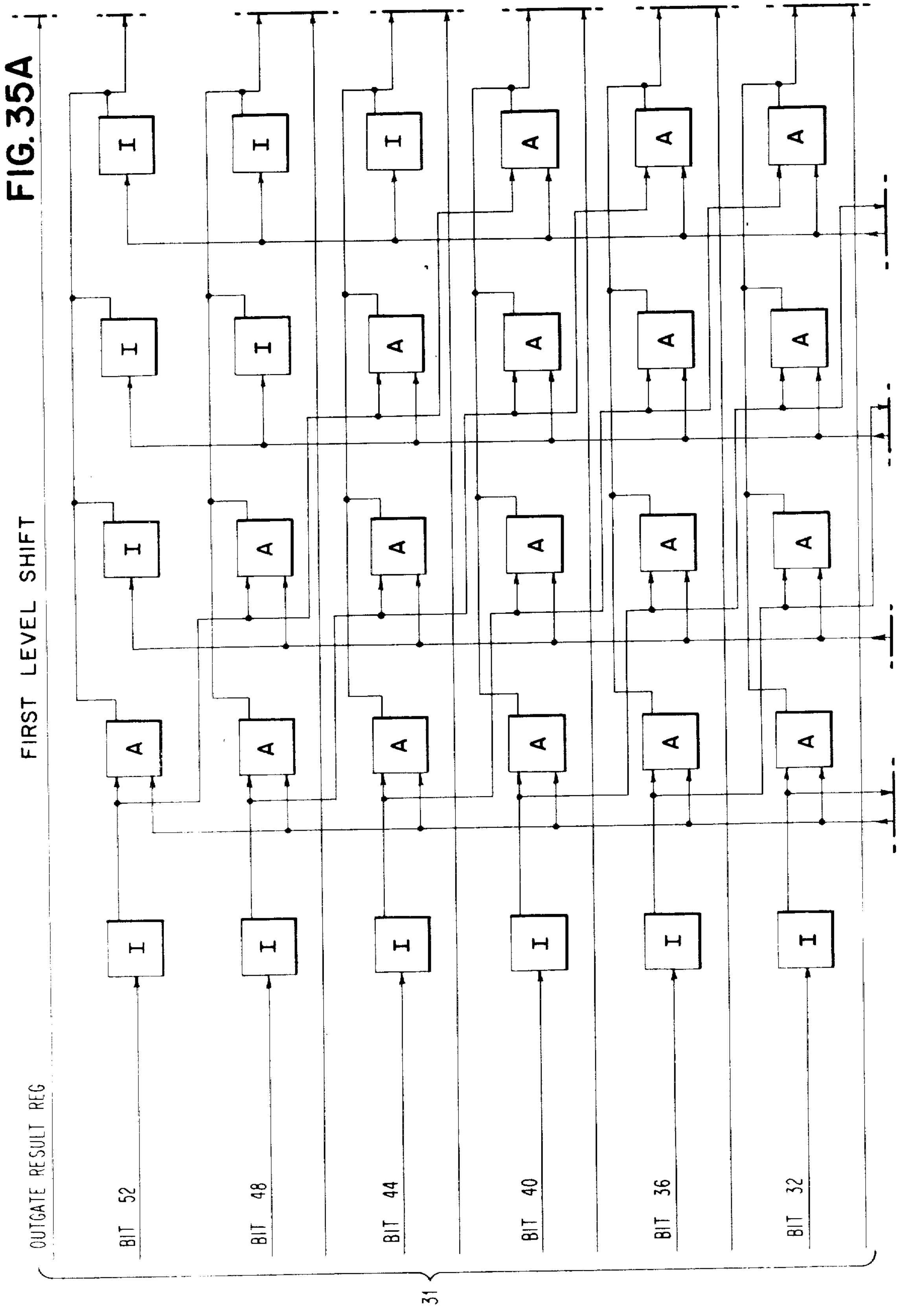
Figure 35B:
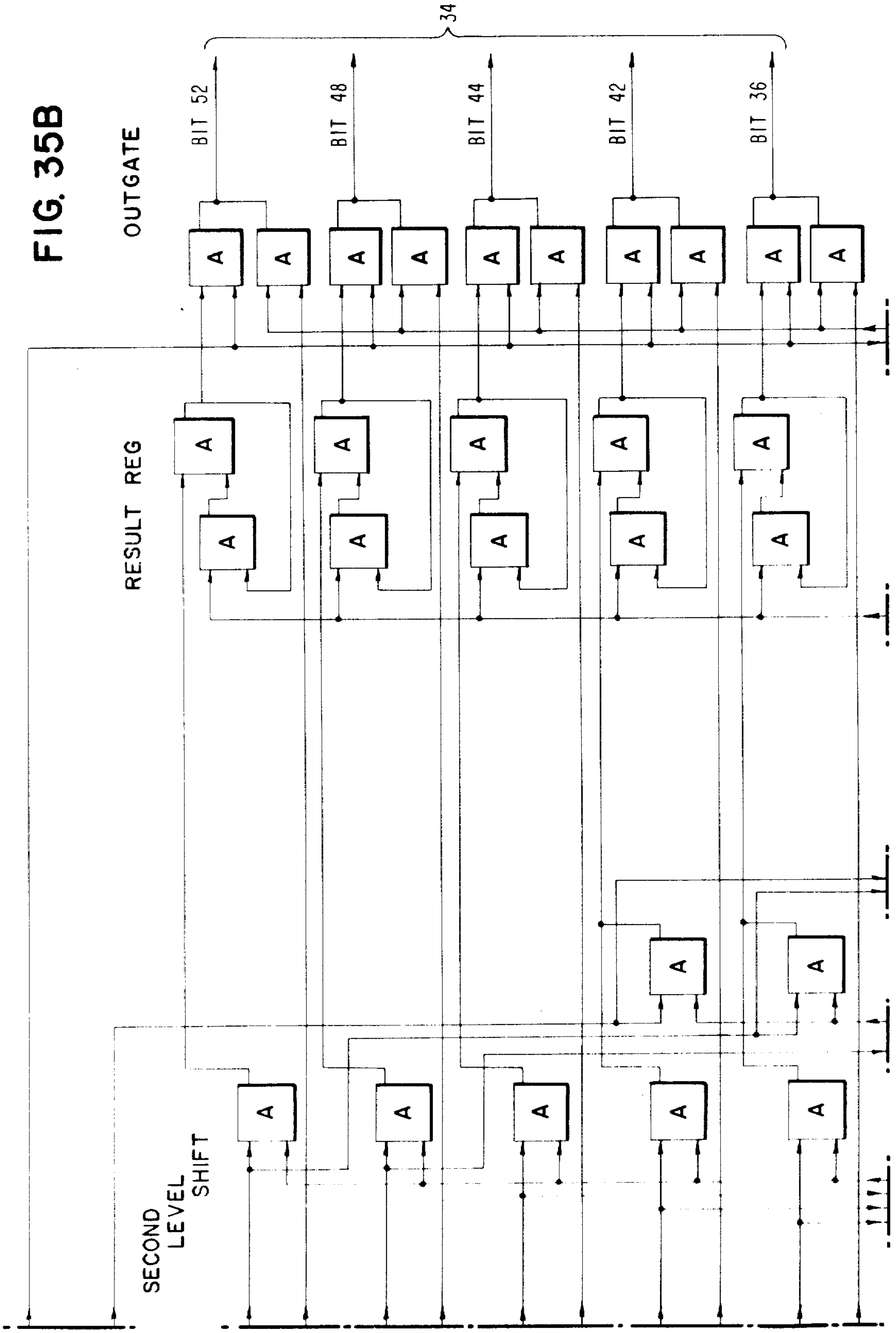
Figure 35C:
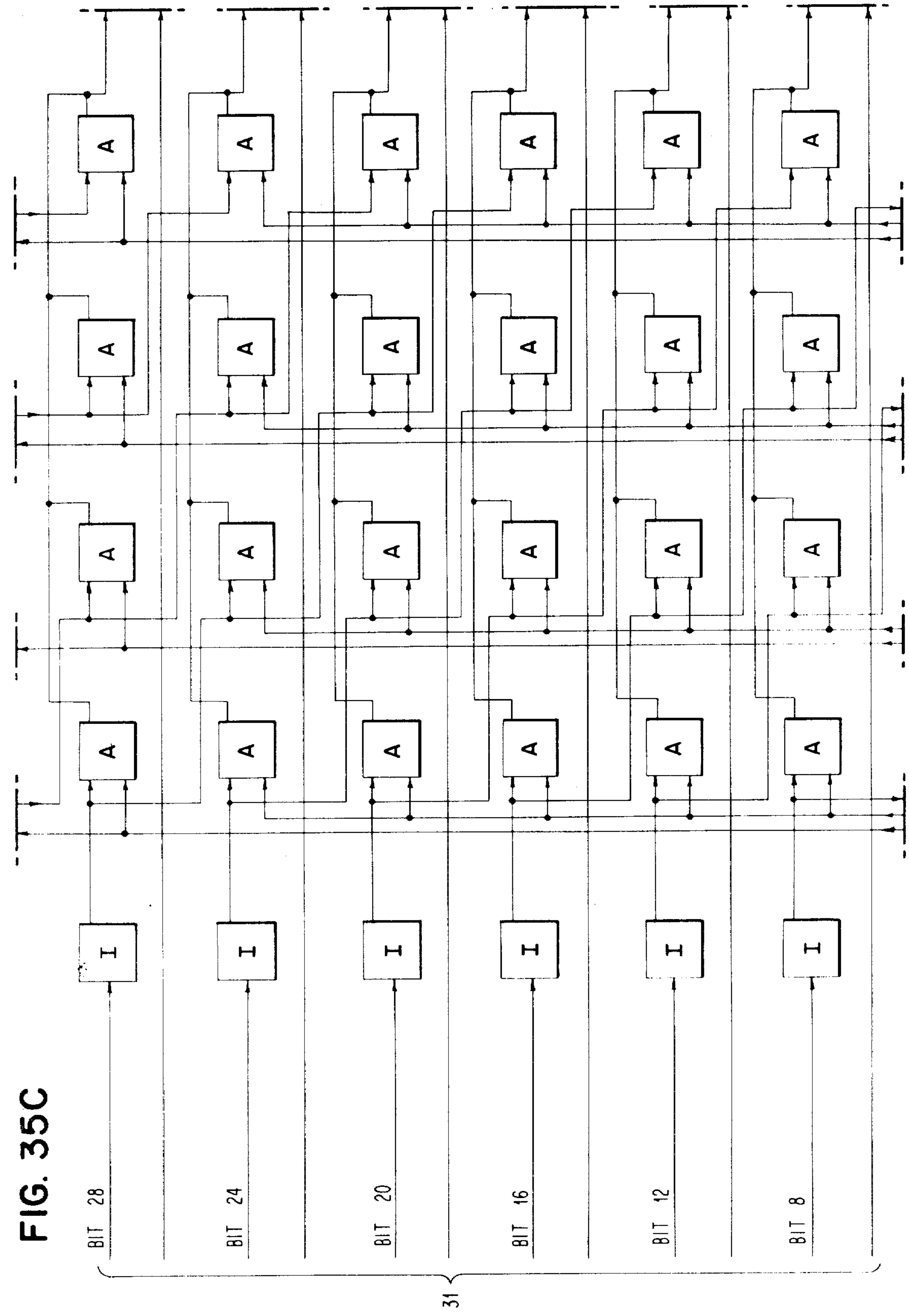
Figure 35D:
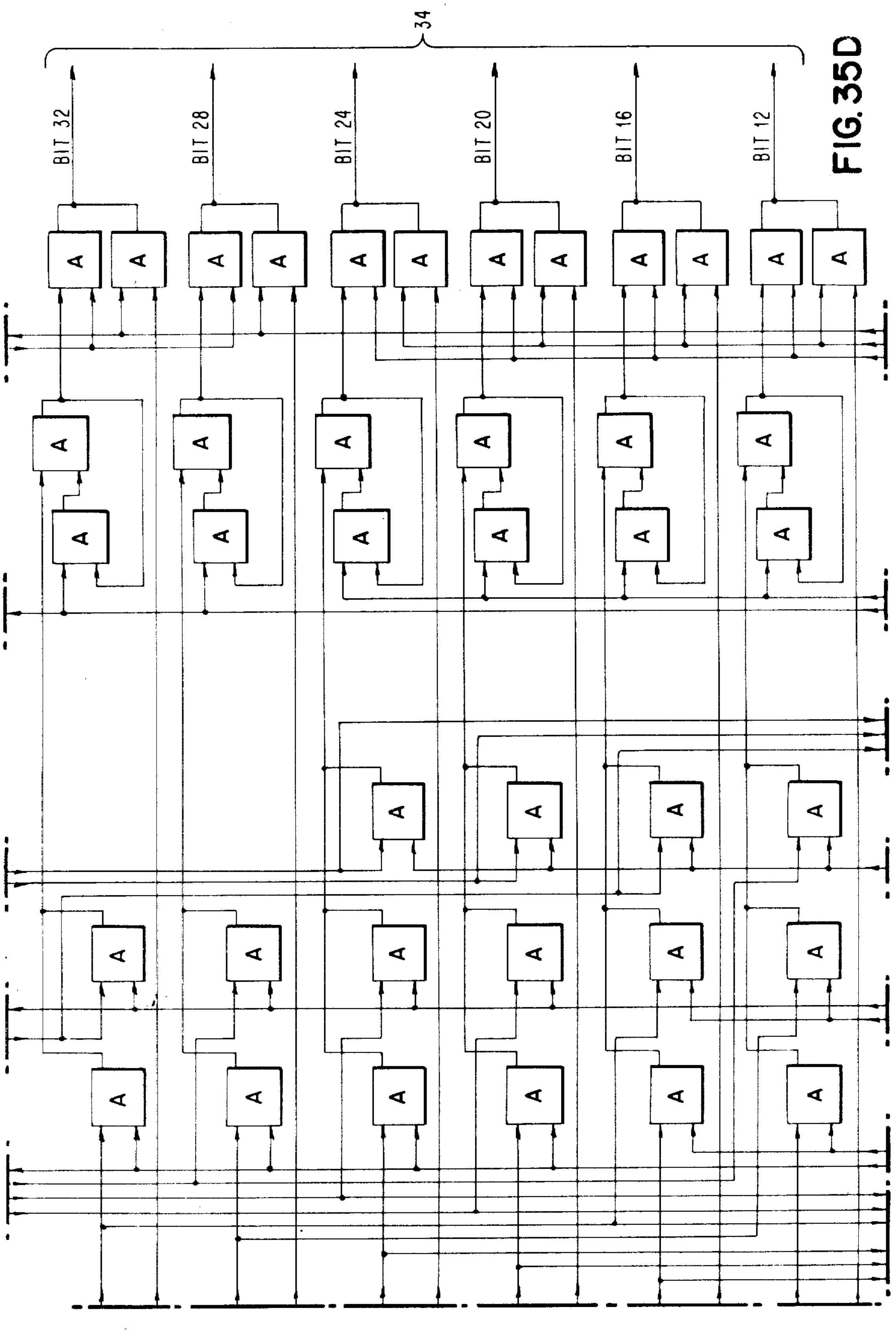
Figure 35E:
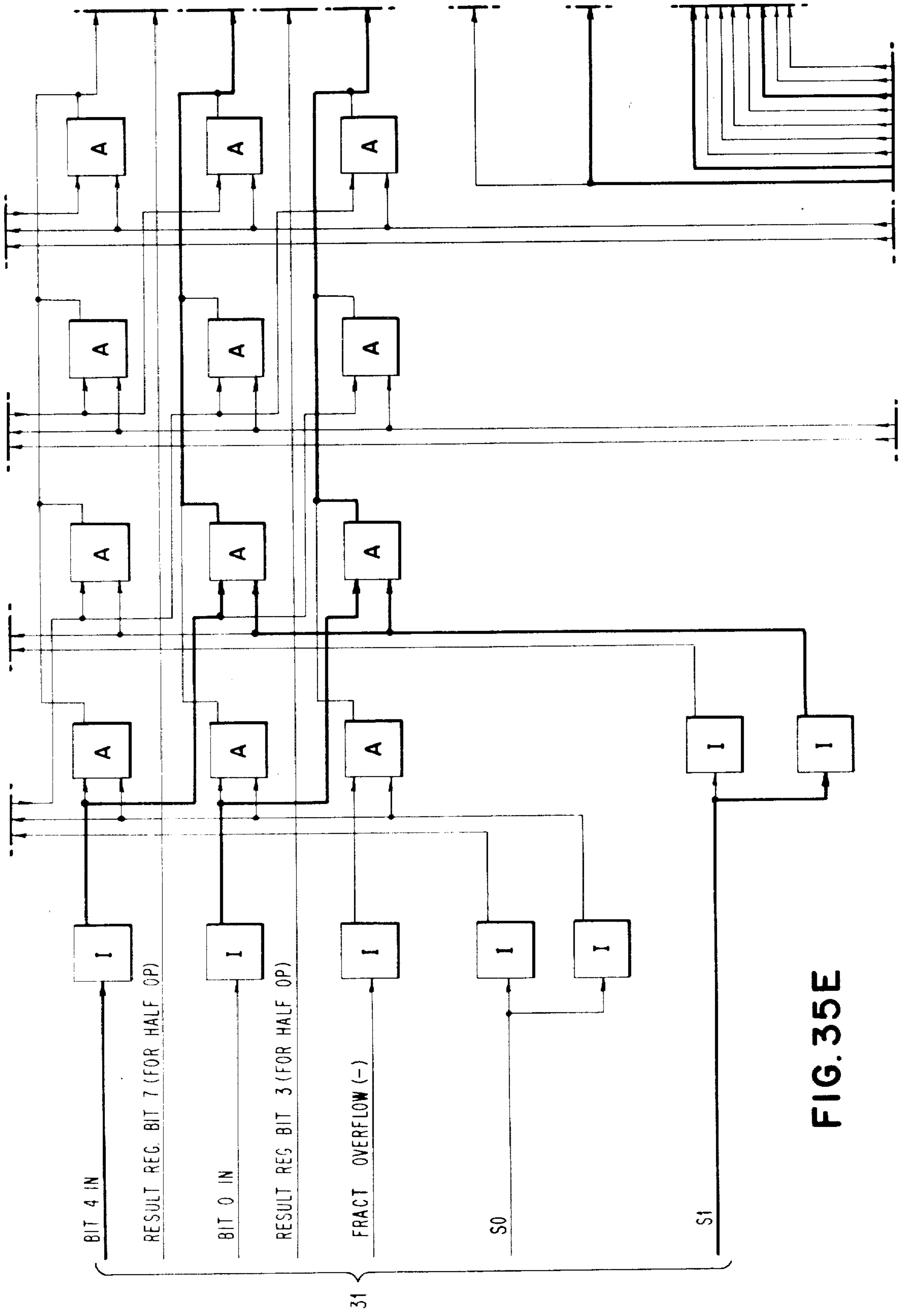
Figure 35G:
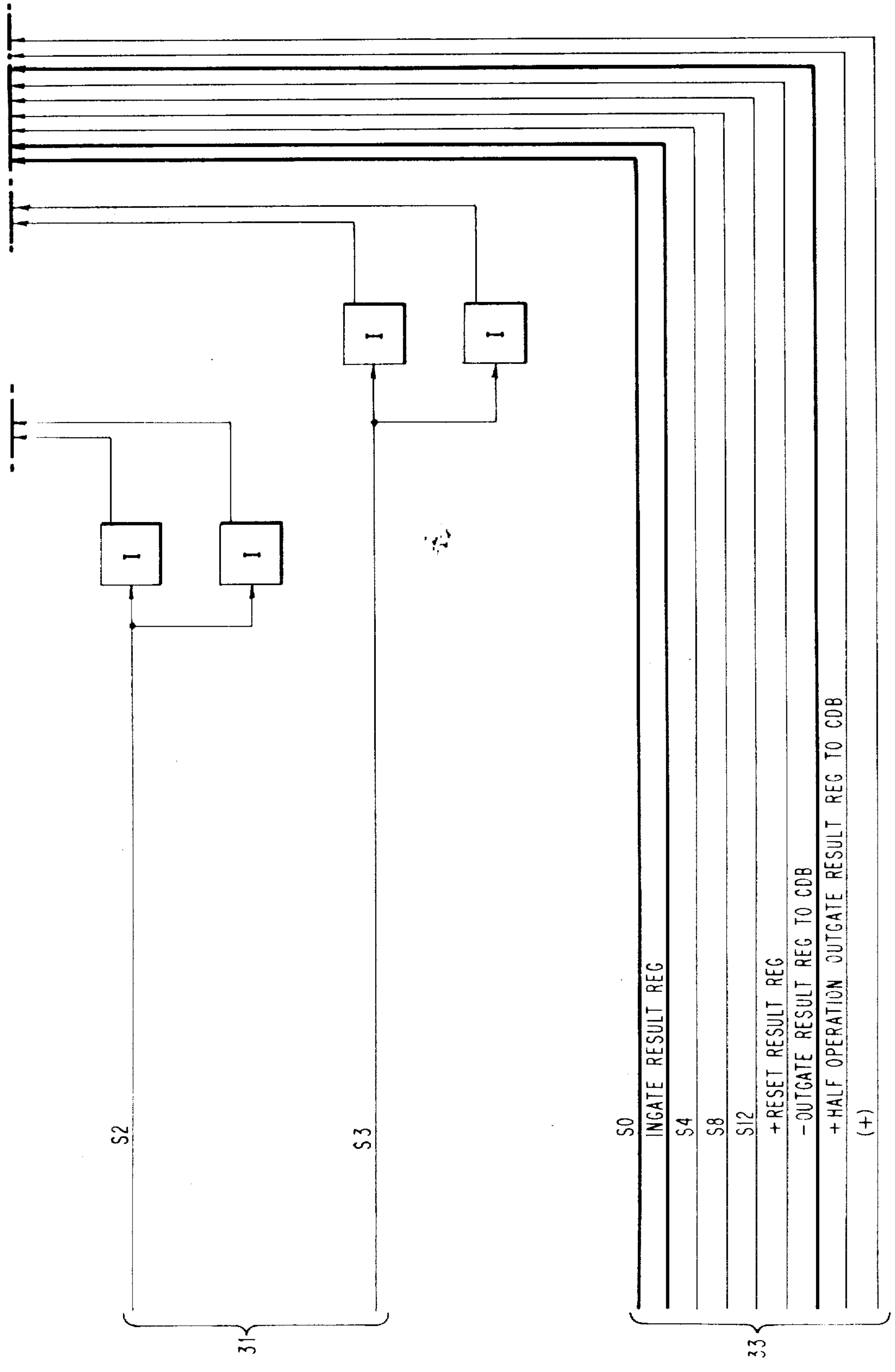

It will be further noted that in the right-hand portion of FIG. 33H the update amount lines are indicated which go to the exponent update adder of FIG. 34. They heavy dark lines from the bit inputs are shown coming out along these lines, but these obviously merely indicate the data flow path. Whether or not a given line is up or not would depend upon the the other prevailing conditions of 1s and 0s in the various 4 bit group digits.

FIGURE 34

This composite FIG. (FIGS. A—F) comprises the Exponent Update Adder 609 and the exponent Result Storage Latch 189. As its input it receives the larger exponent from the Exponent Input Storage Registers of FIG. 28 said gating arrangement being described in the description of the outgates in said FIG. 28. As its other input it receives an update amount from the zero detector, decode section of FIG. 33. These inputs are labeled Exp. and ZD respectively, plus the bit designation. As will be noted both a positive and negative ZD input is available depending upon whether the true or complement shift amount is being transmitted to the update adder.

In essence the exponent update adder is a 7-bit adder with carry/look-ahead features. The various sections of the adder are clearly labeled on the composite view comprising the initial half sum section, look-ahead section, and the final sum section. It will be noted that the output of the final sum stages feed into the result register section where again the actual storage latch or organ comprises an AND gate and an inverter such as 2070 and 2072 shown at the top of the stack of Result latches. Thus, the outputs from this section comprise the final exponent and sign bits after the appropriate normalization.

FIGURE 35

This composite FIG. shows that section of the present high-speed adder devoted to the post shifting or normalization of the result fraction and also constitutes the storage latches for the output of the adder from which the result may be subsequently gated back on to the common data bus (CDB). This section receives two primary inputs, one from the sum latches from the main adder FIG. 31 and a shift magnitude input from the Decode Section 606 shown in detail on FIG. 33. An additional input to this section will obviously be the "gate out result" signal which is stated previously will place the result on the output bus.

Referring now specifically to the composite drawings of FIGS. 35A through J, it will be noted again that only a relatively small portion of the adder inputs are shown as each section is essentially identical and to show seven such sheets would serve no purpose. The actual operation of the first level shift, the second level shift and the result registers is the same for all of these sections. Also the inputs marked "half op" are for specialized operations which have no bearing on the present invention and will accordingly not be further described. In the disclosed example wherein the heavy lines represent the data flow paths through shift and result registers and into the outgates for 2 bit positions it is assumed as indicated previously that shift magnitude of one has been called for. As will be remembered from the previous description, this is an artificially imposed shift magnitude because it is desired to provide for a carry out of the highest order bit position. However, in the present example it is assumed that there is to be neither a normalization nor carry out and that the bits are to come out in their original position in the output. Thus, it will be seen that for the input line S1 being up and bit 0 coming in on its indicated line that this data propagates through the system and comes out on the line marked bit 0 to the right-hand portion of the composite FIG. If the shift line S0 had been up the bit 0 entering on the left-hand portion would have come out on the line marked bit 4. This represents a left shift of 4 bits or one digit as will be appreciated. It will further be noted from the bit input pattern that one bit from each digit appears on this particular logical schematic, therefore, shifting one of the input bits by one position is equivalent to a 4-bit or single digit shift.

FIGURE 36

This FIG. comprises a simplified logical schematic of the Sign Control unit shown on FIG. 26. It is believed that this schematic is largely self-explanatory for all of the various inputs and outputs are clearly labeled. As in the other logical schematic diagrams all of the inputs are at the left-hand portion of the drawing and all of the outputs are the right-hand portion. It will be noticed that the portion enclosed in dotted lines is essentially the "effective operation" logic which determines initially whether an effective add or subtract is to be performed by the main adder and is the first output from this unit which this system requires. The remainder of the circuitry is for the purpose of updating the result based on such factors as end carry, relative magnitude of the exponents, the sign bit of the greater exponent, etc. The outputs from these sections go primarily to the main adder output latches and into the result storage locations for controlling the true or complement form of the final result as opposed to the intermediate result from the main adder.

The philosophy of operation of such adders insofar as sign manipulation is concerned is well known in the art and is described in detail in Section III. It is not believed necessary to go through the various logical operations in detail. It should be remembered however, when examining this diagram in particular that the present system utilizes true binary (i.e., positive or negative) logic wherein, for example, the effective sign which comes out of the effective operational logic section indicated on FIG. 36 will either be a plus or minus voltage depending upon the operation to be performed and an effective add or subtract will obviously be performed by the main adder depending upon the sign of the signal appearing on this line. FIG. 26 indicates the effective operation line going into FIG. 29 where the T/C gates are located. Thus, as stated previously by gating the complement of one of the operands to the main adder an effective subtract is rendered possible.

FIGURE 37

FIGS. 37A and B comprise logical diagrams which explain the operation of the basic logical building blocks of which the preferred embodiment of the present system is constructed and which are shown as the component parts of the logical schematic diagrams of FIGS. 27 through 36. The two indicated blocks the AND (A) and the OR (R) are the two widely utilized basic blocks. The blocks entitled AR and I are merely single input variations of this block. FIG. 37A implies the logic for the AND block. It will be seen that an AND gate will be looking for two negative inputs. If such inputs are received, the lower output will be negative and the upper output positive. Conversely, with the OR configuration of FIG. 37B this particular block will be looking for at least one positive input. If the positive input appears at either A or B the lower output from the logical block will be positive and the upper output will be negative. The AR block and the I block are essentially identical to each other and vary only from the AND and OR blocks in that they are the single input units. In the case of the AR block, both the upper and lower output are utilized for subsequent logical controls whereas in the I block only the upper or inverted output is utilized.

The overall philosophy of these circuits is that with all negative inputs (i.e., one or more) the lower output is the true output and the upper output is the complement. However, if any of the inputs becomes positive, the phase of the outputs reverses and the lower output reflects the positive input and the upper output shows a negative polarity. Generally, the lower output from these units may be considered the true output and the upper output may be considered the complement output. However, as will be apparent from the preceding explanation, this only applies depending upon the particular input being considered since if A were positive and B were negative, the lower output would be positive which would not be a true indication of the negative input at B.

FIG. 37C is a detailed schematic diagram of a typical NAND logic unit which in this basic form comprises almost exclusively the preferred embodiment of the present system. The number of inputs to the three input transistors labeled A, B and C represent the configuration for a 3-input AND or OR logic block. The number of input transistors can vary from one for the AR or I block or up to four with the AND or OR blocks. This type of circuitry is conventionally referred to as current steering emitter follower logic and it is particularly suited integrated circuit technology. The bias points are clearly indicated on the FIG. and will of course vary depending on the particular type of transistor utilized. It should be noted, however, that such circuitry is capable of extremely high-speed operation and the extremely high overall speed of the present adder unit is largely due to this type of high-speed circuitry.

FIGURE 38

This FIG. represents the basic timing chart illustrating the three primary timing pulses utilized with the present high speed adder system. The upper portion of the FIG. illustrating the three sets of pulses labeled $t_0$, $t_1$, and $t_2$ represent the actual timing pulses utilized. The pulse set $t_0$ is effective to initiate the gating of operands from the input storage registers into the adder circuitry wherein the exponents passed through the exponents subtractor and the fractions pass through the assigned gates, of preshifting network and bits into the main adder. The pulse labeled $t_1$ controls the gating of data from the output of the Main Adder into the sum latch. The sum latch provide the storage necessary for the zero-digit check and post shifting. The minimum time duration between $t_0$ and $t_1$ is determined by the longest data path length from the input storage registers to the first latch point and the width (time duration) of the set pulse must be>the shortest path. Finally the pulse $t_2$ controls the gating of data into the result storage register and onto the common data bus which directs it to system storage. The lower three lines of the FIG. constitute a propagation cycle through the adder for three consecutive operations and it will be noted that the second operation may be started slightly before the just preceding operation is gated out of the main adder. This is due to the completely asynchronous serial flow-through characteristic of the present system whereby once a particular operation is started between the latch points, it is essentially independent of any other system control until it reaches the subsequent latch point. It may be seen from this FIG. that it is possible to have as many as three operations going on sequentially within the adder system wherein one may be considered as entering the system a second stored in the sum latches of the main adder and a third store in the result storage latches.

CONCLUSION

There has thus been disclosed and described a novel high-speed adder system having unique data flow-through characteristics. The significant design feature of the system is that there is a single set of completely sequential hardware herein wherein no functional component thereof is used more than once in any given operation either add or subtract. The significance of this design is that it allows pipelining of operations within the adder per se. By this, is meant that one operation can be started and begin flowing through the adder and at some subsequent time before the first operation is completed a second operation may begin. This type of operation is permitted primarily by the sequential or serial nature of the adder design wherein as stated above every functional unit is used only once in a given operation. Thus, for example, the exponent subtractor and the exponent update adder are separate units. Also separate shifters are utilized for prealignment of radix points and postnormalization.

The provision of latch points within the system also allows for the operation of the system with more than one operation being performed concurrently and yet assures that the operations will not inadvertently overlap within the system. Thus, it may be seen, that in effect the present adder is performing two addition operations concurrently and if the final or result latches are considered as an intrinsic part of the adder as many as three separate operations may be active in the system at any given time. By utilizing the disclosed input register organization which allows for the accumulation of up to three operations concurrently with the present high-speed adder, sufficient speed is achieved within the present system whereby two more conventional adders have been replaced by the presently disclosed adder design in an overall system architecture.

As should be readily apparent, the present adder is designed and suited primarily for operation upon floating point operands, however, the system is not necessarily limited thereto.

Also as stated previously in the specification, the present system and logic design disclosed in the instant preferred embodiment lends itself to the use of integrated circuit technology wherein all of the basic logic modules are in essence identical other than in the number of inputs provided and whether one or two of the available outputs are used.

All of the described embodiment disclosed herein is considered a preferred design of a high-speed adder constructed according to the teachings of the present invention. It is to be understood that numerous incidental design changes available to an engineer skilled in the computer arts would be possible within the broad concepts outlined therein. For example, wide variations in the particular logic modules could be utilized to achieve the system architecture generally disclosed herein i.e., widely varying types of logic blocks such as completely different AND, OR, I and AR Box could be utilized as well as other variations in the design of various adder stages, storage registers, shifting networks, and exdecoders. Also as stated previously, many modifications of the basic carry/look-ahead adder could be utilized for example, the design might be made more highly parallel wherein fewer logic levels would be required to complete an operation if it were decided that the extra hardware costs would justify the savings in time. Thus, the look-ahead could go to every individual bit position rather than the primarily intersection look-ahead scheme utilized in the present embodiment. The hexadecimal digit scheme could also be varied widely so that either three (octal) five, or even more bits could be utilized to make up a digit.

In summation, the primary novelty of the present adder is believed to lie in the use of the completely sequential hardware configuration, and the use of the multiple input registers, any one of which can feed an operation to the present adder complex upon demand. Closely related to this is the provision of the latching mechanism within the sequential adder which allows for the complete separation of operations as needed.

While the invention has been disclosed and described with respect to a preferred embodiment, it will be understood by those skilled in the art that the foregoing and other changes in form and details may be made therein without departing from the spirit and scope of the invention.

We claim:

1. A high-speed adder for processing floating point numbers in a computing system, said adder comprising input storage location means for storing all the necessary data for a plurality of add/subtract operations, and an output bus for returning results to the system:

said adder being comprised of completely sequential hardware no functional unit being used more than once in any given add/subtract operation, said hardware including:

means for aligning the radix points of the two operands;

means for transferring operands from said storage location means to said aligning means;

fraction adder means for adding the fraction portions of said two operands;

means for transferring the output from said aligning means to said fraction adder means;

normalization control means connected to the output of said fraction adder means;

unidirectional shifting means operable by said normalization control means for providing for high order carry out and for significant zero elimination;

means for transferring the fraction result from said fraction adder to said shifting means;

means for updating the exponent of the fraction result operable by said normalization control means;

means for transferring the exponent of said fraction result from said input storage location to said updating means;

means for gating a final exponent from said updating means and said fraction result from said shifting means to the output bus; and at least one latch means located between the input storage location means and said output bus means in the adder exponent and fraction data flow path, said latch being controlled by a system clock but wherein data flow between latch means is essentially asynchronous.

2. A high-speed adder as set forth in claim 1 wherein said means for aligning the radix points of the two operands includes an exponent adder for determining both the difference between the two exponents and which of the two exponents is larger, and means for determining it the difference in exponents would result in the fraction portion of the smaller operand becoming all zeros.

3. A high-speed adder as set forth in claim 2 including means for always gating one of the operands to said exponent adder in complement form and the other operand in true form whereby an effective subtraction occurs:

means for determining whether the result of this addition is in true or complement form; and means for transmitting the true result of said exponent addition to a decoding and shifting network means wherein the fraction portion of the smaller operand may be shifted in a single predetermined direction to insert significant leading zeros in the fraction portion of said smaller operand and thus align the radix point of the two operands.

4. A high-speed adder as set forth in claim 3 wherein said normalization control means includes means for examining the true result of said fraction adding means for leading significant zeros, and means for decoding the results of said examination, and unidirectional shifting circuit means controlled by said decoding means for shifting the fraction portion of the result in a single predetermined direction to remove said significant leading zeros from said result.

5. A high-speed adder as set forth in claim 4 wherein a first latch means is located at the output of the input storage location means operative to gate a pair of operands into the radix point alignment and fraction adder means:

a second latch means is located at the output of the fraction adder means selectively operable to gate the intermediate result from said fraction adder means into the shifting means, and the exponent of the larger operand from said input storage location into said updating means; and a third latch means is located at the output of the shifting and exponent update means for gating the final result back into the system data channels.

6. A high-speed adder as set forth in claim 5 including synchronous clock means for gating a pair of operands from said first latch means, an intermediate fraction result from said second latch means, and the final result from said third latch means, the time between actuating said first and second latch means for any one operation being a predetermined time based on the longest possible data path in the fraction adder, said clock means further being operative to gate a second operation from said first latch means a predetermined time before the just preceeding operation is gated from said second latch means.

7. A high-speed fully sequential adder system for performing floating point add/subtract operations in a large scale scientific computer said adder comprising:

input storage means for storing a plurality of pair of operands necessary for performing a plurality of add/subtract operations;

first latch means for gating a selected pair of operands from said input storage means into the adder;

fraction adder means for adding the fraction portion of a pair of operands, said fraction adder being a highly parallel high-speed carry/look-ahead adder;

means interposed between said input storage means and the fraction adder for aligning the radix points of the two operands including means for determining the larger of the exponents of the two operands, and means for shifting the operand having the smaller exponent a predetermined amount to align said radix points;

means for transferring the fraction portions of the larger operand and the operand whose radix point was shifted into said fraction adder;

normalization control means operable to determine whether the sum from said fraction adder has a high order carryout, requires no normalization, or contains high order significant zeros requiring normalization;

means for unidirectionally shifting the sum operable under control of the output from said normalization control means to normalize said sum;

second latch means for gating the fraction sum from said fraction adder into said shifting means;

means for updating the larger exponent of the two operands operable under control of said normalization control means;

means for transferring said larger exponent from said input storage location into said updating means; and third latch means for gating the normalized fraction and exponent portions of the result from said shifting and updating means respectively onto the computing system data busses.

8. A high-speed adder as set forth in claim 7 including timing means for synchronously controlling operation of said latch means, the flow of data between said latch points being essentially asynchronous, the time duration for operating the second latch means with respect to the first latch means from the input storage means being determined by the longest possible data path in the main fraction adder.

9. A high-speed adder as set forth in claim 8 wherein said means for aligning the radix points of the two operands includes an exponent adder for determining the difference between the two exponents and which of the two exponents is larger, and means for determining if the difference in exponents would result in the fraction portion of the smaller operand becoming all zeros.

10. A high-speed adder as set forth in claim 9 including means for always gating the exponent portion of one of the operands to said exponent adder in complement form and the exponent portion of the other operand in true form whereby an effective subtraction occurs:

means for determining whether the result of this addition is in true or complement form;

a decoding and shifting network for shifting the fraction portion of the smaller operand in a single predetermined direction to insert significant leading zeros in said fraction to align the radix points of the two operands; and means for gating the result from said exponent adder to said decoding and shifting network.

11. A high-speed adder as set forth in claim 10 wherein said normalization control means for normalizing the final result of said addition includes means for examining the true result of said fraction adding means for leading significant zeros, and means for decoding the results of the said examination, and unidirectional shifting circuit means controlled by the output of said decoding means for shifting the fraction portion of the result in a single predetermined direction to remove said significant leading zeros from said result.

12. A high-speed adder as set forth in claim 11 wherein said fraction adding means comprises a highly parallel carry/look-ahead adder wherein the fraction is broken into multibit sections and a first level of carry/look-ahead is carried out within each section and a second level of carry/look-ahead is developed for determining carries between the various sections.

13. A high-speed adder as set forth in claim 12 wherein said entire high-speed adder system is constructed of essentially identical logical units comprising current steering emitter follower NAND blocks wherein each block may have from one to four inputs and two outputs, one of said outputs being the complement of the other, and wherein a positive voltage appearing on any one of the inputs to said logical blocks results in both of the outputs changing polarity.

14. A high-speed adder as set forth in claim 13 including a sign control unit for determining the initial effective operation to be performed by the fraction adder and also for determining the character of the fraction adder result and for converting same into proper form for gating into the normalization means.

15. A high-speed adder as set forth in claim 14 wherein the final sum from the fraction adder may be gated to the normalization means in true or complement form under control of said sign control unit.